(12) United States Patent
Tang et al.

(10) Patent No.: US 10,397,990 B2
(45) Date of Patent: Aug. 27, 2019

(54) MICROWAVE OVEN AND THAWING CONTROL METHOD AND DEVICE FOR THE SAME

(71) Applicants: GUANGDONG MIDEA KITCHEN APPLIANCES MANUFACTURING CO., LTD., Foshan (CN); MIDEA GROUP CO., LTD., Foshan (CN)

(72) Inventors: Xiangwei Tang, Foshan (CN); Yuze Jia, Foshan (CN); Yan Li, Foshan (CN); Chun Luan, Foshan (CN); Dawen Sun, Foshan (CN); Zhong Han, Foshan (CN); Xinan Zeng, Foshan (CN)

(73) Assignees: GUANGDONG MIDEA KITCHEN APPLIANCES MANUFACTURING CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 193 days.

(21) Appl. No.: 15/468,994

(22) Filed: Mar. 24, 2017

(65) Prior Publication Data
US 2017/0196050 A1 Jul. 6, 2017

Related U.S. Application Data

(63) Continuation of application No. PCT/CN2015/090806, filed on Sep. 25, 2015.

(30) Foreign Application Priority Data

Sep. 25, 2014 (CN) .............................. 201410499395
Sep. 25, 2014 (CN) .............................. 201410499499
(Continued)

(51) Int. Cl.
*H05B 6/68* (2006.01)
*H05B 6/64* (2006.01)
(Continued)

(52) U.S. Cl.
CPC .............. *H05B 6/688* (2013.01); *F24C 7/02* (2013.01); *F24C 7/08* (2013.01); *H05B 6/6455* (2013.01); *H05B 6/725* (2013.01); *Y02B 40/143* (2013.01)

(58) Field of Classification Search
CPC ... F24C 7/02; F24C 7/08; H05B 6/688; H05B 6/725; H05B 6/6455; Y02B 40/143
(Continued)

(56) References Cited

U.S. PATENT DOCUMENTS 4,413,168 A 11/1983 Teich
4,599,503 A * 7/1986 Ueda .................... H05B 6/6411
219/518
(Continued)

FOREIGN PATENT DOCUMENTS

CN 2200770 Y 6/1995
CN 1284628 A 2/2001
(Continued)

OTHER PUBLICATIONS

EPO, Office Action for EP Application No. 17167008, dated Jan. 19, 2018.
(Continued)

*Primary Examiner* — Quang T Van
(74) *Attorney, Agent, or Firm* — Seed IP Law Group LLP

(57) ABSTRACT

The present disclosure provides a microwave oven, and a thawing control method and device for the same. The method includes: detecting temperatures of a plurality of temperature detecting points on food in the microwave oven; and controlling the microwave generator to start, and thawing the food according to the temperatures of the plurality of temperature detecting points on the food. With the method, the thawed food is more nutritious, healthier, and easier to
(Continued)

cut, and has the low temperature difference, without a cooked discoloration phenomenon.

13 Claims, 35 Drawing Sheets

(30) Foreign Application Priority Data

| Sep. 25, 2014 | (CN) | 201410499543 |
| Sep. 28, 2014 | (CN) | 201410508374 |
| Sep. 28, 2014 | (CN) | 201410510143 |

(51) Int. Cl.
*H05B 6/72* (2006.01)
*F24C 7/02* (2006.01)
*F24C 7/08* (2006.01)

(58) Field of Classification Search
USPC ....... 219/702, 703, 704, 705, 708, 710, 711, 219/715, 518, 720, 690; 426/234, 242, 426/243, 524; 99/325
See application file for complete search history.

(56) References Cited

U.S. PATENT DOCUMENTS

| 5,780,821 | A | 7/1998 | Choi et al. |
| 6,764,702 | B1 | 7/2004 | Törngren et al. |
| 8,525,086 | B2 | 9/2013 | Imai et al. |
| 2010/0059509 | A1* | 3/2010 | Imai ................. H05B 6/68 219/690 |
| 2014/0203012 | A1 | 7/2014 | Corona et al. |

FOREIGN PATENT DOCUMENTS

| CN | 1346583 | A | 4/2002 |
| CN | 1450310 | A | 10/2003 |
| CN | 1704674 | A | 12/2005 |
| CN | 101473692 | A | 7/2009 |
| CN | 104879803 | A | 9/2015 |
| EP | 0781072 | | 6/1997 |
| EP | 1145600 | | 10/2001 |
| EP | 2051563 | | 4/2009 |
| EP | 2704525 | | 3/2014 |
| JP | S5927133 | | 2/1984 |
| JP | H06101847 | | 4/1994 |
| JP | 2007335377 | | 12/2007 |
| RU | 1830197 | | 7/1993 |
| RU | 2124280 | | 12/1998 |
| WO | 2008007368 | | 1/2008 |

OTHER PUBLICATIONS

CIPO, Office Action for CA Application No. 2962660, dated Feb. 2, 2018.
ISA/CN, International Search Report for PCT/CN2015/090806, dated Jan. 11, 2016.
EPO, Office Action for EP Application No. 17167006, dated May 17, 2018.
JPO, Office Action for JP Application No. 2017516302, dated Apr. 26, 2018.
EPO, Office Action for EP Application No. 15845000, dated Apr. 17, 2018.

* cited by examiner

MICROWAVE OVEN AND THAWING CONTROL METHOD AND DEVICE FOR THE SAME

CROSS-REFERENCE TO RELATED APPLICATION

This application is a continuation of International Application No. PCT/CN2015/090806, which claims priority to and benefits of the following applications: (1) Chinese Patent Application Serial Nos. 201410508374.4 and 201410510143.7, filed with the State Intellectual Property Office of P. R. China on Sep. 28, 2014 by GUANGDONG MIDEA KITCHEN APPLIANCES MANUFACTURING CO., LTD. and MIDEA GROUP CO., LTD., and titled with "thawing control method and device for microwave oven and microwave oven"; (2) Chinese Patent Application Serial Nos. 201410499543.2, 201410499499.5 and 201410499395.4, filed with the State Intellectual Property Office of P. R. China on Sep. 25, 2014 by GUANGDONG MIDEA KITCHEN APPLIANCES MANUFACTURING CO., LTD. and MIDEA GROUP CO., LTD., and titled with "thawing control method and device for food in microwave oven and microwave oven". The entire contents of the above applications are incorporated herein by reference.

FIELD

The present disclosure relates to a technology field of household appliances, and more particularly to a thawing control method for a microwave oven, and a thawing control device for a microwave oven and a microwave oven.

BACKGROUND

With popularization and development of household microwave ovens, more and more people begin to use the microwave oven to thaw frozen food because of advantages (such as fast speed and high efficiency) of the microwave oven.

At present, people usually do not eat bought food (such as meat, fish, etc.) all at once in daily life, and some of the food may be frozen for eating next time. Therefore it is necessary to study microwave thawing of food.

In order to study current situation of microwave thawing, 6 microwave ovens with different brands and different models are chosen from the market to thaw 500 grams of minced beef, and following results are obtained.

| Brands | Models | period of thawing | firepower | maximum temperature | minimum temperature | cooked discoloration |
|---|---|---|---|---|---|---|
| Brand 1 | Model 1 | 2'12" | Automatic | 67.0° C. | −2.2° C. | Yes |
| Brand 2 | Model 2 | 15'00" | Automatic | 29.6° C. | −1.8° C. | No |
| Brand 3 | Model 3 | 27'17" | Automatic | 42.1° C. | −0.5° C. | Yes |
| Brand 4 | Model 4 | 7'00" | Automatic | 48.2° C. | −1.9° C. | Yes |
| Brand 5 | Model 5 | 13'00" | Automatic | 67.6° C. | −1.3° C. | Yes |
| Brand 6 | Model 6 | 11'00" | Automatic | 41.9° C. | −2.0° C. | Yes |

It can be seen from the above table that, microwave ovens of most brands have following problems. ① A period of thawing is long, in which the longest period is 27'17". ② There is the cooked discoloration. ③ A temperature difference is too large, in which the largest temperature difference reaches 69.2° C. The reason for occurring these problems is that an optimal temperature at thawing endpoint is not defined, thus lacking research on thawing procedures (such as firepower and period), and resulting in non-ideal effect of thawing. Therefore, it is urgent to research and improve the optimal temperature at thawing endpoint and a control method for thawing food by a microwave oven.

SUMMARY

A thawing control method for a microwave oven according to embodiments of the present disclosure is provided, in which the microwave oven includes a microwave generator, and the method includes: detecting temperatures of a plurality of temperature detecting points on food in the microwave oven; and controlling the microwave generator to start, and thawing the food according to the temperatures of the plurality of temperature detecting points on the food.

A thawing control device for a microwave oven according to embodiments of the present disclosure is provided, including: a processor; and a memory for storing instructions executable by the processor, in which the processor is configured to: detect temperatures of a plurality of temperature detecting points on food in the microwave oven; and control the microwave generator to start, and thaw the food according to the temperatures of the plurality of temperature detecting points on the food.

A microwave oven according to embodiments of the present disclosure is provided, including an oven body, in which an oven chamber is limited inside the oven body, and food is adaptive to be placed in the oven chamber; a temperature detecting device, provided in the oven body to detect temperatures of a plurality of temperature detecting points on the food; a microwave generator, disposed in the oven body, and configured to emit microwaves to the oven chamber to thaw the food; a controller, configured to execute acts of: detecting temperatures of a plurality of temperature detecting points on food in the microwave oven; and controlling the microwave generator to start, and thawing the food according to the temperatures of the plurality of temperature detecting points on the food.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which:

FIG. 4 (b) is a schematic diagram of temperature differences of fish with different weights thawed at different temperatures at thawing endpoint according to an embodiment of the present disclosure;

FIG. 4 (c) is a schematic diagram of temperature differences of chicken with different weights thawed at different temperatures at thawing endpoint according to an embodiment of the present disclosure;

FIG. 4 (d) is a schematic diagram of temperature differences of beef with different weights thawed at different temperatures at thawing endpoint according to an embodiment of the present disclosure;

FIG. 5 (b) is a schematic diagram of purge losses of fish with different weights thawed at different temperatures at thawing endpoint according to an embodiment of the present disclosure;

FIG. 5 (c) is a schematic diagram of purge losses of chicken with different weights thawed at different temperatures at thawing endpoint according to an embodiment of the present disclosure;

FIG. 5 (d) is a schematic diagram of purge losses of beef with different weights thawed at different temperatures at thawing endpoint according to an embodiment of the present disclosure;

FIG. 6 (b) is a schematic diagram of protein contents of fish with different weights thawed at different temperatures at thawing endpoint according to an embodiment of the present disclosure;

FIG. 6 (c) is a schematic diagram of protein contents of chicken with different weights thawed at different temperatures at thawing endpoint according to an embodiment of the present disclosure;

FIG. 6 (d) is a schematic diagram of protein contents of beef with different weights thawed at different temperatures at thawing endpoint according to an embodiment of the present disclosure;

FIG. 7 (b) is a schematic diagram of water contents of fish with different weights thawed at different temperatures at thawing endpoint according to an embodiment of the present disclosure;

FIG. 7 (c) is a schematic diagram of water contents of chicken with different weights thawed at different temperatures at thawing endpoint according to an embodiment of the present disclosure;

FIG. 7 (d) is a schematic diagram of water contents of beef with different weights thawed at different temperatures at thawing endpoint according to an embodiment of the present disclosure;

FIG. 8 (b) is a schematic diagram of shear forces of fish with different weights thawed at different temperatures at thawing endpoint according to an embodiment of the present disclosure;

FIG. 8 (c) is a schematic diagram of shear forces of chicken with different weights thawed at different temperatures at thawing endpoint according to an embodiment of the present disclosure;

FIG. 8 (d) is a schematic diagram of shear forces of beef with different weights thawed at different temperatures at thawing endpoint according to an embodiment of the present disclosure;

FIG. 9 (b) is a schematic diagram of yellowness of fish with different weights thawed at different temperatures at thawing endpoint according to an embodiment of the present disclosure;

FIG. 9 (c) is a schematic diagram of yellowness of chicken with different weights thawed at different temperatures at thawing endpoint according to an embodiment of the present disclosure;

FIG. 9 (d) is a schematic diagram of yellowness of beef with different weights thawed at different temperatures at thawing endpoint according to an embodiment of the present disclosure;

FIG. 10 (b) is a schematic diagram of aerobic plate counts of fish with different weights thawed at different temperatures at thawing endpoint according to an embodiment of the present disclosure;

FIG. 10 (c) is a schematic diagram of aerobic plate counts of chicken with different weights thawed at different temperatures at thawing endpoint according to an embodiment of the present disclosure;

FIG. 10 (d) is a schematic diagram of aerobic plate counts of beef with different weights thawed at different temperatures at thawing endpoint according to an embodiment of the present disclosure;

FIG. 16 (b) is a schematic diagram of temperature differences of fish with different weights thawed at different temperatures at thawing endpoint according to an embodiment of the present disclosure;

FIG. 16 (c) is a schematic diagram of temperature differences of chicken with different weights thawed at different temperatures at thawing endpoint according to an embodiment of the present disclosure;

FIG. 16 (d) is a schematic diagram of temperature differences of beef with different weights thawed at different temperatures at thawing endpoint according to an embodiment of the present disclosure;

FIG. 17 (b) is a schematic diagram of purge losses of fish with different weights thawed at different temperatures at thawing endpoint according to an embodiment of the present disclosure;

FIG. 17 (c) is a schematic diagram of purge losses of chicken with different weights thawed at different temperatures at thawing endpoint according to an embodiment of the present disclosure;

FIG. 17 (d) is a schematic diagram of purge losses of beef with different weights thawed at different temperatures at thawing endpoint according to an embodiment of the present disclosure;

FIG. 18 (b) is a schematic diagram of protein contents of fish with different weights thawed at different temperatures at thawing endpoint according to an embodiment of the present disclosure;

FIG. 18 (c) is a schematic diagram of protein contents of chicken with different weights thawed at different temperatures at thawing endpoint according to an embodiment of the present disclosure;

FIG. 18 (d) is a schematic diagram of protein contents of beef with different weights thawed at different temperatures at thawing endpoint according to an embodiment of the present disclosure;

FIG. 19 (b) is a schematic diagram of water contents of fish with different weights thawed at different temperatures at thawing endpoint according to an embodiment of the present disclosure;

FIG. 19 (c) is a schematic diagram of water contents of chicken with different weights thawed at different temperatures at thawing endpoint according to an embodiment of the present disclosure;

FIG. 19 (d) is a schematic diagram of water contents of beef with different weights thawed at different temperatures at thawing endpoint according to an embodiment of the present disclosure;

FIG. 20 (b) is a schematic diagram of shear forces of fish with different weights thawed at different temperatures at thawing endpoint according to an embodiment of the present disclosure;

FIG. 20 (c) is a schematic diagram of shear forces of chicken with different weights thawed at different temperatures at thawing endpoint according to an embodiment of the present disclosure;

FIG. 20 (d) is a schematic diagram of shear forces of beef with different weights thawed at different temperatures at thawing endpoint according to an embodiment of the present disclosure;

FIG. 21 (b) is a schematic diagram of yellowness of fish with different weights thawed at different temperatures at thawing endpoint according to an embodiment of the present disclosure;

FIG. 21 (c) is a schematic diagram of yellowness of chicken with different weights thawed at different temperatures at thawing endpoint according to an embodiment of the present disclosure;

FIG. 21 (d) is a schematic diagram of yellowness of beef with different weights thawed at different temperatures at thawing endpoint according to an embodiment of the present disclosure;

FIG. 22 (b) is a schematic diagram of aerobic plate counts of fish with different weights thawed at different temperatures at thawing endpoint according to an embodiment of the present disclosure;

FIG. 22 (c) is a schematic diagram of aerobic plate counts of chicken with different weights thawed at different temperatures at thawing endpoint according to an embodiment of the present disclosure;

FIG. 22 (d) is a schematic diagram of aerobic plate counts of beef with different weights thawed at different temperatures at thawing endpoint according to an embodiment of the present disclosure;

Figure 1:
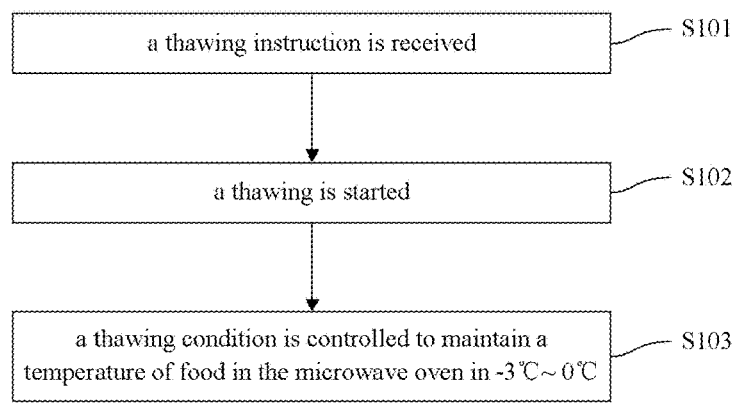
FIG. 1 is a flow chart of a thawing control method for a microwave oven according to an embodiment of the present disclosure.

REFERENCE NUMERALS 110A, 110B: receiving module; 120A: thawing module; 120B: detecting module; 130A, 130B: control module;
210A, 210B: receiving module; 220A: thawing module; 220B: detecting module; 230A,
230B: control module;
100A, 100B: microwave oven;
1: oven body; 11: oven chamber; 12: oven feet; 13: clapboard; 14: mounting portion;
111: cooking chamber; 112: heating chamber; 131: temperature detecting point; 141: through-hole;
2: control panel; 21: display screen; 22: key for thawing;
31: microwave source; 32: microwave source feeding device; 33: waveguide; 34: heating antenna; 35: stirring blade;
4: weight sensor; 5: infrared temperature sensor; 6: motor; 200: food.

DETAILED DESCRIPTION

Exemplary embodiments of the present disclosure will be described in detail herein, and examples thereof are illustrated in accompanying drawings. Throughout figures referred by the following description, the same reference number in different figures indicates the same or similar elements unless otherwise stated. Implementations described in the following exemplary embodiments are explanatory, illustrative, and used to generally understand the present disclosure. The exemplary embodiments shall not be construed to limit the present disclosure.

In the following, a thawing control method and a thawing control device for a microwave oven and a microwave oven according to embodiments of the present disclosure will be described in detail with reference to the accompanying drawings.

FIG. 1 is a flow chart of a thawing control method for a microwave oven according to an embodiment of the present disclosure. As shown in FIG. 1, a thawing control method for a microwave oven may include followings.

In step S101, a thawing instruction is received.

For example, assuming that the thawing control method for a microwave oven may be applied in a microwave oven, the microwave oven can provide a user with a key with a thawing function. When the user put food to be thawed into the microwave oven, the user can input the thawing instruction by pressing the key. According to an embodiment of the present disclosure, the food can be meat or fish.

In step S102, a thawing is started.

For example, the thawing function can be initiated to perform the thawing after the microwave oven receives the thawing instruction.

In step S103, a thawing condition is controlled to maintain a temperature of the food in the microwave oven in −3° C.~0° C.

According to an embodiment of the present disclosure, the thawing condition may include at least one of a period of thawing, heating power, and a heating direction.

Specifically, by controlling the thawing condition (such as the period of thawing, and/or the heating power of the thawing, and/or the heating direction etc.), the temperature of the food in the microwave oven can be maintained in −3° C.~0° C. For example, when the temperature of the food in the microwave oven is detected to be smaller than −20° C. (for example, the food is put into the microwave oven just now) in a thawing process, the heating power of the thawing can be increased to speed up the thawing process. When a current temperature of the food in the microwave oven is detected to be −5° C., the heating power of the thawing can be decreased and be controlled to a corresponding heating power of the thawing. Such that the temperature of the food in the microwave oven can be maintained in −3° C.~0° C. The heating direction also can be controlled to evenly thaw the food.

Figure 2:
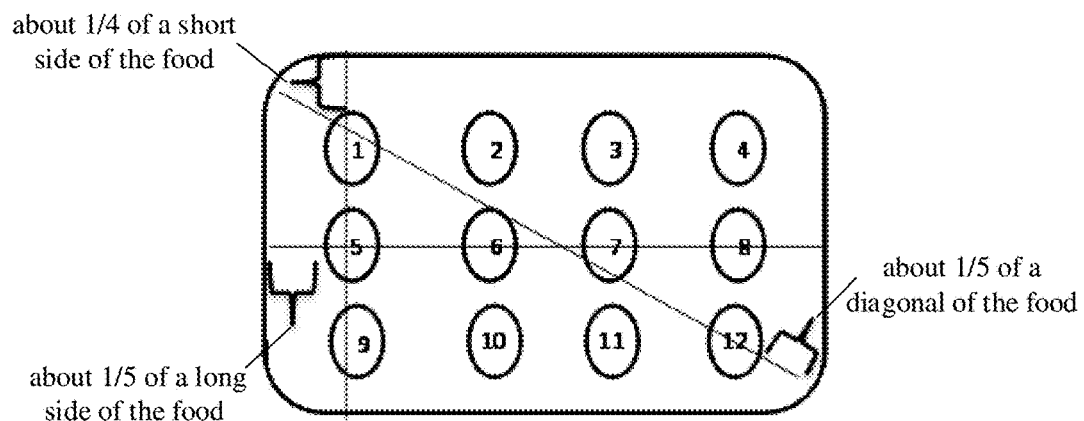
FIG. 2 is a schematic diagram of 12 points selected when detecting a temperature of food according to an embodiment of the present disclosure.

It should be noted that, in embodiments of the present disclosure, as shown in FIG. 2, 12 points on the food in the microwave oven are selected. A temperature detection is performed on the 12 points respectively (for example, a temperature at a height of ½ of each point is detected). When temperatures of more than 80% of the 12 points (that is, 10 points or more) are in a range of −3° C.~0° C., it can be said that the food is the thawed food of −3° C.~0° C. As shown in FIG. 2, a distance between a column in which point 1 lies and an edge of the food is about ⅕ of a long side of the food. A distance between a column in which point 4 lies and an edge of the food is about ⅕ of a long side of the food. A distance between a row in which point 1 lies and an edge of the food is about ¼ of a short side of the food. A distance between a row in which point 9 and an edge of the food is about ¼ of a short side of the food. A distance between each of 4 points (point 1, point 4, point 9 and point 12) and a corresponding corner is about ⅕ of a diagonal of the food.

It should be further noted that, through a large amount of experimental data, the inventors find that, by thawing the food to be thawed via the microwave oven to maintain the temperature of the food in −3° C.~0° C., nutrition retention rate of the food is improved, microbial pollution is reduced, and cutting for the thawed food is not affected.

Figure 3:
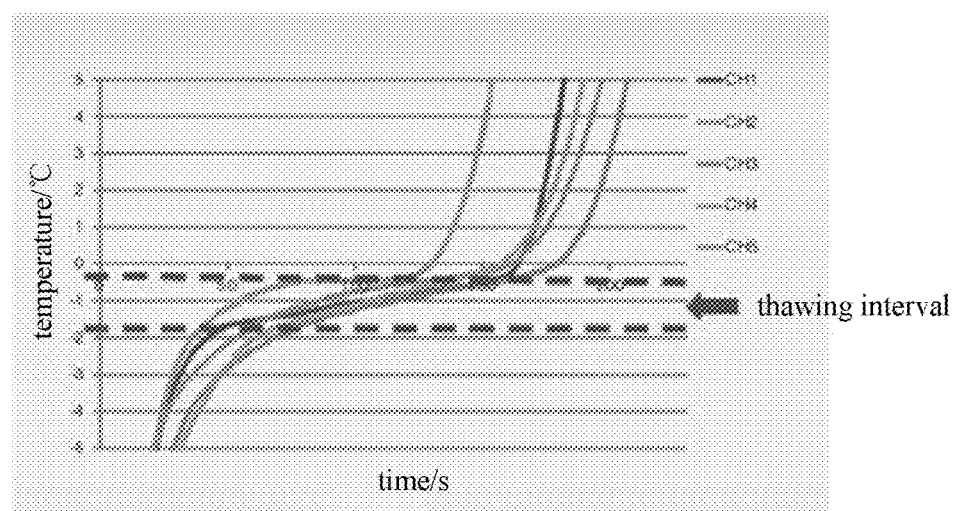
FIG. 3 is a schematic diagram of a temperature curve of meat when a microwave oven thaws the meat according to an embodiment of the present disclosure.

This is because that microwave is mainly used when thawing with the microwave oven. The microwave affects directly on the food to be thawed, and the food is heated inside and outside at the same time without transmitting radiation, thus the food can be thawed regardless of whether there is an interspace between the food and the heating source. Heating in microwave thawing is caused by absorbing loss of medium, so a medium with large loss can be fast heated. Water is a medium with a strong ability for absorbing microwave, so the microwave thawing is effective in heating materials with a large amount of water. Water molecules in the food to be thawed can absorb a large amount of microwave only after thawing, and water molecules trapped in crystalline ice cannot absorb the microwave. Therefore, the temperature of the food changes little when there is crystalline ice in the food, and the temperature of the food may change fast after the crystalline ice in the food melts. As shown in FIG. 3, by performing drawing analysis to data of 5 experiments selected from a plurality of experiments, the inventors find that, the temperature of the food in a thawing interval varies smoothly. The temperature of the food varies little because there is the crystalline ice in the food. When the temperature is above 0° C., as the crystalline ice gradually melts, resulting in gradual increase of water medium for absorbing microwave, thus the temperature of the food may increase continuously and rapidly. However, a case that the food may be cooked is caused. Therefore, −3° C.~0° C. is selected as a thawing interval for thawing food. In the following, experimental data will be combined to enable those skilled in the art to more clearly understand benefits of thawing food at −3° C.~0° C.

In embodiment 1, temperature differences of food thawed at −3° C.~0° C. are analyzed.

1. Pork tenderloin, fish, chicken, and beef are selected as the food respectively, and 100 g (gram), 200 g, 300 g, 400 g, and 500 g are selected as weights of each kind of the food.

(1) Experiments on pork tenderloin of 100 g, 200 g, 300 g, 400 g, and 500 g respectively. Firstly, pork tenderloin of 100 g, 200 g, 300 g, 400 g, and 500 g are put in the microwave oven to thaw respectively. The temperatures of the food in the microwave oven are maintained at different thawing endpoints (i.e. thawed at a temperature larger than 0° C., thawed at 0° C., thawed at −1.5° C., thawed at −3° C., and thawed at −4° C.). And then, a maximum temperature and a minimum temperature of pork tenderloin of 100 g, 200 g, 300 g, 400 g, and 500 g respectively thawed at different thawing endpoints (i.e. thawed at the temperature larger than 0° C., thawed at 0° C., thawed at −1.5° C., thawed at −3° C., and thawed at −4° C.) are detected respectively. Then the temperature differences of pork tenderloin of 100 g, 200 g, 300 g, 400 g, and 500 g respectively thawed at different thawing endpoints (i.e. thawed at the temperature larger than 0° C., thawed at 0° C., thawed at −1.5° C., thawed at −3° C., and thawed at −4° C.) may be obtained. Experimental data of 5 parallel experiments are selected from a plurality of experiments by the inventors and shown in Table 1.

TABLE 1 pork tenderloin

| | parallel 1 | parallel 2 | parallel 3 | parallel 4 | parallel 5 | Mean value |
|---|---|---|---|---|---|---|
| 100 g Thawed at the temperature larger than 0° C. | 42.7 | 39.2 | 37.2 | 44.4 | 41.1 | 40.9 |
| Thawed at 0° C. | 26.3 | 14.6 | 27.7 | 16.2 | 7.1 | 18.4 |
| Thawed at −1.5° C. | 13.0 | 24.7 | 11.0 | 17.7 | 21.7 | 17.6 |
| Thawed at −3° C. | 21.7 | 14.7 | 20.1 | 26.0 | 22.2 | 20.9 |
| Thawed at −4° C. | 21.5 | 13.8 | 12.0 | 9.5 | 27.8 | 16.9 |
| 200 g Thawed at the temperature larger than 0° C. | 42.7 | 35.4 | 40.4 | 41.6 | 37.3 | 39.5 |
| Thawed at 0° C. | 24.5 | 12.1 | 3.8 | 15.7 | 26.7 | 16.6 |
| Thawed at −1.5° C. | 4.0 | 26.4 | 20.8 | 10.9 | 4.0 | 13.2 |
| Thawed at −3° C. | 8.8 | 26.8 | 19.9 | 13.2 | 27.8 | 19.3 |
| Thawed at −4° C. | 4.3 | 17.3 | 18.5 | 27.7 | 20.9 | 17.7 |
| 300 g Thawed at the temperature larger than 0° C. | 36.1 | 37.8 | 36.0 | 42.5 | 37.8 | 38.0 |
| Thawed at 0° C. | 17.8 | 3.2 | 8.6 | 19.6 | 4.2 | 10.7 |
| Thawed at −1.5° C. | 16.7 | 25.4 | 3.4 | 25.6 | 15.1 | 17.2 |
| Thawed at −3° C. | 25.3 | 16.7 | 24.3 | 15.4 | 19.4 | 20.2 |
| Thawed at −4° C. | 15.7 | 21.9 | 18.9 | 6.2 | 18.9 | 16.3 |
| 400 g Thawed at the temperature larger than 0° C. | 35.4 | 36.2 | 41.8 | 36.2 | 41.2 | 38.2 |
| Thawed at 0° C. | 19.5 | 25.0 | 14.0 | 18.2 | 12.5 | 17.8 |
| Thawed at −1.5° C. | 10.3 | 7.2 | 7.4 | 4.9 | 6.1 | 7.2 |
| Thawed at −3° C. | 18.5 | 11.9 | 26.9 | 16.2 | 6.9 | 16.1 |
| Thawed at −4° C. | 23.8 | 11.0 | 9.1 | 12.6 | 4.5 | 12.2 |
| 500 g Thawed at the temperature larger than 0° C. | 40.5 | 41.7 | 43.6 | 36.2 | 40.8 | 40.6 |
| Thawed at 0° C. | 11.3 | 20.1 | 17.0 | 6.4 | 15.8 | 14.1 |
| Thawed at −1.5° C. | 25.8 | 13.7 | 11.4 | 16.8 | 6.3 | 14.8 |
| Thawed at −3° C. | 27.1 | 5.8 | 23.6 | 12.1 | 10.1 | 15.7 |
| Thawed at −4° C. | 13.5 | 8.5 | 9.9 | 17.1 | 25.7 | 14.9 |

(2) Experiments on fish of 100 g, 200 g, 300 g, 400 g, and 500 g respectively, of which a process and a method are same as that of pork tenderloin of 100 g, 200 g, 300 g, 400 g, and 500 g, and can refer to descriptions of the above process and method corresponding to pork tenderloin of 100 g, 200 g, 300 g, 400 g, and 500 g, which is not described in detail herein. Experimental data of 5 parallel experiments are selected from a plurality of experiments by the inventors and shown in Table 2.

TABLE 2 fish

|  | parallel 1 | parallel 2 | parallel 3 | parallel 4 | parallel 5 | Mean value |
|---|---|---|---|---|---|---|
| 100 g Thawed at the temperature larger than 0° C. | 42.5 | 43.3 | 35.4 | 38.6 | 44.7 | 40.9 |
| Thawed at 0° C. | 10.6 | 12.0 | 26.3 | 5.8 | 6.0 | 12.1 |
| Thawed at −1.5° C. | 26.8 | 25.2 | 20.5 | 16.9 | 23.7 | 22.6 |
| Thawed at −3° C. | 21.7 | 22.3 | 9.0 | 15.1 | 17.8 | 17.2 |
| Thawed at −4° C. | 3.0 | 16.8 | 6.1 | 25.7 | 4.7 | 11.3 |
| 200 g Thawed at the temperature larger than 0° C. | 42.4 | 42.5 | 36.4 | 42.4 | 36.7 | 40.1 |
| Thawed at 0° C. | 13.3 | 22.4 | 16.9 | 9.6 | 18.6 | 16.2 |
| Thawed at −1.5° C. | 4.1 | 27.0 | 25.8 | 5.1 | 19.7 | 16.3 |
| Thawed at −3° C. | 13.3 | 5.4 | 17.7 | 23.0 | 18.5 | 15.6 |
| Thawed at −4° C. | 7.1 | 27.9 | 11.5 | 12.8 | 3.3 | 12.5 |
| 300 g Thawed at the temperature larger than 0° C. | 37.7 | 39.4 | 39.8 | 36.0 | 36.6 | 37.9 |
| Thawed at 0° C. | 14.9 | 21.0 | 24.1 | 24.4 | 4.3 | 17.7 |
| Thawed at −1.5° C. | 18.8 | 4.7 | 21.0 | 16.1 | 11.8 | 14.5 |
| Thawed at −3° C. | 15.9 | 26.5 | 11.7 | 22.7 | 15.5 | 18.5 |
| Thawed at −4° C. | 22.0 | 27.7 | 12.1 | 11.8 | 27.1 | 20.1 |
| 400 g Thawed at the temperature larger than 0° C. | 38.3 | 37.9 | 36.1 | 40.8 | 38.0 | 38.2 |
| Thawed at 0° C. | 9.5 | 7.9 | 27.2 | 17.4 | 16.6 | 15.7 |
| Thawed at −1.5° C. | 18.4 | 11.2 | 14.9 | 9.1 | 8.1 | 12.3 |
| Thawed at −3° C. | 24.8 | 8.5 | 16.8 | 9.7 | 18.9 | 15.7 |
| Thawed at −4° C. | 9.1 | 6.2 | 12.3 | 22.2 | 17.3 | 13.4 |
| 500 g Thawed at the temperature larger than 0° C. | 36.1 | 38.8 | 38.3 | 38.3 | 38.3 | 38.0 |
| Thawed at 0° C. | 8.5 | 25.7 | 26.1 | 18.1 | 18.1 | 19.3 |
| Thawed at −1.5° C. | 22.9 | 18.1 | 4.6 | 18.4 | 5.6 | 13.9 |
| Thawed at −3° C. | 18.9 | 10.3 | 19.8 | 12.5 | 16.6 | 15.6 |
| Thawed at −4° C. | 3.2 | 23.5 | 23.2 | 26.4 | 3.5 | 16.0 |

(3) Experiments on chicken of 100 g, 200 g, 300 g, 400 g, and 500 g respectively, of which a process and a method are same as that of pork tenderloin of 100 g, 200 g, 300 g, 400 g, and 500 g, and can refer to descriptions of the above process and method corresponding to pork tenderloin of 100 g, 200 g, 300 g, 400 g, and 500 g, which is not described in detail herein. Experimental data of 5 parallel experiments are selected from a plurality of experiments by the inventors and shown in Table 3.

TABLE 3 chicken

|  | parallel 1 | parallel 2 | parallel 3 | parallel 4 | parallel 5 | Mean value |
|---|---|---|---|---|---|---|
| 100 g Thawed at the temperature larger than 0° C. | 39.6 | 44.2 | 35.7 | 35.0 | 36.3 | 38.2 |
| Thawed at 0° C. | 4.9 | 22.9 | 20.6 | 25.9 | 19.3 | 18.7 |
| Thawed at −1.5° C. | 22.2 | 14.3 | 7.5 | 10.7 | 22.7 | 15.5 |
| Thawed at −3° C. | 18.3 | 16.9 | 8.3 | 18.5 | 26.2 | 17.6 |
| Thawed at −4° C. | 18.5 | 17.7 | 13.9 | 16.3 | 3.4 | 14.0 |
| 200 g Thawed at the temperature larger than 0° C. | 35.9 | 35.1 | 42.2 | 42.2 | 41.5 | 39.4 |
| Thawed at 0° C. | 4.2 | 8.6 | 26.2 | 24.3 | 25.9 | 17.8 |
| Thawed at −1.5° C. | 27.2 | 3.8 | 18.2 | 26.3 | 10.1 | 17.1 |
| Thawed at −3° C. | 5.4 | 5.9 | 10.8 | 25.2 | 10.2 | 11.5 |
| Thawed at −4° C. | 21.0 | 15.8 | 3.3 | 6.0 | 8.5 | 10.9 |
| 300 g Thawed at the temperature larger than 0° C. | 42.1 | 37.6 | 42.7 | 41.2 | 44.4 | 41.6 |
| Thawed at 0° C. | 19.1 | 26.0 | 17.1 | 9.5 | 24.5 | 19.2 |
| Thawed at −1.5° C. | 20.5 | 25.9 | 11.9 | 23.1 | 20.6 | 20.4 |
| Thawed at −3° C. | 27.7 | 3.6 | 12.0 | 26.2 | 6.6 | 15.2 |
| Thawed at −4° C. | 3.6 | 27.9 | 11.3 | 7.6 | 7.1 | 11.5 |
| 400 g Thawed at the temperature larger than 0° C. | 39.4 | 39.6 | 35.7 | 41.5 | 43.2 | 39.9 |
| Thawed at 0° C. | 10.7 | 14.0 | 16.5 | 7.8 | 17.9 | 13.4 |
| Thawed at −1.5° C. | 10.1 | 17.7 | 7.2 | 21.9 | 24.9 | 16.4 |
| Thawed at −3° C. | 22.3 | 17.9 | 17.4 | 23.1 | 13.7 | 18.9 |
| Thawed at −4° C. | 24.3 | 17.9 | 26.7 | 3.3 | 8.1 | 16.1 |
| 500 g Thawed at the temperature larger than 0° C. | 35.7 | 37.7 | 39.8 | 37.6 | 35.6 | 37.3 |
| Thawed at 0° C. | 22.5 | 21.4 | 26.6 | 20.0 | 18.5 | 21.8 |
| Thawed at −1.5° C. | 25.5 | 13.7 | 6.6 | 23.5 | 4.8 | 14.8 |
| Thawed at −3° C. | 6.5 | 19.5 | 3.7 | 10.8 | 9.6 | 10.0 |
| Thawed at −4° C. | 22.3 | 21.8 | 12.6 | 17.6 | 11.4 | 17.1 |

(4) Experiments on beef of 100 g, 200 g, 300 g, 400 g, and 500 g respectively, of which a process and a method are same as that of pork tenderloin of 100 g, 200 g, 300 g, 400 g, and 500 g, and can refer to descriptions of the above process and method corresponding to pork tenderloin of 100 g, 200 g, 300 g, 400 g, and 500 g, which is not described in detail herein. Experimental data of 5 parallel experiments are selected from a plurality of experiments by the inventors and shown in Table 4.

TABLE 4 beef

|  | parallel 1 | parallel 2 | parallel 3 | parallel 4 | parallel 5 | Mean value |
|---|---|---|---|---|---|---|
| 100 g Thawed at the temperature larger than 0° C. | 37.0 | 43.5 | 36.9 | 35.1 | 43.4 | 39.2 |
| Thawed at 0° C. | 5.0 | 12.4 | 22.9 | 9.0 | 17.2 | 13.3 |
| Thawed at −1.5° C. | 11.1 | 21.7 | 13.1 | 5.6 | 23.5 | 15.0 |
| Thawed at −3° C. | 22.0 | 25.4 | 20.0 | 13.7 | 24.9 | 21.2 |
| Thawed at −4° C. | 9.7 | 22.1 | 22.5 | 22.8 | 17.0 | 18.8 |

TABLE 4-continued beef

| | parallel 1 | parallel 2 | parallel 3 | parallel 4 | parallel 5 | Mean value |
|---|---|---|---|---|---|---|
| 200 g Thawed at the temperature larger than 0° C. | 39.3 | 42.2 | 40.0 | 36.3 | 36.4 | 38.8 |
| Thawed at 0° C. | 8.1 | 17.0 | 13.4 | 16.4 | 16.2 | 14.2 |
| Thawed at −1.5° C. | 16.1 | 23.0 | 18.0 | 19.6 | 7.7 | 16.9 |
| Thawed at −3° C. | 6.5 | 5.1 | 21.9 | 21.1 | 5.0 | 11.9 |
| Thawed at −4° C. | 25.0 | 26.3 | 10.3 | 20.7 | 6.9 | 17.8 |
| 300 g Thawed at the temperature larger than 0° C. | 38.7 | 35.1 | 41.2 | 39.7 | 35.6 | 38.1 |
| Thawed at 0° C. | 5.1 | 21.5 | 13.9 | 8.8 | 15.8 | 13.0 |
| Thawed at −1.5° C. | 21.2 | 21.2 | 18.7 | 9.8 | 9.7 | 16.1 |
| Thawed at −3° C. | 8.2 | 7.3 | 25.2 | 26.8 | 27.4 | 19.0 |
| Thawed at −4° C. | 7.6 | 26.9 | 16.3 | 21.3 | 27.7 | 20.0 |
| 400 g Thawed at the temperature larger than 0° C. | 40.5 | 35.6 | 43.8 | 39.7 | 43.6 | 40.6 |
| Thawed at 0° C. | 16.3 | 18.8 | 26.1 | 26.5 | 15.7 | 20.7 |
| Thawed at −1.5° C. | 19.5 | 4.4 | 25.1 | 6.4 | 23.0 | 15.7 |
| Thawed at −3° C. | 19.4 | 24.9 | 6.8 | 17.3 | 12.9 | 16.3 |
| Thawed at −4° C. | 21.6 | 18.1 | 23.0 | 17.8 | 13.6 | 18.8 |
| 500 g Thawed at the temperature larger than 0° C. | 41.9 | 42.4 | 42.8 | 37.1 | 38.3 | 40.5 |
| Thawed at 0° C. | 19.3 | 11.7 | 26.6 | 7.6 | 17.6 | 16.6 |
| Thawed at −1.5° C. | 9.7 | 23.2 | 16.4 | 9.0 | 16.7 | 15.0 |
| Thawed at −3° C. | 13.9 | 8.1 | 23.5 | 6.3 | 18.0 | 14.0 |
| Thawed at −4° C. | 17.0 | 21.3 | 26.5 | 25.3 | 8.6 | 19.7 |

Figure 4:
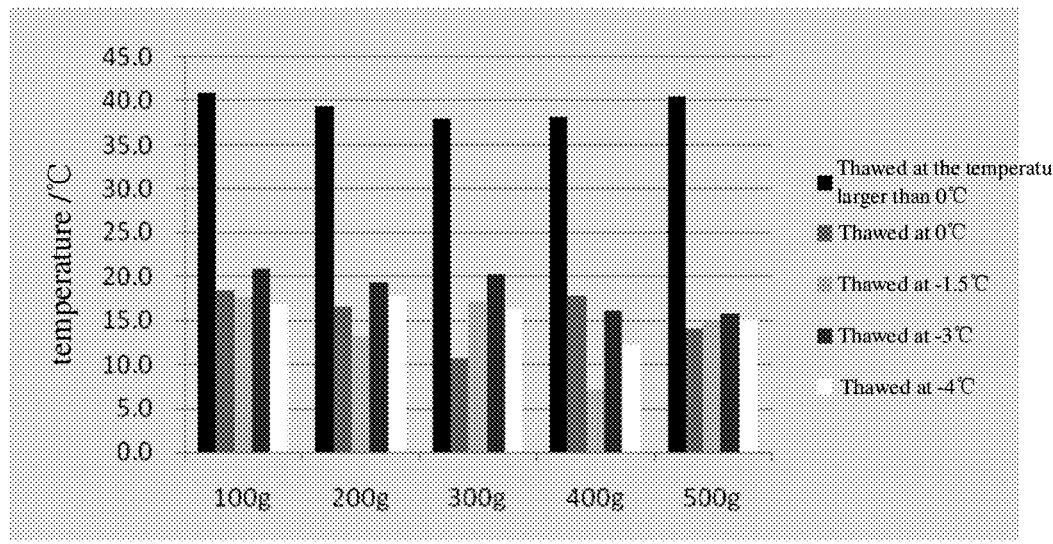
FIG. 4 (a) is a schematic diagram of temperature differences of pork tenderloin with different weights thawed at different temperatures at thawing endpoint according to an embodiment of the present disclosure.
Figure 4:
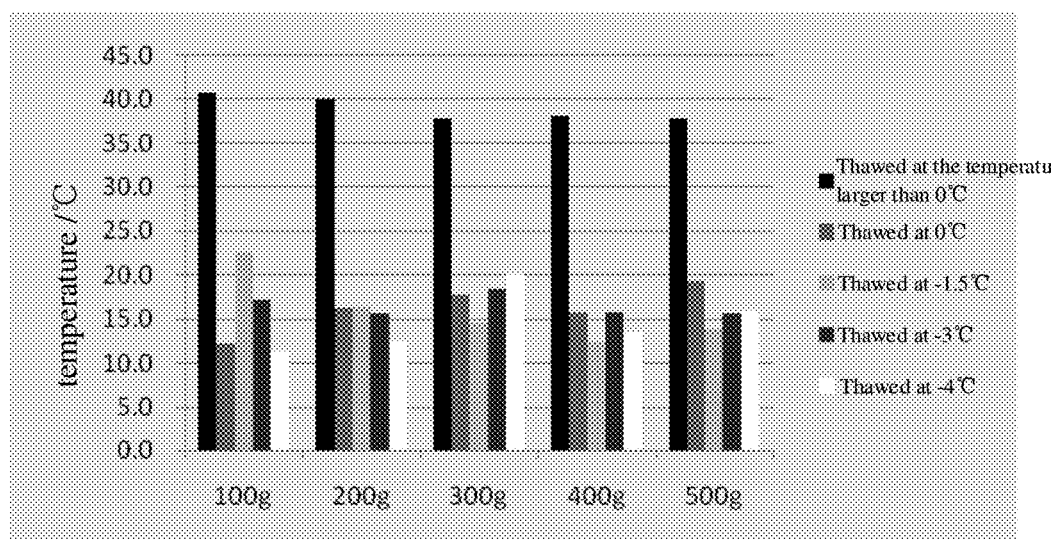
Figure 4:
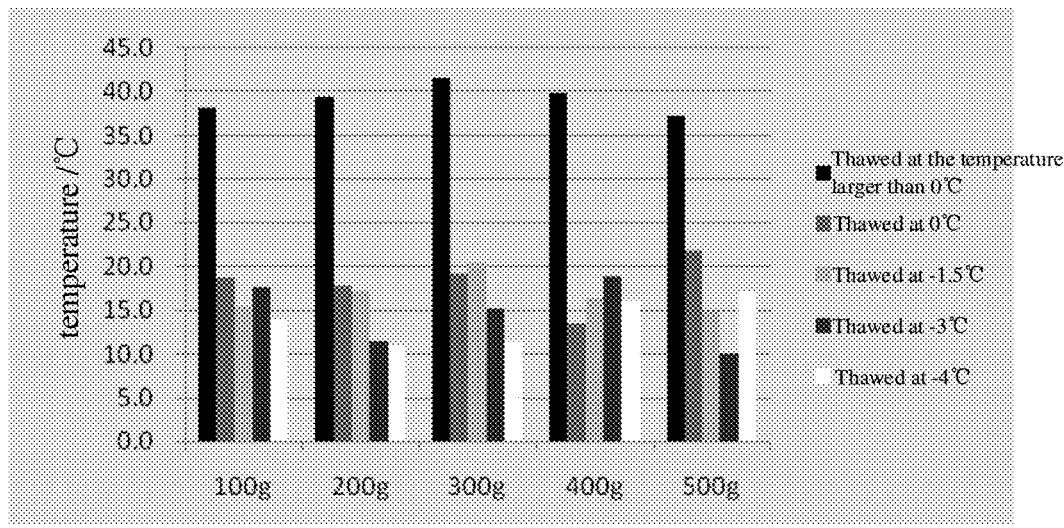
Figure 4:
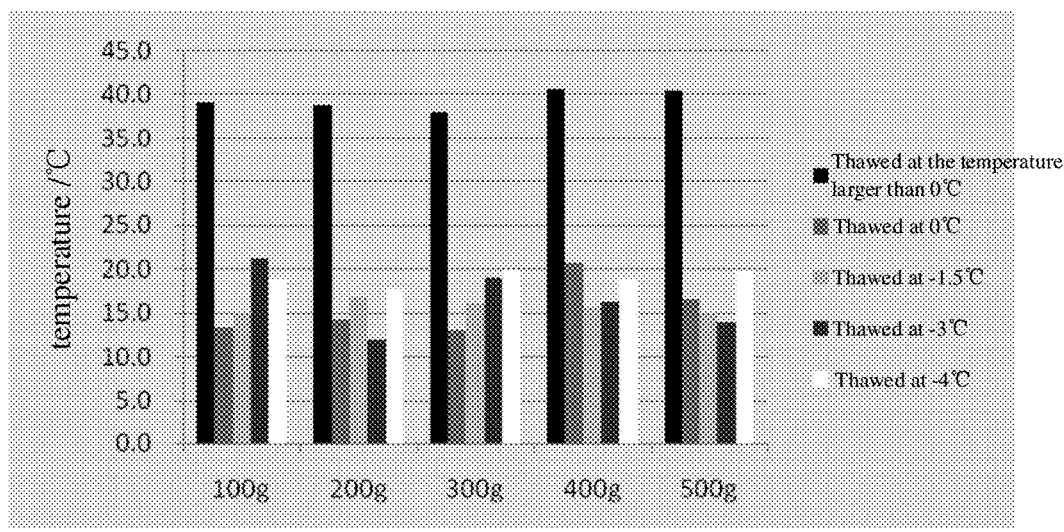

2. Experiment results. FIG. 4(a) is a diagram drawn according to each group of mean values in Table 1. FIG. 4(b) is a diagram drawn according to each group of mean values in Table 2. FIG. 4(c) is a diagram drawn according to each group of mean values in Table 3. FIG. 4(d) is a diagram drawn according to each group of mean values in Table 4. It can be known from FIG. 4(a), FIG. 4(b), FIG. 4(c), and FIG. 4(d) that, after thawing, the temperature difference varies with the kind of the food, the weight of the food, and the temperature at thawing endpoint. The temperature differences are significantly reduced and the thawing is uniform when the temperature of the food after thawing (i.e. the thawed food) is maintained in −3° C.~0° C., relative to that when the temperature of the food after thawing (i.e. the thawed food) is larger than 0° C.

In embodiment 2, purge losses of food thawed at −3° C.~0° C. are analyzed.

1. Pork tenderloin, fish, chicken, and beef are selected as the food respectively, and 100 g (gram), 200 g, 300 g, 400 g, and 500 g are selected as weights of each kind of the food.

(1) Experiments on pork tenderloin of 100 g, 200 g, 300 g, 400 g, and 500 g respectively. Firstly, pork tenderloin of 100 g, 200 g, 300 g, 400 g, and 500 g are put in the microwave oven to thaw respectively. The temperatures of the food in the microwave oven are maintained at different thawing endpoints (i.e. thawed at a temperature larger than 0° C., thawed at 0° C., thawed at −1.5° C., thawed at −3° C., and thawed at −4° C.). And then, the purge losses of pork tenderloin of 100 g, 200 g, 300 g, 400 g, and 500 g respectively thawed at different thawing endpoints (i.e. thawed at the temperature larger than 0° C., thawed at 0° C., thawed at −1.5° C., thawed at −3° C., and thawed at −4° C.) are calculated according to a formula "a gravy quantity/a total weight of the pork tenderloin*100%" respectively. Experimental data of 5 parallel experiments are selected from a plurality of experiments by the inventors and shown in Table 5.

TABLE 5 pork tenderloin

| | parallel 1 | parallel 2 | parallel 3 | parallel 4 | parallel 5 | Mean value |
|---|---|---|---|---|---|---|
| 100 g Thawed at the temperature larger than 0° C. | 1.05% | 1.49% | 2.19% | 1.20% | 1.70% | 1.53% |
| Thawed at 0° C. | 0.25% | 0.21% | 0.27% | 0.11% | 0.26% | 0.22% |
| Thawed at −1.5° C. | 0.15% | 0.24% | 0.29% | 0.18% | 0.18% | 0.21% |
| Thawed at −3° C. | 0.25% | 0.28% | 0.14% | 0.24% | 0.22% | 0.23% |
| Thawed at −4° C. | 0.16% | 0.28% | 0.26% | 0.27% | 0.15% | 0.22% |
| 200 g Thawed at the temperature larger than 0° C. | 1.29% | 2.62% | 1.03% | 2.67% | 1.75% | 1.87% |
| Thawed at 0° C. | 0.11% | 0.24% | 0.25% | 0.15% | 0.14% | 0.18% |
| Thawed at −1.5° C. | 0.13% | 0.28% | 0.15% | 0.27% | 0.26% | 0.22% |
| Thawed at −3° C. | 0.23% | 0.11% | 0.20% | 0.27% | 0.11% | 0.18% |
| Thawed at −4° C. | 0.12% | 0.26% | 0.16% | 0.22% | 0.20% | 0.19% |
| 300 g Thawed at the temperature larger than 0° C. | 2.32% | 2.33% | 2.36% | 1.21% | 1.01% | 1.85% |
| Thawed at 0° C. | 0.16% | 0.10% | 0.17% | 0.18% | 0.23% | 0.17% |
| Thawed at −1.5° C. | 0.16% | 0.27% | 0.21% | 0.22% | 0.25% | 0.22% |
| Thawed at −3° C. | 0.11% | 0.16% | 0.21% | 0.20% | 0.20% | 0.18% |
| Thawed at −4° C. | 0.30% | 0.25% | 0.25% | 0.11% | 0.22% | 0.22% |
| 400 g Thawed at the temperature larger than 0° C. | 1.66% | 1.74% | 2.14% | 2.60% | 2.48% | 2.12% |
| Thawed at 0° C. | 0.20% | 0.12% | 0.23% | 0.26% | 0.29% | 0.22% |
| Thawed at −1.5° C. | 0.12% | 0.11% | 0.11% | 0.10% | 0.22% | 0.13% |
| Thawed at −3° C. | 0.26% | 0.14% | 0.11% | 0.16% | 0.26% | 0.19% |
| Thawed at −4° C. | 0.11% | 0.19% | 0.15% | 0.20% | 0.13% | 0.16% |
| 500 g Thawed at the temperature larger than 0° C. | 2.48% | 2.09% | 1.36% | 2.54% | 2.76% | 2.25% |
| Thawed at 0° C. | 0.24% | 0.29% | 0.17% | 0.25% | 0.10% | 0.21% |
| Thawed at −1.5° C. | 0.13% | 0.13% | 0.16% | 0.14% | 0.29% | 0.17% |
| Thawed at −3° C. | 0.22% | 0.29% | 0.30% | 0.18% | 0.24% | 0.24% |
| Thawed at −4° C. | 0.28% | 0.18% | 0.27% | 0.21% | 0.23% | 0.23% |

(2) Experiments on fish of 100 g, 200 g, 300 g, 400 g, and 500 g respectively, of which a process and a method are same as that of pork tenderloin of 100 g, 200 g, 300 g, 400 g, and 500 g, and can refer to descriptions of the above process and method corresponding to pork tenderloin of 100 g, 200 g, 300 g, 400 g, and 500 g, which is not described in detail herein. Experimental data of 5 parallel experiments are selected from a plurality of experiments by the inventors and shown in Table 6.

TABLE 6

| fish | | | | | | |
|---|---|---|---|---|---|---|
| | parallel 1 | parallel 2 | parallel 3 | parallel 4 | parallel 5 | Mean value |
| 100 g Thawed at the temperature larger than 0° C. | 2.69% | 1.47% | 1.83% | 2.35% | 1.17% | 1.90% |
| Thawed at 0° C. | 0.12% | 0.24% | 0.19% | 0.22% | 0.19% | 0.19% |
| Thawed at −1.5° C. | 0.21% | 0.16% | 0.14% | 0.10% | 0.16% | 0.15% |
| Thawed at −3° C. | 0.23% | 0.11% | 0.17% | 0.11% | 0.25% | 0.17% |
| Thawed at −4° C. | 0.20% | 0.19% | 0.16% | 0.21% | 0.23% | 0.20% |
| 200 g Thawed at the temperature larger than 0° C. | 1.25% | 1.86% | 2.61% | 1.06% | 1.66% | 1.69% |
| Thawed at 0° C. | 0.26% | 0.20% | 0.12% | 0.27% | 0.22% | 0.22% |
| Thawed at −1.5° C. | 0.11% | 0.27% | 0.16% | 0.29% | 0.14% | 0.19% |
| Thawed at −3° C. | 0.28% | 0.18% | 0.11% | 0.11% | 0.13% | 0.16% |
| Thawed at −4° C. | 0.28% | 0.24% | 0.10% | 0.19% | 0.14% | 0.19% |
| 300 g Thawed at the temperature larger than 0° C. | 1.02% | 2.75% | 1.19% | 1.44% | 2.90% | 1.86% |
| Thawed at 0° C. | 0.12% | 0.14% | 0.17% | 0.21% | 0.29% | 0.18% |
| Thawed at −1.5° C. | 0.14% | 0.18% | 0.24% | 0.13% | 0.21% | 0.18% |
| Thawed at −3° C. | 0.16% | 0.22% | 0.15% | 0.19% | 0.11% | 0.17% |
| Thawed at −4° C. | 0.13% | 0.24% | 0.27% | 0.17% | 0.21% | 0.20% |
| 400 g Thawed at the temperature larger than 0° C. | 1.78% | 2.73% | 1.29% | 1.63% | 2.20% | 1.92% |
| Thawed at 0° C. | 0.16% | 0.18% | 0.23% | 0.25% | 0.17% | 0.20% |
| Thawed at −1.5° C. | 0.23% | 0.29% | 0.21% | 0.15% | 0.17% | 0.21% |
| Thawed at −3° C. | 0.11% | 0.22% | 0.24% | 0.29% | 0.27% | 0.23% |
| Thawed at −4° C. | 0.20% | 0.21% | 0.21% | 0.26% | 0.21% | 0.22% |
| 500 g Thawed at the temperature larger than 0° C. | 2.11% | 1.39% | 2.32% | 2.04% | 2.49% | 2.07% |
| Thawed at 0° C. | 0.25% | 0.21% | 0.28% | 0.22% | 0.11% | 0.21% |
| Thawed at −1.5° C. | 0.30% | 0.20% | 0.22% | 0.20% | 0.23% | 0.23% |
| Thawed at −3° C. | 0.18% | 0.12% | 0.12% | 0.12% | 0.13% | 0.13% |
| Thawed at −4° C. | 0.17% | 0.25% | 0.24% | 0.22% | 0.11% | 0.20% |

(3) Experiments on chicken of 100 g, 200 g, 300 g, 400 g, and 500 g respectively, of which a process and a method are same as that of pork tenderloin of 100 g, 200 g, 300 g, 400 g, and 500 g, and can refer to descriptions of the above process and method corresponding to pork tenderloin of 100 g, 200 g, 300 g, 400 g, and 500 g, which is not described in detail herein. Experimental data of 5 parallel experiments are selected from a plurality of experiments by the inventors and shown in Table 7.

TABLE 7

| chicken | | | | | | |
|---|---|---|---|---|---|---|
| | parallel 1 | parallel 2 | parallel 3 | parallel 4 | parallel 5 | Mean value |
| 100 g Thawed at the temperature larger than 0° C. | 1.37% | 1.50% | 1.64% | 1.08% | 2.19% | 1.56% |
| Thawed at 0° C. | 0.12% | 0.20% | 0.26% | 0.23% | 0.10% | 0.18% |
| Thawed at −1.5° C. | 0.19% | 0.16% | 0.14% | 0.17% | 0.12% | 0.15% |
| Thawed at −3° C. | 0.20% | 0.14% | 0.14% | 0.14% | 0.12% | 0.15% |
| Thawed at −4° C. | 0.19% | 0.21% | 0.11% | 0.10% | 0.18% | 0.16% |
| 200 g Thawed at the temperature larger than 0° C. | 1.02% | 2.68% | 1.84% | 1.74% | 1.97% | 1.85% |
| Thawed at 0° C. | 0.25% | 0.25% | 0.28% | 0.26% | 0.11% | 0.23% |
| Thawed at −1.5° C. | 0.14% | 0.30% | 0.25% | 0.23% | 0.21% | 0.23% |
| Thawed at −3° C. | 0.16% | 0.14% | 0.23% | 0.27% | 0.22% | 0.20% |
| Thawed at −4° C. | 0.25% | 0.19% | 0.17% | 0.23% | 0.28% | 0.22% |

TABLE 7-continued

| | | chicken | | | | |
|---|---|---|---|---|---|---|
| | parallel 1 | parallel 2 | parallel 3 | parallel 4 | parallel 5 | Mean value |
| 300 g Thawed at the temperature larger than 0° C. | 1.54% | 2.07% | 2.61% | 2.86% | 1.46% | 2.11% |
| Thawed at 0° C. | 0.18% | 0.17% | 0.13% | 0.11% | 0.30% | 0.18% |
| Thawed at −1.5° C. | 0.27% | 0.17% | 0.29% | 0.29% | 0.21% | 0.25% |
| Thawed at −3° C. | 0.19% | 0.12% | 0.18% | 0.19% | 0.10% | 0.16% |
| Thawed at −4° C. | 0.24% | 0.23% | 0.20% | 0.23% | 0.11% | 0.20% |
| 400 g Thawed at the temperature larger than 0° C. | 2.45% | 1.66% | 1.73% | 1.29% | 1.77% | 1.78% |
| Thawed at 0° C. | 0.19% | 0.29% | 0.25% | 0.20% | 0.25% | 0.23% |
| Thawed at −1.5° C. | 0.11% | 0.29% | 0.16% | 0.11% | 0.21% | 0.17% |
| Thawed at −3° C. | 0.25% | 0.23% | 0.20% | 0.25% | 0.14% | 0.21% |
| Thawed at −4° C. | 0.26% | 0.21% | 0.29% | 0.18% | 0.25% | 0.24% |
| 500 g Thawed at the temperature larger than 0° C. | 1.54% | 2.48% | 2.92% | 1.34% | 2.67% | 2.19% |
| Thawed at 0° C. | 0.29% | 0.24% | 0.15% | 0.19% | 0.12% | 0.20% |
| Thawed at −1.5° C. | 0.24% | 0.11% | 0.15% | 0.13% | 0.27% | 0.18% |
| Thawed at −3° C. | 0.23% | 0.16% | 0.12% | 0.17% | 0.19% | 0.17% |
| Thawed at −4° C. | 0.10% | 0.18% | 0.19% | 0.10% | 0.25% | 0.17% |

(4) Experiments on beef of 100 g, 200 g, 300 g, 400 g, and 500 g respectively, of which a process and a method are same as that of pork tenderloin of 100 g, 200 g, 300 g, 400 g, and 500 g, and can refer to descriptions of the above process and method corresponding to pork tenderloin of 100 g, 200 g, 300 g, 400 g, and 500 g, which is not described in detail herein. Experimental data of 5 parallel experiments are selected from a plurality of experiments by the inventors and shown in Table 8.

TABLE 8

| | | beef | | | | |
|---|---|---|---|---|---|---|
| | parallel 1 | parallel 2 | parallel 3 | parallel 4 | parallel 5 | Mean value |
| 100 g Thawed at the temperature larger than 0° C. | 1.30% | 2.44% | 1.26% | 2.79% | 1.49% | 1.86% |
| Thawed at 0° C. | 0.19% | 0.20% | 0.22% | 0.15% | 0.19% | 0.19% |
| Thawed at −1.5° C. | 0.26% | 0.18% | 0.21% | 0.20% | 0.28% | 0.22% |
| Thawed at −3° C. | 0.29% | 0.16% | 0.13% | 0.24% | 0.18% | 0.20% |
| Thawed at −4° C. | 0.28% | 0.26% | 0.22% | 0.12% | 0.15% | 0.21% |
| 200 g Thawed at the temperature larger than 0° C. | 1.14% | 1.38% | 1.25% | 2.52% | 1.08% | 1.47% |
| Thawed at 0° C. | 0.19% | 0.16% | 0.10% | 0.10% | 0.24% | 0.16% |
| Thawed at −1.5° C. | 0.30% | 0.21% | 0.11% | 0.18% | 0.23% | 0.20% |
| Thawed at −3° C. | 0.20% | 0.21% | 0.14% | 0.25% | 0.21% | 0.20% |
| Thawed at −4° C. | 0.23% | 0.27% | 0.16% | 0.15% | 0.18% | 0.20% |
| 300 g Thawed at the temperature larger than 0° C. | 1.73% | 1.91% | 2.31% | 1.71% | 2.43% | 2.02% |
| Thawed at 0° C. | 0.16% | 0.15% | 0.17% | 0.22% | 0.23% | 0.19% |
| Thawed at −1.5° C. | 0.29% | 0.30% | 0.17% | 0.23% | 0.23% | 0.24% |
| Thawed at −3° C. | 0.26% | 0.30% | 0.16% | 0.19% | 0.13% | 0.21% |
| Thawed at −4° C. | 0.23% | 0.12% | 0.28% | 0.16% | 0.13% | 0.18% |
| 400 g Thawed at the temperature larger than 0° C. | 2.09% | 1.13% | 1.76% | 2.00% | 2.65% | 1.93% |
| Thawed at 0° C. | 0.12% | 0.15% | 0.20% | 0.11% | 0.12% | 0.14% |
| Thawed at −1.5° C. | 0.12% | 0.22% | 0.12% | 0.15% | 0.11% | 0.14% |
| Thawed at −3° C. | 0.29% | 0.13% | 0.21% | 0.20% | 0.20% | 0.21% |
| Thawed at −4° C. | 0.20% | 0.11% | 0.27% | 0.17% | 0.15% | 0.18% |
| 500 g Thawed at the temperature larger than 0° C. | 2.20% | 2.29% | 1.96% | 1.47% | 2.78% | 2.14% |
| Thawed at 0° C. | 0.25% | 0.15% | 0.24% | 0.23% | 0.12% | 0.20% |
| Thawed at −1.5° C. | 0.29% | 0.26% | 0.14% | 0.11% | 0.26% | 0.21% |
| Thawed at −3° C. | 0.13% | 0.26% | 0.19% | 0.21% | 0.25% | 0.21% |
| Thawed at −4° C. | 0.27% | 0.18% | 0.23% | 0.23% | 0.23% | 0.23% |

Figure 5:
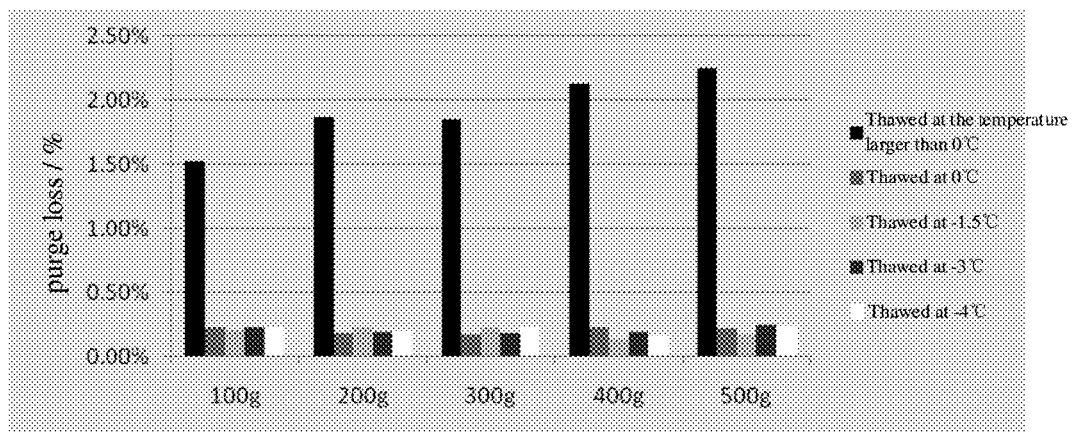
FIG. 5 (a) is a schematic diagram of purge losses of pork tenderloin with different weights thawed at different temperatures at thawing endpoint according to an embodiment of the present disclosure.
Figure 5:
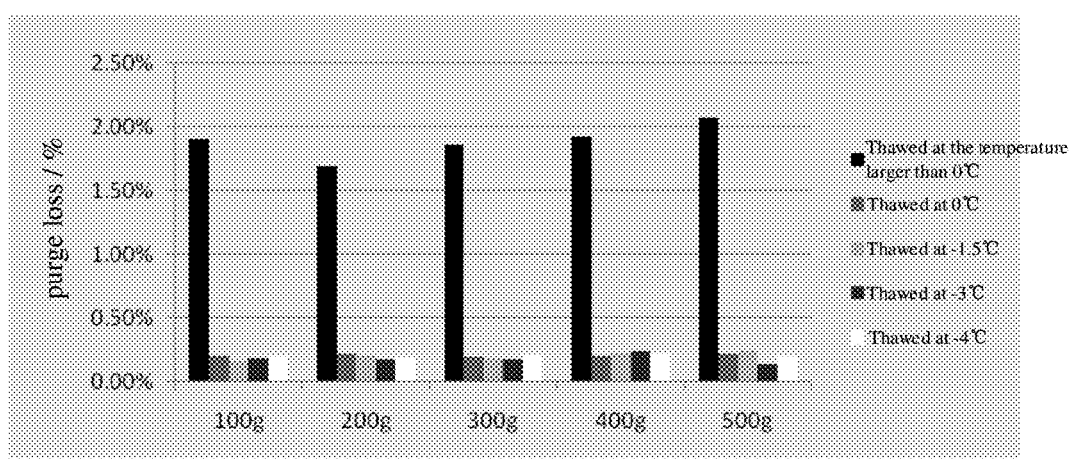
Figure 5:
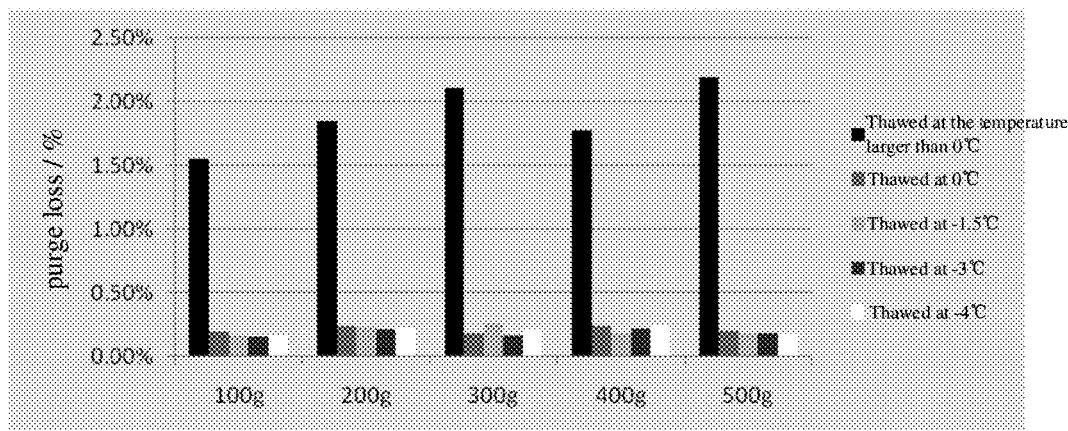
Figure 5:
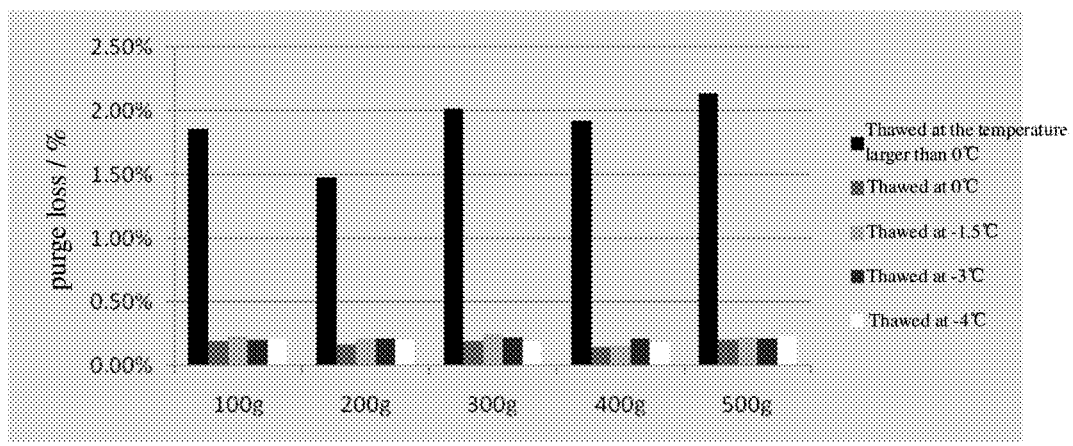

2. Experiment results. FIG. 5(a) is a diagram drawn according to each group of mean values in Table 5. FIG. 5(b) is a diagram drawn according to each group of mean values in Table 6. FIG. 5(c) is a diagram drawn according to each group of mean values in Table 7. FIG. 5(d) is a diagram drawn according to each group of mean values in Table 8. It can be known from FIG. 5(a), FIG. 5(b), FIG. 5(c), and FIG. 5(d) that, after thawing, the purge loss varies with the kind of the food, the weight of the food, and the temperature at thawing endpoint. The purge loss are significantly reduced, almost no purge loss, when the temperature of the food after thawing is maintained in −3° C.~0° C., relative to that when the temperature of the food after thawing is larger than 0° C.

In embodiment 3, protein contents of food thawed at −3° C.~0° C. are analyzed.

1. Pork tenderloin, fish, chicken, and beef are selected as the food respectively, and 100 g (gram), 200 g, 300 g, 400 g, and 500 g are selected as weights of each kind of the food.

(1) Experiments on pork tenderloin of 100 g, 200 g, 300 g, 400 g, and 500 g respectively. Firstly, pork tenderloin of 100 g, 200 g, 300 g, 400 g, and 500 g are put in the microwave oven to thaw respectively. The temperatures of the food in the microwave oven are maintained at different thawing endpoints (i.e. thawed at a temperature larger than 0° C., thawed at 0° C., thawed at −1.5° C., thawed at −3° C., and thawed at −4° C.). And then, protein contents of pork tenderloin of 100 g, 200 g, 300 g, 400 g, and 500 g respectively thawed at different thawing endpoints (i.e. thawed at the temperature larger than 0° C., thawed at 0° C., thawed at −1.5° C., thawed at −3° C., and thawed at −4° C.) are measured by a Kjeldahl apparatus respectively. Experimental data of 5 parallel experiments are selected from a plurality of experiments by the inventors and shown in Table 9.

TABLE 9

| | | pork tenderloin | | | | |
| --- | --- | --- | --- | --- | --- | --- |
| | parallel 1 | parallel 2 | parallel 3 | parallel 4 | parallel 5 | Mean value |
| 100 g Thawed at the temperature larger than 0° C. | 23.67% | 23.55% | 23.65% | 23.60% | 23.69% | 23.63% |
| Thawed at 0° C. | 24.07% | 23.97% | 23.92% | 23.92% | 23.96% | 23.97% |
| Thawed at −1.5° C. | 24.00% | 24.05% | 23.95% | 23.93% | 23.91% | 23.97% |
| Thawed at −3° C. | 24.00% | 23.96% | 23.92% | 23.98% | 23.96% | 23.96% |
| Thawed at −4° C. | 24.07% | 24.08% | 24.09% | 24.09% | 24.01% | 24.07% |
| 200 g Thawed at the temperature larger than 0° C. | 23.53% | 23.66% | 23.69% | 23.66% | 23.68% | 23.64% |
| Thawed at 0° C. | 24.10% | 23.94% | 24.00% | 24.08% | 23.93% | 24.01% |
| Thawed at −1.5° C. | 24.05% | 24.10% | 24.04% | 23.99% | 24.09% | 24.06% |
| Thawed at −3° C. | 24.00% | 23.91% | 24.04% | 24.00% | 24.03% | 23.99% |
| Thawed at −4° C. | 24.02% | 23.90% | 24.01% | 24.00% | 23.91% | 23.97% |
| 300 g Thawed at the temperature larger than 0° C. | 23.63% | 23.68% | 23.68% | 23.66% | 23.54% | 23.64% |
| Thawed at 0° C. | 23.96% | 24.01% | 23.93% | 23.90% | 23.91% | 23.94% |
| Thawed at −1.5° C. | 24.07% | 23.91% | 24.03% | 23.98% | 24.01% | 24.00% |
| Thawed at −3° C. | 23.99% | 24.00% | 24.00% | 24.03% | 24.02% | 24.01% |
| Thawed at −4° C. | 24.08% | 23.99% | 23.99% | 24.00% | 24.08% | 24.03% |
| 400 g Thawed at the temperature larger than 0° C. | 23.51% | 23.56% | 23.59% | 23.61% | 23.56% | 23.57% |
| Thawed at 0° C. | 24.05% | 24.01% | 24.06% | 23.92% | 24.00% | 24.01% |
| Thawed at −1.5° C. | 23.96% | 24.01% | 24.06% | 24.09% | 24.03% | 24.03% |
| Thawed at −3° C. | 24.00% | 23.93% | 24.03% | 24.02% | 23.91% | 23.98% |
| Thawed at −4° C. | 24.07% | 24.09% | 24.05% | 23.94% | 24.09% | 24.05% |
| 500 g Thawed at the temperature larger than 0° C. | 23.63% | 23.68% | 23.57% | 23.53% | 23.65% | 23.61% |
| Thawed at 0° C. | 23.96% | 23.93% | 24.02% | 24.06% | 24.09% | 24.01% |
| Thawed at −1.5° C. | 23.90% | 24.07% | 24.00% | 23.96% | 24.06% | 24.00% |
| Thawed at −3° C. | 23.91% | 24.02% | 24.08% | 24.04% | 24.09% | 24.03% |
| Thawed at −4° C. | 23.99% | 24.07% | 24.01% | 24.03% | 23.93% | 24.00% |

(2) Experiments on fish of 100 g, 200 g, 300 g, 400 g, and 500 g respectively, of which a process and a method are same as that of pork tenderloin of 100 g, 200 g, 300 g, 400 g, and 500 g, and can refer to descriptions of the above process and method corresponding to pork tenderloin of 100 g, 200 g, 300 g, 400 g, and 500 g, which is not described in detail herein. Experimental data of 5 parallel experiments are selected from a plurality of experiments by the inventors and shown in Table 10.

TABLE 10

| | | parallel 1 | parallel 2 | parallel 3 | parallel 4 | parallel 5 | Mean value |
|---|---|---|---|---|---|---|---|
| | fish | | | | | | |
| 100 g | Thawed at the temperature larger than 0° C. | 16.18% | 16.10% | 16.12% | 16.24% | 16.18% | 16.16% |
| | Thawed at 0° C. | 17.68% | 17.69% | 17.66% | 17.60% | 17.61% | 17.65% |
| | Thawed at −1.5° C. | 17.52% | 17.58% | 17.59% | 17.61% | 17.51% | 17.56% |
| | Thawed at −3° C. | 17.68% | 17.62% | 17.60% | 17.59% | 17.65% | 17.63% |
| | Thawed at −4° C. | 17.68% | 17.50% | 17.67% | 17.52% | 17.61% | 17.60% |
| 200 g | Thawed at the temperature larger than 0° C. | 16.12% | 16.21% | 16.16% | 16.15% | 16.21% | 16.17% |
| | Thawed at 0° C. | 17.59% | 17.69% | 17.55% | 17.62% | 17.57% | 17.60% |
| | Thawed at −1.5° C. | 17.59% | 17.68% | 17.50% | 17.67% | 17.68% | 17.62% |
| | Thawed at −3° C. | 17.57% | 17.69% | 17.50% | 17.62% | 17.58% | 17.59% |
| | Thawed at −4° C. | 17.66% | 17.65% | 17.56% | 17.58% | 17.67% | 17.62% |
| 300 g | Thawed at the temperature larger than 0° C. | 16.26% | 16.20% | 16.26% | 16.28% | 16.12% | 16.23% |
| | Thawed at 0° C. | 17.58% | 17.58% | 17.53% | 17.52% | 17.69% | 17.58% |
| | Thawed at −1.5° C. | 17.70% | 17.67% | 17.62% | 17.61% | 17.63% | 17.64% |
| | Thawed at −3° C. | 17.70% | 17.59% | 17.55% | 17.70% | 17.54% | 17.62% |
| | Thawed at −4° C. | 17.55% | 17.67% | 17.62% | 17.51% | 17.54% | 17.58% |
| 400 g | Thawed at the temperature larger than 0° C. | 16.29% | 16.23% | 16.15% | 16.13% | 16.17% | 16.19% |
| | Thawed at 0° C. | 17.69% | 17.66% | 17.56% | 17.58% | 17.56% | 17.61% |
| | Thawed at −1.5° C. | 17.53% | 17.60% | 17.60% | 17.56% | 17.66% | 17.59% |
| | Thawed at −3° C. | 17.59% | 17.67% | 17.68% | 17.63% | 17.54% | 17.62% |
| | Thawed at −4° C. | 17.54% | 17.57% | 17.68% | 17.67% | 17.51% | 17.59% |
| 500 g | Thawed at the temperature larger than 0° C. | 16.25% | 16.25% | 16.27% | 16.20% | 16.24% | 16.24% |
| | Thawed at 0° C. | 17.61% | 17.58% | 17.53% | 17.51% | 17.63% | 17.57% |
| | Thawed at −1.5° C. | 17.51% | 17.56% | 17.50% | 17.56% | 17.67% | 17.56% |
| | Thawed at −3° C. | 17.69% | 17.64% | 17.58% | 17.50% | 17.54% | 17.59% |
| | Thawed at −4° C. | 17.60% | 17.62% | 17.59% | 17.64% | 17.56% | 17.60% |

(3) Experiment on chicken of 100 g, 200 g, 300 g, 400 g, and 500 g respectively, of which a process and a method are same as that of pork tenderloin of 100 g, 200 g, 300 g, 400 g, and 500 g, and can refer to descriptions of the above process and method corresponding to pork tenderloin of 100 g, 200 g, 300 g, 400 g, and 500 g, which is not described in detail herein. Experimental data of 5 parallel experiments are selected from a plurality of experiments by the inventors and shown in Table 11.

TABLE 11

| | | parallel 1 | parallel 2 | parallel 3 | parallel 4 | parallel 5 | Mean value |
|---|---|---|---|---|---|---|---|
| | chicken | | | | | | |
| 100 g | Thawed at the temperature larger than 0° C. | 19.44% | 19.39% | 19.30% | 19.42% | 19.38% | 19.39% |
| | Thawed at 0° C. | 20.57% | 20.53% | 20.64% | 20.51% | 20.65% | 20.58% |
| | Thawed at −1.5° C. | 20.53% | 20.57% | 20.52% | 20.67% | 20.56% | 20.57% |
| | Thawed at −3° C. | 20.52% | 20.69% | 20.64% | 20.65% | 20.53% | 20.61% |
| | Thawed at −4° C. | 20.52% | 20.62% | 20.56% | 20.62% | 20.58% | 20.58% |
| 200 g | Thawed at the temperature larger than 0° C. | 19.33% | 19.48% | 19.38% | 19.30% | 19.32% | 19.36% |
| | Thawed at 0° C. | 20.62% | 20.68% | 20.60% | 20.52% | 20.58% | 20.60% |
| | Thawed at −1.5° C. | 20.60% | 20.50% | 20.52% | 20.62% | 20.65% | 20.58% |
| | Thawed at −3° C. | 20.50% | 20.56% | 20.58% | 20.60% | 20.63% | 20.57% |
| | Thawed at −4° C. | 20.68% | 20.66% | 20.55% | 20.53% | 20.51% | 20.59% |
| 300 g | Thawed at the temperature larger than 0° C. | 19.50% | 19.31% | 19.35% | 19.34% | 19.38% | 19.37% |
| | Thawed at 0° C. | 20.69% | 20.60% | 20.51% | 20.65% | 20.58% | 20.61% |
| | Thawed at −1.5° C. | 20.54% | 20.59% | 20.51% | 20.51% | 20.63% | 20.56% |
| | Thawed at −3° C. | 20.67% | 20.61% | 20.60% | 20.63% | 20.69% | 20.64% |
| | Thawed at −4° C. | 20.56% | 20.61% | 20.58% | 20.54% | 20.58% | 20.57% |
| 400 g | Thawed at the temperature larger than 0° C. | 19.33% | 19.34% | 19.31% | 19.46% | 19.49% | 19.39% |
| | Thawed at 0° C. | 20.70% | 20.54% | 20.55% | 20.57% | 20.60% | 20.59% |
| | Thawed at −1.5° C. | 20.58% | 20.70% | 20.65% | 20.51% | 20.52% | 20.59% |
| | Thawed at −3° C. | 20.58% | 20.66% | 20.56% | 20.57% | 20.51% | 20.58% |
| | Thawed at −4° C. | 20.54% | 20.52% | 20.54% | 20.65% | 20.67% | 20.58% |

TABLE 11-continued

| | chicken | | | | | |
|---|---|---|---|---|---|---|
| | parallel 1 | parallel 2 | parallel 3 | parallel 4 | parallel 5 | Mean value |
| 500 g Thawed at the temperature larger than 0° C. | 19.34% | 19.34% | 19.38% | 19.42% | 19.36% | 19.37% |
| Thawed at 0° C. | 20.53% | 20.51% | 20.67% | 20.51% | 20.54% | 20.55% |
| Thawed at −1.5° C. | 20.64% | 20.51% | 20.70% | 20.63% | 20.68% | 20.63% |
| Thawed at −3° C. | 20.70% | 20.69% | 20.52% | 20.67% | 20.58% | 20.63% |
| Thawed at −4° C. | 20.58% | 20.69% | 20.65% | 20.56% | 20.70% | 20.63% |

(4) Experiments on beef of 100 g, 200 g, 300 g, 400 g, and 500 g respectively, of which a process and a method are same as that of pork tenderloin of 100 g, 200 g, 300 g, 400 g, and 500 g, and can refer to descriptions of the above process and method corresponding to pork tenderloin of 100 g, 200 g, 300 g, 400 g, and 500 g, which is not described in detail herein. Experimental data of 5 parallel experiments are selected from a plurality of experiments by the inventors and shown in Table 12.

In embodiment 4, water contents of food thawed at −3° C.~0° C. are analyzed.

1. Pork tenderloin, fish, chicken, and beef are selected as the food respectively, and 100 g (gram), 200 g, 300 g, 400 g, and 500 g are selected as weights of each kind of the food.

(1) Experiments on pork tenderloin of 100 g, 200 g, 300 g, 400 g, and 500 g respectively. Firstly, pork tenderloin of 100 g, 200 g, 300 g, 400 g, and 500 g are put in the microwave oven to thaw respectively. The temperatures of

TABLE 12

| | beef | | | | | |
|---|---|---|---|---|---|---|
| | parallel 1 | parallel 2 | parallel 3 | parallel 4 | parallel 5 | Mean value |
| 100 g Thawed at the temperature larger than 0° C. | 20.18% | 20.08% | 20.16% | 20.07% | 20.13% | 20.13% |
| Thawed at 0° C. | 22.88% | 23.00% | 22.87% | 22.92% | 22.97% | 22.93% |
| Thawed at −1.5° C. | 22.94% | 22.83% | 23.00% | 22.92% | 22.87% | 22.91% |
| Thawed at −3° C. | 22.95% | 22.94% | 22.92% | 22.93% | 22.95% | 22.94% |
| Thawed at −4° C. | 22.83% | 22.95% | 22.98% | 22.84% | 22.92% | 22.90% |
| 200 g Thawed at the temperature larger than 0° C. | 20.03% | 20.13% | 20.20% | 20.06% | 20.06% | 20.10% |
| Thawed at 0° C. | 22.80% | 22.99% | 22.97% | 22.95% | 22.96% | 22.93% |
| Thawed at −1.5° C. | 22.99% | 23.00% | 22.96% | 22.94% | 22.85% | 22.95% |
| Thawed at −3° C. | 22.87% | 22.90% | 22.86% | 22.87% | 22.96% | 22.89% |
| Thawed at −4° C. | 22.84% | 22.97% | 22.87% | 22.93% | 22.86% | 22.89% |
| 300 g Thawed at the temperature larger than 0° C. | 20.12% | 20.08% | 20.05% | 20.09% | 20.02% | 20.07% |
| Thawed at 0° C. | 22.99% | 22.89% | 22.96% | 22.82% | 23.00% | 22.93% |
| Thawed at −1.5° C. | 22.82% | 22.80% | 22.95% | 22.88% | 22.86% | 22.86% |
| Thawed at −3° C. | 22.88% | 22.94% | 22.88% | 22.81% | 22.84% | 22.87% |
| Thawed at −4° C. | 22.90% | 22.84% | 22.81% | 22.81% | 22.83% | 22.84% |
| 400 g Thawed at the temperature larger than 0° C. | 20.18% | 20.09% | 20.15% | 20.08% | 20.09% | 20.12% |
| Thawed at 0° C. | 22.83% | 22.81% | 22.80% | 22.87% | 22.97% | 22.86% |
| Thawed at −1.5° C. | 22.95% | 22.95% | 22.90% | 22.95% | 22.90% | 22.93% |
| Thawed at −3° C. | 22.85% | 22.87% | 22.89% | 22.87% | 22.99% | 22.89% |
| Thawed at −4° C. | 22.94% | 22.84% | 22.85% | 22.89% | 22.93% | 22.89% |
| 500 g Thawed at the temperature larger than 0° C. | 20.09% | 20.01% | 20.08% | 20.07% | 20.19% | 20.08% |
| Thawed at 0° C. | 22.91% | 22.85% | 22.91% | 22.98% | 22.97% | 22.93% |
| Thawed at −1.5° C. | 22.94% | 22.86% | 22.97% | 22.89% | 22.94% | 22.92% |
| Thawed at −3° C. | 22.90% | 22.88% | 22.97% | 22.82% | 22.93% | 22.90% |
| Thawed at −4° C. | 23.00% | 22.94% | 22.81% | 22.83% | 22.83% | 22.88% |

Figure 6:
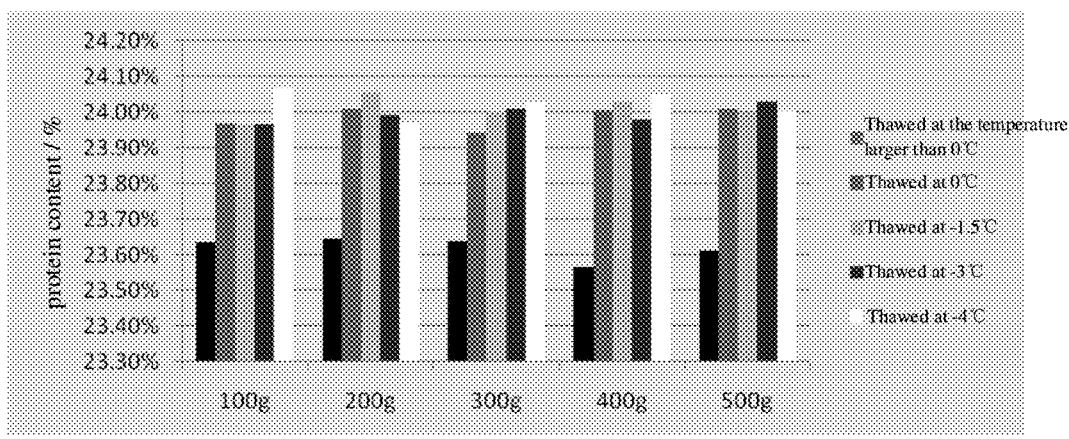
FIG. 6 (a) is a schematic diagram of protein contents of pork tenderloin with different weights thawed at different temperatures at thawing endpoint according to an embodiment of the present disclosure.
Figure 6:
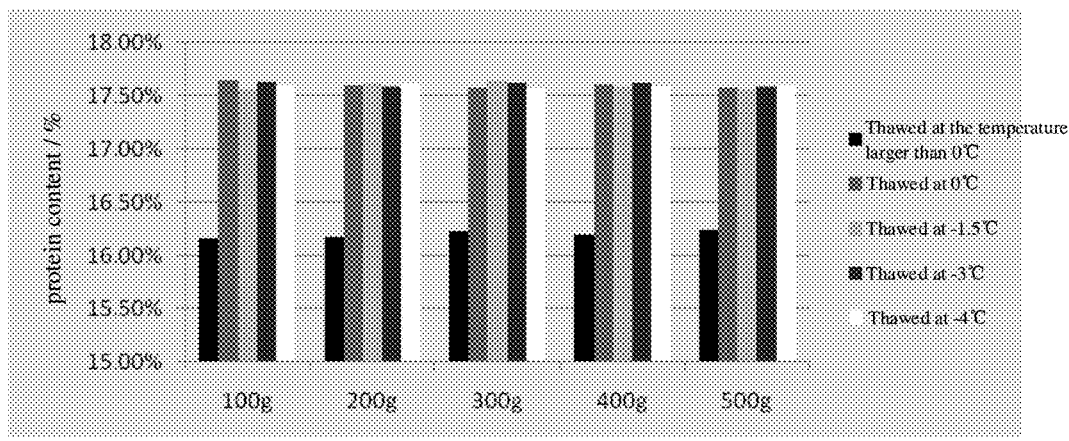
Figure 6:
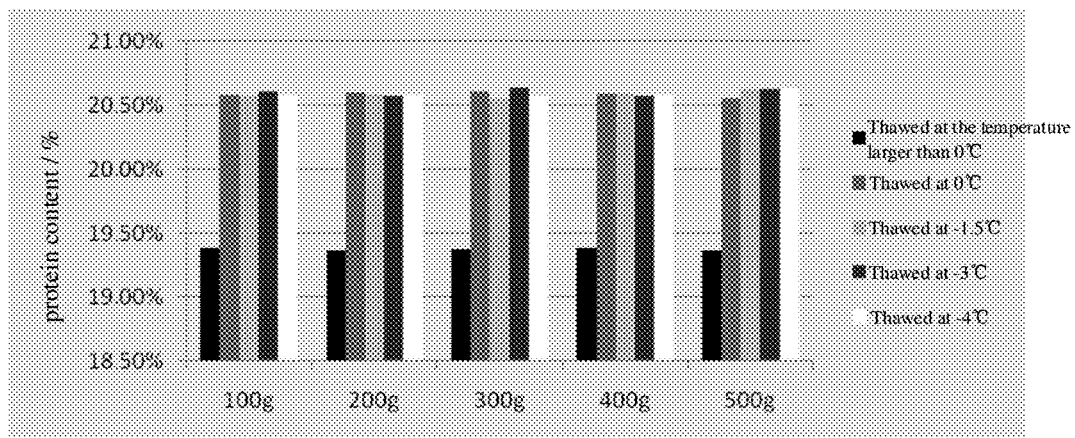
Figure 6:
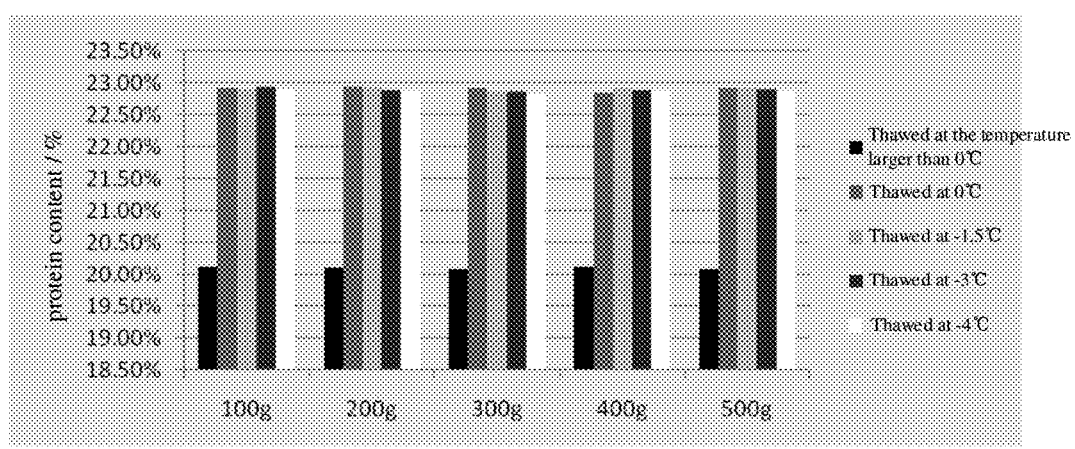

2. Experiment results. FIG. 6(a) is a diagram drawn according to each group of mean values in Table 9. FIG. 6(b) is a diagram drawn according to each group of mean values in Table 10. FIG. 6(c) is a diagram drawn according to each group of mean values in Table 11. FIG. 6(d) is a diagram drawn according to each group of mean values in Table 12. It can be known from FIG. 6(a), FIG. 6(b), FIG. 6(c), and FIG. 6(d) that, after thawing, the protein content varies with the kind of the food, the weight of the food, and the temperature at thawing endpoint. The protein contents are slightly increased, with high nutritive value, when the temperature of the food after thawing is maintained in −3° C.~0° C., relative to that when the temperature of the food after thawing is larger than 0° C.

the food in the microwave oven are maintained at different thawing endpoints (i.e. thawed at a temperature larger than 0° C., thawed at 0° C., thawed at −1.5° C., thawed at −3° C., and thawed at −4° C.). And then, water contents of pork tenderloin of 100 g, 200 g, 300 g, 400 g, and 500 g respectively thawed at different thawing endpoints (i.e. thawed at the temperature larger than 0° C., thawed at 0° C., thawed at −1.5° C., thawed at −3° C., and thawed at −4° C.) are measured with a method of drying at 105° C. respectively. Experimental data of 5 parallel experiments are selected from a plurality of experiments by the inventors and shown in Table 13.

TABLE 13

| | | parallel 1 | parallel 2 | parallel 3 | parallel 4 | parallel 5 | Mean value |
|---|---|---|---|---|---|---|---|
| | pork tenderloin | | | | | | |
| 100 g | Thawed at the temperature larger than 0° C. | 72.08% | 72.07% | 72.15% | 72.17% | 72.18% | 72.13% |
| | Thawed at 0° C. | 72.66% | 72.59% | 72.57% | 72.69% | 72.70% | 72.64% |
| | Thawed at −1.5° C. | 72.69% | 72.56% | 72.60% | 72.51% | 72.62% | 72.60% |
| | Thawed at −3° C. | 72.61% | 72.66% | 72.59% | 72.61% | 72.69% | 72.63% |
| | Thawed at −4° C. | 72.54% | 72.64% | 72.68% | 72.60% | 72.54% | 72.60% |
| 200 g | Thawed at the temperature larger than 0° C. | 72.16% | 72.15% | 72.02% | 72.11% | 72.11% | 72.11% |
| | Thawed at 0° C. | 72.61% | 72.65% | 72.57% | 72.62% | 72.64% | 72.62% |
| | Thawed at −1.5° C. | 72.69% | 72.52% | 72.52% | 72.61% | 72.69% | 72.60% |
| | Thawed at −3° C. | 72.60% | 72.57% | 72.57% | 72.53% | 72.70% | 72.59% |
| | Thawed at −4° C. | 72.61% | 72.56% | 72.65% | 72.56% | 72.54% | 72.58% |
| 300 g | Thawed at the temperature larger than 0° C. | 72.11% | 72.15% | 72.05% | 72.10% | 72.06% | 72.09% |
| | Thawed at 0° C. | 72.61% | 72.58% | 72.69% | 72.67% | 72.56% | 72.62% |
| | Thawed at −1.5° C. | 72.59% | 72.59% | 72.59% | 72.58% | 72.63% | 72.59% |
| | Thawed at −3° C. | 72.52% | 72.57% | 72.54% | 72.52% | 72.51% | 72.53% |
| | Thawed at −4° C. | 72.61% | 72.64% | 72.55% | 72.63% | 72.67% | 72.62% |
| 400 g | Thawed at the temperature larger than 0° C. | 72.20% | 72.13% | 72.08% | 72.11% | 72.11% | 72.13% |
| | Thawed at 0° C. | 72.65% | 72.65% | 72.52% | 72.57% | 72.60% | 72.60% |
| | Thawed at −1.5° C. | 72.69% | 72.62% | 72.60% | 72.62% | 72.67% | 72.64% |
| | Thawed at −3° C. | 72.55% | 72.52% | 72.62% | 72.53% | 72.69% | 72.58% |
| | Thawed at −4° C. | 72.68% | 72.53% | 72.63% | 72.68% | 72.55% | 72.61% |
| 500 g | Thawed at the temperature larger than 0° C. | 72.10% | 72.04% | 72.00% | 72.17% | 72.08% | 72.08% |
| | Thawed at 0° C. | 72.70% | 72.63% | 72.65% | 72.57% | 72.60% | 72.63% |
| | Thawed at −1.5° C. | 72.54% | 72.60% | 72.69% | 72.63% | 72.54% | 72.60% |
| | Thawed at −3° C. | 72.68% | 72.61% | 72.62% | 72.65% | 72.52% | 72.62% |
| | Thawed at −4° C. | 72.64% | 72.64% | 72.52% | 72.52% | 72.66% | 72.60% |

(2) Experiments on fish of 100 g, 200 g, 300 g, 400 g, and 500 g respectively, of which a process and a method are same as that of pork tenderloin of 100 g, 200 g, 300 g, 400 g, and 500 g, and can refer to descriptions of the above process and method corresponding to pork tenderloin of 100 g, 200 g, 300 g, 400 g, and 500 g, which is not described in detail herein. Experimental data of 5 parallel experiments are selected from a plurality of experiments by the inventors and shown in Table 14.

TABLE 14

| | | parallel 1 | parallel 2 | parallel 3 | parallel 4 | parallel 5 | Mean value |
|---|---|---|---|---|---|---|---|
| | fish | | | | | | |
| 100 g | Thawed at the temperature larger than 0° C. | 71.16% | 71.06% | 71.15% | 71.19% | 71.10% | 71.13% |
| | Thawed at 0° C. | 71.70% | 71.68% | 71.66% | 71.54% | 71.53% | 71.62% |
| | Thawed at −1.5° C. | 71.54% | 71.55% | 71.57% | 71.62% | 71.53% | 71.56% |
| | Thawed at −3° C. | 71.58% | 71.67% | 71.61% | 71.57% | 71.60% | 71.61% |
| | Thawed at −4° C. | 71.61% | 71.53% | 71.68% | 71.61% | 71.66% | 71.62% |
| 200 g | Thawed at the temperature larger than 0° C. | 71.19% | 71.01% | 71.11% | 71.10% | 71.01% | 71.09% |
| | Thawed at 0° C. | 71.57% | 71.70% | 71.66% | 71.61% | 71.64% | 71.63% |
| | Thawed at −1.5° C. | 71.68% | 71.56% | 71.60% | 71.56% | 71.69% | 71.62% |
| | Thawed at −3° C. | 71.55% | 71.68% | 71.70% | 71.66% | 71.53% | 71.63% |
| | Thawed at −4° C. | 71.56% | 71.55% | 71.51% | 71.67% | 71.52% | 71.56% |
| 300 g | Thawed at the temperature larger than 0° C. | 71.19% | 71.01% | 71.10% | 71.02% | 71.05% | 71.08% |
| | Thawed at 0° C. | 71.56% | 71.55% | 71.57% | 71.57% | 71.64% | 71.58% |
| | Thawed at −1.5° C. | 71.64% | 71.63% | 71.61% | 71.52% | 71.70% | 71.62% |
| | Thawed at −3° C. | 71.64% | 71.52% | 71.58% | 71.64% | 71.69% | 71.61% |
| | Thawed at −4° C. | 71.51% | 71.60% | 71.67% | 71.65% | 71.61% | 71.61% |
| 400 g | Thawed at the temperature larger than 0° C. | 71.12% | 71.08% | 71.13% | 71.16% | 71.09% | 71.11% |
| | Thawed at 0° C. | 71.51% | 71.63% | 71.55% | 71.50% | 71.51% | 71.54% |
| | Thawed at −1.5° C. | 71.69% | 71.63% | 71.68% | 71.60% | 71.56% | 71.63% |
| | Thawed at −3° C. | 71.69% | 71.57% | 71.66% | 71.64% | 71.52% | 71.62% |
| | Thawed at −4° C. | 71.51% | 71.55% | 71.65% | 71.56% | 71.54% | 71.56% |

TABLE 14-continued

| | | parallel 1 | parallel 2 | parallel 3 | parallel 4 | parallel 5 | Mean value |
|---|---|---|---|---|---|---|---|
| | fish | | | | | | |
| 500 g | Thawed at the temperature larger than 0° C. | 71.18% | 71.17% | 71.13% | 71.07% | 71.11% | 71.13% |
| | Thawed at 0° C. | 71.70% | 71.55% | 71.51% | 71.52% | 71.57% | 71.57% |
| | Thawed at −1.5° C. | 71.50% | 71.50% | 71.56% | 71.60% | 71.52% | 71.54% |
| | Thawed at −3° C. | 71.63% | 71.68% | 71.52% | 71.51% | 71.67% | 71.60% |
| | Thawed at −4° C. | 71.51% | 71.52% | 71.51% | 71.58% | 71.60% | 71.54% |

(3) Experiments on chicken of 100 g, 200 g, 300 g, 400 g, and 500 g respectively, of which a process and a method are same as that of pork tenderloin of 100 g, 200 g, 300 g, 400 g, and 500 g, and can refer to descriptions of the above process and method corresponding to pork tenderloin of 100 g, 200 g, 300 g, 400 g, and 500 g, which is not described in detail herein. Experimental data of 5 parallel experiments are selected from a plurality of experiments by the inventors and shown in Table 15.

TABLE 15

| | | parallel 1 | parallel 2 | parallel 3 | parallel 4 | parallel 5 | Mean value |
|---|---|---|---|---|---|---|---|
| | chicken | | | | | | |
| 100 g | Thawed at the temperature larger than 0° C. | 68.02% | 68.10% | 68.16% | 68.12% | 68.06% | 68.09% |
| | Thawed at 0° C. | 69.06% | 69.13% | 69.08% | 69.18% | 69.19% | 69.12% |
| | Thawed at −1.5° C. | 69.05% | 69.02% | 69.09% | 69.19% | 69.11% | 69.09% |
| | Thawed at −3° C. | 69.10% | 69.11% | 69.08% | 69.18% | 69.13% | 69.12% |
| | Thawed at −4° C. | 69.14% | 69.05% | 69.13% | 69.00% | 69.02% | 69.07% |
| 200 g | Thawed at the temperature larger than 0° C. | 68.14% | 68.11% | 68.07% | 68.04% | 68.03% | 68.08% |
| | Thawed at 0° C. | 69.05% | 69.16% | 69.11% | 69.07% | 69.07% | 69.09% |
| | Thawed at −1.5° C. | 69.12% | 69.17% | 69.08% | 69.05% | 69.02% | 69.09% |
| | Thawed at −3° C. | 69.18% | 69.20% | 69.05% | 69.14% | 69.09% | 69.13% |
| | Thawed at −4° C. | 69.01% | 69.19% | 69.06% | 69.17% | 69.05% | 69.10% |
| 300 g | Thawed at the temperature larger than 0° C. | 68.16% | 68.10% | 68.15% | 68.01% | 68.13% | 68.11% |
| | Thawed at 0° C. | 69.20% | 69.12% | 69.01% | 69.17% | 69.19% | 69.14% |
| | Thawed at −1.5° C. | 69.12% | 69.06% | 69.16% | 69.00% | 69.03% | 69.07% |
| | Thawed at −3° C. | 69.07% | 69.12% | 69.03% | 69.12% | 69.16% | 69.10% |
| | Thawed at −4° C. | 69.14% | 69.03% | 69.10% | 69.03% | 69.03% | 69.06% |
| 400 g | Thawed at the temperature larger than 0° C. | 68.16% | 68.05% | 68.18% | 68.12% | 68.19% | 68.14% |
| | Thawed at 0° C. | 69.03% | 69.11% | 69.10% | 69.12% | 69.04% | 69.08% |
| | Thawed at −1.5° C. | 69.00% | 69.05% | 69.12% | 69.08% | 69.16% | 69.08% |
| | Thawed at −3° C. | 69.15% | 69.03% | 69.09% | 69.10% | 69.07% | 69.09% |
| | Thawed at −4° C. | 69.06% | 69.09% | 69.03% | 69.10% | 69.09% | 69.07% |
| 500 g | Thawed at the temperature larger than 0° C. | 68.08% | 68.00% | 68.13% | 68.15% | 68.19% | 68.11% |
| | Thawed at 0° C. | 69.04% | 69.03% | 69.12% | 69.18% | 69.10% | 69.09% |
| | Thawed at −1.5° C. | 69.01% | 69.03% | 69.05% | 69.12% | 69.08% | 69.06% |
| | Thawed at −3° C. | 69.16% | 69.09% | 69.03% | 69.11% | 69.12% | 69.10% |
| | Thawed at −4° C. | 69.03% | 69.07% | 69.16% | 69.01% | 69.04% | 69.06% |

(4) Experiments on beef of 100 g, 200 g, 300 g, 400 g, and 500 g respectively, of which a process and a method are same as that of pork tenderloin of 100 g, 200 g, 300 g, 400 g, and 500 g, and can refer to descriptions of the above process and method corresponding to pork tenderloin of 100 g, 200 g, 300 g, 400 g, and 500 g, which is not described in detail herein. Experimental data of 5 parallel experiments are selected from a plurality of experiments by the inventors and shown in Table 16.

TABLE 16

| | | parallel 1 | parallel 2 | parallel 3 | parallel 4 | parallel 5 | Mean value |
|---|---|---|---|---|---|---|---|
| | beef | | | | | | |
| 100 g | Thawed at the temperature larger than 0° C. | 65.01% | 65.17% | 65.06% | 65.08% | 65.14% | 65.09% |
| | Thawed at 0° C. | 66.14% | 66.11% | 66.07% | 66.08% | 66.08% | 66.10% |

TABLE 16-continued

| beef | | | | | | |
|---|---|---|---|---|---|---|
| | parallel 1 | parallel 2 | parallel 3 | parallel 4 | parallel 5 | Mean value |
| Thawed at −1.5° C. | 66.15% | 66.10% | 66.13% | 66.13% | 66.09% | 66.12% |
| Thawed at −3° C. | 66.10% | 66.20% | 66.19% | 66.16% | 66.07% | 66.14% |
| Thawed at −4° C. | 66.17% | 66.15% | 66.14% | 66.02% | 66.16% | 66.13% |
| 200 g Thawed at the temperature larger than 0° C. | 65.06% | 65.07% | 65.00% | 65.09% | 65.15% | 65.07% |
| Thawed at 0° C. | 66.18% | 66.19% | 66.07% | 66.18% | 66.13% | 66.15% |
| Thawed at −1.5° C. | 66.08% | 66.17% | 66.06% | 66.09% | 66.15% | 66.11% |
| Thawed at −3° C. | 66.13% | 66.13% | 66.17% | 66.07% | 66.05% | 66.11% |
| Thawed at −4° C. | 66.02% | 66.17% | 66.07% | 66.02% | 66.02% | 66.06% |
| 300 g Thawed at the temperature larger than 0° C. | 65.10% | 65.13% | 65.18% | 65.11% | 65.11% | 65.13% |
| Thawed at 0° C. | 66.19% | 66.07% | 66.11% | 66.02% | 66.18% | 66.11% |
| Thawed at −1.5° C. | 66.20% | 66.06% | 66.09% | 66.06% | 66.11% | 66.10% |
| Thawed at −3° C. | 66.17% | 66.13% | 66.10% | 66.14% | 66.15% | 66.14% |
| Thawed at −4° C. | 66.06% | 66.09% | 66.05% | 66.18% | 66.06% | 66.09% |
| 400 g Thawed at the temperature larger than 0° C. | 65.17% | 65.16% | 65.00% | 65.06% | 65.01% | 65.08% |
| Thawed at 0° C. | 66.19% | 66.20% | 66.07% | 66.04% | 66.03% | 66.10% |
| Thawed at −1.5° C. | 66.18% | 66.05% | 66.10% | 66.14% | 66.19% | 66.13% |
| Thawed at −3° C. | 66.12% | 66.01% | 66.13% | 66.17% | 66.12% | 66.11% |
| Thawed at −4° C. | 66.00% | 66.14% | 66.14% | 66.11% | 66.10% | 66.10% |
| 500 g Thawed at the temperature larger than 0° C. | 65.06% | 65.14% | 65.14% | 65.17% | 65.04% | 65.11% |
| Thawed at 0° C. | 66.05% | 66.00% | 66.15% | 66.15% | 66.13% | 66.10% |
| Thawed at −1.5° C. | 66.03% | 66.18% | 66.16% | 66.15% | 66.12% | 66.13% |
| Thawed at −3° C. | 66.12% | 66.01% | 66.16% | 66.17% | 66.12% | 66.12% |
| Thawed at −4° C. | 66.02% | 66.10% | 66.18% | 66.17% | 66.07% | 66.11% |

Figure 7:
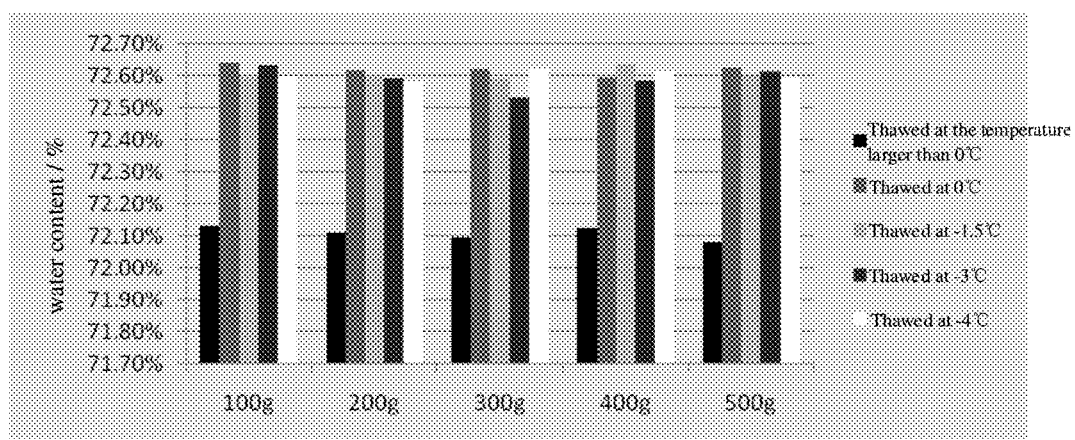
FIG. 7 (a) is a schematic diagram of water contents of pork tenderloin with different weights thawed at different temperatures at thawing endpoint according to an embodiment of the present disclosure.
Figure 7:
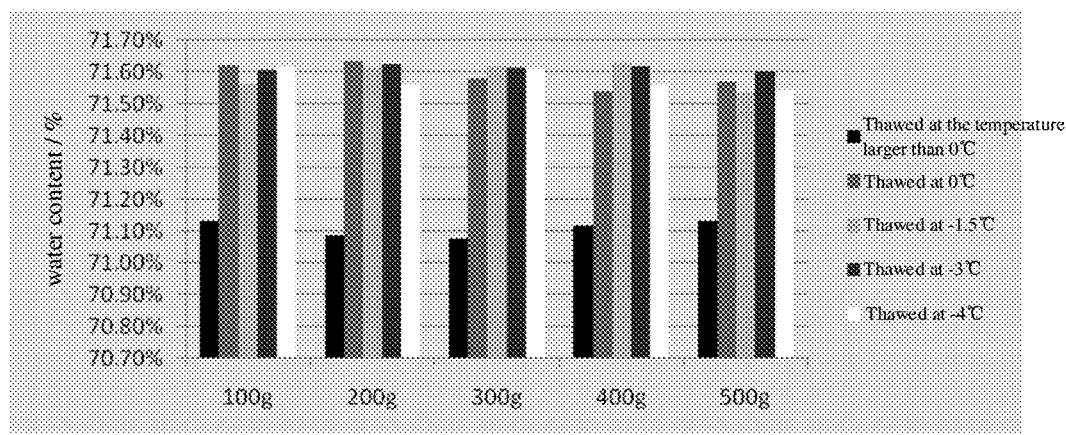
Figure 7:
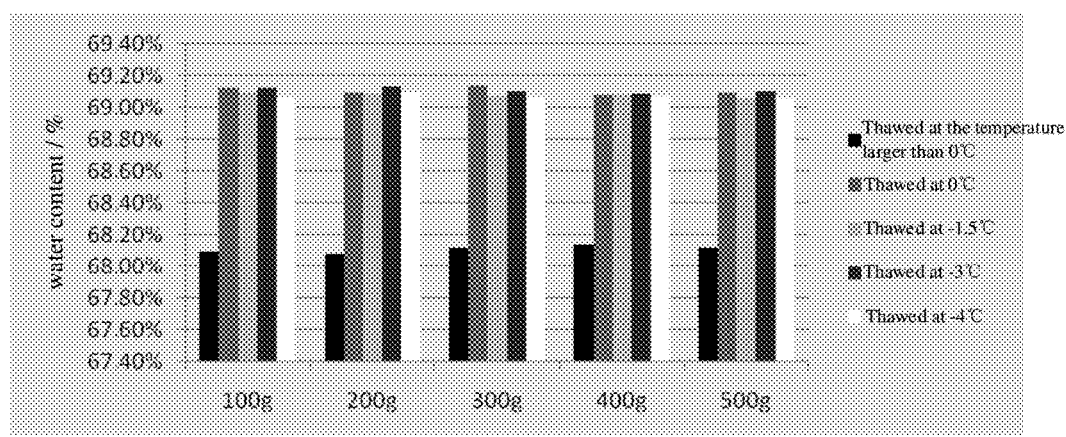
Figure 7:
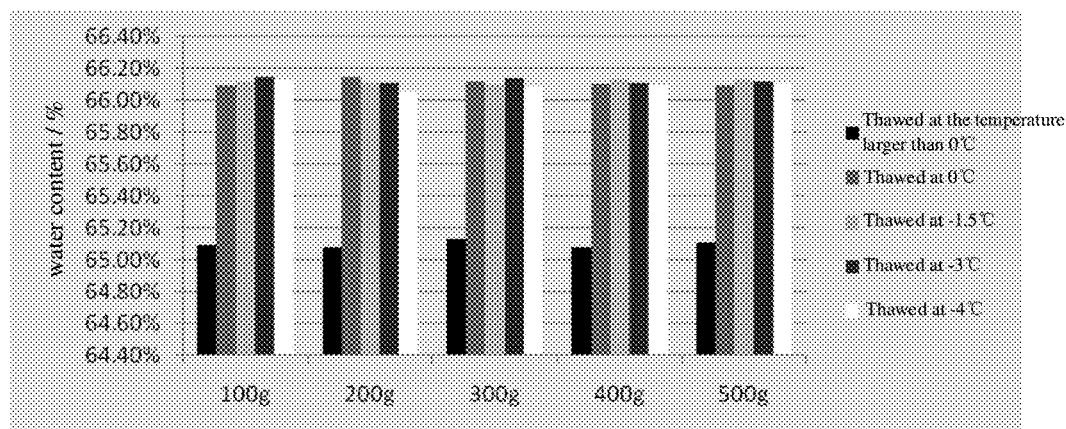

2. Experiment results. FIG. 7(a) is a diagram drawn according to each group of mean values in Table 13. FIG. 7(b) is a diagram drawn according to each group of mean values in Table 14. FIG. 7(c) is a diagram drawn according to each group of mean values in Table 15. FIG. 7(d) is a diagram drawn according to each group of mean values in Table 16. It can be known from FIG. 7(a), FIG. 7(b), FIG. 7(c), and FIG. 7(d) that, after thawing, the water content varies with the kind of the food, the weight of the food, and the temperature at thawing endpoint. The water contents are slightly increased, with a good taste, when the temperature of the food after thawing is maintained in −3° C.∼0° C., relative to that when the temperature of the food after thawing is larger than 0° C.

In embodiment 5, textures of food thawed at −3° C.∼0° C. are analyzed.

1. Pork tenderloin, fish, chicken, and beef are selected as the food respectively, and 100 g (gram), 200 g, 300 g, 400 g, and 500 g are selected as weights of each kind of the food.

(1) Experiments on pork tenderloin of 100 g, 200 g, 300 g, 400 g, and 500 g respectively. Firstly, pork tenderloin of 100 g, 200 g, 300 g, 400 g, and 500 g are put in the microwave oven to thaw respectively. The temperatures of the food in the microwave oven are maintained at different thawing endpoints (i.e. thawed at a temperature larger than 0° C., thawed at 0° C., thawed at −1.5° C., thawed at −3° C., and thawed at −4° C.). And then, shear forces of pork tenderloin of 100 g, 200 g, 300 g, 400 g, and 500 g respectively thawed at different thawing endpoints (i.e. thawed at the temperature larger than 0° C., thawed at 0° C., thawed at −1.5° C., thawed at −3° C., and thawed at −4° C.) are measured by a texture analyzer respectively. Experimental data of 5 parallel experiments are selected from a plurality of experiments by the inventors and shown in Table 17.

TABLE 17

| pork tenderloin | | | | | | |
|---|---|---|---|---|---|---|
| | parallel 1 | parallel 2 | parallel 3 | parallel 4 | parallel 5 | Mean value |
| 100 g Thawed at the temperature larger than 0° C. | 17.19 | 17.19 | 17.05 | 17.01 | 17.18 | 17.12 |
| Thawed at 0° C. | 18.51 | 18.59 | 18.66 | 18.64 | 18.58 | 18.60 |
| Thawed at −1.5° C. | 20.51 | 20.62 | 20.62 | 20.54 | 20.50 | 20.56 |
| Thawed at −3° C. | 23.56 | 23.60 | 23.70 | 23.58 | 23.61 | 23.61 |
| Thawed at −4° C. | 50.37 | 50.23 | 50.05 | 48.81 | 49.06 | 49.70 |
| 200 g Thawed at the temperature larger than 0° C. | 17.04 | 17.10 | 17.06 | 17.11 | 17.06 | 17.07 |
| Thawed at 0° C. | 18.67 | 18.64 | 18.58 | 18.53 | 18.68 | 18.62 |
| Thawed at −1.5° C. | 20.57 | 20.62 | 20.56 | 20.67 | 20.65 | 20.61 |
| Thawed at −3° C. | 23.53 | 23.69 | 23.63 | 23.60 | 23.52 | 23.59 |
| Thawed at −4° C. | 49.34 | 50.32 | 49.45 | 48.83 | 50.47 | 49.68 |
| 300 g Thawed at the temperature larger than 0° C. | 17.13 | 17.03 | 17.14 | 17.09 | 17.00 | 17.08 |
| Thawed at 0° C. | 18.55 | 18.63 | 18.67 | 18.64 | 18.57 | 18.61 |
| Thawed at −1.5° C. | 20.68 | 20.56 | 20.54 | 20.58 | 20.55 | 20.58 |
| Thawed at −3° C. | 23.69 | 23.61 | 23.58 | 23.63 | 23.54 | 23.61 |
| Thawed at −4° C. | 48.62 | 49.23 | 49.98 | 49.01 | 49.59 | 49.28 |
| 400 g Thawed at the temperature larger than 0° C. | 17.17 | 17.12 | 17.08 | 17.17 | 17.12 | 17.13 |
| Thawed at 0° C. | 18.60 | 18.52 | 18.58 | 18.54 | 18.59 | 18.57 |
| Thawed at −1.5° C. | 20.64 | 20.66 | 20.58 | 20.67 | 20.56 | 20.62 |
| Thawed at −3° C. | 23.53 | 23.60 | 23.66 | 23.59 | 23.68 | 23.61 |
| Thawed at −4° C. | 49.49 | 49.17 | 49.50 | 49.21 | 49.80 | 49.43 |
| 500 g Thawed at the temperature larger than 0° C. | 17.14 | 17.02 | 17.14 | 17.05 | 17.14 | 17.10 |
| Thawed at 0° C. | 18.59 | 18.64 | 18.51 | 18.54 | 18.58 | 18.57 |
| Thawed at −1.5° C. | 20.50 | 20.53 | 20.56 | 20.70 | 20.56 | 20.57 |
| Thawed at −3° C. | 23.67 | 23.53 | 23.63 | 23.68 | 23.57 | 23.62 |
| Thawed at −4° C. | 48.92 | 48.90 | 49.90 | 48.74 | 49.89 | 49.27 |

(2) Experiments on fish of 100 g, 200 g, 300 g, 400 g, and 500 g respectively, of which a process and a method are same as that of pork tenderloin of 100 g, 200 g, 300 g, 400 g, and 500 g, and can refer to descriptions of the above process and method corresponding to pork tenderloin of 100 g, 200 g, 300 g, 400 g, and 500 g, which is not described in detail herein. Experimental data of 5 parallel experiments are selected from a plurality of experiments by the inventors and shown in Table 18.

TABLE 18

| | | parallel 1 | parallel 2 | parallel 3 | parallel 4 | parallel 5 | Mean value |
|---|---|---|---|---|---|---|---|
| 100 g | Thawed at the temperature larger than 0° C. | 15.56 | 15.54 | 15.55 | 15.70 | 15.62 | 15.59 |
| | Thawed at 0° C. | 17.51 | 17.62 | 17.64 | 17.61 | 17.55 | 17.59 |
| | Thawed at −1.5° C. | 19.58 | 19.72 | 19.51 | 19.65 | 19.60 | 19.61 |
| | Thawed at −3° C. | 24.62 | 24.72 | 24.78 | 24.77 | 24.62 | 24.70 |
| | Thawed at −4° C. | 47.39 | 46.24 | 46.25 | 45.65 | 47.18 | 46.54 |
| 200 g | Thawed at the temperature larger than 0° C. | 15.60 | 15.52 | 15.68 | 15.50 | 15.63 | 15.59 |
| | Thawed at 0° C. | 17.70 | 17.53 | 17.55 | 17.50 | 17.69 | 17.60 |
| | Thawed at −1.5° C. | 19.74 | 19.57 | 19.62 | 19.53 | 19.68 | 19.63 |
| | Thawed at −3° C. | 24.70 | 24.70 | 24.74 | 24.51 | 24.76 | 24.68 |
| | Thawed at −4° C. | 47.44 | 47.28 | 46.12 | 46.24 | 46.94 | 46.80 |
| 300 g | Thawed at the temperature larger than 0° C. | 15.59 | 15.55 | 15.66 | 15.55 | 15.51 | 15.57 |
| | Thawed at 0° C. | 17.52 | 17.67 | 17.64 | 17.51 | 17.62 | 17.59 |
| | Thawed at −1.5° C. | 19.59 | 19.64 | 19.59 | 19.62 | 19.59 | 19.61 |
| | Thawed at −3° C. | 24.50 | 24.79 | 24.55 | 24.51 | 24.70 | 24.61 |
| | Thawed at −4° C. | 45.74 | 46.79 | 45.86 | 45.85 | 45.65 | 45.98 |
| 400 g | Thawed at the temperature larger than 0° C. | 15.57 | 15.61 | 15.64 | 15.66 | 15.59 | 15.61 |
| | Thawed at 0° C. | 17.64 | 17.53 | 17.67 | 17.68 | 17.65 | 17.63 |
| | Thawed at −1.5° C. | 19.60 | 19.51 | 19.50 | 19.64 | 19.68 | 19.59 |
| | Thawed at −3° C. | 24.51 | 24.68 | 24.60 | 24.57 | 24.50 | 24.57 |
| | Thawed at −4° C. | 46.81 | 46.00 | 47.08 | 46.93 | 46.03 | 46.57 |
| 500 g | Thawed at the temperature larger than 0° C. | 15.63 | 15.69 | 15.63 | 15.50 | 15.62 | 15.61 |
| | Thawed at 0° C. | 17.53 | 17.55 | 17.61 | 17.53 | 17.51 | 17.55 |
| | Thawed at −1.5° C. | 19.60 | 19.74 | 19.54 | 19.74 | 19.70 | 19.66 |
| | Thawed at −3° C. | 24.58 | 24.57 | 24.51 | 24.80 | 24.55 | 24.60 |
| | Thawed at −4° C. | 47.06 | 47.20 | 45.93 | 45.66 | 46.63 | 46.50 |

(3) Experiments on chicken of 100 g, 200 g, 300 g, 400 g, and 500 g respectively, of which a process and a method are same as that of pork tenderloin of 100 g, 200 g, 300 g, 400 g, and 500 g, and can refer to descriptions of the above process and method corresponding to pork tenderloin of 100 g, 200 g, 300 g, 400 g, and 500 g, which is not described in detail herein. Experimental data of 5 parallel experiments are selected from a plurality of experiments by the inventors and shown in Table 19.

TABLE 19

| | | parallel 1 | parallel 2 | parallel 3 | parallel 4 | parallel 5 | Mean value |
|---|---|---|---|---|---|---|---|
| 100 g | Thawed at the temperature larger than 0° C. | 16.61 | 16.51 | 16.65 | 16.55 | 16.56 | 16.58 |
| | Thawed at 0° C. | 18.53 | 18.52 | 18.52 | 18.68 | 18.69 | 18.59 |
| | Thawed at −1.5° C. | 20.23 | 20.21 | 20.09 | 20.06 | 20.23 | 20.16 |
| | Thawed at −3° C. | 23.19 | 23.11 | 23.15 | 23.11 | 23.13 | 23.14 |
| | Thawed at −4° C. | 43.48 | 44.74 | 43.25 | 43.53 | 44.89 | 43.98 |
| 200 g | Thawed at the temperature larger than 0° C. | 16.67 | 16.51 | 16.61 | 16.54 | 16.52 | 16.57 |
| | Thawed at 0° C. | 18.66 | 18.58 | 18.54 | 18.67 | 18.69 | 18.63 |
| | Thawed at −1.5° C. | 20.24 | 20.07 | 20.26 | 20.04 | 20.02 | 20.13 |
| | Thawed at −3° C. | 23.28 | 23.20 | 23.24 | 23.26 | 23.29 | 23.26 |
| | Thawed at −4° C. | 43.64 | 44.85 | 44.21 | 44.42 | 44.96 | 44.42 |
| 300 g | Thawed at the temperature larger than 0° C. | 16.61 | 16.63 | 16.67 | 16.69 | 16.67 | 16.65 |
| | Thawed at 0° C. | 18.60 | 18.57 | 18.66 | 18.58 | 18.64 | 18.61 |
| | Thawed at −1.5° C. | 20.29 | 20.25 | 20.04 | 20.20 | 20.02 | 20.16 |
| | Thawed at −3° C. | 23.28 | 23.03 | 23.03 | 23.01 | 23.15 | 23.10 |
| | Thawed at −4° C. | 44.21 | 44.49 | 44.57 | 43.77 | 44.39 | 44.29 |

TABLE 19-continued

| | | chicken | | | | |
|---|---|---|---|---|---|---|
| | parallel 1 | parallel 2 | parallel 3 | parallel 4 | parallel 5 | Mean value |
| 400 g Thawed at the temperature larger than 0° C. | 16.56 | 16.61 | 16.63 | 16.57 | 16.68 | 16.61 |
| Thawed at 0° C. | 18.62 | 18.67 | 18.62 | 18.70 | 18.51 | 18.62 |
| Thawed at −1.5° C. | 20.18 | 20.18 | 20.07 | 20.02 | 20.30 | 20.15 |
| Thawed at −3° C. | 23.19 | 23.08 | 23.04 | 23.21 | 23.23 | 23.15 |
| Thawed at −4° C. | 44.97 | 43.31 | 44.48 | 44.93 | 43.31 | 44.20 |
| 500 g Thawed at the temperature larger than 0° C. | 16.64 | 16.68 | 16.56 | 16.55 | 16.63 | 16.61 |
| Thawed at 0° C. | 18.68 | 18.66 | 18.64 | 18.61 | 18.60 | 18.64 |
| Thawed at −1.5° C. | 20.21 | 20.13 | 20.22 | 20.15 | 20.22 | 20.19 |
| Thawed at −3° C. | 23.17 | 23.12 | 23.03 | 23.15 | 23.01 | 23.09 |
| Thawed at −4° C. | 43.55 | 43.79 | 44.47 | 43.25 | 44.26 | 43.86 |

(4) Experiments on beef of 100 g, 200 g, 300 g, 400 g, and 500 g respectively, of which a process and a method are same as that of pork tenderloin of 100 g, 200 g, 300 g, 400 g, and 500 g, and can refer to descriptions of the above process and method corresponding to pork tenderloin of 100 g, 200 g, 300 g, 400 g, and 500 g, which is not described in detail herein. Experimental data of 5 parallel experiments are selected from a plurality of experiments by the inventors and shown in Table 20.

TABLE 20

| | | beef | | | | |
|---|---|---|---|---|---|---|
| | parallel 1 | parallel 2 | parallel 3 | parallel 4 | parallel 5 | Mean value |
| 100 g Thawed at the temperature larger than 0° C. | 15.13 | 15.18 | 15.01 | 15.08 | 15.12 | 15.10 |
| Thawed at 0° C. | 17.61 | 17.55 | 17.53 | 17.53 | 17.60 | 17.56 |
| Thawed at −1.5° C. | 19.65 | 19.61 | 19.70 | 19.66 | 19.60 | 19.64 |
| Thawed at −3° C. | 22.52 | 22.65 | 22.71 | 22.71 | 22.52 | 22.62 |
| Thawed at −4° C. | 51.47 | 50.36 | 51.21 | 51.94 | 50.04 | 51.01 |
| 200 g Thawed at the temperature larger than 0° C. | 15.12 | 15.09 | 15.05 | 15.03 | 15.09 | 15.08 |
| Thawed at 0° C. | 17.52 | 17.57 | 17.65 | 17.59 | 17.61 | 17.59 |
| Thawed at −1.5° C. | 19.71 | 19.74 | 19.50 | 19.66 | 19.62 | 19.65 |
| Thawed at −3° C. | 22.58 | 22.59 | 22.51 | 22.51 | 22.68 | 22.57 |
| Thawed at −4° C. | 50.25 | 51.79 | 50.25 | 50.25 | 50.64 | 50.64 |
| 300 g Thawed at the temperature larger than 0° C. | 15.13 | 15.07 | 15.01 | 15.15 | 15.12 | 15.10 |
| Thawed at 0° C. | 17.58 | 17.59 | 17.56 | 17.57 | 17.65 | 17.59 |
| Thawed at −1.5° C. | 19.67 | 19.53 | 19.62 | 19.75 | 19.61 | 19.63 |
| Thawed at −3° C. | 22.61 | 22.76 | 22.63 | 22.67 | 22.68 | 22.67 |
| Thawed at −4° C. | 50.27 | 51.60 | 50.21 | 50.86 | 51.65 | 50.92 |
| 400 g Thawed at the temperature larger than 0° C. | 15.18 | 15.07 | 15.13 | 15.07 | 15.04 | 15.10 |
| Thawed at 0° C. | 17.67 | 17.66 | 17.53 | 17.52 | 17.61 | 17.60 |
| Thawed at −1.5° C. | 19.62 | 19.56 | 19.72 | 19.80 | 19.60 | 19.66 |
| Thawed at −3° C. | 22.75 | 22.76 | 22.66 | 22.77 | 22.55 | 22.70 |
| Thawed at −4° C. | 50.00 | 51.24 | 51.77 | 50.60 | 50.94 | 50.91 |
| 500 g Thawed at the temperature larger than 0° C. | 15.01 | 15.06 | 15.05 | 15.14 | 15.15 | 15.08 |
| Thawed at 0° C. | 17.69 | 17.65 | 17.66 | 17.61 | 17.51 | 17.62 |
| Thawed at −1.5° C. | 19.57 | 19.62 | 19.50 | 19.62 | 19.71 | 19.60 |
| Thawed at −3° C. | 22.77 | 22.79 | 22.71 | 22.60 | 22.67 | 22.71 |
| Thawed at −4° C. | 50.85 | 51.83 | 50.57 | 50.42 | 50.80 | 50.89 |

Figure 8:
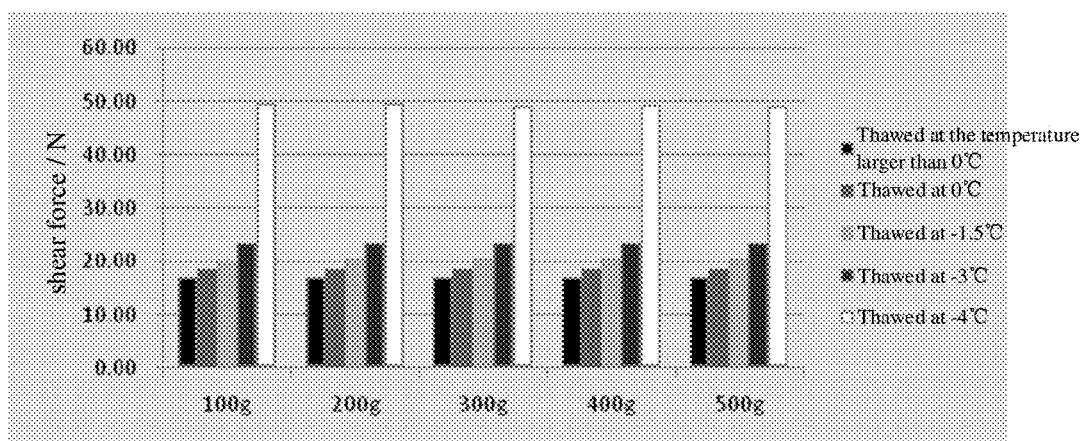
FIG. 8 (a) is a schematic diagram of shear forces of pork tenderloin with different weights thawed at different temperatures at thawing endpoint according to an embodiment of the present disclosure.
Figure 8:
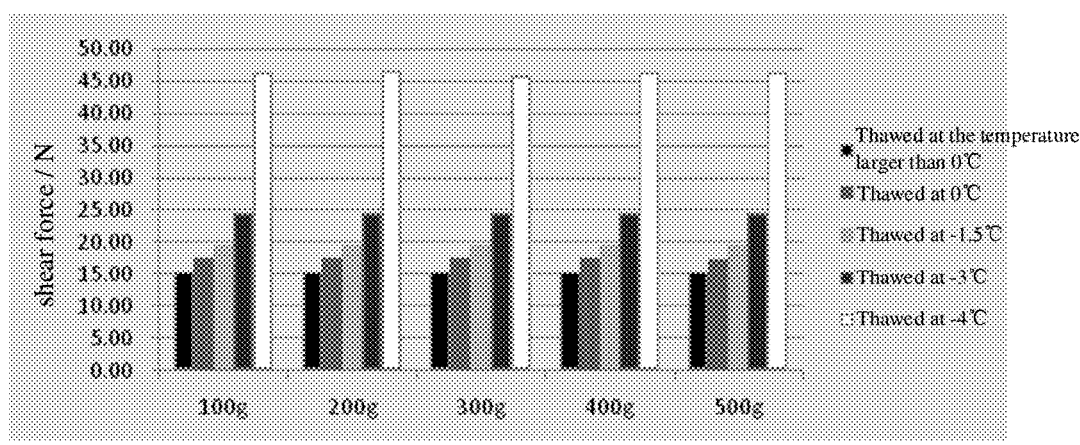
Figure 8:
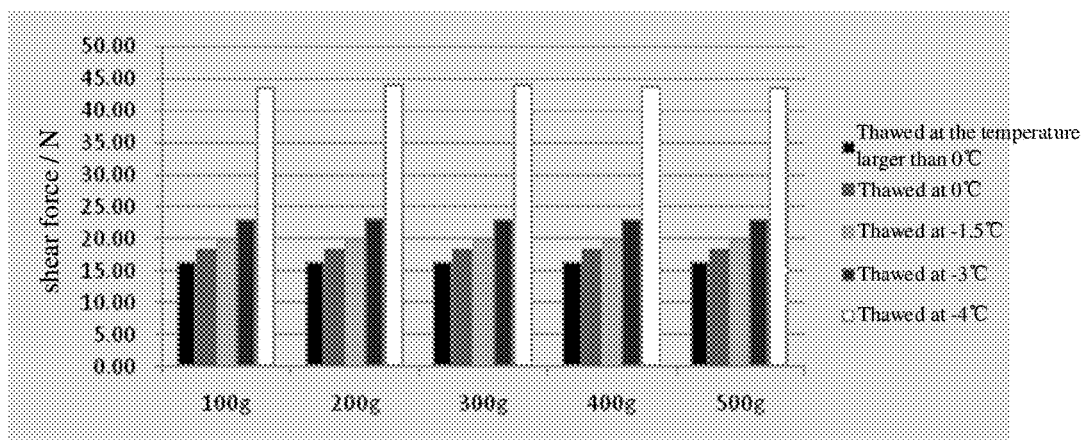
Figure 8:
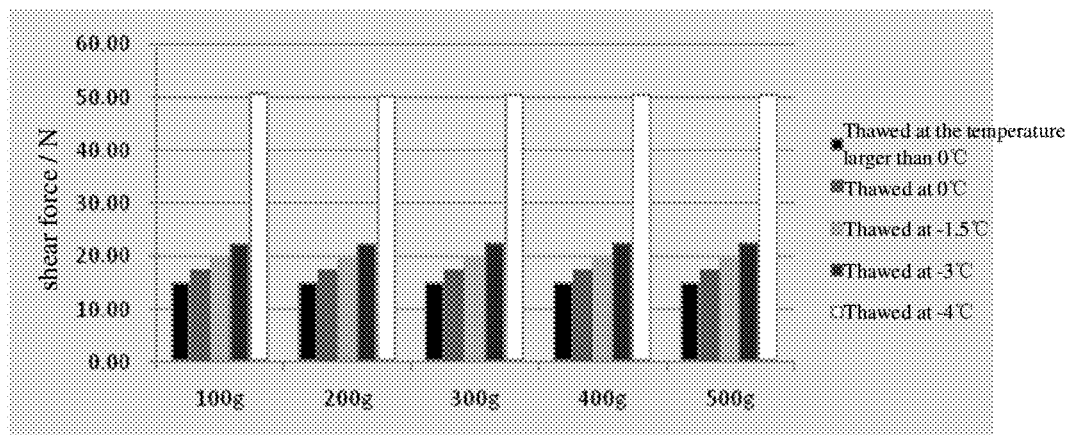

2. Experiment results. FIG. 8(a) is a diagram drawn according to each group of mean values in Table 17. FIG. 8(b) is a diagram drawn according to each group of mean values in Table 18. FIG. 8(c) is a diagram drawn according to each group of mean values in Table 19. FIG. 8(d) is a diagram drawn according to each group of mean values in Table 20. It can be known from FIG. 8(a), FIG. 8(b), FIG. 8(c), and FIG. 8(d) that, after thawing, the shear force varies with the kind of the food, the weight of the food, and the temperature at thawing endpoint. The shear forces are slightly increased when the temperature of the food after thawing is maintained in −3° C.~−0° C. relative to that when the temperature of the food after thawing is larger than 0° C., but are significantly smaller than that when the temperature of the food after thawing is about −4° C. Therefore, the thawed food is easier to cut.

In embodiment 6, yellowness of the food thawed at −3° C.~−0° C. is analyzed.

1. Pork tenderloin, fish, chicken, and beef are selected as the food respectively, and 100 g (gram), 200 g, 300 g, 400 g, and 500 g are selected as weights of each kind of the food.

(1) Experiments on pork tenderloin of 100 g, 200 g, 300 g, 400 g, and 500 g respectively. Firstly, pork tenderloin of 100 g, 200 g, 300 g, 400 g, and 500 g are put in the microwave oven to thaw respectively. The temperatures of the food in the microwave oven are maintained at different thawing endpoints (i.e. thawed at a temperature larger than 0° C., thawed at 0° C., thawed at −1.5° C., thawed at −3° C., and thawed at −4° C.). And then, yellowness of pork tenderloin of 100 g, 200 g, 300 g, 400 g, and 500 g respectively thawed at different thawing endpoints (i.e. thawed at the temperature larger than 0° C., thawed at 0° C., thawed at −1.5° C., thawed at −3° C., and thawed at −4° C.) are measured by a color difference meter respectively. Experimental data of 5 parallel experiments are selected from a plurality of experiments by the inventors and shown in Table 21.

TABLE 21 pork tenderloin

|   |   | parallel 1 | parallel 2 | parallel 3 | parallel 4 | parallel 5 | Mean value |
|---|---|---|---|---|---|---|---|
| 100 g | Thawed at the temperature larger than 0° C. | 11.52 | 11.60 | 11.62 | 11.59 | 11.68 | 11.60 |
|  | Thawed at 0° C. | 3.82 | 3.88 | 3.91 | 3.90 | 3.91 | 3.88 |
|  | Thawed at −1.5° C. | 3.94 | 3.92 | 3.96 | 3.90 | 3.95 | 3.93 |
|  | Thawed at −3° C. | 3.82 | 3.92 | 3.88 | 3.96 | 3.88 | 3.89 |
|  | Thawed at −4° C. | 3.90 | 3.81 | 3.96 | 3.92 | 3.83 | 3.88 |
| 200 g | Thawed at the temperature larger than 0° C. | 11.61 | 11.51 | 11.60 | 11.58 | 11.56 | 11.57 |
|  | Thawed at 0° C. | 3.82 | 3.82 | 3.81 | 4.00 | 3.85 | 3.86 |
|  | Thawed at −1.5° C. | 3.95 | 3.97 | 3.95 | 3.89 | 3.89 | 3.93 |
|  | Thawed at −3° C. | 3.89 | 3.99 | 3.93 | 3.91 | 3.93 | 3.93 |
|  | Thawed at −4° C. | 3.93 | 3.92 | 3.89 | 3.86 | 3.90 | 3.90 |
| 300 g | Thawed at the temperature larger than 0° C. | 11.54 | 11.54 | 11.52 | 11.59 | 11.61 | 11.56 |
|  | Thawed at 0° C. | 3.84 | 3.99 | 3.95 | 3.99 | 3.89 | 3.93 |
|  | Thawed at −1.5° C. | 3.86 | 3.90 | 3.82 | 3.80 | 3.89 | 3.86 |
|  | Thawed at −3° C. | 3.97 | 3.88 | 3.82 | 3.97 | 3.86 | 3.90 |
|  | Thawed at −4° C. | 3.86 | 3.97 | 3.95 | 3.85 | 3.97 | 3.92 |
| 400 g | Thawed at the temperature larger than 0° C. | 11.65 | 11.62 | 11.53 | 11.52 | 11.52 | 11.57 |
|  | Thawed at 0° C. | 3.97 | 3.91 | 3.88 | 3.96 | 3.87 | 3.92 |
|  | Thawed at −1.5° C. | 3.92 | 3.80 | 3.86 | 3.89 | 3.98 | 3.89 |
|  | Thawed at −3° C. | 3.97 | 3.92 | 3.89 | 3.89 | 3.82 | 3.90 |
|  | Thawed at −4° C. | 3.84 | 3.91 | 3.83 | 3.96 | 3.89 | 3.89 |
| 500 g | Thawed at the temperature larger than 0° C. | 11.51 | 11.59 | 11.68 | 11.65 | 11.65 | 11.62 |
|  | Thawed at 0° C. | 3.82 | 3.97 | 3.96 | 3.82 | 3.88 | 3.89 |
|  | Thawed at −1.5° C. | 3.89 | 3.87 | 3.89 | 3.81 | 3.89 | 3.87 |
|  | Thawed at −3° C. | 3.92 | 3.97 | 3.83 | 3.93 | 3.96 | 3.92 |
|  | Thawed at −4° C. | 3.95 | 3.96 | 3.83 | 3.86 | 3.80 | 3.88 |

(2) Experiments on fish of 100 g, 200 g, 300 g, 400 g, and 500 g respectively, of which a process and a method are same as that of pork tenderloin of 100 g, 200 g, 300 g, 400 g, and 500 g, and can refer to descriptions of the above process and method corresponding to pork tenderloin of 100 g, 200 g, 300 g, 400 g, and 500 g, which is not described in detail herein. Experimental data of 5 parallel experiments are selected from a plurality of experiments by the inventors and shown in Table 22.

TABLE 22 fish

|   |   | parallel 1 | parallel 2 | parallel 3 | parallel 4 | parallel 5 | Mean value |
|---|---|---|---|---|---|---|---|
| 100 g | Thawed at the temperature larger than 0° C. | 10.55 | 10.52 | 10.58 | 10.64 | 10.60 | 10.58 |
|  | Thawed at 0° C. | 2.59 | 2.53 | 2.65 | 2.61 | 2.56 | 2.59 |
|  | Thawed at −1.5° C. | 2.60 | 2.61 | 2.52 | 2.66 | 2.51 | 2.58 |
|  | Thawed at −3° C. | 2.68 | 2.65 | 2.54 | 2.67 | 2.55 | 2.62 |
|  | Thawed at −4° C. | 2.65 | 2.50 | 2.66 | 2.58 | 2.53 | 2.58 |
| 200 g | Thawed at the temperature larger than 0° C. | 10.69 | 10.56 | 10.69 | 10.55 | 10.56 | 10.61 |
|  | Thawed at 0° C. | 2.58 | 2.58 | 2.54 | 2.66 | 2.62 | 2.59 |
|  | Thawed at −1.5° C. | 2.61 | 2.59 | 2.69 | 2.59 | 2.55 | 2.61 |
|  | Thawed at −3° C. | 2.60 | 2.68 | 2.63 | 2.52 | 2.53 | 2.59 |
|  | Thawed at −4° C. | 2.54 | 2.60 | 2.54 | 2.57 | 2.51 | 2.55 |

TABLE 22-continued

| | | fish | | | | | |
|---|---|---|---|---|---|---|---|
| | | parallel 1 | parallel 2 | parallel 3 | parallel 4 | parallel 5 | Mean value |
| 300 g | Thawed at the temperature larger than 0° C. | 10.58 | 10.57 | 10.61 | 10.67 | 10.62 | 10.61 |
| | Thawed at 0° C. | 2.55 | 2.65 | 2.70 | 2.60 | 2.64 | 2.63 |
| | Thawed at −1.5° C. | 2.51 | 2.64 | 2.64 | 2.55 | 2.65 | 2.60 |
| | Thawed at −3° C. | 2.66 | 2.68 | 2.60 | 2.52 | 2.55 | 2.60 |
| | Thawed at −4° C. | 2.67 | 2.66 | 2.51 | 2.53 | 2.56 | 2.58 |
| 400 g | Thawed at the temperature larger than 0° C. | 10.64 | 10.69 | 10.67 | 10.64 | 10.63 | 10.65 |
| | Thawed at 0° C. | 2.65 | 2.60 | 2.63 | 2.68 | 2.57 | 2.62 |
| | Thawed at −1.5° C. | 2.61 | 2.61 | 2.58 | 2.65 | 2.56 | 2.60 |
| | Thawed at −3° C. | 2.66 | 2.67 | 2.66 | 2.67 | 2.67 | 2.67 |
| | Thawed at −4° C. | 2.67 | 2.65 | 2.58 | 2.60 | 2.58 | 2.62 |
| 500 g | Thawed at the temperature larger than 0° C. | 10.66 | 10.60 | 10.68 | 10.61 | 10.51 | 10.61 |
| | Thawed at 0° C. | 2.53 | 2.54 | 2.65 | 2.55 | 2.66 | 2.58 |
| | Thawed at −1.5° C. | 2.67 | 2.53 | 2.70 | 2.58 | 2.51 | 2.60 |
| | Thawed at −3° C. | 2.50 | 2.57 | 2.53 | 2.59 | 2.52 | 2.54 |
| | Thawed at −4° C. | 2.52 | 2.68 | 2.53 | 2.67 | 2.66 | 2.61 |

(3) Experiments on chicken of 100 g, 200 g, 300 g, 400 g, and 500 g respectively, of which a process and a method are same as that of pork tenderloin of 100 g, 200 g, 300 g, 400 g, and 500 g, and can refer to descriptions of the above process and method corresponding to pork tenderloin of 100 g, 200 g, 300 g, 400 g, and 500 g, which is not described in detail herein. Experimental data of 5 parallel experiments are selected from a plurality of experiments by the inventors and shown in Table 23.

TABLE 23

| | | chicken | | | | | |
|---|---|---|---|---|---|---|---|
| | | parallel 1 | parallel 2 | parallel 3 | parallel 4 | parallel 5 | Mean value |
| 100 g | Thawed at the temperature larger than 0° C. | 13.71 | 13.72 | 13.61 | 13.61 | 13.76 | 13.68 |
| | Thawed at 0° C. | 4.23 | 4.15 | 4.14 | 4.19 | 4.26 | 4.20 |
| | Thawed at −1.5° C. | 4.16 | 4.13 | 4.26 | 4.25 | 4.19 | 4.20 |
| | Thawed at −3° C. | 4.24 | 4.21 | 4.15 | 4.18 | 4.17 | 4.19 |
| | Thawed at −4° C. | 4.19 | 4.13 | 4.14 | 4.15 | 4.12 | 4.15 |
| 200 g | Thawed at the temperature larger than 0° C. | 13.61 | 13.76 | 13.75 | 13.74 | 13.66 | 13.70 |
| | Thawed at 0° C. | 4.19 | 4.11 | 4.16 | 4.19 | 4.12 | 4.15 |
| | Thawed at −1.5° C. | 4.17 | 4.22 | 4.22 | 4.13 | 4.12 | 4.17 |
| | Thawed at −3° C. | 4.16 | 4.28 | 4.16 | 4.18 | 4.21 | 4.20 |
| | Thawed at −4° C. | 4.13 | 4.20 | 4.29 | 4.23 | 4.26 | 4.22 |
| 300 g | Thawed at the temperature larger than 0° C. | 13.68 | 13.62 | 13.74 | 13.68 | 13.73 | 13.69 |
| | Thawed at 0° C. | 4.26 | 4.14 | 4.19 | 4.21 | 4.25 | 4.21 |
| | Thawed at −1.5° C. | 4.20 | 4.26 | 4.25 | 4.30 | 4.19 | 4.24 |
| | Thawed at −3° C. | 4.10 | 4.29 | 4.19 | 4.13 | 4.16 | 4.17 |
| | Thawed at −4° C. | 4.24 | 4.13 | 4.18 | 4.22 | 4.21 | 4.20 |
| 400 g | Thawed at the temperature larger than 0° C. | 13.63 | 13.77 | 13.79 | 13.79 | 13.65 | 13.73 |
| | Thawed at 0° C. | 4.25 | 4.11 | 4.22 | 4.21 | 4.17 | 4.19 |
| | Thawed at −1.5° C. | 4.26 | 4.25 | 4.22 | 4.15 | 4.27 | 4.23 |
| | Thawed at −3° C. | 4.18 | 4.15 | 4.19 | 4.10 | 4.14 | 4.15 |
| | Thawed at −4° C. | 4.25 | 4.11 | 4.27 | 4.18 | 4.25 | 4.21 |
| 500 g | Thawed at the temperature larger than 0° C. | 13.74 | 13.73 | 13.70 | 13.61 | 13.64 | 13.69 |
| | Thawed at 0° C. | 4.21 | 4.11 | 4.12 | 4.10 | 4.25 | 4.16 |
| | Thawed at −1.5° C. | 4.25 | 4.12 | 4.21 | 4.15 | 4.13 | 4.17 |
| | Thawed at −3° C. | 4.25 | 4.19 | 4.14 | 4.16 | 4.27 | 4.20 |
| | Thawed at −4° C. | 4.20 | 4.27 | 4.19 | 4.28 | 4.19 | 4.23 |

(4) Experiment on beef of 100 g, 200 g, 300 g, 400 g, and 500 g respectively, of which a process and a method are same as that of pork tenderloin of 100 g, 200 g, 300 g, 400 g, and 500 g, and can refer to descriptions of the above process and method corresponding to pork tenderloin of 100 g, 200 g, 300 g, 400 g, and 500 g, which is not described in detail herein. Experimental data of 5 parallel experiments are selected from a plurality of experiments by the inventors and shown in Table 24.

TABLE 24

| | | beef | | | | | |
|---|---|---|---|---|---|---|---|
| | | parallel 1 | parallel 2 | parallel 3 | parallel 4 | parallel 5 | Mean value |
| 100 g | Thawed at the temperature larger than 0° C. | 11.01 | 11.14 | 11.04 | 11.04 | 11.13 | 11.07 |
| | Thawed at 0° C. | 2.04 | 2.08 | 2.05 | 2.07 | 2.07 | 2.06 |
| | Thawed at −1.5° C. | 2.01 | 2.15 | 2.18 | 2.12 | 2.05 | 2.10 |
| | Thawed at −3° C. | 2.16 | 2.05 | 2.13 | 2.17 | 2.06 | 2.11 |
| | Thawed at −4° C. | 2.09 | 2.14 | 2.10 | 2.15 | 2.11 | 2.12 |
| 200 g | Thawed at the temperature larger than 0° C. | 11.03 | 11.15 | 11.02 | 11.12 | 11.12 | 11.09 |
| | Thawed at 0° C. | 2.01 | 2.06 | 2.12 | 2.15 | 2.01 | 2.07 |
| | Thawed at −1.5° C. | 2.08 | 2.06 | 2.02 | 2.05 | 2.16 | 2.07 |
| | Thawed at −3° C. | 2.13 | 2.03 | 2.04 | 2.09 | 2.16 | 2.09 |
| | Thawed at −4° C. | 2.17 | 2.13 | 2.06 | 2.07 | 2.07 | 2.10 |
| 300 g | Thawed at the temperature larger than 0° C. | 11.09 | 11.04 | 11.17 | 11.17 | 11.12 | 11.12 |
| | Thawed at 0° C. | 2.13 | 2.03 | 2.08 | 2.04 | 2.07 | 2.07 |
| | Thawed at −1.5° C. | 2.15 | 2.18 | 2.04 | 2.10 | 2.05 | 2.10 |
| | Thawed at −3° C. | 2.11 | 2.06 | 2.03 | 2.01 | 2.07 | 2.05 |
| | Thawed at −4° C. | 2.02 | 2.12 | 2.19 | 2.02 | 2.19 | 2.11 |
| 400 g | Thawed at the temperature larger than 0° C. | 11.14 | 11.16 | 11.18 | 11.07 | 11.02 | 11.12 |
| | Thawed at 0° C. | 2.19 | 2.14 | 2.15 | 2.18 | 2.03 | 2.14 |
| | Thawed at −1.5° C. | 2.08 | 2.03 | 2.17 | 2.06 | 2.08 | 2.08 |
| | Thawed at −3° C. | 2.07 | 2.07 | 2.05 | 2.11 | 2.00 | 2.06 |
| | Thawed at −4° C. | 2.10 | 2.06 | 2.09 | 2.17 | 2.15 | 2.12 |
| 500 g | Thawed at the temperature larger than 0° C. | 11.00 | 11.19 | 11.01 | 11.17 | 11.04 | 11.08 |
| | Thawed at 0° C. | 2.15 | 2.11 | 2.08 | 2.17 | 2.10 | 2.12 |
| | Thawed at −1.5° C. | 2.12 | 2.10 | 2.17 | 2.02 | 2.12 | 2.10 |
| | Thawed at −3° C. | 2.05 | 2.07 | 2.06 | 2.00 | 2.04 | 2.04 |
| | Thawed at −4° C. | 2.15 | 2.04 | 2.15 | 2.02 | 2.13 | 2.10 |

Figure 9:
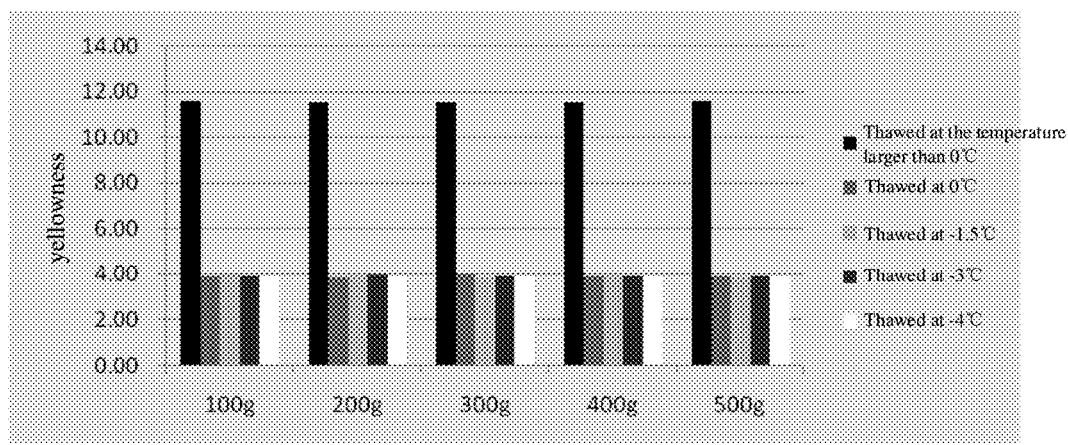
FIG. 9 (a) is a schematic diagram of yellowness of pork tenderloin with different weights thawed at different temperatures at thawing endpoint according to an embodiment of the present disclosure.
Figure 9:
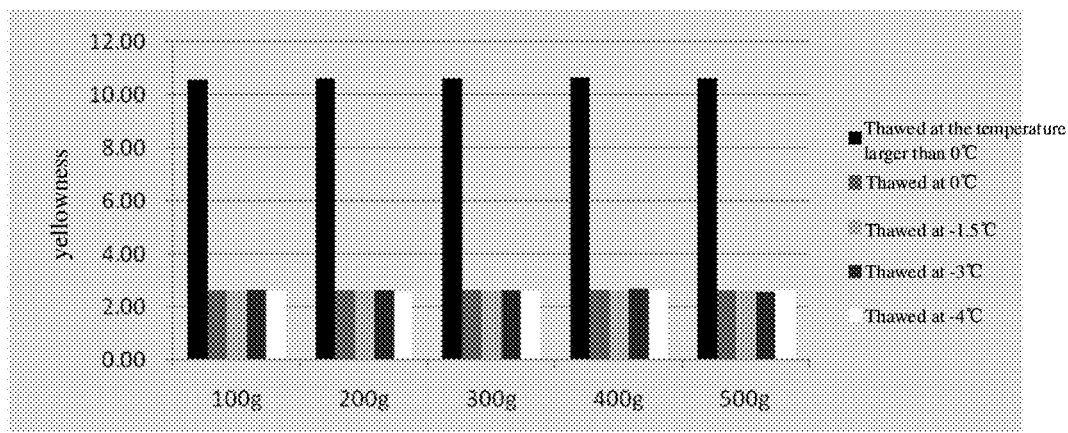
Figure 9:
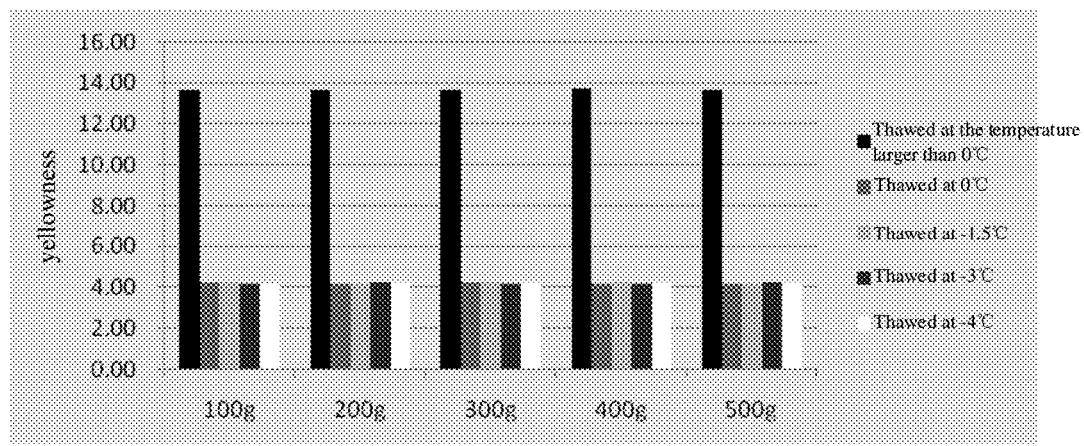
Figure 9:
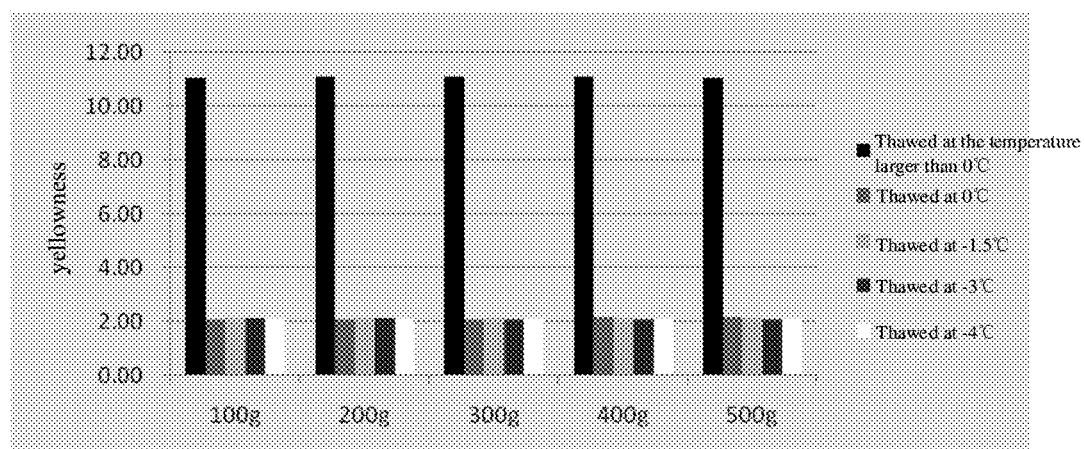

2. Experiment results. FIG. 9(a) is a diagram drawn according to each group of mean values in Table 21. FIG. 9(b) is a diagram drawn according to each group of mean values in Table 22. FIG. 9(c) is a diagram drawn according to each group of mean values in Table 23. FIG. 9(d) is a diagram drawn according to each group of mean values in Table 24. It can be known from FIG. 9(a), FIG. 9(b), FIG. 9(c) and FIG. 9(d) that, after thawing, the yellowness varies with the kind of the food, the weight of the food, and the temperature at thawing endpoint. The yellowness is significantly increased when the temperature of the food after thawing is above 0° C., relative to that when the temperature of the food after thawing is maintained in −3° C.~0° C., which indicates that parts of the food has been discolored and has been cooked.

In embodiment 7, aerobic plate counts of food thawed at −3° C.~0° C. are analyzed.

1. Pork tenderloin, fish, chicken, and beef are selected as the food respectively, and 100 g (gram), 200 g, 300 g, 400 g, and 500 g are selected as weights of each kind of the food.

(1) Experiments on pork tenderloin of 100 g, 200 g, 300 g, 400 g, and 500 g respectively. Firstly, pork tenderloin of 100 g, 200 g, 300 g, 400 g, and 500 g are put in the microwave oven to thaw respectively. The temperatures of the food in the microwave oven are maintained at different thawing endpoints (i.e. thawed at a temperature larger than 0° C., thawed at 0° C., thawed at −1.5° C., thawed at −3° C., and thawed at −4° C.). And then, aerobic plate counts of pork tenderloin of 100 g, 200 g, 300 g, 400 g, and 500 g respectively thawed at different thawing endpoints (i.e. thawed at the temperature larger than 0° C., thawed at 0° C., thawed at −1.5° C., thawed at −3° C., and thawed at −4° C.) are measured by a diluted cultivation counting method respectively. Experimental data of 5 parallel experiments are selected from a plurality of experiments by the inventors and shown in Table 25.

TABLE 25 pork tenderloin

| | | parallel 1 | parallel 2 | parallel 3 | parallel 4 | parallel 5 | Mean value |
|---|---|---|---|---|---|---|---|
| 100 g | Thawed at the temperature larger than 0° C. | 2.50E+05 | 2.60E+05 | 2.56E+05 | 2.63E+05 | 2.56E+05 | 2.57E+05 |
| | Thawed at 0° C. | 5.64E+04 | 5.78E+04 | 5.78E+04 | 5.67E+04 | 5.69E+04 | 5.71E+04 |
| | Thawed at −1.5° C. | 5.62E+04 | 5.71E+04 | 5.68E+04 | 5.65E+04 | 5.64E+04 | 5.66E+04 |
| | Thawed at −3° C. | 5.77E+04 | 5.70E+04 | 5.70E+04 | 5.79E+04 | 5.64E+04 | 5.72E+04 |
| | Thawed at −4° C. | 5.67E+04 | 5.71E+04 | 5.66E+04 | 5.76E+04 | 5.66E+04 | 5.69E+04 |
| 200 g | Thawed at the temperature larger than 0° C. | 2.51E+05 | 2.69E+05 | 2.63E+05 | 2.67E+05 | 2.53E+05 | 2.61E+05 |
| | Thawed at 0° C. | 5.77E+04 | 5.65E+04 | 5.80E+04 | 5.66E+04 | 5.75E+04 | 5.72E+04 |
| | Thawed at −1.5° C. | 5.72E+04 | 5.72E+04 | 5.78E+04 | 5.64E+04 | 5.78E+04 | 5.73E+04 |
| | Thawed at −3° C. | 5.72E+04 | 5.67E+04 | 5.63E+04 | 5.78E+04 | 5.65E+04 | 5.69E+04 |
| | Thawed at −4° C. | 5.78E+04 | 5.74E+04 | 5.73E+04 | 5.80E+04 | 5.75E+04 | 5.76E+04 |
| 300 g | Thawed at the temperature larger than 0° C. | 2.55E+05 | 2.70E+05 | 2.54E+05 | 2.56E+05 | 2.55E+05 | 2.58E+05 |
| | Thawed at 0° C. | 5.61E+04 | 5.60E+04 | 5.70E+04 | 5.79E+04 | 5.62E+04 | 5.66E+04 |
| | Thawed at −1.5° C. | 5.64E+04 | 5.76E+04 | 5.72E+04 | 5.65E+04 | 5.68E+04 | 5.69E+04 |
| | Thawed at −3° C. | 5.74E+04 | 5.61E+04 | 5.63E+04 | 5.79E+04 | 5.65E+04 | 5.69E+04 |
| | Thawed at −4° C. | 5.62E+04 | 5.61E+04 | 5.69E+04 | 5.76E+04 | 5.79E+04 | 5.69E+04 |
| 400 g | Thawed at the temperature larger than 0° C. | 2.54E+05 | 2.54E+05 | 2.52E+05 | 2.54E+05 | 2.54E+05 | 2.54E+05 |
| | Thawed at 0° C. | 5.62E+04 | 5.72E+04 | 5.75E+04 | 5.75E+04 | 5.79E+04 | 5.73E+04 |
| | Thawed at −1.5° C. | 5.71E+04 | 5.76E+04 | 5.66E+04 | 5.66E+04 | 5.69E+04 | 5.70E+04 |
| | Thawed at −3° C. | 5.65E+04 | 5.73E+04 | 5.80E+04 | 5.74E+04 | 5.75E+04 | 5.73E+04 |
| | Thawed at −4° C. | 5.69E+04 | 5.68E+04 | 5.72E+04 | 5.72E+04 | 5.60E+04 | 5.68E+04 |
| 500 g | Thawed at the temperature larger than 0° C. | 2.62E+05 | 2.52E+05 | 2.65E+05 | 2.63E+05 | 2.56E+05 | 2.60E+05 |
| | Thawed at 0° C. | 5.78E+04 | 5.77E+04 | 5.74E+04 | 5.63E+04 | 5.67E+04 | 5.72E+04 |
| | Thawed at −1.5° C. | 5.64E+04 | 5.60E+04 | 5.64E+04 | 5.79E+04 | 5.62E+04 | 5.66E+04 |
| | Thawed at −3° C. | 5.78E+04 | 5.69E+04 | 5.77E+04 | 5.61E+04 | 5.69E+04 | 5.71E+04 |
| | Thawed at −4° C. | 5.69E+04 | 5.64E+04 | 5.77E+04 | 5.79E+04 | 5.75E+04 | 5.73E+04 |

(2) Experiments on fish of 100 g, 200 g, 300 g, 400 g, and 500 g respectively, of which a process and a method are same as that of pork tenderloin of 100 g, 200 g, 300 g, 400 g, and 500 g, and can refer to descriptions of the above process and method corresponding to pork tenderloin of 100 g, 200 g, 300 g, 400 g, and 500 g, which is not described in detail herein. Experimental data of 5 parallel experiments are selected from a plurality of experiments by the inventors and shown in Table 26.

TABLE 26 fish

| | | parallel 1 | parallel 2 | parallel 3 | parallel 4 | parallel 5 | Mean value |
|---|---|---|---|---|---|---|---|
| 100 g | Thawed at the temperature larger than 0° C. | 1.75E+05 | 1.62E+05 | 1.71E+05 | 1.77E+05 | 1.74E+05 | 1.72E+05 |
| | Thawed at 0° C. | 6.11E+04 | 6.10E+04 | 6.17E+04 | 6.01E+04 | 6.03E+04 | 6.08E+04 |
| | Thawed at −1.5° C. | 6.07E+04 | 6.06E+04 | 6.06E+04 | 6.00E+04 | 6.04E+04 | 6.05E+04 |
| | Thawed at −3° C. | 6.05E+04 | 6.10E+04 | 6.08E+04 | 6.01E+04 | 6.04E+04 | 6.06E+04 |
| | Thawed at −4° C. | 6.11E+04 | 6.10E+04 | 6.17E+04 | 6.03E+04 | 6.01E+04 | 6.08E+04 |
| 200 g | Thawed at the temperature larger than 0° C. | 1.61E+05 | 1.66E+05 | 1.74E+05 | 1.79E+05 | 1.61E+05 | 1.68E+05 |
| | Thawed at 0° C. | 6.19E+04 | 6.01E+04 | 6.08E+04 | 6.12E+04 | 6.05E+04 | 6.09E+04 |
| | Thawed at −1.5° C. | 6.09E+04 | 6.03E+04 | 6.11E+04 | 6.16E+04 | 6.08E+04 | 6.09E+04 |
| | Thawed at −3° C. | 6.10E+04 | 6.08E+04 | 6.19E+04 | 6.07E+04 | 6.08E+04 | 6.10E+04 |
| | Thawed at −4° C. | 6.01E+04 | 6.18E+04 | 6.01E+04 | 6.12E+04 | 6.20E+04 | 6.10E+04 |
| 300 g | Thawed at the temperature larger than 0° C. | 1.78E+05 | 1.68E+05 | 1.61E+05 | 1.68E+05 | 1.77E+05 | 1.71E+05 |
| | Thawed at 0° C. | 6.16E+04 | 6.14E+04 | 6.02E+04 | 6.09E+04 | 6.12E+04 | 6.11E+04 |
| | Thawed at −1.5° C. | 6.06E+04 | 6.09E+04 | 6.12E+04 | 6.16E+04 | 6.06E+04 | 6.10E+04 |
| | Thawed at −3° C. | 6.03E+04 | 6.12E+04 | 6.05E+04 | 6.20E+04 | 6.14E+04 | 6.11E+04 |
| | Thawed at −4° C. | 6.09E+04 | 6.06E+04 | 6.07E+04 | 6.18E+04 | 6.16E+04 | 6.11E+04 |
| 400 g | Thawed at the temperature larger than 0° C. | 1.72E+05 | 1.74E+05 | 1.77E+05 | 1.79E+05 | 1.66E+05 | 1.74E+05 |
| | Thawed at 0° C. | 6.13E+04 | 6.00E+04 | 6.15E+04 | 6.10E+04 | 6.08E+04 | 6.09E+04 |
| | Thawed at −1.5° C. | 6.19E+04 | 6.08E+04 | 6.07E+04 | 6.00E+04 | 6.03E+04 | 6.08E+04 |

TABLE 26-continued

| | | fish | | | | | |
|---|---|---|---|---|---|---|---|
| | | parallel 1 | parallel 2 | parallel 3 | parallel 4 | parallel 5 | Mean value |
| | Thawed at −3° C. | 6.18E+04 | 6.11E+04 | 6.10E+04 | 6.01E+04 | 6.17E+04 | 6.11E+04 |
| | Thawed at −4° C. | 6.10E+04 | 6.06E+04 | 6.06E+04 | 6.12E+04 | 6.12E+04 | 6.09E+04 |
| 500 g | Thawed at the temperature larger than 0° C. | 1.80E+05 | 1.68E+05 | 1.65E+05 | 1.67E+05 | 1.62E+05 | 1.68E+05 |
| | Thawed at 0° C. | 6.19E+04 | 6.07E+04 | 6.17E+04 | 6.18E+04 | 6.17E+04 | 6.16E+04 |
| | Thawed at −1.5° C. | 6.09E+04 | 6.11E+04 | 6.03E+04 | 6.13E+04 | 6.19E+04 | 6.11E+04 |
| | Thawed at −3° C. | 6.19E+04 | 6.19E+04 | 6.08E+04 | 6.06E+04 | 6.02E+04 | 6.11E+04 |
| | Thawed at −4° C. | 6.14E+04 | 6.06E+04 | 6.12E+04 | 6.19E+04 | 6.14E+04 | 6.13E+04 |

(3) Experiments on chicken of 100 g, 200 g, 300 g, 400 g, and 500 g respectively, of which a process and a method are same as that of pork tenderloin of 100 g, 200 g, 300 g, 400 g, and 500 g, and can refer to descriptions of the above process and method corresponding to pork tenderloin of 100 g, 200 g, 300 g, 400 g, and 500 g, which is not described in detail herein. Experimental data of 5 parallel experiments are selected from a plurality of experiments by the inventors and shown in Table 27.

TABLE 27

| | | chicken | | | | | |
|---|---|---|---|---|---|---|---|
| | | parallel 1 | parallel 2 | parallel 3 | parallel 4 | parallel 5 | Mean value |
| 100 g | Thawed at the temperature larger than 0° C. | 3.02E+05 | 3.02E+05 | 3.20E+05 | 3.13E+05 | 3.12E+05 | 3.10E+05 |
| | Thawed at 0° C. | 7.17E+04 | 7.00E+04 | 7.03E+04 | 7.10E+04 | 7.17E+04 | 7.10E+04 |
| | Thawed at −1.5° C. | 7.14E+04 | 7.08E+04 | 7.18E+04 | 7.15E+04 | 7.10E+04 | 7.13E+04 |
| | Thawed at −3° C. | 7.13E+04 | 7.03E+04 | 7.14E+04 | 7.17E+04 | 7.02E+04 | 7.10E+04 |
| | Thawed at −4° C. | 7.06E+04 | 7.13E+04 | 7.16E+04 | 7.04E+04 | 7.06E+04 | 7.09E+04 |
| 200 g | Thawed at the temperature larger than 0° C. | 3.04E+05 | 3.07E+05 | 3.17E+05 | 3.01E+05 | 3.16E+05 | 3.09E+05 |
| | Thawed at 0° C. | 7.06E+04 | 7.06E+04 | 7.05E+04 | 7.17E+04 | 7.06E+04 | 7.08E+04 |
| | Thawed at −1.5° C. | 7.05E+04 | 7.08E+04 | 7.04E+04 | 7.15E+04 | 7.02E+04 | 7.07E+04 |
| | Thawed at −3° C. | 7.03E+04 | 7.13E+04 | 7.18E+04 | 7.15E+04 | 7.11E+04 | 7.12E+04 |
| | Thawed at −4° C. | 7.09E+04 | 7.19E+04 | 7.12E+04 | 7.06E+04 | 7.02E+04 | 7.10E+04 |
| 300 g | Thawed at the temperature larger than 0° C. | 3.05E+05 | 3.11E+05 | 3.05E+05 | 3.14E+05 | 3.10E+05 | 3.09E+05 |
| | Thawed at 0° C. | 7.20E+04 | 7.18E+04 | 7.05E+04 | 7.06E+04 | 7.16E+04 | 7.13E+04 |
| | Thawed at −1.5° C. | 7.20E+04 | 7.15E+04 | 7.16E+04 | 7.07E+04 | 7.03E+04 | 7.12E+04 |
| | Thawed at −3° C. | 7.19E+04 | 7.05E+04 | 7.05E+04 | 7.05E+04 | 7.11E+04 | 7.09E+04 |
| | Thawed at −4° C. | 7.08E+04 | 7.08E+04 | 7.06E+04 | 7.17E+04 | 7.05E+04 | 7.09E+04 |
| 400 g | Thawed at the temperature larger than 0° C. | 3.11E+05 | 3.10E+05 | 3.18E+05 | 3.07E+05 | 3.06E+05 | 3.10E+05 |
| | Thawed at 0° C. | 7.03E+04 | 7.02E+04 | 7.04E+04 | 7.02E+04 | 7.07E+04 | 7.04E+04 |
| | Thawed at −1.5° C. | 7.13E+04 | 7.17E+04 | 7.13E+04 | 7.15E+04 | 7.18E+04 | 7.15E+04 |
| | Thawed at −3° C. | 7.05E+04 | 7.17E+04 | 7.09E+04 | 7.07E+04 | 7.18E+04 | 7.11E+04 |
| | Thawed at −4° C. | 7.11E+04 | 7.15E+04 | 7.18E+04 | 7.16E+04 | 7.03E+04 | 7.13E+04 |
| 500 g | Thawed at the temperature larger than 0° C. | 3.01E+05 | 3.16E+05 | 3.02E+05 | 3.06E+05 | 3.15E+05 | 3.08E+05 |
| | Thawed at 0° C. | 7.00E+04 | 7.10E+04 | 7.12E+04 | 7.15E+04 | 7.02E+04 | 7.08E+04 |
| | Thawed at −1.5° C. | 7.01E+04 | 7.12E+04 | 7.00E+04 | 7.17E+04 | 7.05E+04 | 7.07E+04 |
| | Thawed at −3° C. | 7.18E+04 | 7.01E+04 | 7.14E+04 | 7.05E+04 | 7.02E+04 | 7.08E+04 |
| | Thawed at −4° C. | 7.03E+04 | 7.07E+04 | 7.20E+04 | 7.19E+04 | 7.12E+04 | 7.12E+04 |

(4) Experiments on beef of 100 g, 200 g, 300 g, 400 g, and 500 g respectively, of which a process and a method are same as that of pork tenderloin of 100 g, 200 g, 300 g, 400 g, and 500 g, and can refer to descriptions of the above process and method corresponding to pork tenderloin of 100 g, 200 g, 300 g, 400 g, and 500 g, which is not described in detail herein. Experimental data of 5 parallel experiments are selected from a plurality of experiments by the inventors and shown in Table 28.

TABLE 28

| | | beef | | | | |
|---|---|---|---|---|---|---|
| | | parallel 1 | parallel 2 | parallel 3 | parallel 4 | parallel 5 | Mean value |
| 100 g | Thawed at the temperature larger than 0° C. | 1.11E+05 | 1.13E+05 | 1.09E+05 | 1.20E+05 | 1.09E+05 | 1.12E+05 |
| | Thawed at 0° C. | 4.18E+04 | 4.17E+04 | 4.15E+04 | 4.12E+04 | 4.11E+04 | 4.15E+04 |
| | Thawed at −1.5° C. | 4.18E+04 | 4.16E+04 | 4.05E+04 | 4.11E+04 | 4.17E+04 | 4.13E+04 |
| | Thawed at −3° C. | 4.09E+04 | 4.10E+04 | 4.16E+04 | 4.15E+04 | 4.17E+04 | 4.14E+04 |
| | Thawed at −4° C. | 4.07E+04 | 4.14E+04 | 4.15E+04 | 4.00E+04 | 4.18E+04 | 4.11E+04 |
| 200 g | Thawed at the temperature larger than 0° C. | 1.19E+05 | 1.01E+05 | 1.02E+05 | 1.12E+05 | 1.11E+05 | 1.09E+05 |
| | Thawed at 0° C. | 4.11E+04 | 4.05E+04 | 4.10E+04 | 4.10E+04 | 4.19E+04 | 4.11E+04 |
| | Thawed at −1.5° C. | 4.11E+04 | 4.13E+04 | 4.03E+04 | 4.19E+04 | 4.18E+04 | 4.13E+04 |
| | Thawed at −3° C. | 4.01E+04 | 4.09E+04 | 4.20E+04 | 4.02E+04 | 4.04E+04 | 4.07E+04 |
| | Thawed at −4° C. | 4.00E+04 | 4.00E+04 | 4.15E+04 | 4.14E+04 | 4.04E+04 | 4.07E+04 |
| 300 g | Thawed at the temperature larger than 0° C. | 1.19E+05 | 1.09E+05 | 1.16E+05 | 1.17E+05 | 1.06E+05 | 1.13E+05 |
| | Thawed at 0° C. | 4.11E+04 | 4.20E+04 | 4.05E+04 | 4.08E+04 | 4.15E+04 | 4.12E+04 |
| | Thawed at −1.5° C. | 4.11E+04 | 4.01E+04 | 4.10E+04 | 4.09E+04 | 4.06E+04 | 4.08E+04 |
| | Thawed at −3° C. | 4.00E+04 | 4.06E+04 | 4.01E+04 | 4.02E+04 | 4.13E+04 | 4.04E+04 |
| | Thawed at −4° C. | 4.19E+04 | 4.12E+04 | 4.05E+04 | 4.00E+04 | 4.08E+04 | 4.09E+04 |
| 400 g | Thawed at the temperature larger than 0° C. | 1.15E+05 | 1.09E+05 | 1.14E+05 | 1.00E+05 | 1.18E+05 | 1.11E+05 |
| | Thawed at 0° C. | 4.11E+04 | 4.14E+04 | 4.03E+04 | 4.10E+04 | 4.05E+04 | 4.08E+04 |
| | Thawed at −1.5° C. | 4.03E+04 | 4.20E+04 | 4.05E+04 | 4.01E+04 | 4.11E+04 | 4.08E+04 |
| | Thawed at −3° C. | 4.10E+04 | 4.01E+04 | 4.12E+04 | 4.02E+04 | 4.01E+04 | 4.05E+04 |
| | Thawed at −4° C. | 4.08E+04 | 4.16E+04 | 4.12E+04 | 4.01E+04 | 4.06E+04 | 4.09E+04 |
| 500 g | Thawed at the temperature larger than 0° C. | 1.13E+05 | 1.13E+05 | 1.13E+05 | 1.19E+05 | 1.11E+05 | 1.14E+05 |
| | Thawed at 0° C. | 4.10E+04 | 4.12E+04 | 4.08E+04 | 4.00E+04 | 4.06E+04 | 4.07E+04 |
| | Thawed at −1.5° C. | 4.09E+04 | 4.02E+04 | 4.15E+04 | 4.06E+04 | 4.02E+04 | 4.07E+04 |
| | Thawed at −3° C. | 4.02E+04 | 4.00E+04 | 4.04E+04 | 4.12E+04 | 4.08E+04 | 4.05E+04 |
| | Thawed at −4° C. | 4.15E+04 | 4.14E+04 | 4.18E+04 | 4.14E+04 | 4.06E+04 | 4.13E+04 |

1. Pork tenderloin, fish, chicken, and beef are selected as the food respectively, and 100 g (gram), 200 g, 300 g, 400 g, and 500 g are selected as weights of each kind of the food.

(1) Experiments on pork tenderloin of 100 g, 200 g, 300 g, 400 g, and 500 g respectively. Firstly, pork tenderloin of 100 g, 200 g, 300 g, 400 g, and 500 g are put in the microwave oven to thaw respectively. The temperatures of the food in the microwave oven are maintained at different thawing endpoints (i.e. thawed at a temperature larger than 0° C., thawed at 0° C., thawed at −1.5° C., thawed at −3° C., and thawed at −4° C.). And then, the thawing speeds of pork tenderloin of 100 g, 200 g, 300 g, 400 g, and 500 g respectively thawed at different thawing endpoints (i.e. thawed at the temperature larger than 0° C., thawed at 0° C., thawed at −1.5° C., thawed at −3° C., and thawed at −4° C.) are measured according to the period of time used during the thawing. Experimental data of 5 parallel experiments are selected from a plurality of experiments by the inventors and shown in Table 29.

Figure 10:
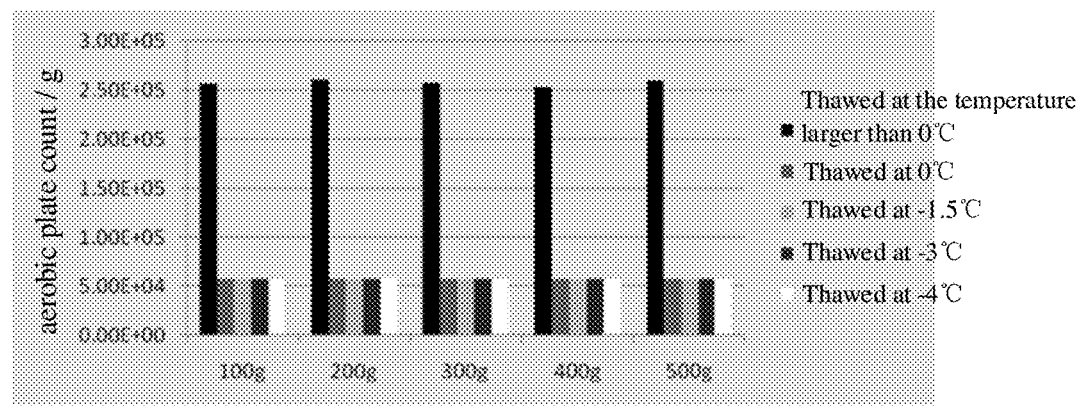
FIG. 10 (a) is a schematic diagram of aerobic plate counts of pork tenderloin with different weights thawed at different temperatures at thawing endpoint according to an embodiment of the present disclosure.
Figure 10:
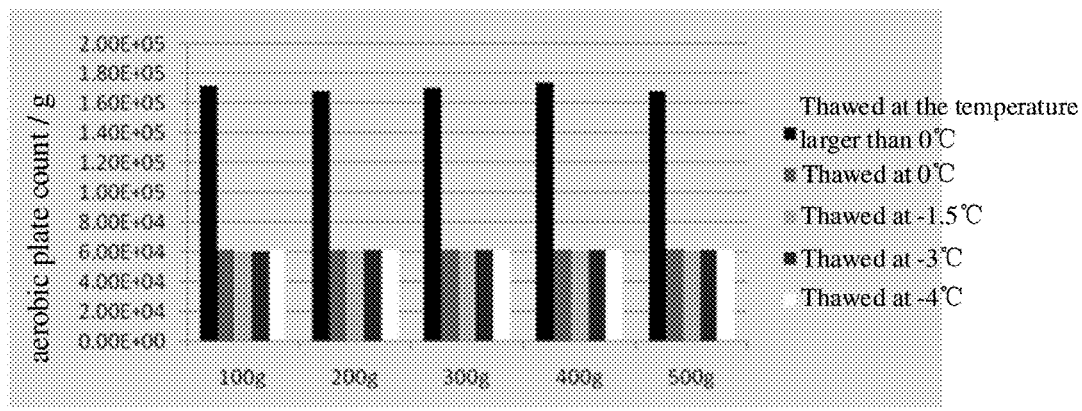
Figure 10:
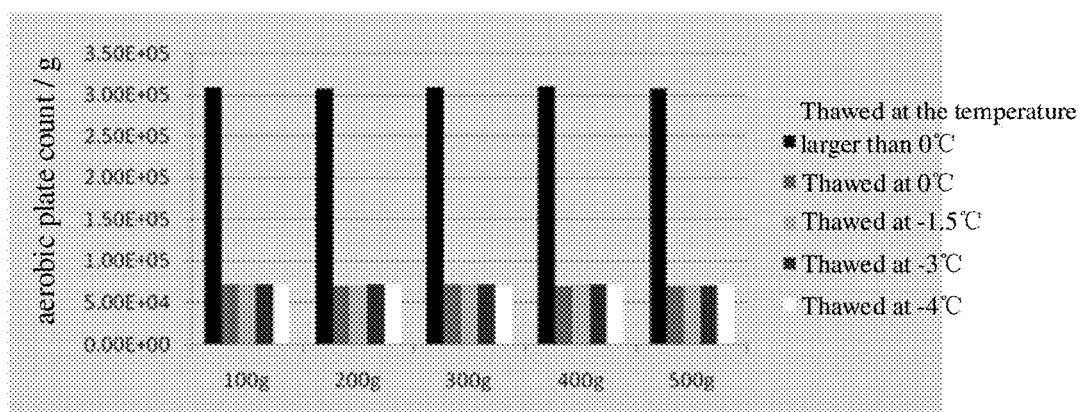
Figure 10:
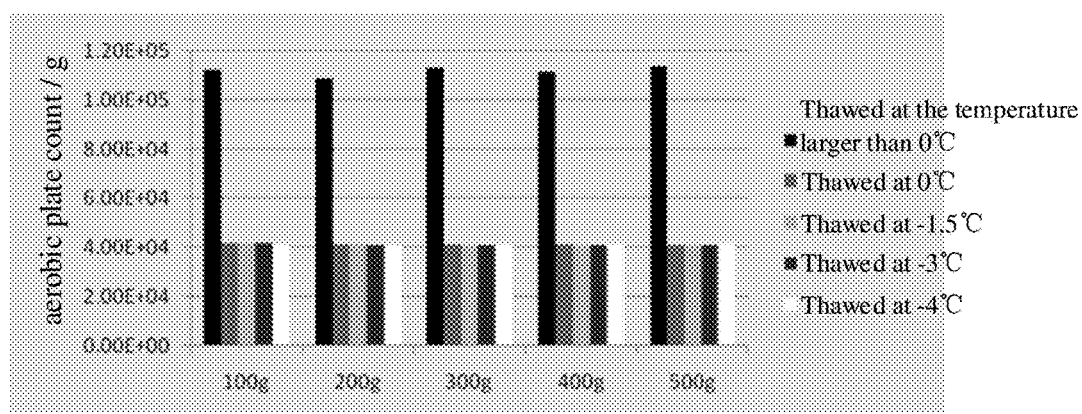

2. Experiment results. FIG. 10(a) is a diagram drawn according to each group of mean values in Table 25. FIG. 10(b) is a diagram drawn according to each group of mean values in Table 26. FIG. 10(c) is a diagram drawn according to each group of mean values in Table 27. FIG. 10(d) is a diagram drawn according to each group of mean values in Table 28. It can be known from FIG. 10(a), FIG. 10(b), FIG. 10(c) and FIG. 10(d) that, after thawing, the aerobic plate count varies with the kind of the food, the weight of the food, and the temperature at thawing endpoint. When the temperature of the food after thawing is maintained in −3° C.~0° C., the aerobic plate counts are significantly less than that when the temperature of the food after thawing is larger than 0° C. This is because that the microbial propagation is slow when the temperature after thawing is lower. As a result, the thawed food is healthier.

In embodiment 8, thawing speeds of food thawed at −3° C.~0° C. are analyzed.

TABLE 29 pork tenderloin

|  |  | parallel 1 | parallel 2 | parallel 3 | parallel 4 | parallel 5 | Mean value |
|---|---|---|---|---|---|---|---|
| 100 g | Thawed at the temperature larger than 0° C. | 96 | 96 | 96 | 96 | 96 | 96 |
|  | Thawed at 0° C. | 60 | 60 | 60 | 60 | 60 | 60 |
|  | Thawed at −1.5° C. | 60 | 60 | 60 | 60 | 60 | 60 |
|  | Thawed at −3° C. | 60 | 60 | 60 | 60 | 60 | 60 |
|  | Thawed at −4° C. | 60 | 60 | 60 | 60 | 60 | 60 |
| 200 g | Thawed at the temperature larger than 0° C. | 192 | 192 | 192 | 192 | 192 | 192 |
|  | Thawed at 0° C. | 120 | 120 | 120 | 120 | 120 | 120 |
|  | Thawed at −1.5° C. | 120 | 120 | 120 | 120 | 120 | 120 |
|  | Thawed at −3° C. | 120 | 120 | 120 | 120 | 120 | 120 |
|  | Thawed at −4° C. | 120 | 120 | 120 | 120 | 120 | 120 |
| 300 g | Thawed at the temperature larger than 0° C. | 288 | 288 | 288 | 288 | 288 | 288 |
|  | Thawed at 0° C. | 180 | 180 | 180 | 180 | 180 | 180 |
|  | Thawed at −1.5° C. | 180 | 180 | 180 | 180 | 180 | 180 |
|  | Thawed at −3° C. | 180 | 180 | 180 | 180 | 180 | 180 |
|  | Thawed at −4° C. | 180 | 180 | 180 | 180 | 180 | 180 |
| 400 g | Thawed at the temperature larger than 0° C. | 384 | 384 | 384 | 384 | 384 | 384 |
|  | Thawed at 0° C. | 240 | 240 | 240 | 240 | 240 | 240 |
|  | Thawed at −1.5° C. | 240 | 240 | 240 | 240 | 240 | 240 |
|  | Thawed at −3° C. | 240 | 240 | 240 | 240 | 240 | 240 |
|  | Thawed at −4° C. | 240 | 240 | 240 | 240 | 240 | 240 |
| 500 g | Thawed at the temperature larger than 0° C. | 480 | 480 | 480 | 480 | 480 | 480 |
|  | Thawed at 0° C. | 300 | 300 | 300 | 300 | 300 | 300 |
|  | Thawed at −1.5° C. | 300 | 300 | 300 | 300 | 300 | 300 |
|  | Thawed at −3° C. | 300 | 300 | 300 | 300 | 300 | 300 |
|  | Thawed at −4° C. | 300 | 300 | 300 | 300 | 300 | 300 |

(2) Experiments on fish of 100 g, 200 g, 300 g, 400 g, and 500 g respectively, of which a process and a method are same as that of pork tenderloin of 100 g, 200 g, 300 g, 400 g, and 500 g, and can refer to descriptions of the above process and method corresponding to pork tenderloin of 100 g, 200 g, 300 g, 400 g, and 500 g, which is not described in detail herein. Experimental data of 5 parallel experiments are selected from a plurality of experiments by the inventors and shown in Table 30.

TABLE 30 fish

|  |  | parallel 1 | parallel 2 | parallel 3 | parallel 4 | parallel 5 | Mean value |
|---|---|---|---|---|---|---|---|
| 100 g | Thawed at the temperature larger than 0° C. | 96 | 96 | 96 | 96 | 96 | 96 |
|  | Thawed at 0° C. | 60 | 60 | 60 | 60 | 60 | 60 |
|  | Thawed at −1.5° C. | 60 | 60 | 60 | 60 | 60 | 60 |
|  | Thawed at −3° C. | 60 | 60 | 60 | 60 | 60 | 60 |
|  | Thawed at −4° C. | 60 | 60 | 60 | 60 | 60 | 60 |
| 200 g | Thawed at the temperature larger than 0° C. | 192 | 192 | 192 | 192 | 192 | 192 |
|  | Thawed at 0° C. | 120 | 120 | 120 | 120 | 120 | 120 |
|  | Thawed at −1.5° C. | 120 | 120 | 120 | 120 | 120 | 120 |
|  | Thawed at −3° C. | 120 | 120 | 120 | 120 | 120 | 120 |
|  | Thawed at −4° C. | 120 | 120 | 120 | 120 | 120 | 120 |
| 300 g | Thawed at the temperature larger than 0° C. | 288 | 288 | 288 | 288 | 288 | 288 |
|  | Thawed at 0° C. | 180 | 180 | 180 | 180 | 180 | 180 |
|  | Thawed at −1.5° C. | 180 | 180 | 180 | 180 | 180 | 180 |
|  | Thawed at −3° C. | 180 | 180 | 180 | 180 | 180 | 180 |
|  | Thawed at −4° C. | 180 | 180 | 180 | 180 | 180 | 180 |
| 400 g | Thawed at the temperature larger than 0° C. | 384 | 384 | 384 | 384 | 384 | 384 |
|  | Thawed at 0° C. | 240 | 240 | 240 | 240 | 240 | 240 |
|  | Thawed at −1.5° C. | 240 | 240 | 240 | 240 | 240 | 240 |
|  | Thawed at −3° C. | 240 | 240 | 240 | 240 | 240 | 240 |
|  | Thawed at −4° C. | 240 | 240 | 240 | 240 | 240 | 240 |
| 500 g | Thawed at the temperature larger than 0° C. | 480 | 480 | 480 | 480 | 480 | 480 |
|  | Thawed at 0° C. | 300 | 300 | 300 | 300 | 300 | 300 |
|  | Thawed at −1.5° C. | 300 | 300 | 300 | 300 | 300 | 300 |

TABLE 30-continued

| | fish | | | | | |
|---|---|---|---|---|---|---|
| | parallel 1 | parallel 2 | parallel 3 | parallel 4 | parallel 5 | Mean value |
| Thawed at −3° C. | 300 | 300 | 300 | 300 | 300 | 300 |
| Thawed at −4° C. | 300 | 300 | 300 | 300 | 300 | 300 |

(3) Experiments on chicken of 100 g, 200 g, 300 g, 400 g, and 500 g respectively, of which a process and a method are same as that of pork tenderloin of 100 g, 200 g, 300 g, 400 g, and 500 g, and can refer to descriptions of the above process and method corresponding to pork tenderloin of 100 g, 200 g, 300 g, 400 g, and 500 g, which is not described in detail herein. Experimental data of 5 parallel experiments are selected from a plurality of experiments by the inventors and shown in Table 31.

TABLE 31

| | chicken | | | | | |
|---|---|---|---|---|---|---|
| | parallel 1 | parallel 2 | parallel 3 | parallel 4 | parallel 5 | Mean value |
| 100 g Thawed at the temperature larger than 0° C. | 96 | 96 | 96 | 96 | 96 | 96 |
| Thawed at 0° C. | 60 | 60 | 60 | 60 | 60 | 60 |
| Thawed at −1.5° C. | 60 | 60 | 60 | 60 | 60 | 60 |
| Thawed at −3° C. | 60 | 60 | 60 | 60 | 60 | 60 |
| Thawed at −4° C. | 60 | 60 | 60 | 60 | 60 | 60 |
| 200 g Thawed at the temperature larger than 0° C. | 192 | 192 | 192 | 192 | 192 | 192 |
| Thawed at 0° C. | 120 | 120 | 120 | 120 | 120 | 120 |
| Thawed at −1.5° C. | 120 | 120 | 120 | 120 | 120 | 120 |
| Thawed at −3° C. | 120 | 120 | 120 | 120 | 120 | 120 |
| Thawed at −4° C. | 120 | 120 | 120 | 120 | 120 | 120 |
| 300 g Thawed at the temperature larger than 0° C. | 288 | 288 | 288 | 288 | 288 | 288 |
| Thawed at 0° C. | 180 | 180 | 180 | 180 | 180 | 180 |
| Thawed at −1.5° C. | 180 | 180 | 180 | 180 | 180 | 180 |
| Thawed at −3° C. | 180 | 180 | 180 | 180 | 180 | 180 |
| Thawed at −4° C. | 180 | 180 | 180 | 180 | 180 | 180 |
| 400 g Thawed at the temperature larger than 0° C. | 384 | 384 | 384 | 384 | 384 | 384 |
| Thawed at 0° C. | 240 | 240 | 240 | 240 | 240 | 240 |
| Thawed at −1.5° C. | 240 | 240 | 240 | 240 | 240 | 240 |
| Thawed at −3° C. | 240 | 240 | 240 | 240 | 240 | 240 |
| Thawed at −4° C. | 240 | 240 | 240 | 240 | 240 | 240 |
| 500 g Thawed at the temperature larger than 0° C. | 480 | 480 | 480 | 480 | 480 | 480 |
| Thawed at 0° C. | 300 | 300 | 300 | 300 | 300 | 300 |
| Thawed at −1.5° C. | 300 | 300 | 300 | 300 | 300 | 300 |
| Thawed at −3° C. | 300 | 300 | 300 | 300 | 300 | 300 |
| Thawed at −4° C. | 300 | 300 | 300 | 300 | 300 | 300 |

(4) Experiments on beef of 100 g, 200 g, 300 g, 400 g, and 500 g respectively, of which a process and a method are same as that of pork tenderloin of 100 g, 200 g, 300 g, 400 g, and 500 g, and can refer to descriptions of the above process and method corresponding to pork tenderloin of 100 g, 200 g, 300 g, 400 g, and 500 g, which is not described in detail herein. Experimental data of 5 parallel experiments are selected from a plurality of experiments by the inventors and shown in Table 32.

TABLE 32

| | | | beef | | | |
|---|---|---|---|---|---|---|
| | parallel 1 | parallel 2 | parallel 3 | parallel 4 | parallel 5 | Mean value |
| 100 g Thawed at the temperature larger than 0° C. | 96 | 96 | 96 | 96 | 96 | 96 |
| Thawed at 0° C. | 60 | 60 | 60 | 60 | 60 | 60 |
| Thawed at −1.5° C. | 60 | 60 | 60 | 60 | 60 | 60 |
| Thawed at −3° C. | 60 | 60 | 60 | 60 | 60 | 60 |
| Thawed at −4° C. | 60 | 60 | 60 | 60 | 60 | 60 |
| 200 g Thawed at the temperature larger than 0° C. | 192 | 192 | 192 | 192 | 192 | 192 |
| Thawed at 0° C. | 120 | 120 | 120 | 120 | 120 | 120 |
| Thawed at −1.5° C. | 120 | 120 | 120 | 120 | 120 | 120 |
| Thawed at −3° C. | 120 | 120 | 120 | 120 | 120 | 120 |
| Thawed at −4° C. | 120 | 120 | 120 | 120 | 120 | 120 |
| 300 g Thawed at the temperature larger than 0° C. | 288 | 288 | 288 | 288 | 288 | 288 |
| Thawed at 0° C. | 180 | 180 | 180 | 180 | 180 | 180 |
| Thawed at −1.5° C. | 180 | 180 | 180 | 180 | 180 | 180 |
| Thawed at −3° C. | 180 | 180 | 180 | 180 | 180 | 180 |
| Thawed at −4° C. | 180 | 180 | 180 | 180 | 180 | 180 |
| 400 g Thawed at the temperature larger than 0° C. | 384 | 384 | 384 | 384 | 384 | 384 |
| Thawed at 0° C. | 240 | 240 | 240 | 240 | 240 | 240 |
| Thawed at −1.5° C. | 240 | 240 | 240 | 240 | 240 | 240 |
| Thawed at −3° C. | 240 | 240 | 240 | 240 | 240 | 240 |
| Thawed at −4° C. | 240 | 240 | 240 | 240 | 240 | 240 |
| 500 g Thawed at the temperature larger than 0° C. | 480 | 480 | 480 | 480 | 480 | 480 |
| Thawed at 0° C. | 300 | 300 | 300 | 300 | 300 | 300 |
| Thawed at −1.5° C. | 300 | 300 | 300 | 300 | 300 | 300 |
| Thawed at −3° C. | 300 | 300 | 300 | 300 | 300 | 300 |
| Thawed at −4° C. | 300 | 300 | 300 | 300 | 300 | 300 |

Figure 11:
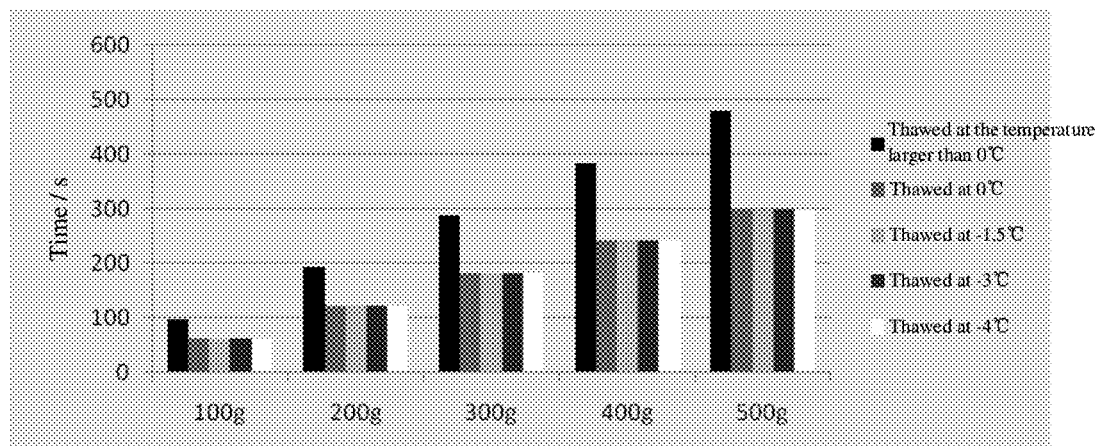
FIG. 11 is a schematic diagram of thawing speeds of different food with different weights thawed at different temperatures at thawing endpoint according to an embodiment of the present disclosure.

2. Experiment results. By analyzing the experimental data shown in Tables 29, 30, 31 and 32, the inventors find that the thawing speed varies with the kind of the food, the weight of the food, and the temperature at thawing endpoint. Therefore, a diagram can be used to illustrate the thawing speed in this embodiment. FIG. 11 is a diagram drawn according to each group of mean values in Table 29 (or Table 30, or Table 31, or Table 32). It can be known from FIG. 11 that, when the temperature of the food after thawing is maintained in −3° C.~0° C., the thawing speeds are significantly smaller than that when the temperature of the food after thawing is larger than 0° C. This is because that it needs less energy when the temperature at thawing endpoint is low, thus shorting the thawing time.

In conclusion, through lots of experiments and theoretical analysis, the inventors innovatively find that, by controlling the temperature of the food in −3° C.~0° C., the thawed food is more nutritious, healthier and easier to cut, and the temperature difference of the food is low, without a cooked discoloration phenomenon. Therefore it is better to determine a temperature in −3° C.~0° C. as the optimal temperature at thawing endpoint.

With the thawing control method for a microwave oven according to embodiments of the present disclosure, the thawing instruction can be received first, then the thawing can be started, and the thawing condition can be controlled to maintain the temperature of the food in the microwave oven in −3° C.~0° C. Through lots of experiments and theoretical analysis, it is innovatively found that, there are at least following advantages by taking temperatures in the range of −3° C.~0° C. as an optimal temperature at thawing endpoint for thawing the food. (1) The thawed food is more nutritious; (2) the thawed food is healthier; (3) the temperature difference of the thawed food is low, without a cooked discoloration phenomenon; (4) shear force of the thawed food is modest, and the thawed food is easier to cut and operate.

Corresponding to the thawing control method for a microwave oven provided in the above embodiments, another embodiment of the present disclosure further provides a thawing control device for a microwave oven. Since the thawing control device for a microwave oven in the embodiment of the present disclosure corresponds to the thawing control method for a microwave oven in the above embodiments of the present disclosure, implementations suitable for the thawing control method for a microwave oven are also applicable to the thawing control device for a microwave oven provided in the present embodiment, which will not be described in detail in the present embodiment.

Figure 12:
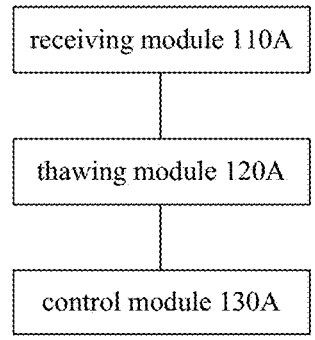
FIG. 12 is a block diagram of a thawing control device for a microwave oven according to an embodiment of the present disclosure.

FIG. 12 is a block diagram of a thawing control device for a microwave oven according to an embodiment of the present disclosure. As shown in FIG. 12, the thawing control device for a microwave oven may include a receiving module 110A, a thawing module 120A, and a control module 130A.

In detail, the receiving module 110A can be configured to receive a thawing instruction. The thawing module 120A can be configured to start a thawing. The control module 130A can be configured to control a thawing condition, to maintain a temperature of food in the microwave oven in −3° C.~0° C. According to an embodiment of the present disclosure, the food may be meat or fish. In addition, the thawing condition may specifically include at least one of a period of thawing, heating power, and a heating direction.

With the thawing control device for a microwave oven according to embodiments of the present disclosure, the thawing instruction is received by the receiving module, the thawing is started by the thawing module, and the thawing condition is controlled by the control module to maintain the temperature of the food in the microwave oven in −3° C.~0° C. Through lots of experiments and theoretical analysis, it is innovatively found that, there are at least following advantages by taking temperatures in the range of −3° C.~0° C. as an optimal temperature at thawing endpoint for thawing the food. (1) The thawed food is more nutritious. (2) The thawed food is healthier. (3) The temperature difference of the thawed food is low, without a cooked discoloration phenomenon. (4) The shear force of the thawed food is modest, and the thawed food is easier to cut and operate.

Embodiments of the present disclosure further provide a microwave oven in order to achieve the above embodiments. The microwave oven includes the thawing control device according to embodiments shown in FIG. 12.

With the microwave oven according to embodiments of the present disclosure, the thawing instruction is received by the receiving module of the thawing control device, the thawing is started by the thawing module of the thawing control device, and the thawing condition is controlled by the control module of the thawing control device to maintain the temperature of the food in the microwave oven in −3° C.~0° C. Through lots of experiments and theoretical analysis, it is innovatively found that, there are at least following advantages by taking temperatures in the range of −3° C.~0° C. as an optimal temperature at thawing endpoint for thawing the food. (1) The thawed food is more nutritious. (2) The thawed food is healthier. (3) The temperature difference of the thawed food is low, without a cooked discoloration phenomenon. (4) The shear force of the thawed food is modest, and the thawed food is easier to cut and operate.

It is to be illustrated that, the thawing condition may be controlled to maintain the temperature of the food in the microwave oven in −3° C.~0° C. after thawing, at which moment the food may also be referred to food thawed at −3° C.~0° C. (or the thawed food of −3° C.~0° C.). Specifically, embodiments of the present disclosure further provide another thawing control method for a microwave oven.

Figure 13:
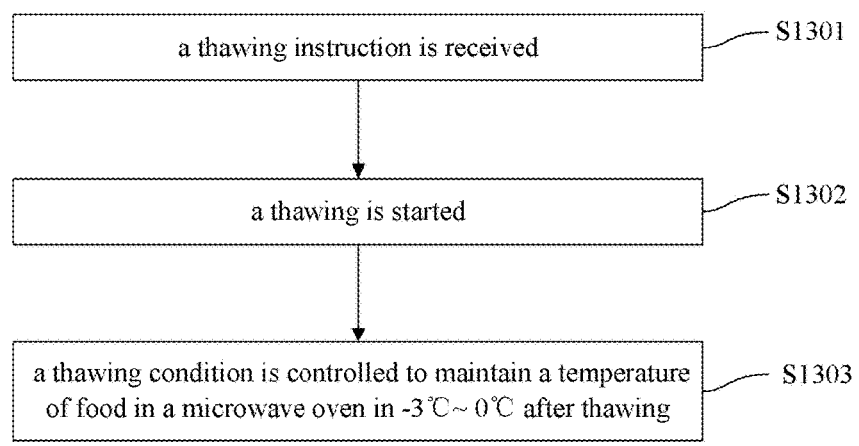
FIG. 13 is a flow chart of a thawing control method for a microwave oven according to another embodiment of the present disclosure.

FIG. 13 is a flow chart of a thawing control method for a microwave oven according to another embodiment of the present disclosure. As shown in FIG. 13, the thawing control method for a microwave oven may include followings.

S1301, a thawing instruction is received.

S1302, a thawing is started.

S1303, a thawing condition is controlled to maintain a temperature of food in the microwave oven in −3° C.~0° C. after thawing.

According to an embodiment of the present disclosure, the thawing condition may specifically include at least one of a period of thawing, heating power, and a heating direction. In addition, the food may be meat or fish.

It is to be illustrated that, benefits brought by making the food to be food thawed at −3° C.~0° C. (or the thawed food of −3° C.~0° C.) with the thawing control method for a microwave oven provided in the present embodiment, can be described in detail with reference to the above-described embodiments 1 to 8, not discussed here.

With the thawing control method for a microwave oven in embodiments of the present disclosure, the thawing instruction can be received first, then the thawing can be started, and the thawing condition can be controlled to maintain the temperature of the food in the microwave oven in −3° C.~0° C. after thawing. Through lots of experiments and theoretical analysis, it is innovatively found that, there are at least following advantages by taking temperatures in the range of −3° C.~0° C. as an optimal temperature at thawing endpoint for thawing the food. (1) The thawed food is more nutritious. (2) The thawed food is healthier. (3) The temperature difference of the thawed food is low, without a cooked discoloration phenomenon. (4) The shear force of the thawed food is modest, and the thawed food is easier to cut and operate.

Corresponding to the thawing control method for a microwave oven provided in the above embodiments, another embodiment of the present disclosure further provides a thawing control device for a microwave oven. Since the thawing control device for a microwave oven in the embodiment of the present disclosure corresponds to the thawing control method for a microwave oven in the above embodiments of the present disclosure, implementations suitable for the thawing control method for a microwave oven are also applicable to the thawing control device for a microwave oven provided in the present embodiment, which will not be described in detail in the present embodiment.

Figure 14:
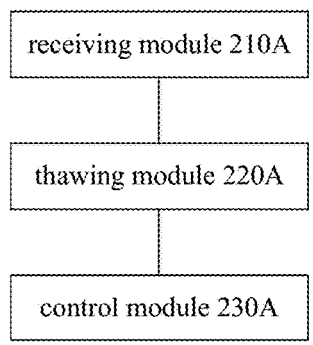
FIG. 14 is a block diagram of a thawing control device for a microwave oven according to another embodiment of the present disclosure.

FIG. 14 is a block diagram of a thawing control device for a microwave oven according to another embodiment of the present disclosure. As shown in FIG. 14, the thawing control device for a microwave oven may include a receiving module 210A, a thawing module 220A, and a control module 230A.

In detail, the receiving module 210A can be configured to receive a thawing instruction. The detecting module 220A can be configured to start a thawing. The control module 230A can be configured to control a thawing condition to maintain the temperature of the food in the microwave oven in −3° C.~0° C. after thawing. In addition, in an embodiment of the present disclosure, the thawing condition may specifically include at least one of a period of thawing, heating power, and a heating direction. In addition, the food may be meat or fish.

With the thawing control device for a microwave oven in embodiments of the present disclosure, the thawing instruction is received by the receiving module, the thawing is started by the thawing module, and the thawing condition is controlled by the control module to maintain the temperature of food in the microwave oven in −3° C.~0° C. after thawing. Through lots of experiments and theoretical analysis, it is innovatively found that, there are at least following advantages by taking temperatures in the range of −3° C.~0° C. as an optimal temperature at thawing endpoint for thawing the food. (1) The thawed food is more nutritious. (2) The thawed food is healthier. (3) The temperature difference of the thawed food is low, without a cooked discoloration phenomenon. (4) The shear force of the thawed food is modest, and the thawed food is easier to cut and operate.

Embodiments of the present disclosure further provide a microwave oven in order to achieve the above embodiments. The microwave oven includes the thawing control device according to embodiments shown in FIG. 14.

With the microwave oven in embodiments of the present disclosure, the thawing instruction is received by the receiving module of the thawing control device, the thawing is started by the thawing module of the thawing control device, and the thawing condition is controlled by the control module of the thawing control device to maintain the temperature of the food in the microwave oven in −3° C.~0° C. after thawing. Through lots of experiments and theoretical analysis, it is innovatively found that, there are at least following advantages by taking temperatures in the range of −3° C.~0° C. as an optimal temperature at thawing endpoint for thawing the food. (1) The thawed food is more nutritious. (2) The thawed food is healthier. (3) The temperature difference of the thawed food is low, without a cooked discoloration phenomenon. (4) The shear force of the thawed food is modest, and the thawed food is easier to cut and operate.

Embodiments of the present disclosure further provide another thawing control method for a microwave oven. With the method, a temperature of the food in the microwave oven is detected in a thawing process, and the temperature of the food is controlled lower than −3° C.~0° C. in the thawing process. The temperature of the food is controlled in −3° C.~0° C. after the thawing process.

It should be noted that, benefits brought by making the food to be food thawed at −3° C.~0° C. with the thawing control method for a microwave oven provided in the present embodiment, can be described in detail with reference to the above-described embodiments 1 to 8, not discussed here.

With the thawing control method for a microwave oven according to embodiments of the present disclosure, the temperature of the food in the microwave oven can be detected in real time in the thawing process, and can be controlled lower than −3° C.~0° C. in the thawing process, and can be controlled in −3° C.~0° C. after the thawing process. Through lots of experiments and theoretical analysis, it is innovatively found that, there are at least following advantages by taking temperatures in the range of −3° C.~0° C. as an optimal temperature at thawing endpoint for thawing the food. (1) The thawed food is more nutritious. (2) The thawed food is healthier. (3) The temperature difference of the thawed food is low, without a cooked discoloration phenomenon. (4) The shear force of the thawed food is modest, and the thawed food is easier to cut and operate.

Embodiments of the present disclosure further provide another thawing control device for a microwave oven in order to achieve the above embodiments. With the device, a temperature of the food in the microwave oven is detected in a thawing process, and the temperature of food is controlled lower than −3° C.~0° C. in the thawing process. The temperature of the food is controlled in −3° C.~0° C. after the thawing process.

With the thawing control device for a microwave oven in embodiments of the present disclosure, the temperature of the food in the microwave oven can be detected in real time in the thawing process, and can be controlled lower than −3° C.~0° C. in the thawing process, and can be controlled in −3° C.~0° C. after the thawing process. Through lots of experiments and theoretical analysis, it is innovatively found that, there are at least following advantages by taking temperatures in the range of −3° C.~0° C. as an optimal temperature at thawing endpoint for thawing the food. (1) The thawed food is more nutritious. (2) The thawed food is healthier. (3) The temperature difference of the thawed food is low, without a cooked discoloration phenomenon. (4) The shear force of the thawed food is modest, and the thawed food is easier to cut and operate.

Embodiments of the present disclosure further provide a microwave oven in order to achieve the above embodiments. The microwave oven includes the thawing control device according to the above embodiments.

With the microwave oven in embodiments of the present disclosure, the temperature of the food in the microwave oven can be detected in real time in the thawing process, and can be controlled lower than −3° C.~0° C. in the thawing process, and can be controlled in −3° C.~0° C. after the thawing process. Through lots of experiments and theoretical analysis, it is innovatively found that, there are at least following advantages by taking temperatures in the range of −3° C.~0° C. as an optimal temperature at thawing endpoint for thawing the food. (1) The thawed food is more nutritious. (2) The thawed food is healthier. (3) The temperature difference of the thawed food is low, without a cooked discoloration phenomenon. (4) The shear force of the thawed food is modest, and the thawed food is easier to cut and operate.

Embodiments of the present disclosure also provide a thawing control method for a microwave oven.

Figure 15:
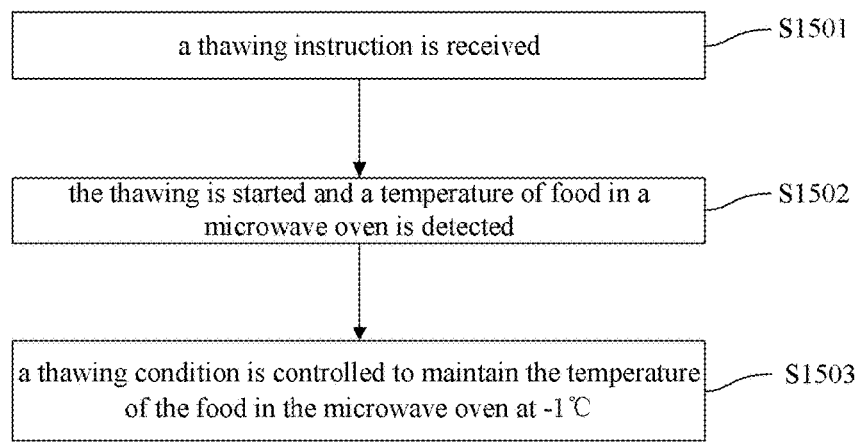
FIG. 15 is a flow chart of a thawing control method for a microwave oven according to an embodiment of the present disclosure.

FIG. 15 is a flow chart of a thawing control method for a microwave oven according to an embodiment of the present disclosure. As shown in FIG. 15, the method includes followings.

At S1501, a thawing instruction is received.

For example, assuming that the thawing control method for a microwave oven may be applied in a microwave oven, the microwave oven can provide a user with a key with a thawing function. When the user put food to be thawed into the microwave oven, the user can input the thawing instruction by pressing the key. According to an embodiment of the present disclosure, the food can be meat or fish.

S1502, the thawing is started and a temperature of food in the microwave oven is detected.

For example, the thawing function can be initiated to perform the thawing after the microwave oven receives the thawing instruction. The temperature of the food in the microwave oven may be detected in real time.

S1503, a thawing condition is controlled to maintain the temperature of the food in the microwave oven at −1° C.

According to an embodiment of the present disclosure, the thawing condition may include at least one of a period of thawing, heating power, and a heating direction.

In detail, by controlling the thawing condition (such as the period of thawing, and/or heating power of the thawing, and/or heating direction of the thawing and the like), the temperature of the food in the microwave oven can be maintained at −1° C. For example, during the thawing, when the temperature of the food in the microwave oven is detected to below −20° C. (for example, the food is placed into the microwave oven just now), the heating power of thawing may be increased to accelerate the thawing. When a current temperature of the food in the microwave oven is detected to be −5° C., the heating power of thawing may be decreased and be controlled to a corresponding heating power of the thawing. Such that the temperature of the food in the microwave oven is maintained at −1° C., and the heating direction may be controlled simultaneously to enable the food to be thawed evenly.

It is to be illustrated that, in embodiments of the present disclosure, as shown in FIG. 2, 12 points on the food in the microwave oven may be selected, and a temperature detection is performed on the 12 points respectively (for example, a temperature at a height of ½ of each point is detected). When temperatures of more than 80% of the 12 points (that is, 10 points or more) are in a range of −1±0.2° C., the food may be referred to be −1° C. thawed food. As shown in FIG. 2, a distance between a column in which point 1 lies and an edge of the food is about ⅕ of a long side of the food. A distance between a column in which point 4 lies and an edge of the food is about ⅕ of a long side of the food. A distance between a row in which point 1 lies and an edge of the food is about ¼ of a short side of the food. A distance between a row in which point 9 and an edge of the food is about ¼ of a short side of the food. A distance between each of 4 point (point 1, point 4, point 9 and point 12) and a corresponding corner is about ⅕ of a diagonal of the food.

It is further to be illustrated that, through a large amount of experimental data the inventors find that, by thawing the food to be thawed via the microwave oven to maintain the temperature of the food at −1° C., the thawed food is more nutritious, healthier and there is no influence on cutting the thawed food.

This is because that microwave is mainly used when thawing with the microwave oven. The microwave directly affects on the food to be thawed, and the food is heated inside and outside at the same time without transmitting radiation, thus the food can be thawed regardless of whether there is an interspace between the food and the heating source. Heating in microwave thawing is caused by absorbing loss of medium, so a medium with large loss can be fast heated. Water is a medium with a strong ability for absorbing microwave, so the microwave thawing is effective in heating materials with a large amount of water. Water molecules in the food to be thawed can absorb a large amount of microwave only after thawing, and water molecules trapped in crystalline ice cannot absorb the microwave. Therefore, the temperature of the food changes little when there is crystalline ice in the food, and the temperature of the food may change fast after the crystalline ice in the food melts. As shown in FIG. 3, by performing drawing analysis to data of 5 experiments selected from a plurality of experiments, the inventors find that, the temperature of the food in a thawing interval varies smoothly. The temperature of the food varies little because there is the crystalline ice in the food. When the temperature is above 0° C., as the crystalline ice gradually melts, resulting in gradual increase of water medium for absorbing microwave, thus the temperature of the food may increase continuously and rapidly. However, a case that the food may be cooked is caused. Therefore, the temperature of −1° C. is selected to be the temperature at thawing endpoint. In the following, experimental data will be combined to enable those skilled in the art to more clearly understand benefits of thawing food at −1° C.

In embodiment 9, temperature differences of food thawed at −1° C. are analyzed.

1. Pork tenderloin, fish, chicken, and beef are selected as the food respectively, and 100 g (gram), 200 g, 300 g, 400 g, and 500 g are selected as weights of each kind of the food.

(1) Experiments on pork tenderloin of 100 g, 200 g, 300 g, 400 g, and 500 g respectively. Firstly, pork tenderloin of 100 g, 200 g, 300 g, 400 g, and 500 g are put in the microwave oven to thaw respectively. The temperatures of the food in the microwave oven are maintained at different thawing endpoints (i.e. thawed at temperatures of −1° C., 0° C., and −2° C.). And then, a maximum temperature and a minimum temperature of pork tenderloin of 100 g, 200 g, 300 g, 400 g, and 500 g respectively thawed at different thawing endpoints (i.e. thawed at temperatures of −1° C., 0° C., and −2° C.) are detected respectively. Then the temperature differences of pork tenderloin of 100 g, 200 g, 300 g, 400 g, and 500 g respectively thawed at different thawing endpoints (i.e. thawed at temperatures of −1° C., 0° C., and −2° C.) may be obtained. Experimental data of 5 parallel experiments are selected from a plurality of experiments by the inventors and shown in Table 33.

TABLE 33 pork tenderloin

| | | parallel 1 | parallel 2 | parallel 3 | parallel 4 | parallel 5 | Mean value |
|---|---|---|---|---|---|---|---|
| 100 g | Thawed at −1° C. | 23.7 | 19.9 | 17.7 | 16.6 | 18.2 | 19.2 |
| | Thawed at 0° C. | 45.0 | 44.1 | 42.7 | 35.1 | 41.1 | 41.6 |
| | Thawed at −2° C. | 16.9 | 27.3 | 17.0 | 18.9 | 10.1 | 18.0 |
| 200 g | Thawed at −1° C. | 4.2 | 4.6 | 21.2 | 7.9 | 28.2 | 13.2 |
| | Thawed at 0° C. | 42.2 | 47.6 | 45.8 | 42.5 | 43.9 | 44.4 |
| | Thawed at −2° C. | 20.1 | 19.6 | 8.7 | 21.6 | 12.1 | 16.4 |
| 300 g | Thawed at −1° C. | 11.0 | 16.6 | 20.9 | 5.8 | 4.8 | 11.8 |
| | Thawed at 0° C. | 45.8 | 45.3 | 43.4 | 41.9 | 47.7 | 44.8 |
| | Thawed at −2° C. | 28.3 | 3.1 | 23.0 | 17.0 | 9.1 | 16.1 |
| 400 g | Thawed at −1° C. | 17.6 | 24.0 | 28.5 | 5.7 | 10.9 | 17.3 |
| | Thawed at 0° C. | 36.3 | 35.5 | 44.3 | 41.1 | 37.0 | 38.8 |
| | Thawed at −2° C. | 13.6 | 7.1 | 13.9 | 17.8 | 9.8 | 12.4 |
| 500 g | Thawed at −1° C. | 15.2 | 15.5 | 19.6 | 19.8 | 19.9 | 18.0 |
| | Thawed at 0° C. | 40.7 | 44.0 | 41.7 | 50.6 | 48.5 | 45.1 |
| | Thawed at −2° C. | 26.8 | 22.7 | 22.1 | 25.1 | 28.0 | 24.9 |

(2) Experiments on fish of 100 g, 200 g, 300 g, 400 g, and 500 g respectively, of which a process and a method are same as that of pork tenderloin of 100 g, 200 g, 300 g, 400 g, and 500 g, and can refer to descriptions of the above process and method corresponding to pork tenderloin of 100 g, 200 g, 300 g, 400 g, and 500 g, which is not described in detail herein. Experimental data of 5 parallel experiments are selected from a plurality of experiments by the inventors and shown in Table 34.

TABLE 34 fish

| | | parallel 1 | parallel 2 | parallel 3 | parallel 4 | parallel 5 | Mean value |
|---|---|---|---|---|---|---|---|
| 100 g | Thawed at −1° C. | 27.4 | 15.8 | 4.2 | 21.1 | 9.8 | 15.7 |
| | Thawed at 0° C. | 47.5 | 50.5 | 48.3 | 37.0 | 49.7 | 46.6 |
| | Thawed at −2° C. | 12.2 | 13.2 | 3.6 | 8.0 | 15.8 | 10.6 |

TABLE 34-continued fish

|  |  | parallel 1 | parallel 2 | parallel 3 | parallel 4 | parallel 5 | Mean value |
|---|---|---|---|---|---|---|---|
| 200 g | Thawed at −1° C. | 13.3 | 10.0 | 15.1 | 8.8 | 22.3 | 13.9 |
|  | Thawed at 0° C. | 49.6 | 39.6 | 49.7 | 46.7 | 36.4 | 44.4 |
|  | Thawed at −2° C. | 28.9 | 13.5 | 13.3 | 17.7 | 27.2 | 20.1 |
| 300 g | Thawed at −1° C. | 9.5 | 24.1 | 21.0 | 13.8 | 15.2 | 16.7 |
|  | Thawed at 0° C. | 41.6 | 35.1 | 42.3 | 39.9 | 50.2 | 41.8 |
|  | Thawed at −2° C. | 12.9 | 17.9 | 23.2 | 11.9 | 11.0 | 15.4 |
| 400 g | Thawed at −1° C. | 6.5 | 28.0 | 4.8 | 13.9 | 11.6 | 13.0 |
|  | Thawed at 0° C. | 38.2 | 47.9 | 36.8 | 38.2 | 39.7 | 40.2 |
|  | Thawed at −2° C. | 28.3 | 8.1 | 13.3 | 15.3 | 23.9 | 17.8 |
| 500 g | Thawed at −1° C. | 16.9 | 26.7 | 13.4 | 18.8 | 6.3 | 16.4 |
|  | Thawed at 0° C. | 39.8 | 35.7 | 35.3 | 42.5 | 40.5 | 38.8 |
|  | Thawed at −2° C. | 3.2 | 10.3 | 17.6 | 9.8 | 25.5 | 13.3 |

(3) Experiments on chicken of 100 g, 200 g, 300 g, 400 g, and 500 g respectively, of which a process and a method are same as that of pork tenderloin of 100 g, 200 g, 300 g, 400 g, and 500 g, and can refer to descriptions of the above process and method corresponding to pork tenderloin of 100 g, 200 g, 300 g, 400 g, and 500 g, which is not described in detail herein. Experimental data of 5 parallel experiments are selected from a plurality of experiments by the inventors and shown in Table 35.

TABLE 35 chicken

|  |  | parallel 1 | parallel 2 | parallel 3 | parallel 4 | parallel 5 | Mean value |
|---|---|---|---|---|---|---|---|
| 100 g | Thawed at −1° C. | 7.5 | 18.3 | 21.7 | 23.3 | 18.0 | 17.8 |
|  | Thawed at 0° C. | 49.2 | 46.7 | 36.5 | 37.6 | 49.9 | 44.0 |
|  | Thawed at −2° C. | 19.5 | 14.2 | 12.5 | 7.6 | 6.3 | 12.0 |
| 200 g | Thawed at −1° C. | 21.8 | 18.6 | 12.3 | 9.0 | 16.0 | 15.5 |
|  | Thawed at 0° C. | 49.9 | 48.6 | 40.7 | 40.9 | 45.3 | 45.1 |
|  | Thawed at −2° C. | 14.6 | 15.6 | 14.5 | 19.5 | 25.8 | 18.0 |
| 300 g | Thawed at −1° C. | 18.0 | 6.7 | 3.2 | 28.5 | 4.5 | 12.2 |
|  | Thawed at 0° C. | 39.0 | 37.1 | 49.6 | 42.2 | 47.5 | 43.1 |
|  | Thawed at −2° C. | 26.2 | 14.4 | 10.6 | 7.1 | 22.5 | 16.2 |
| 400 g | Thawed at −1° C. | 14.6 | 3.4 | 17.1 | 7.9 | 3.2 | 9.2 |
|  | Thawed at 0° C. | 44.9 | 39.9 | 50.1 | 43.9 | 46.1 | 45.0 |
|  | Thawed at −2° C. | 24.6 | 16.3 | 28.0 | 27.8 | 13.0 | 21.9 |
| 500 g | Thawed at −1° C. | 17.5 | 24.5 | 5.8 | 4.3 | 5.6 | 11.5 |
|  | Thawed at 0° C. | 41.9 | 50.4 | 46.5 | 39.2 | 47.2 | 45.0 |
|  | Thawed at −2° C. | 24.4 | 13.8 | 6.9 | 7.8 | 17.9 | 14.2 |

(4) Experiments on beef of 100 g, 200 g, 300 g, 400 g, and 500 g respectively, of which a process and a method are same as that of pork tenderloin of 100 g, 200 g, 300 g, 400 g, and 500 g, and can refer to descriptions of the above process and method corresponding to pork tenderloin of 100 g, 200 g, 300 g, 400 g, and 500 g, which is not described in detail herein. Experimental data of 5 parallel experiments are selected from a plurality of experiments by the inventors and shown in Table 36.

TABLE 36 beef

|  |  | parallel 1 | parallel 2 | parallel 3 | parallel 4 | parallel 5 | Mean value |
|---|---|---|---|---|---|---|---|
| 100 g | Thawed at −1° C. | 26.1 | 20.5 | 21.5 | 9.6 | 15.8 | 18.7 |
|  | Thawed at 0° C. | 40.1 | 44.0 | 50.2 | 41.4 | 36.2 | 42.4 |
|  | Thawed at −2° C. | 18.8 | 6.1 | 3.8 | 16.1 | 26.4 | 14.2 |
| 200 g | Thawed at −1° C. | 24.7 | 14.1 | 21.2 | 14.2 | 5.0 | 15.8 |
|  | Thawed at 0° C. | 43.4 | 45.8 | 37.2 | 47.9 | 50.8 | 45.0 |
|  | Thawed at −2° C. | 18.8 | 4.4 | 8.4 | 17.1 | 24.6 | 14.7 |
| 300 g | Thawed at −1° C. | 6.8 | 20.6 | 14.3 | 10.5 | 9.0 | 12.2 |
|  | Thawed at 0° C. | 45.2 | 45.2 | 39.4 | 50.5 | 49.9 | 46.0 |
|  | Thawed at −2° C. | 18.0 | 9.5 | 9.8 | 22.9 | 6.5 | 13.3 |
| 400 g | Thawed at −1° C. | 22.2 | 4.7 | 19.3 | 13.1 | 25.6 | 17.0 |
|  | Thawed at 0° C. | 36.2 | 41.2 | 35.4 | 38.3 | 37.2 | 37.7 |
|  | Thawed at −2° C. | 8.9 | 28.0 | 6.4 | 28.9 | 27.5 | 19.9 |

TABLE 36-continued

| | | parallel 1 | parallel 2 | parallel 3 | parallel 4 | parallel 5 | Mean value |
|---|---|---|---|---|---|---|---|
| | beef | | | | | | |
| 500 g | Thawed at −1° C. | 17.8 | 23.5 | 6.9 | 8.3 | 7.2 | 12.7 |
| | Thawed at 0° C. | 49.6 | 45.2 | 37.4 | 41.3 | 47.2 | 44.1 |
| | Thawed at −2° C. | 14.0 | 17.1 | 17.7 | 18.5 | 23.6 | 18.2 |

Figure 16:
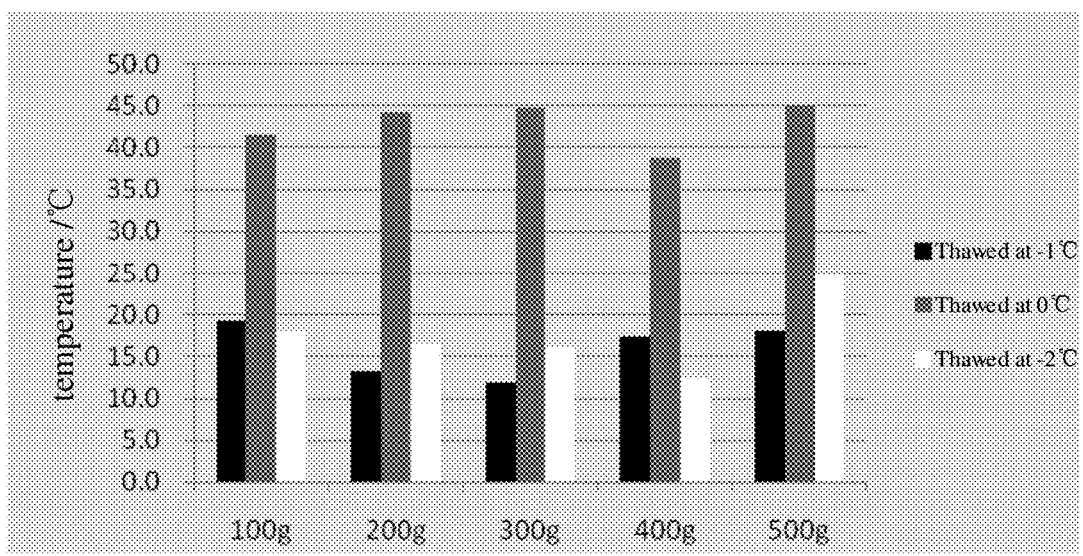
FIG. 16 (a) is a schematic diagram of temperature differences of pork tenderloin with different weights thawed at different temperatures at thawing endpoint according to an embodiment of the present disclosure.
Figure 16:
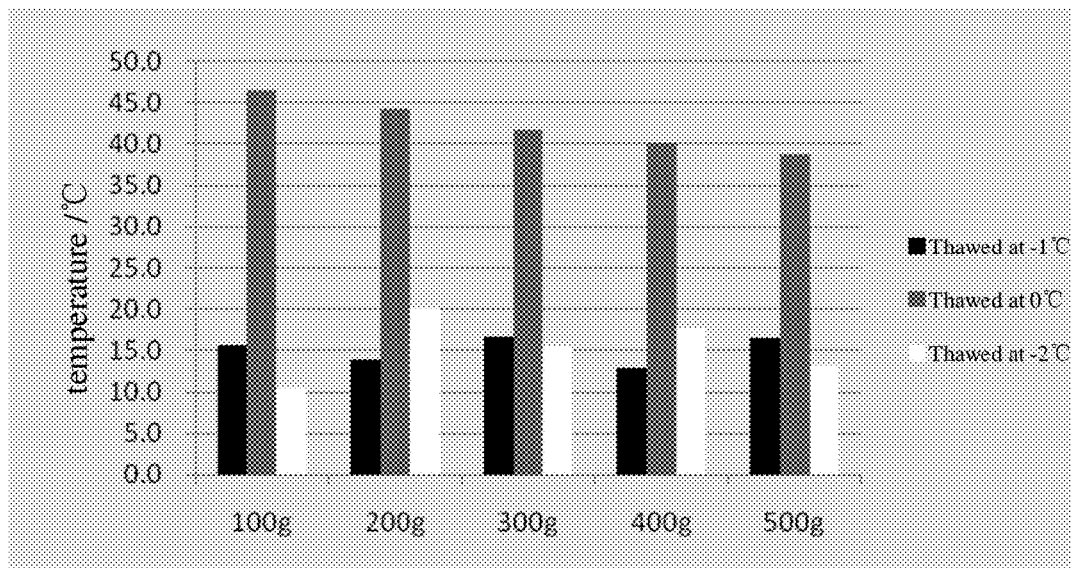
Figure 16:
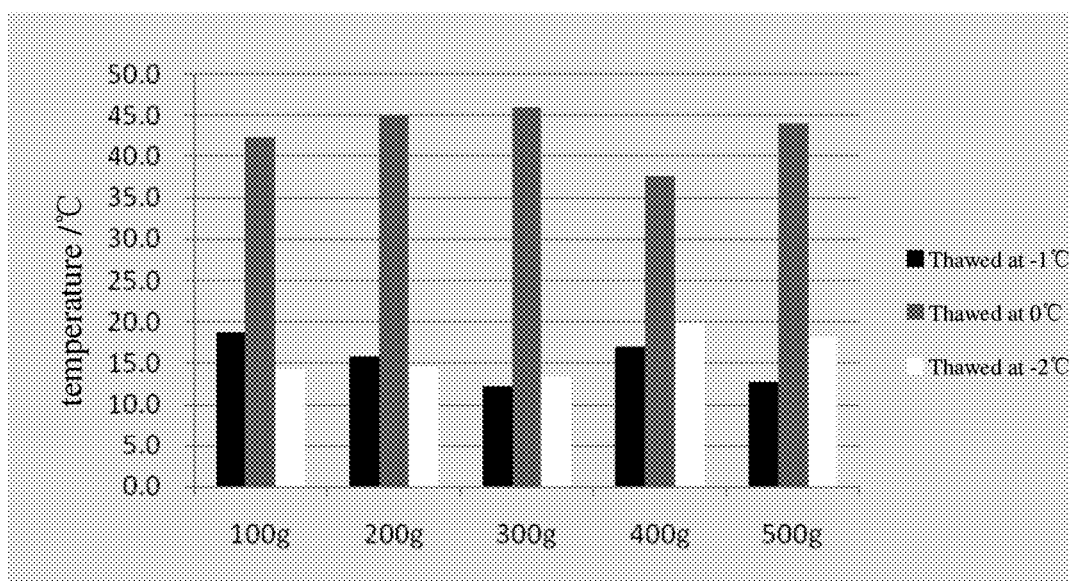
Figure 16:
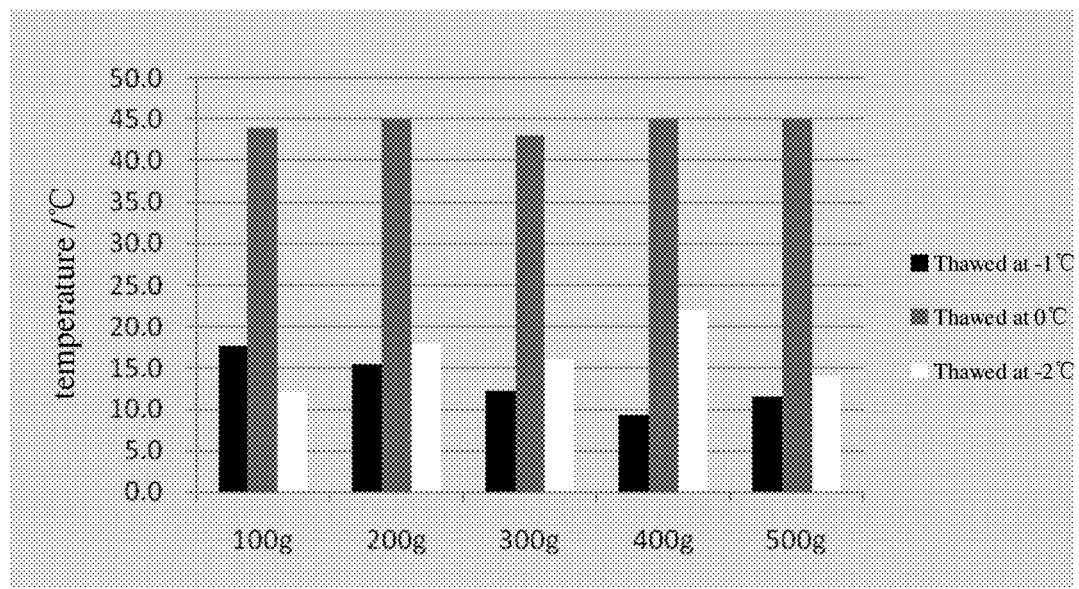

2. Experiment results. FIG. 16(a) is a diagram drawn according to each group of mean values in Table 33; FIG. 16(b) is a diagram drawn according to each group of mean values in Table 34; FIG. 16(c) is a diagram drawn according to each group of mean values in Table 35; and FIG. 16(d) is a diagram drawn according to each group of mean values in Table 36. It can be known from FIG. 16(a), FIG. 16(b), FIG. 16(c) and FIG. 16(d) that, after thawing, the temperature differences varies with the kind of the food, the weight of the food, and the temperature at thawing endpoint. The temperature differences are significantly reduced and the thawing is uniform, when the temperature of the food after thawing is about −1° C., relative to that when the temperature of the food after thawing is larger than 0° C.

In embodiment 10: purge losses of food thawed at −1° C. are analyzed.

1. Pork tenderloin, fish, chicken, and beef are selected as the food respectively, and 100 g (gram), 200 g, 300 g, 400 g, and 500 g are selected as weights of each kind of the food.

(1) Experiments on pork tenderloin of 100 g, 200 g, 300 g, 400 g, and 500 g respectively. Firstly, pork tenderloin of 100 g, 200 g, 300 g, 400 g, and 500 g are put in the microwave oven to thaw respectively. The temperatures of the food in the microwave oven are maintained at different thawing endpoints (i.e. thawed at temperatures of −1° C., 0° C., and −2° C.). And then, the purge losses of pork tenderloin of 100 g, 200 g, 300 g, 400 g, and 500 g respectively thawed at different thawing endpoints (i.e. thawed at temperatures of −1° C., 0° C., and 2° C.) are calculated according to a formula "a gravy quantity/a total weight of the pork tenderloin*100%" respectively. Experimental data of 5 parallel experiments are selected from a plurality of experiments by the inventors and shown in Table 37.

TABLE 37

| | | parallel 1 | parallel 2 | parallel 3 | parallel 4 | parallel 5 | Mean value |
|---|---|---|---|---|---|---|---|
| | pork tenderloin | | | | | | |
| 100 g | Thawed at −1° C. | 0.10% | 0.12% | 0.25% | 0.25% | 0.12% | 0.17% |
| | Thawed at 0° C. | 1.23% | 2.49% | 2.98% | 2.30% | 1.65% | 2.13% |
| | Thawed at −2° C. | 0.19% | 0.11% | 0.15% | 0.29% | 0.24% | 0.20% |
| 200 g | Thawed at −1° C. | 0.13% | 0.29% | 0.23% | 0.11% | 0.24% | 0.20% |
| | Thawed at 0° C. | 2.34% | 1.10% | 2.49% | 1.52% | 2.29% | 1.95% |
| | Thawed at −2° C. | 0.27% | 0.23% | 0.15% | 0.28% | 0.29% | 0.24% |
| 300 g | Thawed at −1° C. | 0.27% | 0.14% | 0.12% | 0.15% | 0.13% | 0.16% |
| | Thawed at 0° C. | 2.40% | 2.24% | 2.94% | 1.39% | 2.88% | 2.37% |
| | Thawed at −2° C. | 0.29% | 0.28% | 0.19% | 0.14% | 0.12% | 0.20% |
| 400 g | Thawed at −1° C. | 0.24% | 0.11% | 0.28% | 0.16% | 0.12% | 0.18% |
| | Thawed at 0° C. | 2.85% | 1.56% | 2.47% | 2.98% | 1.12% | 2.19% |
| | Thawed at −2° C. | 0.12% | 0.28% | 0.28% | 0.13% | 0.11% | 0.18% |
| 500 g | Thawed at −1° C. | 0.23% | 0.18% | 0.28% | 0.29% | 0.29% | 0.25% |
| | Thawed at 0° C. | 2.85% | 1.40% | 2.51% | 2.68% | 1.99% | 2.28% |
| | Thawed at −2° C. | 0.25% | 0.12% | 0.24% | 0.15% | 0.28% | 0.21% |

(2) Experiments on fish of 100 g, 200 g, 300 g, 400 g, and 500 g respectively, of which a process and a method are same as that of pork tenderloin of 100 g, 200 g, 300 g, 400 g, and 500 g, and can refer to descriptions of the above process and method corresponding to pork tenderloin of 100 g, 200 g, 300 g, 400 g, and 500 g, which is not described in detail herein. Experimental data of 5 parallel experiments are selected from a plurality of experiments by the inventors and shown in Table 38.

TABLE 38

| | | parallel 1 | parallel 2 | parallel 3 | parallel 4 | parallel 5 | Mean value |
|---|---|---|---|---|---|---|---|
| | fish | | | | | | |
| 100 g | Thawed at −1° C. | 0.27% | 0.17% | 0.11% | 0.20% | 0.11% | 0.17% |
| | Thawed at 0° C. | 1.79% | 2.08% | 1.26% | 2.61% | 1.39% | 1.83% |
| | Thawed at −2° C. | 0.29% | 0.23% | 0.23% | 0.18% | 0.17% | 0.22% |

TABLE 38-continued fish

|  |  | parallel 1 | parallel 2 | parallel 3 | parallel 4 | parallel 5 | Mean value |
|---|---|---|---|---|---|---|---|
| 200 g | Thawed at −1° C. | 0.28% | 0.16% | 0.21% | 0.18% | 0.29% | 0.22% |
|  | Thawed at 0° C. | 1.17% | 1.34% | 2.49% | 1.83% | 1.50% | 1.67% |
|  | Thawed at −2° C. | 0.24% | 0.20% | 0.22% | 0.23% | 0.29% | 0.24% |
| 300 g | Thawed at −1° C. | 0.29% | 0.11% | 0.26% | 0.17% | 0.20% | 0.21% |
|  | Thawed at 0° C. | 2.24% | 2.58% | 2.57% | 1.11% | 2.95% | 2.29% |
|  | Thawed at −2° C. | 0.22% | 0.11% | 0.21% | 0.20% | 0.19% | 0.19% |
| 400 g | Thawed at −1° C. | 0.21% | 0.14% | 0.16% | 0.19% | 0.27% | 0.19% |
|  | Thawed at 0° C. | 1.44% | 1.05% | 2.89% | 1.35% | 2.97% | 1.94% |
|  | Thawed at −2° C. | 0.27% | 0.13% | 0.30% | 0.30% | 0.16% | 0.23% |
| 500 g | Thawed at −1° C. | 0.17% | 0.15% | 0.21% | 0.21% | 0.15% | 0.18% |
|  | Thawed at 0° C. | 1.69% | 1.82% | 2.60% | 1.51% | 2.95% | 2.11% |
|  | Thawed at −2° C. | 0.25% | 0.23% | 0.24% | 0.25% | 0.16% | 0.23% |

(3) Experiments on chicken of 100 g, 200 g, 300 g, 400 g, and 500 g respectively, of which a process and a method are same as that of pork tenderloin of 100 g, 200 g, 300 g, 400 g and 500 g, can refer to descriptions of the above process and method corresponding to pork tenderloin of 100 g, 200 g, 300 g, 400 g and 500 g, which is not described in detail herein. Experimental data of 5 parallel experiments are selected from a plurality of experiments by the inventors and shown in Table 39 below.

TABLE 39 chicken

|  |  | parallel 1 | parallel 2 | parallel 3 | parallel 4 | parallel 5 | Mean value |
|---|---|---|---|---|---|---|---|
| 100 g | Thawed at −1° C. | 0.26% | 0.11% | 0.28% | 0.25% | 0.22% | 0.23% |
|  | Thawed at 0° C. | 1.40% | 1.81% | 2.07% | 1.38% | 1.42% | 1.62% |
|  | Thawed at −2° C. | 0.12% | 0.23% | 0.12% | 0.17% | 0.10% | 0.15% |
| 200 g | Thawed at −1° C. | 0.11% | 0.18% | 0.11% | 0.21% | 0.28% | 0.18% |
|  | Thawed at 0° C. | 2.67% | 1.87% | 2.42% | 2.57% | 2.36% | 2.38% |
|  | Thawed at −2° C. | 0.12% | 0.27% | 0.18% | 0.11% | 0.12% | 0.16% |
| 300 g | Thawed at −1° C. | 0.15% | 0.26% | 0.11% | 0.17% | 0.18% | 0.17% |
|  | Thawed at 0° C. | 1.22% | 2.00% | 2.18% | 1.71% | 2.87% | 2.00% |
|  | Thawed at −2° C. | 0.29% | 0.18% | 0.13% | 0.14% | 0.19% | 0.19% |
| 400 g | Thawed at −1° C. | 0.24% | 0.10% | 0.17% | 0.23% | 0.26% | 0.20% |
|  | Thawed at 0° C. | 2.73% | 2.30% | 2.25% | 1.21% | 1.02% | 1.90% |
|  | Thawed at −2° C. | 0.19% | 0.15% | 0.26% | 0.27% | 0.23% | 0.22% |
| 500 g | Thawed at −1° C. | 0.15% | 0.22% | 0.29% | 0.23% | 0.22% | 0.22% |
|  | Thawed at 0° C. | 2.65% | 1.43% | 1.28% | 1.55% | 1.92% | 1.77% |
|  | Thawed at −2° C. | 0.28% | 0.18% | 0.12% | 0.16% | 0.15% | 0.18% |

(4) Experiments on beef of 100 g, 200 g, 300 g, 400 g and 500 g respectively, of which a process and a method are same as that of that of pork tenderloin of 100 g, 200 g, 300 g, 400 g and 500 g, can refer to descriptions of the above process and method corresponding to pork tenderloin of 100 g, 200 g, 300 g, 400 g and 500 g, which is not described in detail herein. Experimental data of 5 parallel experiments are selected from a plurality of experiments by the inventors and shown in Table 40 below.

TABLE 40 beef

|  |  | parallel 1 | parallel 2 | parallel 3 | parallel 4 | parallel 5 | Mean value |
|---|---|---|---|---|---|---|---|
| 100 g | Thawed at −1° C. | 0.12% | 0.17% | 0.27% | 0.12% | 0.13% | 0.16% |
|  | Thawed at 0° C. | 2.92% | 2.14% | 2.98% | 2.97% | 1.09% | 2.42% |
|  | Thawed at −2° C. | 0.28% | 0.13% | 0.17% | 0.29% | 0.23% | 0.22% |
| 200 g | Thawed at −1° C. | 0.10% | 0.21% | 0.22% | 0.22% | 0.20% | 0.19% |
|  | Thawed at 0° C. | 1.79% | 2.15% | 2.26% | 2.33% | 2.36% | 2.18% |
|  | Thawed at −2° C. | 0.26% | 0.22% | 0.13% | 0.25% | 0.23% | 0.22% |
| 300 g | Thawed at −1° C. | 0.12% | 0.21% | 0.15% | 0.23% | 0.20% | 0.18% |
|  | Thawed at 0° C. | 2.19% | 1.18% | 2.76% | 1.07% | 1.69% | 1.78% |
|  | Thawed at −2° C. | 0.10% | 0.17% | 0.23% | 0.14% | 0.14% | 0.16% |
| 400 g | Thawed at −1° C. | 0.28% | 0.19% | 0.10% | 0.25% | 0.11% | 0.19% |
|  | Thawed at 0° C. | 2.86% | 1.79% | 1.81% | 2.44% | 2.73% | 2.32% |
|  | Thawed at −2° C. | 0.18% | 0.15% | 0.16% | 0.23% | 0.13% | 0.17% |

TABLE 40-continued

| | | parallel 1 | parallel 2 | parallel 3 | parallel 4 | parallel 5 | Mean value |
|---|---|---|---|---|---|---|---|
| | | beef | | | | | |
| 500 g | Thawed at −1° C. | 0.25% | 0.13% | 0.12% | 0.10% | 0.13% | 0.15% |
| | Thawed at 0° C. | 1.23% | 2.87% | 2.44% | 1.60% | 2.37% | 2.10% |
| | Thawed at −2° C. | 0.22% | 0.11% | 0.18% | 0.18% | 0.29% | 0.20% |

Figure 17:
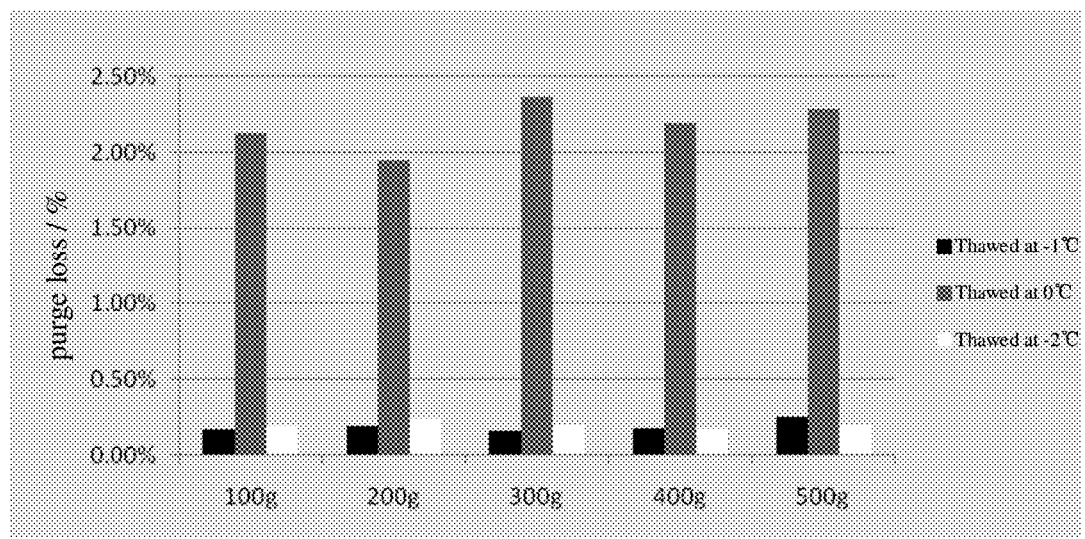
FIG. 17 (a) is a schematic diagram of purge losses of pork tenderloin with different weights thawed at different temperatures at thawing endpoint according to an embodiment of the present disclosure.
Figure 17:
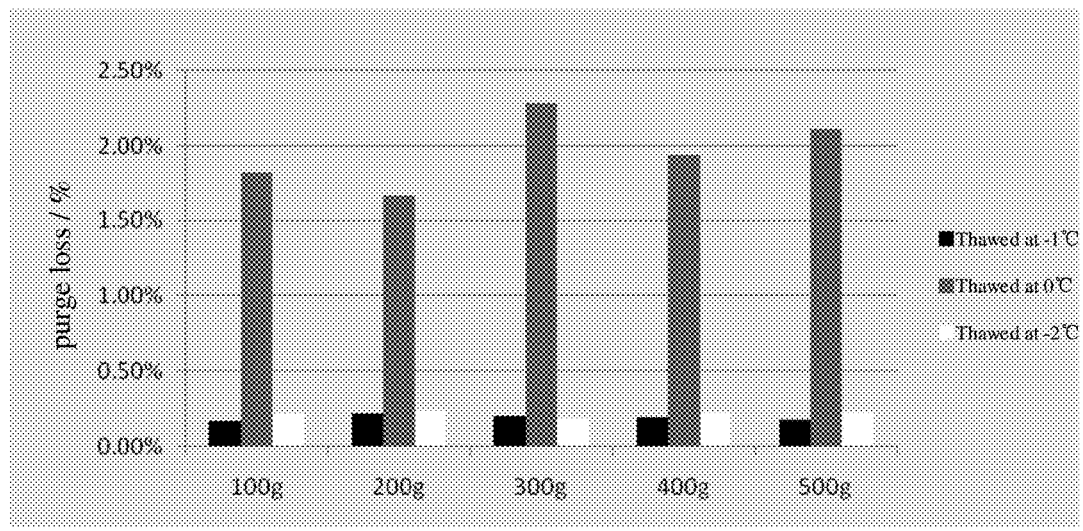
Figure 17:
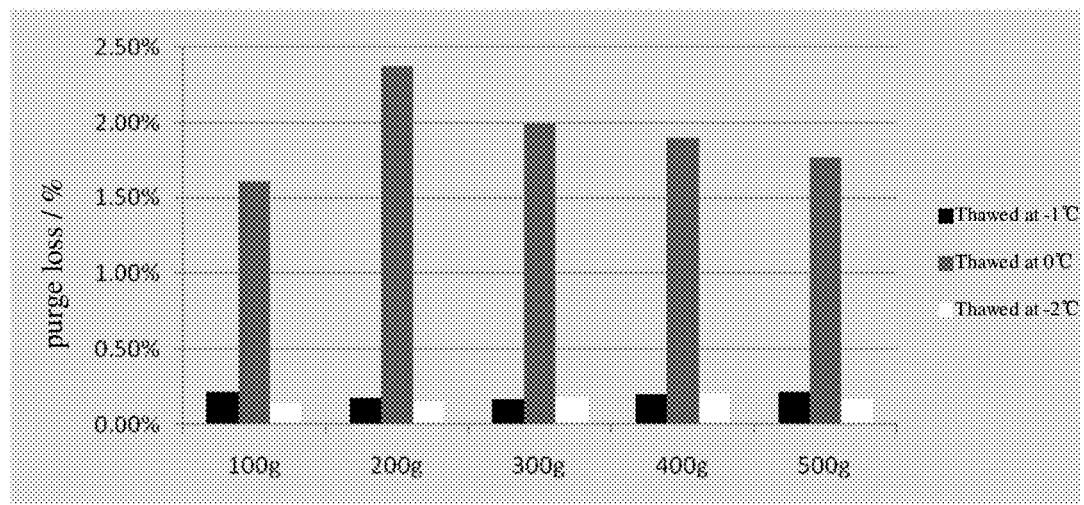
Figure 17:
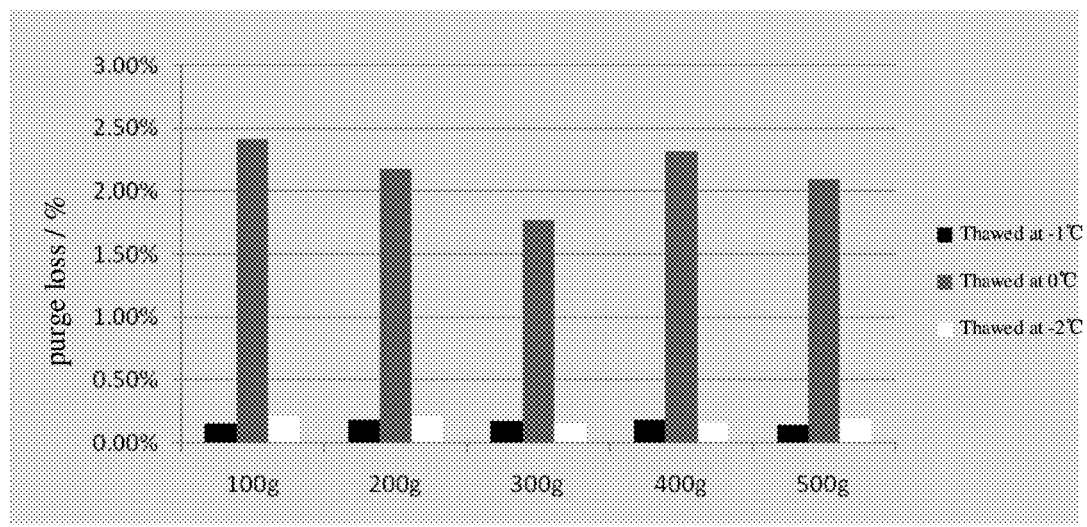

2. Experiment results. FIG. 17(*a*) is a diagram drawn according to each group of mean values in Table 37, FIG. 17(*b*) is a diagram drawn according to each group of mean values in Table 38, FIG. 17(*c*) is a diagram drawn according to each group of mean values in Table 39 and FIG. 17(*d*) is a diagram drawn according to each group of mean values in Table 40. It can be seen from FIG. 17(*a*), FIG. 17(*b*), FIG. 17(*c*) and FIG. 17(*d*) that, after thawing, the purge loss varies with the kind of the food, the weight of the food, and the temperature at thawing endpoint. The purge losses are significantly reduced, almost no purge loss, when the temperature of the food after thawing is about −1° C., relative to that when the temperature of the food after thawing is larger than 0° C.

In embodiment 11, protein contents of food thawed at −1° C. are analyzed.

1. Pork tenderloin, fish, chicken and beef are selected as the food respectively, and 100 g (gram), 200 g, 300 g, 400 g, and 500 g are selected as weights of each kind of the food.

(1) Experiments on pork tenderloin of 100 g, 200 g, 300 g, 400 g, and 500 g respectively. Firstly, pork tenderloin of 100 g, 200 g, 300 g, 400 g, and 500 g are put in the microwave oven to thaw respectively. The temperatures of the food in the microwave oven are maintained at different thawing endpoints (i.e. thawed at temperatures of −1° C., 0° C., and −2° C.). And then, protein contents of pork tenderloin of 100 g, 200 g, 300 g, 400 g and 500 g respectively thawed at different thawing endpoint (i.e. thawed at temperatures of −1° C., 0° C., and −2° C.) are measured by Kjeldahl apparatus respectively. Experimental data of 5 parallel experiments are selected from a plurality of experiments by the inventors and shown in Table 40 below.

TABLE 41

| | | parallel 1 | parallel 2 | parallel 3 | parallel 4 | parallel 5 | Mean value |
|---|---|---|---|---|---|---|---|
| | | pork tenderloin | | | | | |
| 100 g | Thawed at −1° C. | 23.98% | 23.96% | 24.03% | 24.09% | 24.09% | 24.03% |
| | Thawed at 0° C. | 23.55% | 23.55% | 23.52% | 23.68% | 23.55% | 23.57% |
| | Thawed at −2° C. | 24.07% | 24.03% | 23.96% | 23.97% | 24.08% | 24.02% |
| 200 g | Thawed at −1° C. | 23.91% | 24.09% | 23.95% | 24.03% | 23.99% | 23.99% |
| | Thawed at 0° C. | 23.53% | 23.60% | 23.67% | 23.60% | 23.58% | 23.60% |
| | Thawed at −2° C. | 24.09% | 24.02% | 23.94% | 23.95% | 24.05% | 24.01% |
| 300 g | Thawed at −1° C. | 24.03% | 23.97% | 24.02% | 23.93% | 23.98% | 23.98% |
| | Thawed at 0° C. | 23.60% | 23.61% | 23.53% | 23.65% | 23.65% | 23.61% |
| | Thawed at −2° C. | 24.01% | 23.91% | 24.00% | 24.07% | 23.92% | 23.98% |
| 400 g | Thawed at −1° C. | 23.99% | 23.98% | 23.91% | 24.07% | 24.06% | 24.00% |
| | Thawed at 0° C. | 23.64% | 23.69% | 23.61% | 23.57% | 23.63% | 23.63% |
| | Thawed at −2° C. | 24.06% | 24.03% | 24.01% | 23.95% | 23.98% | 24.01% |
| 500 g | Thawed at −1° C. | 24.10% | 23.99% | 24.03% | 23.98% | 23.90% | 24.00% |
| | Thawed at 0° C. | 23.66% | 23.68% | 23.64% | 23.56% | 23.56% | 23.62% |
| | Thawed at −2° C. | 24.02% | 23.95% | 23.94% | 23.90% | 24.08% | 23.98% |

(2) Experiments on fish of 100 g, 200 g, 300 g, 400 g, and 500 g respectively, of which a process and a method are same as that of pork tenderloin of 100 g, 200 g, 300 g, 400 g, and 500 g, and can refer to descriptions of the above process and method corresponding to pork tenderloin of 100 g, 200 g, 300 g, 400 g, and 500 g, which is not described in detail herein. Experimental data of 5 parallel experiments are selected from a plurality of experiments by the inventors and shown in Table 42 below.

TABLE 42

| | | parallel 1 | parallel 2 | parallel 3 | parallel 4 | parallel 5 | Mean value |
|---|---|---|---|---|---|---|---|
| | | fish | | | | | |
| 100 g | Thawed at −1° C. | 17.67% | 17.63% | 17.61% | 17.59% | 17.58% | 17.62% |
| | Thawed at 0° C. | 16.16% | 16.22% | 16.10% | 16.16% | 16.23% | 16.17% |
| | Thawed at −2° C. | 17.54% | 17.60% | 17.55% | 17.65% | 17.66% | 17.60% |
| 200 g | Thawed at −1° C. | 17.63% | 17.63% | 17.63% | 17.64% | 17.67% | 17.64% |
| | Thawed at 0° C. | 16.21% | 16.27% | 16.23% | 16.10% | 16.13% | 16.19% |
| | Thawed at −2° C. | 17.57% | 17.54% | 17.51% | 17.60% | 17.50% | 17.55% |

TABLE 42-continued

| | | fish | | | | | |
|---|---|---|---|---|---|---|---|
| | | parallel 1 | parallel 2 | parallel 3 | parallel 4 | parallel 5 | Mean value |
| 300 g | Thawed at −1° C. | 17.56% | 17.68% | 17.58% | 17.61% | 17.51% | 17.59% |
| | Thawed at 0° C. | 16.17% | 16.26% | 16.29% | 16.11% | 16.20% | 16.21% |
| | Thawed at −2° C. | 17.55% | 17.63% | 17.66% | 17.61% | 17.57% | 17.60% |
| 400 g | Thawed at −1° C. | 17.64% | 17.68% | 17.52% | 17.61% | 17.64% | 17.62% |
| | Thawed at 0° C. | 16.13% | 16.18% | 16.15% | 16.21% | 16.18% | 16.17% |
| | Thawed at −2° C. | 17.57% | 17.53% | 17.67% | 17.62% | 17.60% | 17.60% |
| 500 g | Thawed at −1° C. | 17.51% | 17.57% | 17.58% | 17.57% | 17.67% | 17.58% |
| | Thawed at 0° C. | 16.21% | 16.27% | 16.11% | 16.29% | 16.20% | 16.22% |
| | Thawed at −2° C. | 17.61% | 17.61% | 17.69% | 17.58% | 17.63% | 17.63% |

(3) Experiments on chicken of 100 g, 200 g, 300 g, 400 g, and 500 g respectively, of which a process and a method are same as that of pork tenderloin of 100 g, 200 g, 300 g, 400 g, and 500 g, and can refer to descriptions of the above process and method corresponding to pork tenderloin of 100 g, 200 g, 300 g, 400 g, and 500 g, which is not described in detail herein. Experimental data of 5 parallel experiments are selected from a plurality of experiments by the inventors and shown in Table 43 below.

TABLE 43

| | | chicken | | | | | |
|---|---|---|---|---|---|---|---|
| | | parallel 1 | parallel 2 | parallel 3 | parallel 4 | parallel 5 | Mean value |
| 100 g | Thawed at −1° C. | 20.60% | 20.60% | 20.52% | 20.58% | 20.52% | 20.56% |
| | Thawed at 0° C. | 19.38% | 19.30% | 19.42% | 19.32% | 19.32% | 19.35% |
| | Thawed at −2° C. | 20.57% | 20.56% | 20.56% | 20.67% | 20.67% | 20.60% |
| 200 g | Thawed at −1° C. | 20.52% | 20.63% | 20.64% | 20.67% | 20.51% | 20.59% |
| | Thawed at 0° C. | 19.42% | 19.32% | 19.47% | 19.36% | 19.46% | 19.41% |
| | Thawed at −2° C. | 20.53% | 20.58% | 20.65% | 20.58% | 20.69% | 20.61% |
| 300 g | Thawed at −1° C. | 20.69% | 20.61% | 20.51% | 20.63% | 20.51% | 20.59% |
| | Thawed at 0° C. | 19.48% | 19.44% | 19.44% | 19.45% | 19.37% | 19.44% |
| | Thawed at −2° C. | 20.62% | 20.61% | 20.65% | 20.61% | 20.58% | 20.61% |
| 400 g | Thawed at −1° C. | 20.52% | 20.60% | 20.59% | 20.53% | 20.59% | 20.57% |
| | Thawed at 0° C. | 19.33% | 19.34% | 19.41% | 19.36% | 19.49% | 19.39% |
| | Thawed at −2° C. | 20.57% | 20.59% | 20.57% | 20.51% | 20.64% | 20.58% |
| 500 g | Thawed at −1° C. | 20.69% | 20.57% | 20.64% | 20.66% | 20.59% | 20.63% |
| | Thawed at 0° C. | 19.31% | 19.39% | 19.49% | 19.33% | 19.41% | 19.39% |
| | Thawed at −2° C. | 20.67% | 20.50% | 20.69% | 20.66% | 20.54% | 20.61% |

TABLE 44

| | | beef | | | | | |
|---|---|---|---|---|---|---|---|
| | | parallel 1 | parallel 2 | parallel 3 | parallel 4 | parallel 5 | Mean value |
| 100 g | Thawed at −1° C. | 22.91% | 22.90% | 22.80% | 22.96% | 22.97% | 22.91% |
| | Thawed at 0° C. | 20.17% | 20.16% | 20.10% | 20.04% | 20.02% | 20.10% |
| | Thawed at −2° C. | 22.87% | 22.81% | 22.94% | 22.84% | 22.85% | 22.86% |
| 200 g | Thawed at −1° C. | 22.84% | 22.91% | 22.87% | 22.93% | 22.90% | 22.89% |
| | Thawed at 0° C. | 20.10% | 20.19% | 20.09% | 20.18% | 20.17% | 20.14% |
| | Thawed at −2° C. | 22.81% | 22.94% | 22.85% | 22.97% | 23.00% | 22.91% |
| 300 g | Thawed at −1° C. | 22.90% | 22.97% | 22.94% | 22.95% | 22.98% | 22.95% |
| | Thawed at 0° C. | 20.20% | 20.04% | 20.06% | 20.17% | 20.17% | 20.13% |
| | Thawed at −2° C. | 22.99% | 22.81% | 22.80% | 22.81% | 22.97% | 22.88% |
| 400 g | Thawed at −1° C. | 22.95% | 22.81% | 22.89% | 22.93% | 22.92% | 22.90% |
| | Thawed at 0° C. | 20.08% | 20.13% | 20.14% | 20.00% | 20.15% | 20.10% |
| | Thawed at −2° C. | 22.82% | 22.87% | 23.00% | 23.00% | 22.91% | 22.92% |
| 500 g | Thawed at −1° C. | 22.90% | 22.93% | 22.97% | 22.84% | 22.91% | 22.91% |
| | Thawed at 0° C. | 20.11% | 20.04% | 20.02% | 20.03% | 20.07% | 20.05% |
| | Thawed at −2° C. | 22.97% | 22.85% | 22.93% | 22.95% | 22.85% | 22.91% |

(4) Experiments on beef of 100 g, 200 g, 300 g, 400 g, and 500 g respectively, of which a process and a method are same as that of pork tenderloin of 100 g, 200 g, 300 g, 400 g, and 500 g, and can refer to descriptions of the above process and method corresponding to pork tenderloin of 100 g, 200 g, 300 g, 400 g, and 500 g, which is not described in detail herein. Experimental data of 5 parallel experiments are selected from a plurality of experiments by the inventors and shown in Table 44 below.

Figure 18:
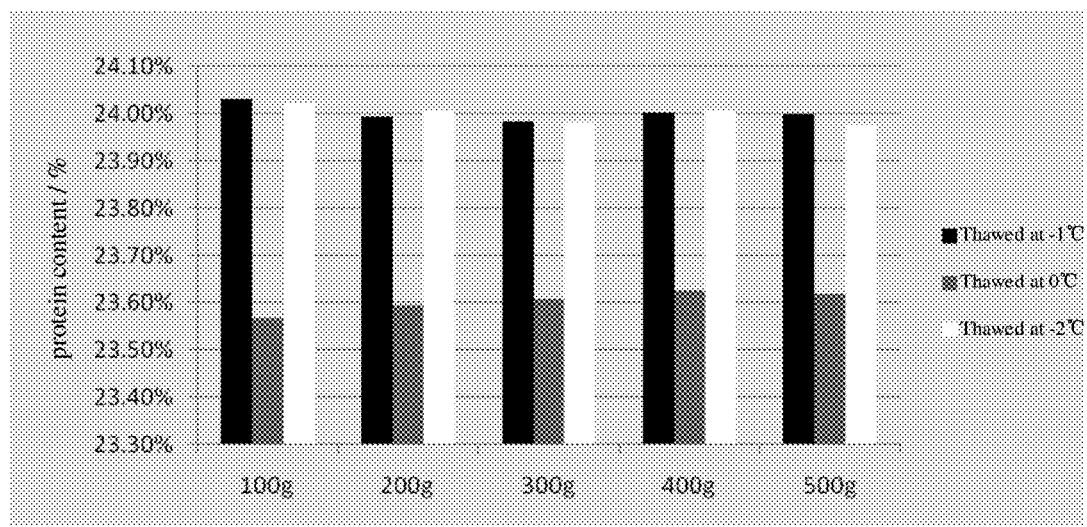
FIG. 18 (a) is a schematic diagram of protein contents of pork tenderloin with different weights thawed at different temperatures at thawing endpoint according to an embodiment of the present disclosure.
Figure 18:
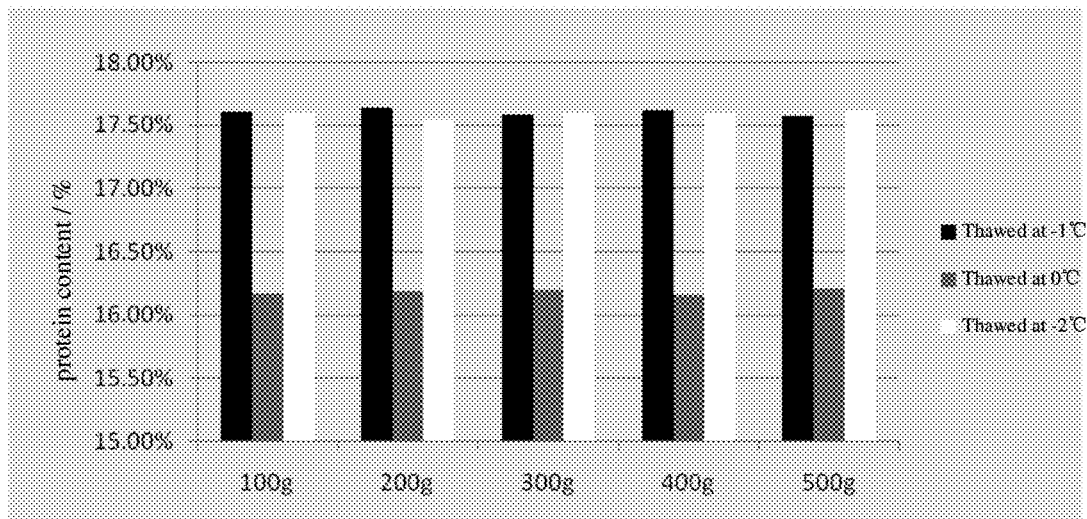
Figure 18:
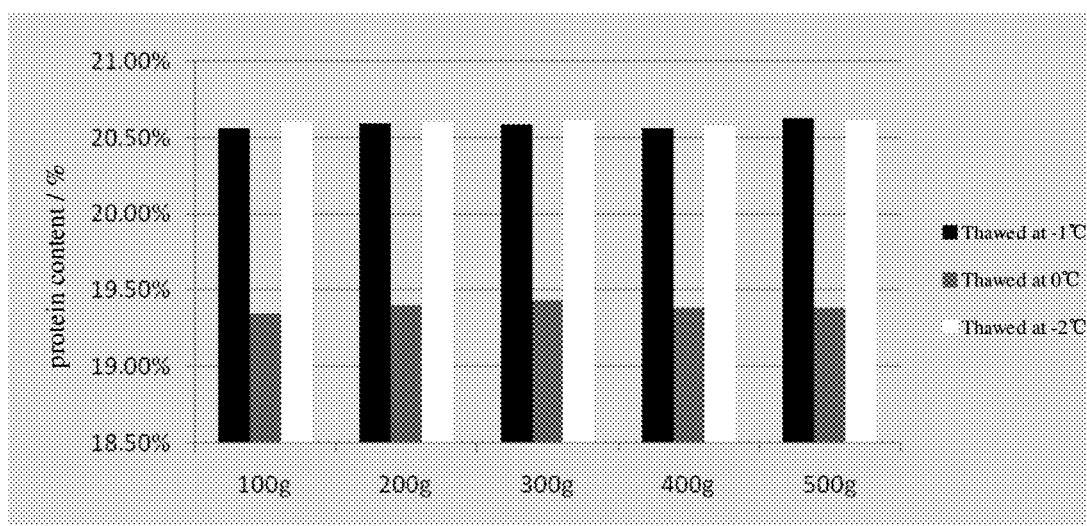
Figure 18:
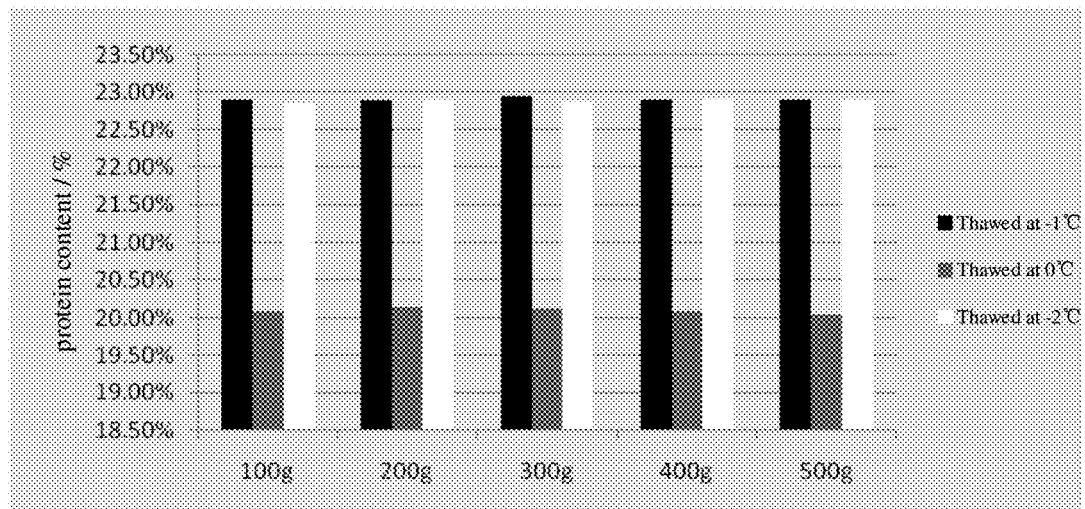

2. Experiment results. FIG. 18(a) is a diagram drawn according to each group of mean values in Table 41, FIG. 18(b) is a diagram drawn according to each group of mean values in Table 42, FIG. 18(c) is a diagram drawn according to each group of mean values in Table 43 and FIG. 18(d) is a diagram drawn according to each group of mean values in Table 44. It can be seen from FIG. 18(a), FIG. 18(b), FIG. 18(c) and FIG. 18(d) that, after thawing, the protein content varies with the kind of the food, the weight of the food, and the temperature at thawing endpoint. The protein contents are slightly increased, with high nutritive value, when the temperature of the food after thawing is about −1° C., relative to that when the temperature of the food after thawing is larger than 0° C.

In embodiment 12, water contents of food thawed at −1° C. are analyzed.

1. Pork tenderloin, fish, chicken, and beef are selected as the food respectively, and 100 g (gram), 200 g, 300 g, 400 g, and 500 g are selected as weights of each kind of the food.

(1) Experiments on pork tenderloin of 100 g, 200 g, 300 g, 400 g, and 500 g respectively. Firstly, pork tenderloin of 100 g, 200 g, 300 g, 400 g, and 500 g are put in the microwave oven to thaw respectively. The temperatures of the food in the microwave oven are maintained at different thawing endpoints (i.e. thawed at temperatures of −1° C., 0° C., and −2° C.). And then, water contents of pork tenderloin of 100 g, 200 g, 300 g, 400 g, and 500 g respectively thawed at different thawing endpoints (i.e. thawed at temperatures of −1° C., 0° C., and −2° C.) are measured with a method of drying at 150° C. respectively. Experimental data of 5 parallel experiments are selected from a plurality of experiments by the inventors and shown in Table 45 below.

TABLE 45 pork tenderloin

| | | parallel 1 | parallel 2 | parallel 3 | parallel 4 | parallel 5 | Mean value |
|---|---|---|---|---|---|---|---|
| 100 g | Thawed at −1° C. | 72.54% | 72.56% | 72.60% | 72.59% | 72.56% | 72.57% |
| | Thawed at 0° C. | 72.02% | 72.11% | 72.02% | 72.12% | 72.05% | 72.06% |
| | Thawed at −2° C. | 72.62% | 72.56% | 72.57% | 72.63% | 72.61% | 72.60% |
| 200 g | Thawed at −1° C. | 72.54% | 72.58% | 72.64% | 72.68% | 72.66% | 72.62% |
| | Thawed at 0° C. | 72.15% | 72.12% | 72.01% | 72.09% | 72.08% | 72.09% |
| | Thawed at −2° C. | 72.65% | 72.66% | 72.63% | 72.57% | 72.61% | 72.62% |
| 300 g | Thawed at −1° C. | 72.64% | 72.66% | 72.55% | 72.63% | 72.58% | 72.61% |
| | Thawed at 0° C. | 72.14% | 72.11% | 72.06% | 72.02% | 72.20% | 72.10% |
| | Thawed at −2° C. | 72.56% | 72.69% | 72.55% | 72.59% | 72.63% | 72.60% |
| 400 g | Thawed at −1° C. | 72.62% | 72.53% | 72.60% | 72.58% | 72.67% | 72.60% |
| | Thawed at 0° C. | 72.05% | 72.18% | 72.02% | 72.07% | 72.05% | 72.07% |
| | Thawed at −2° C. | 72.53% | 72.52% | 72.54% | 72.50% | 72.66% | 72.55% |
| 500 g | Thawed at −1° C. | 72.63% | 72.52% | 72.65% | 72.66% | 72.65% | 72.62% |
| | Thawed at 0° C. | 72.03% | 72.18% | 72.03% | 72.09% | 72.12% | 72.09% |
| | Thawed at −2° C. | 72.57% | 72.53% | 72.63% | 72.69% | 72.57% | 72.60% |

(2) Experiments on fish of 100 g, 200 g, 300 g, 400 g, and 500 g respectively, of which a process and a method are same as that of pork tenderloin of 100 g, 200 g, 300 g, 400 g, and 500 g, and can refer to descriptions of the above process and method corresponding to pork tenderloin of 100 g, 200 g, 300 g, 400 g, and 500 g, which is not described in detail herein. Experimental data of 5 parallel experiments are selected from a plurality of experiments by the inventors and shown in Table 46 below.

TABLE 46 fish

| | | parallel 1 | parallel 2 | parallel 3 | parallel 4 | parallel 5 | Mean value |
|---|---|---|---|---|---|---|---|
| 100 g | Thawed at −1° C. | 71.58% | 71.66% | 71.51% | 71.57% | 71.51% | 71.57% |
| | Thawed at 0° C. | 71.20% | 71.17% | 71.04% | 71.19% | 71.01% | 71.12% |
| | Thawed at −2° C. | 71.55% | 71.64% | 71.69% | 71.60% | 71.62% | 71.62% |
| 200 g | Thawed at −1° C. | 71.65% | 71.58% | 71.64% | 71.64% | 71.69% | 71.64% |
| | Thawed at 0° C. | 71.15% | 71.17% | 71.16% | 71.12% | 71.02% | 71.13% |
| | Thawed at −2° C. | 71.61% | 71.59% | 71.70% | 71.62% | 71.60% | 71.62% |
| 300 g | Thawed at −1° C. | 71.53% | 71.69% | 71.52% | 71.60% | 71.69% | 71.60% |
| | Thawed at 0° C. | 71.15% | 71.08% | 71.18% | 71.10% | 71.11% | 71.12% |
| | Thawed at −2° C. | 71.56% | 71.69% | 71.69% | 71.62% | 71.61% | 71.64% |
| 400 g | Thawed at −1° C. | 71.52% | 71.53% | 71.68% | 71.61% | 71.61% | 71.59% |
| | Thawed at 0° C. | 71.06% | 71.12% | 71.03% | 71.11% | 71.12% | 71.09% |
| | Thawed at −2° C. | 71.63% | 71.69% | 71.61% | 71.57% | 71.58% | 71.62% |
| 500 g | Thawed at −1° C. | 71.65% | 71.68% | 71.66% | 71.58% | 71.56% | 71.63% |
| | Thawed at 0° C. | 71.03% | 71.14% | 71.16% | 71.01% | 71.04% | 71.08% |
| | Thawed at −2° C. | 71.62% | 71.61% | 71.67% | 71.53% | 71.65% | 71.62% |

(3) Experiments on chicken of 100 g, 200 g, 300 g, 400 g, and 500 g respectively, of which a process and a method are same as that of pork tenderloin of 100 g, 200 g, 300 g, 400 g, and 500 g, and can refer to descriptions of the above process and method corresponding to pork tenderloin of 100 g, 200 g, 300 g, 400 g, and 500 g, which is not described in detail herein. Experimental data of 5 parallel experiments are selected from a plurality of experiments by the inventors and shown in Table 47 below.

TABLE 47 chicken

| | | parallel 1 | parallel 2 | parallel 3 | parallel 4 | parallel 5 | Mean value |
|---|---|---|---|---|---|---|---|
| 100 g | Thawed at −1° C. | 69.05% | 69.09% | 69.14% | 69.08% | 69.03% | 69.08% |
| | Thawed at 0° C. | 68.12% | 68.05% | 68.07% | 68.13% | 68.15% | 68.10% |
| | Thawed at −2° C. | 69.03% | 69.19% | 69.04% | 69.06% | 69.04% | 69.07% |
| 200 g | Thawed at −1° C. | 69.00% | 69.13% | 69.06% | 69.02% | 69.10% | 69.06% |
| | Thawed at 0° C. | 68.14% | 68.19% | 68.05% | 68.05% | 68.04% | 68.09% |
| | Thawed at −2° C. | 69.07% | 69.12% | 69.12% | 69.15% | 69.12% | 69.11% |
| 300 g | Thawed at −1° C. | 69.00% | 69.07% | 69.15% | 69.06% | 69.04% | 69.07% |
| | Thawed at 0° C. | 68.12% | 68.02% | 68.16% | 68.10% | 68.01% | 68.08% |
| | Thawed at −2° C. | 69.08% | 69.03% | 69.15% | 69.19% | 69.16% | 69.12% |
| 400 g | Thawed at −1° C. | 69.11% | 69.07% | 69.01% | 69.08% | 69.15% | 69.09% |
| | Thawed at 0° C. | 68.05% | 68.16% | 68.19% | 68.10% | 68.05% | 68.11% |
| | Thawed at −2° C. | 69.03% | 69.01% | 69.12% | 69.00% | 69.06% | 69.05% |
| 500 g | Thawed at −1° C. | 69.06% | 69.11% | 69.12% | 69.12% | 69.13% | 69.10% |
| | Thawed at 0° C. | 68.19% | 68.15% | 68.06% | 68.18% | 68.12% | 68.14% |
| | Thawed at −2° C. | 69.16% | 69.17% | 69.08% | 69.09% | 69.06% | 69.11% |

(4) Experiments on beef of 100 g, 200 g, 300 g, 400 g, and 500 g respectively, of which a process and a method are same as that of pork tenderloin of 100 g, 200 g, 300 g, 400 g, and 500 g, and can refer to descriptions of the above process and method corresponding to pork tenderloin of 100 g, 200 g, 300 g, 400 g, and 500 g, which is not described in detail herein. Experimental data of 5 parallel experiments are selected from a plurality of experiments by the inventors and shown in Table 48 below.

TABLE 48 beef

| | | parallel 1 | parallel 2 | parallel 3 | parallel 4 | parallel 5 | Mean value |
|---|---|---|---|---|---|---|---|
| 100 g | Thawed at −1° C. | 66.01% | 66.03% | 66.15% | 66.18% | 66.01% | 66.08% |
| | Thawed at 0° C. | 65.10% | 65.01% | 65.05% | 65.08% | 65.17% | 65.08% |
| | Thawed at −2° C. | 66.14% | 66.11% | 66.06% | 66.12% | 66.15% | 66.12% |
| 200 g | Thawed at −1° C. | 66.12% | 66.14% | 66.12% | 66.18% | 66.08% | 66.13% |
| | Thawed at 0° C. | 65.02% | 65.09% | 65.02% | 65.12% | 65.12% | 65.08% |
| | Thawed at −2° C. | 66.11% | 66.05% | 66.14% | 66.05% | 66.09% | 66.09% |
| 300 g | Thawed at −1° C. | 66.14% | 66.04% | 66.08% | 66.04% | 66.13% | 66.09% |
| | Thawed at 0° C. | 65.09% | 65.13% | 65.18% | 65.20% | 65.15% | 65.15% |
| | Thawed at −2° C. | 66.06% | 66.01% | 66.17% | 66.03% | 66.16% | 66.09% |
| 400 g | Thawed at −1° C. | 66.16% | 66.15% | 66.19% | 66.10% | 66.04% | 66.13% |
| | Thawed at 0° C. | 65.14% | 65.11% | 65.08% | 65.15% | 65.01% | 65.10% |
| | Thawed at −2° C. | 66.12% | 66.17% | 66.03% | 66.13% | 66.10% | 66.11% |
| 500 g | Thawed at −1° C. | 66.09% | 66.16% | 66.19% | 66.17% | 66.18% | 66.16% |
| | Thawed at 0° C. | 65.04% | 65.19% | 65.17% | 65.08% | 65.13% | 65.12% |
| | Thawed at −2° C. | 66.07% | 66.03% | 66.02% | 66.01% | 66.18% | 66.06% |

Figure 19:
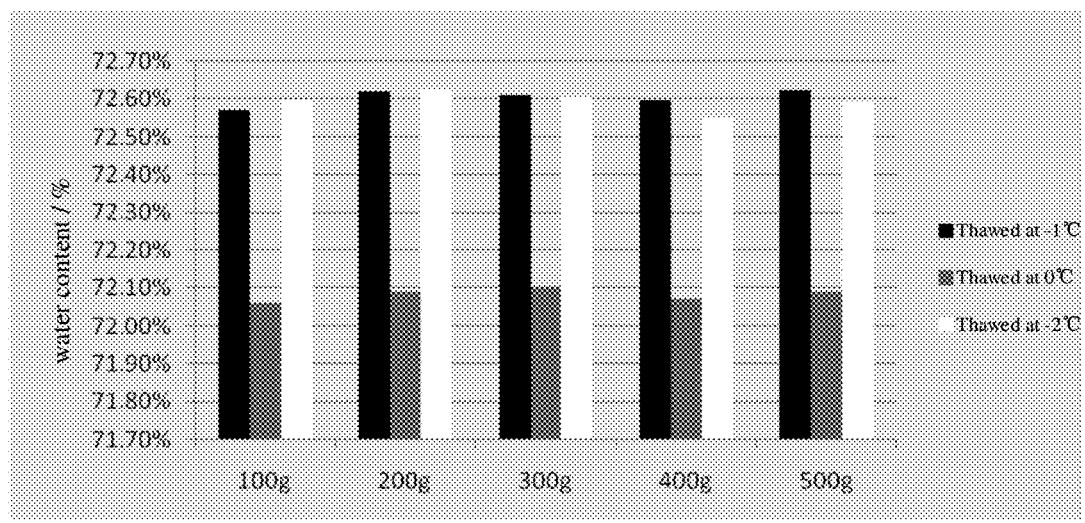
FIG. 19 (a) is a schematic diagram of water contents of pork tenderloin with different weights thawed at different temperatures at thawing endpoint according to an embodiment of the present disclosure.
Figure 19:
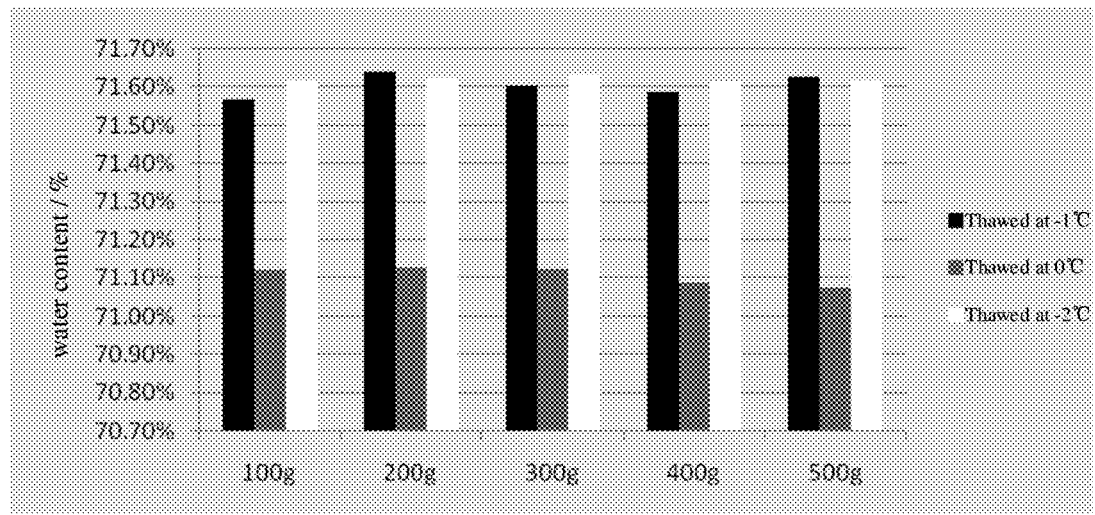
Figure 19:
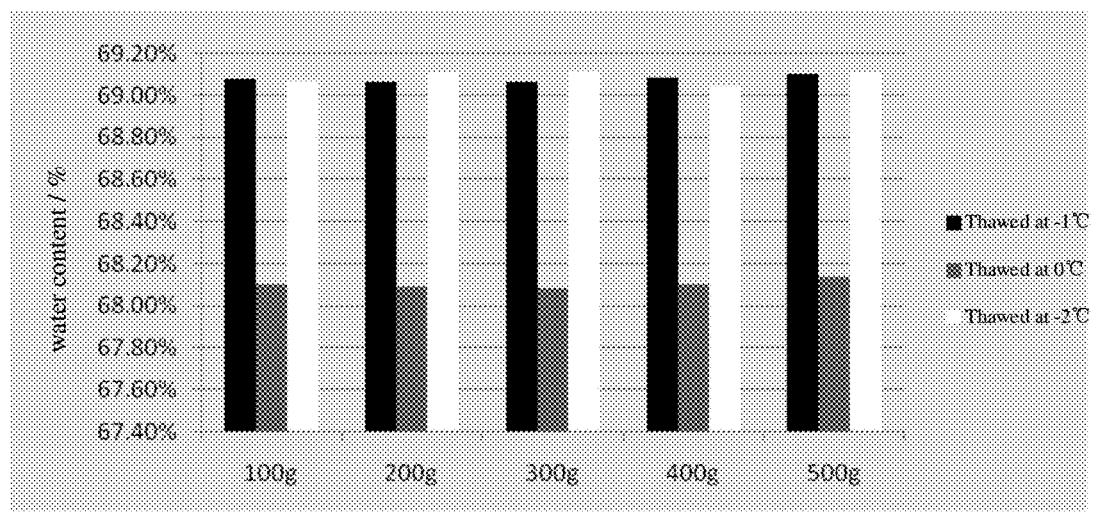
Figure 19:
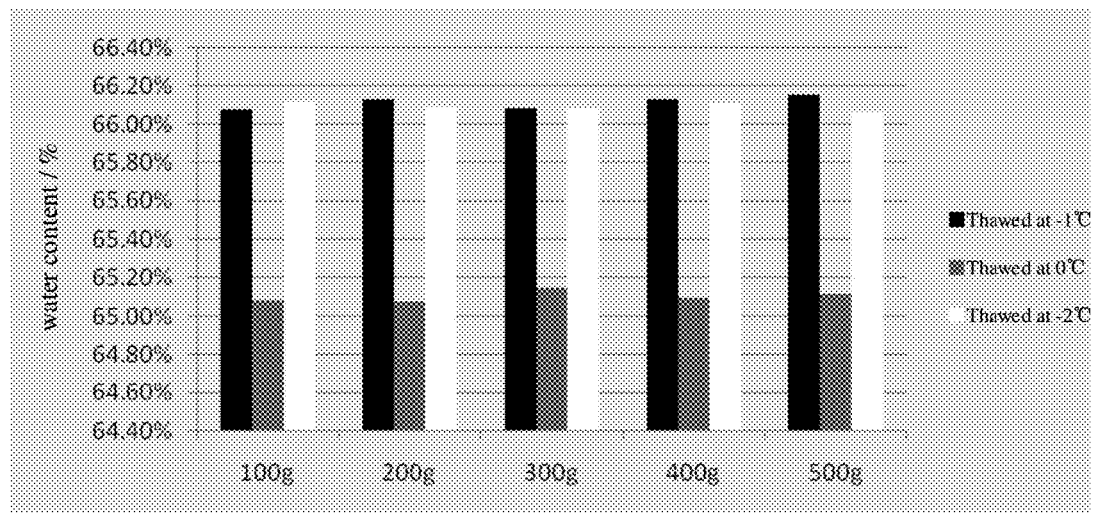

2. Experiment results. FIG. 19(a) is a diagram drawn according to each group of mean values in Table 45, FIG. 19(b) is a diagram drawn according to each group of mean values in Table 46, FIG. 19(c) is a diagram drawn according to each group of mean values in Table 47 and FIG. 19(d) is a diagram drawn according to each group of mean values in Table 48. It can be seen from FIG. 19(a), FIG. 19(b), FIG. 19(c) and FIG. 19(d) that, after thawing, the water content varies with the kind of the food, the weight of the food, and the temperature at thawing endpoint. The water contents are slightly increased, with a good taste, when the temperature of the food after thawing is about −1° C., relative to that when the temperature of the food after thawing is larger than 0° C.

In embodiment 13, textures of food thawed at −1° C. are analyzed.

1. Pork tenderloin, fish, chicken, and beef are selected as the food respectively, and 100 g (gram), 200 g, 300 g, 400 g, and 500 g are selected as weights of each kind of the food.

(1) Experiments on pork tenderloin of 100 g, 200 g, 300 g, 400 g, and 500 g respectively. Firstly, pork tenderloin of 100 g, 200 g, 300 g, 400 g, and 500 g are put in the microwave oven to thaw respectively. The temperatures of the food in the microwave oven are maintained at different thawing endpoints (i.e. thawed at temperatures of −1° C., 0° C., and −2° C.). And then, shear forces of pork tenderloin of 100 g, 200 g, 300 g, 400 g, and 500 g respectively thawed at different thawing endpoints (i.e. thawed at temperatures of −1° C., 0° C., and −2° C.) are measured by a texture analyzer respectively. Experimental data of 5 parallel experiments are selected from a plurality of experiments by the inventors and shown in Table 49 below.

TABLE 49

| | | parallel 1 | parallel 2 | parallel 3 | parallel 4 | parallel 5 | Mean value |
|---|---|---|---|---|---|---|---|
| pork tenderloin | | | | | | | |
| 100 g | Thawed at −1° C. | 18.67 | 18.69 | 18.53 | 18.54 | 18.66 | 18.62 |
| | Thawed at 0° C. | 17.15 | 17.01 | 17.02 | 17.13 | 17.16 | 17.09 |
| | Thawed at −2° C. | 22.05 | 22.12 | 22.19 | 22.17 | 22.13 | 22.13 |
| 200 g | Thawed at −1° C. | 18.51 | 18.61 | 18.64 | 18.56 | 18.51 | 18.56 |
| | Thawed at 0° C. | 17.12 | 17.00 | 17.20 | 17.13 | 17.02 | 17.09 |
| | Thawed at −2° C. | 22.12 | 22.19 | 22.01 | 22.00 | 22.10 | 22.08 |
| 300 g | Thawed at −1° C. | 18.58 | 18.66 | 18.50 | 18.64 | 18.70 | 18.62 |
| | Thawed at 0° C. | 17.05 | 17.13 | 17.06 | 17.19 | 17.02 | 17.09 |
| | Thawed at −2° C. | 22.06 | 22.11 | 22.05 | 22.12 | 22.12 | 22.09 |
| 400 g | Thawed at −1° C. | 18.61 | 18.70 | 18.56 | 18.51 | 18.63 | 18.60 |
| | Thawed at 0° C. | 17.17 | 17.01 | 17.19 | 17.17 | 17.13 | 17.14 |
| | Thawed at −2° C. | 22.09 | 22.19 | 22.10 | 22.18 | 22.13 | 22.14 |
| 500 g | Thawed at −1° C. | 18.55 | 18.58 | 18.52 | 18.58 | 18.67 | 18.58 |
| | Thawed at 0° C. | 17.18 | 17.01 | 17.11 | 17.00 | 17.08 | 17.07 |
| | Thawed at −2° C. | 22.08 | 22.20 | 22.03 | 22.16 | 22.16 | 22.12 |

(2) Experiments on fish of 100 g, 200 g, 300 g, 400 g, and 500 g respectively, of which a process and a method are same as that of pork tenderloin of 100 g, 200 g, 300 g, 400 g, and 500 g, and can refer to descriptions of the above process and method corresponding to pork tenderloin of 100 g, 200 g, 300 g, 400 g, and 500 g, which is not described in detail herein. Experimental data of 5 parallel experiments are selected from a plurality of experiments by the inventors and shown in Table 50 below.

TABLE 50

| | | parallel 1 | parallel 2 | parallel 3 | parallel 4 | parallel 5 | Mean value |
|---|---|---|---|---|---|---|---|
| fish | | | | | | | |
| 100 g | Thawed at −1° C. | 17.67 | 17.69 | 17.52 | 17.55 | 17.56 | 17.60 |
| | Thawed at 0° C. | 15.69 | 15.56 | 15.56 | 15.68 | 15.53 | 15.61 |
| | Thawed at −2° C. | 21.15 | 21.11 | 21.11 | 21.19 | 21.05 | 21.12 |
| 200 g | Thawed at −1° C. | 17.63 | 17.66 | 17.54 | 17.59 | 17.64 | 17.61 |
| | Thawed at 0° C. | 15.69 | 15.67 | 15.66 | 15.70 | 15.57 | 15.66 |
| | Thawed at −2° C. | 21.08 | 21.08 | 21.12 | 21.19 | 21.01 | 21.10 |
| 300 g | Thawed at −1° C. | 17.70 | 17.54 | 17.70 | 17.61 | 17.68 | 17.64 |
| | Thawed at 0° C. | 15.59 | 15.55 | 15.60 | 15.55 | 15.62 | 15.58 |
| | Thawed at −2° C. | 21.15 | 21.14 | 21.15 | 21.08 | 21.08 | 21.12 |
| 400 g | Thawed at −1° C. | 17.58 | 17.65 | 17.64 | 17.65 | 17.67 | 17.64 |
| | Thawed at 0° C. | 15.51 | 15.66 | 15.66 | 15.63 | 15.59 | 15.61 |
| | Thawed at −2° C. | 21.02 | 21.14 | 21.07 | 21.07 | 21.11 | 21.08 |
| 500 g | Thawed at −1° C. | 17.61 | 17.51 | 17.65 | 17.57 | 17.66 | 17.60 |
| | Thawed at 0° C. | 15.60 | 15.67 | 15.56 | 15.52 | 15.55 | 15.58 |
| | Thawed at −2° C. | 21.14 | 21.14 | 21.04 | 21.15 | 21.04 | 21.10 |

(3) Experiments on chicken of 100 g, 200 g, 300 g, 400 g, and 500 g respectively, of which a process and a method are same as that of pork tenderloin of 100 g, 200 g, 300 g, 400 g, and 500 g, and can refer to descriptions of the above process and method corresponding to pork tenderloin of 100 g, 200 g, 300 g, 400 g, and 500 g, which is not described in detail herein. Experimental data of 5 parallel experiments are selected from a plurality of experiments by the inventors and shown in Table 51 below.

TABLE 51 chicken

| | | parallel 1 | parallel 2 | parallel 3 | parallel 4 | parallel 5 | Mean value |
|---|---|---|---|---|---|---|---|
| 100 g | Thawed at −1° C. | 18.53 | 18.57 | 18.60 | 18.54 | 18.56 | 18.56 |
| | Thawed at 0° C. | 16.65 | 16.62 | 16.60 | 16.55 | 16.64 | 16.61 |
| | Thawed at −2° C. | 22.63 | 22.52 | 22.53 | 22.57 | 22.62 | 22.58 |
| 200 g | Thawed at −1° C. | 18.64 | 18.63 | 18.50 | 18.62 | 18.69 | 18.61 |
| | Thawed at 0° C. | 16.69 | 16.67 | 16.68 | 16.54 | 16.70 | 16.66 |
| | Thawed at −2° C. | 22.64 | 22.60 | 22.56 | 22.64 | 22.66 | 22.62 |
| 300 g | Thawed at −1° C. | 18.59 | 18.51 | 18.60 | 18.65 | 18.62 | 18.59 |
| | Thawed at 0° C. | 16.53 | 16.52 | 16.68 | 16.61 | 16.67 | 16.60 |
| | Thawed at −2° C. | 22.56 | 22.66 | 22.59 | 22.66 | 22.68 | 22.63 |
| 400 g | Thawed at −1° C. | 18.59 | 18.58 | 18.59 | 18.67 | 18.62 | 18.61 |
| | Thawed at 0° C. | 16.67 | 16.67 | 16.63 | 16.66 | 16.62 | 16.65 |
| | Thawed at −2° C. | 22.59 | 22.59 | 22.69 | 22.61 | 22.63 | 22.62 |
| 500 g | Thawed at −1° C. | 18.51 | 18.63 | 18.59 | 18.64 | 18.59 | 18.59 |
| | Thawed at 0° C. | 16.52 | 16.60 | 16.56 | 16.57 | 16.59 | 16.57 |
| | Thawed at −2° C. | 22.51 | 22.69 | 22.63 | 22.61 | 22.64 | 22.61 |

(4) Experiments on beef of 100 g, 200 g, 300 g, 400 g, and 500 g respectively, of which a process and a method are same as that of pork tenderloin of 100 g, 200 g, 300 g, 400 g, and 500 g, and can refer to descriptions of the above process and method corresponding to pork tenderloin of 100 g, 200 g, 300 g, 400 g, and 500 g, which is not described in detail herein. Experimental data of 5 parallel experiments are selected from a plurality of experiments by the inventors and shown in Table 52 below.

TABLE 52 beef

| | | parallel 1 | parallel 2 | parallel 3 | parallel 4 | parallel 5 | Mean value |
|---|---|---|---|---|---|---|---|
| 100 g | Thawed at −1° C. | 17.55 | 17.63 | 17.65 | 17.66 | 17.51 | 17.60 |
| | Thawed at 0° C. | 15.17 | 15.05 | 15.05 | 15.20 | 15.04 | 15.10 |
| | Thawed at −2° C. | 21.63 | 21.68 | 21.69 | 21.67 | 21.69 | 21.67 |
| 200 g | Thawed at −1° C. | 17.61 | 17.59 | 17.59 | 17.66 | 17.50 | 17.59 |
| | Thawed at 0° C. | 15.06 | 15.01 | 15.15 | 15.08 | 15.03 | 15.06 |
| | Thawed at −2° C. | 21.55 | 21.68 | 21.67 | 21.53 | 21.52 | 21.59 |
| 300 g | Thawed at −1° C. | 17.70 | 17.63 | 17.58 | 17.61 | 17.61 | 17.63 |
| | Thawed at 0° C. | 15.19 | 15.08 | 15.09 | 15.10 | 15.02 | 15.10 |
| | Thawed at −2° C. | 21.62 | 21.52 | 21.66 | 21.67 | 21.50 | 21.59 |
| 400 g | Thawed at −1° C. | 17.53 | 17.50 | 17.57 | 17.67 | 17.63 | 17.58 |
| | Thawed at 0° C. | 15.15 | 15.06 | 15.19 | 15.12 | 15.16 | 15.13 |
| | Thawed at −2° C. | 21.52 | 21.68 | 21.57 | 21.59 | 21.52 | 21.58 |
| 500 g | Thawed at −1° C. | 17.57 | 17.66 | 17.64 | 17.55 | 17.64 | 17.61 |
| | Thawed at 0° C. | 15.07 | 15.17 | 15.06 | 15.08 | 15.14 | 15.10 |
| | Thawed at −2° C. | 21.62 | 21.55 | 21.59 | 21.61 | 21.54 | 21.58 |

Figure 20:
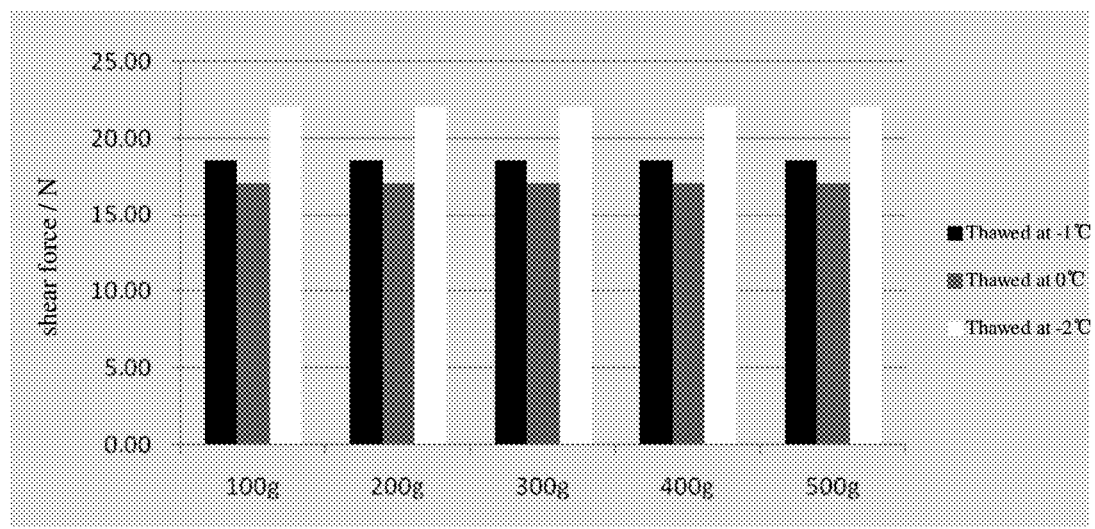
FIG. 20 (a) is a schematic diagram of shear forces of pork tenderloin with different weights thawed at different temperatures at thawing endpoint according to an embodiment of the present disclosure.
Figure 20:
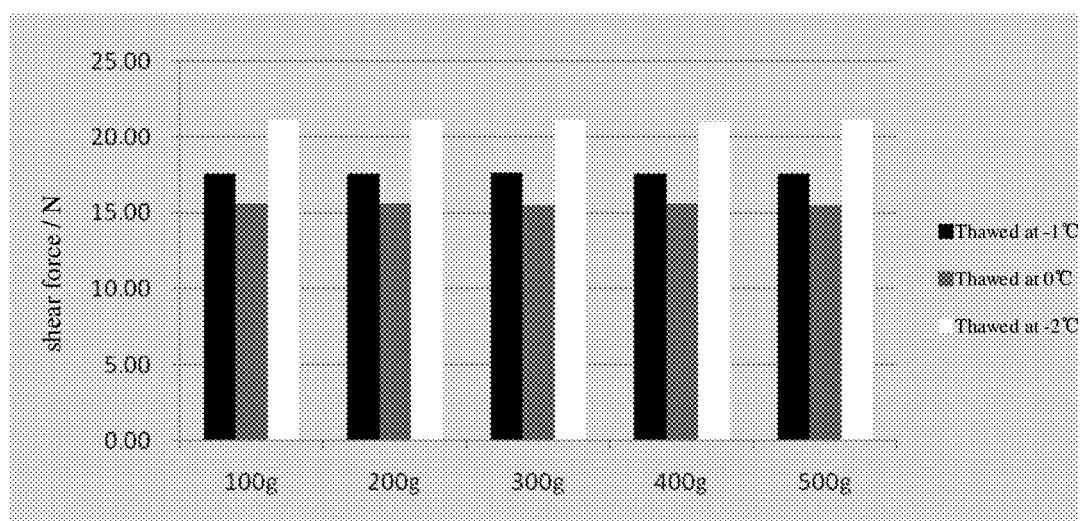
Figure 20:
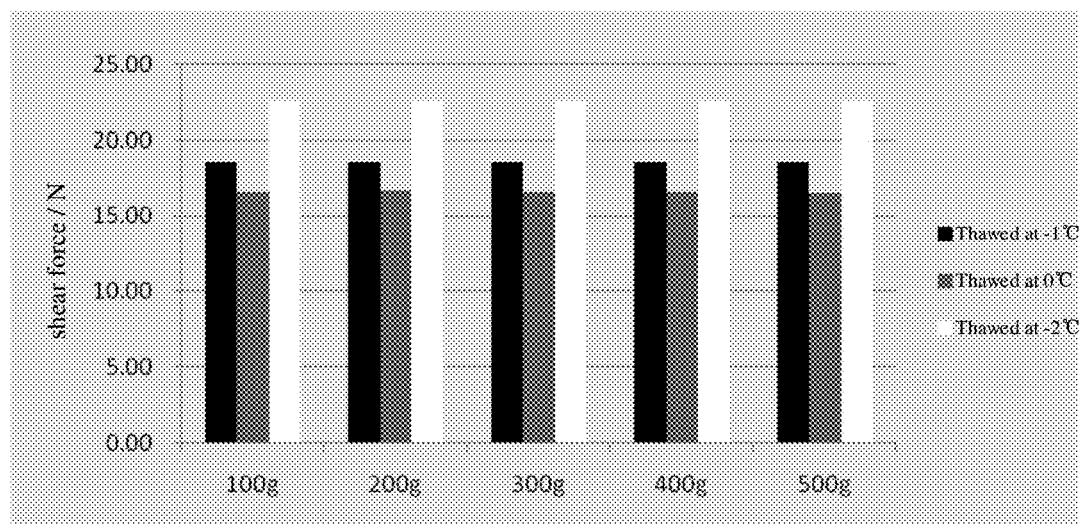
Figure 20:
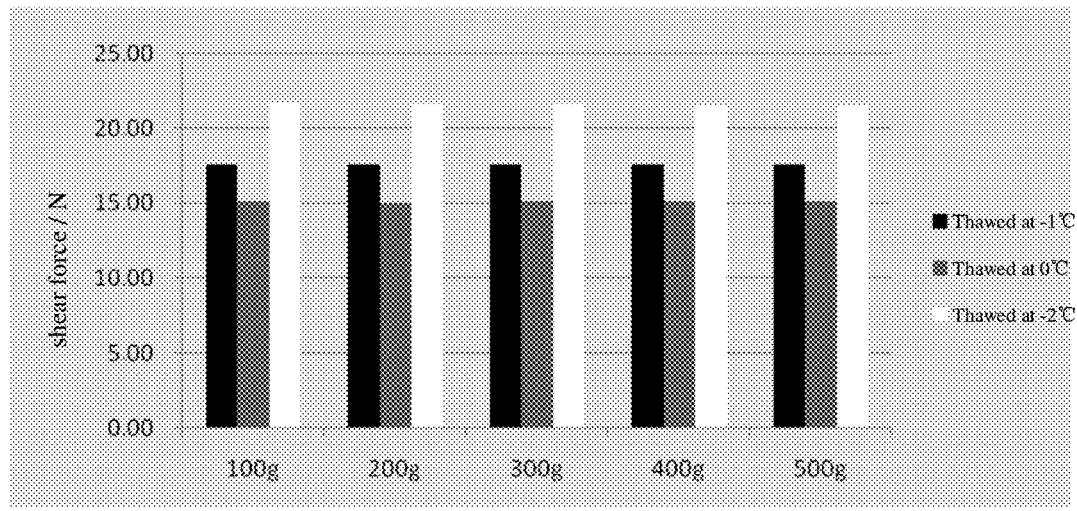

2. Experiment results. FIG. 20 (a) is a diagram drawn according to each group of mean values in Table 49, FIG. 20(b) is a diagram drawn according to each group of mean values in Table 50, FIG. 20(c) is a diagram drawn according to each group of mean values in Table 51 and FIG. 20(d) is a diagram drawn according to each group of mean values in Table 52. It can be seen from FIG. 20(a), FIG. 20(b), FIG. 20(c) and FIG. 20(d) that, after thawing, the shear force varies with the kind of the food, the weight of the food, and the temperature at thawing endpoint. The shear forces are slightly increased when the temperature of the food after thawing is about −1° C., relative to that when the temperature of the food after thawing is larger than 0° C. Therefore, the thawed food is easier to cut.

In embodiment 14, yellowness of the food thawed at −1° C. is analyzed.

1. Pork tenderloin, fish, chicken, and beef are selected as the food respectively, and 100 g (gram), 200 g, 300 g, 400 g, and 500 g are selected as weights of each kind of the food.

(1) Experiments on pork tenderloin of 100 g, 200 g, 300 g, 400 g, and 500 g respectively. Firstly, pork tenderloin of 100 g, 200 g, 300 g, 400 g, and 500 g are put in the microwave oven to thaw respectively. The temperatures of the food in the microwave oven are maintained at different thawing endpoints (i.e. thawed at temperatures of −1° C., 0° C., and −2° C.). And then, yellowness of pork tenderloin of 100 g, 200 g, 300 g, 400 g and 500 g respectively thawed at different thawing endpoints ((i.e. thawed at temperatures of −1° C., 0° C., and −2° C.) are measured by a color difference meter respectively. Experimental data of 5 parallel experiments are selected from a plurality of experiments by the inventors and shown in Table 53 below.

TABLE 53

| | | parallel 1 | parallel 2 | parallel 3 | parallel 4 | parallel 5 | Mean value |
|---|---|---|---|---|---|---|---|
| | pork tenderloin | | | | | | |
| 100 g | Thawed at −1° C. | 3.95 | 3.93 | 3.91 | 3.86 | 3.97 | 3.92 |
| | Thawed at 0° C. | 11.58 | 11.68 | 11.56 | 11.64 | 11.59 | 11.61 |
| | Thawed at −2° C. | 3.92 | 3.93 | 3.92 | 3.81 | 3.93 | 3.90 |
| 200 g | Thawed at −1° C. | 3.81 | 3.97 | 3.89 | 3.82 | 3.94 | 3.89 |
| | Thawed at 0° C. | 11.64 | 11.58 | 11.67 | 11.60 | 11.69 | 11.64 |
| | Thawed at −2° C. | 3.89 | 3.92 | 3.93 | 3.91 | 3.86 | 3.90 |
| 300 g | Thawed at −1° C. | 3.83 | 3.98 | 3.94 | 3.89 | 3.88 | 3.91 |
| | Thawed at 0° C. | 11.64 | 11.56 | 11.70 | 11.51 | 11.53 | 11.59 |
| | Thawed at −2° C. | 3.86 | 3.96 | 3.95 | 3.85 | 3.88 | 3.90 |
| 400 g | Thawed at −1° C. | 3.86 | 3.94 | 3.93 | 3.98 | 3.83 | 3.91 |
| | Thawed at 0° C. | 11.53 | 11.68 | 11.50 | 11.60 | 11.64 | 11.59 |
| | Thawed at −2° C. | 3.82 | 3.83 | 3.90 | 3.93 | 3.88 | 3.87 |
| 500 g | Thawed at −1° C. | 3.86 | 3.93 | 3.96 | 3.92 | 3.86 | 3.91 |
| | Thawed at 0° C. | 11.65 | 11.54 | 11.57 | 11.54 | 11.55 | 11.57 |
| | Thawed at −2° C. | 3.95 | 3.92 | 3.81 | 3.97 | 3.99 | 3.93 |

(2) Experiments on fish of 100 g, 200 g, 300 g, 400 g, and 500 g respectively, of which a process and a method are same as that of pork tenderloin of 100 g, 200 g, 300 g, 400 g, and 500 g, and can refer to descriptions of the above process and method corresponding to pork tenderloin of 100 g, 200 g, 300 g, 400 g, and 500 g, which is not described in detail herein. Experimental data of 5 parallel experiments are selected from a plurality of experiments by the inventors and shown in in Table 54 below.

TABLE 54

| | | parallel 1 | parallel 2 | parallel 3 | parallel 4 | parallel 5 | Mean value |
|---|---|---|---|---|---|---|---|
| | fish | | | | | | |
| 100 g | Thawed at −1° C. | 2.65 | 2.50 | 2.69 | 2.65 | 2.68 | 2.63 |
| | Thawed at 0° C. | 10.62 | 10.68 | 10.69 | 10.65 | 10.68 | 10.66 |
| | Thawed at −2° C. | 2.61 | 2.51 | 2.60 | 2.63 | 2.53 | 2.57 |
| 200 g | Thawed at −1° C. | 2.62 | 2.55 | 2.66 | 2.54 | 2.65 | 2.60 |
| | Thawed at 0° C. | 10.53 | 10.57 | 10.55 | 10.50 | 10.53 | 10.54 |
| | Thawed at −2° C. | 2.57 | 2.53 | 2.56 | 2.66 | 2.51 | 2.57 |
| 300 g | Thawed at −1° C. | 2.59 | 2.60 | 2.68 | 2.64 | 2.61 | 2.62 |
| | Thawed at 0° C. | 10.61 | 10.61 | 10.66 | 10.65 | 10.61 | 10.63 |
| | Thawed at −2° C. | 2.56 | 2.52 | 2.57 | 2.52 | 2.68 | 2.57 |
| 400 g | Thawed at −1° C. | 2.58 | 2.50 | 2.65 | 2.54 | 2.60 | 2.57 |
| | Thawed at 0° C. | 10.69 | 10.63 | 10.70 | 10.57 | 10.68 | 10.65 |
| | Thawed at −2° C. | 2.68 | 2.66 | 2.61 | 2.54 | 2.68 | 2.63 |
| 500 g | Thawed at −1° C. | 2.66 | 2.67 | 2.69 | 2.69 | 2.55 | 2.65 |
| | Thawed at 0° C. | 10.63 | 10.70 | 10.50 | 10.62 | 10.66 | 10.62 |
| | Thawed at −2° C. | 2.52 | 2.54 | 2.52 | 2.55 | 2.64 | 2.55 |

(3) Experiments on chicken of 100 g, 200 g, 300 g, 400 g, and 500 g respectively, of which a process and a method are same as that of pork tenderloin of 100 g, 200 g, 300 g, 400 g, and 500 g, and can refer to descriptions of the above process and method corresponding to pork tenderloin of 100 g, 200 g, 300 g, 400 g, and 500 g, which is not described in detail herein. Experimental data of 5 parallel experiments are selected from a plurality of experiments by the inventors and shown in Table 55 below.

TABLE 55 chicken

|  |  | parallel 1 | parallel 2 | parallel 3 | parallel 4 | parallel 5 | Mean value |
|---|---|---|---|---|---|---|---|
| 100 g | Thawed at −1° C. | 4.30 | 4.19 | 4.20 | 4.19 | 4.20 | 4.22 |
|  | Thawed at 0° C. | 13.65 | 4.28 | 4.28 | 4.14 | 4.20 | 6.11 |
|  | Thawed at −2° C. | 4.24 | 4.17 | 4.17 | 4.17 | 4.12 | 4.18 |
| 200 g | Thawed at −1° C. | 4.23 | 4.18 | 4.21 | 4.28 | 4.25 | 4.23 |
|  | Thawed at 0° C. | 13.61 | 4.10 | 4.12 | 4.20 | 4.25 | 6.06 |
|  | Thawed at −2° C. | 4.21 | 4.21 | 4.13 | 4.29 | 4.12 | 4.19 |
| 300 g | Thawed at −1° C. | 4.19 | 4.26 | 4.30 | 4.29 | 4.11 | 4.23 |
|  | Thawed at 0° C. | 13.72 | 4.24 | 4.19 | 4.18 | 4.12 | 6.09 |
|  | Thawed at −2° C. | 4.30 | 4.24 | 4.27 | 4.16 | 4.18 | 4.23 |
| 400 g | Thawed at −1° C. | 4.14 | 4.16 | 4.18 | 4.16 | 4.29 | 4.19 |
|  | Thawed at 0° C. | 13.71 | 4.10 | 4.15 | 4.30 | 4.21 | 6.09 |
|  | Thawed at −2° C. | 4.28 | 4.21 | 4.24 | 4.28 | 4.13 | 4.23 |
| 500 g | Thawed at −1° C. | 4.25 | 4.17 | 4.19 | 4.26 | 4.15 | 4.20 |
|  | Thawed at 0° C. | 13.61 | 4.29 | 4.19 | 4.29 | 4.21 | 6.12 |
|  | Thawed at −2° C. | 4.15 | 4.19 | 4.11 | 4.16 | 4.10 | 4.14 |

(4) Experiments on beef of 100 g, 200 g, 300 g, 400 g, and 500 g respectively, of which a process and a method are same as that of pork tenderloin of 100 g, 200 g, 300 g, 400 g, and 500 g, and can refer to descriptions of the above process and method corresponding to pork tenderloin of 100 g, 200 g, 300 g, 400 g, and 500 g, which is not described in detail herein. Experimental data of 5 parallel experiments are selected from a plurality of experiments by the inventors and shown in Table 56 below.

TABLE 56 beef

|  |  | parallel 1 | parallel 2 | parallel 3 | parallel 4 | parallel 5 | Mean value |
|---|---|---|---|---|---|---|---|
| 100 g | Thawed at −1° C. | 2.12 | 2.07 | 2.08 | 2.06 | 2.18 | 2.10 |
|  | Thawed at 0° C. | 11.01 | 11.20 | 11.17 | 11.00 | 11.09 | 11.09 |
|  | Thawed at −2° C. | 2.09 | 2.06 | 2.16 | 2.14 | 2.08 | 2.11 |
| 200 g | Thawed at −1° C. | 2.20 | 2.10 | 2.02 | 2.09 | 2.13 | 2.11 |
|  | Thawed at 0° C. | 11.09 | 11.11 | 11.14 | 11.04 | 11.01 | 11.08 |
|  | Thawed at −2° C. | 2.11 | 2.09 | 2.04 | 2.09 | 2.14 | 2.09 |
| 300 g | Thawed at −1° C. | 2.06 | 2.09 | 2.08 | 2.02 | 2.01 | 2.05 |
|  | Thawed at 0° C. | 11.19 | 11.08 | 11.12 | 11.03 | 11.18 | 11.12 |
|  | Thawed at −2° C. | 2.13 | 2.02 | 2.06 | 2.02 | 2.05 | 2.06 |
| 400 g | Thawed at −1° C. | 2.19 | 2.16 | 2.06 | 2.02 | 2.08 | 2.10 |
|  | Thawed at 0° C. | 11.11 | 11.15 | 11.20 | 11.10 | 11.15 | 11.14 |
|  | Thawed at −2° C. | 2.04 | 2.15 | 2.00 | 2.16 | 2.10 | 2.09 |
| 500 g | Thawed at −1° C. | 2.17 | 2.14 | 2.03 | 2.18 | 2.00 | 2.10 |
|  | Thawed at 0° C. | 11.18 | 11.11 | 11.19 | 11.08 | 11.00 | 11.11 |
|  | Thawed at −2° C. | 2.07 | 2.13 | 2.03 | 2.13 | 2.02 | 2.08 |

Figure 21:
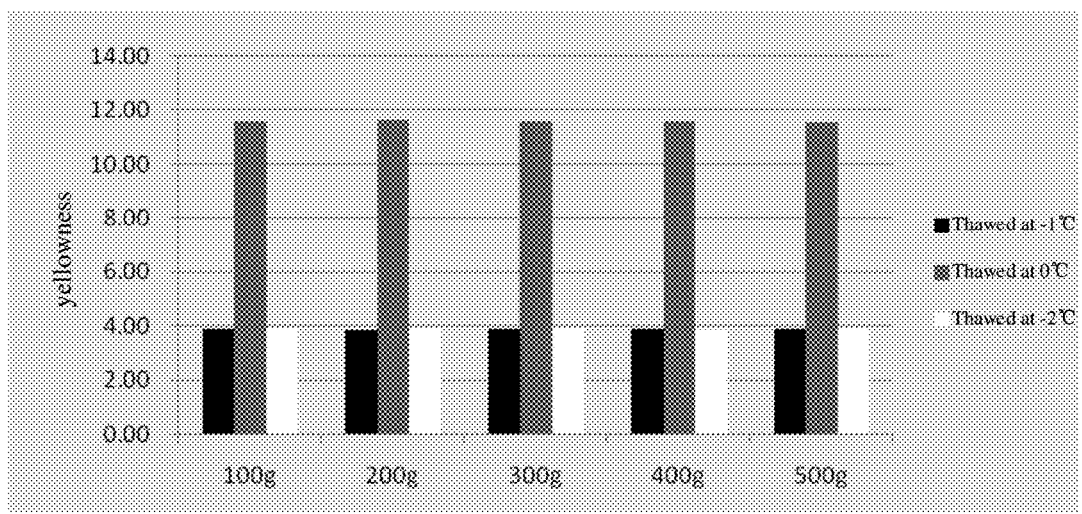
FIG. 21 (a) is a schematic diagram of yellowness of pork tenderloin with different weights thawed at different temperatures at thawing endpoint according to an embodiment of the present disclosure.
Figure 21:
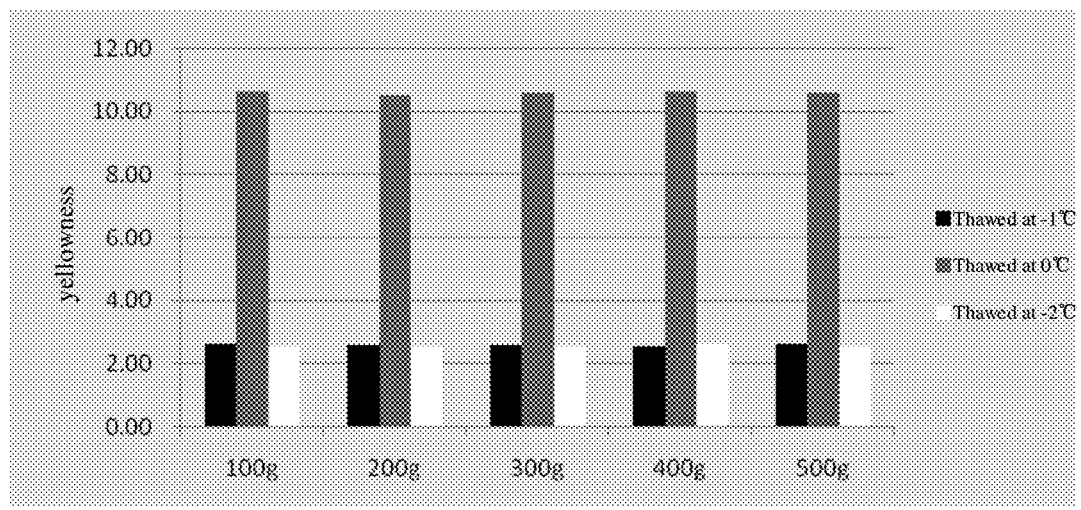
Figure 21:
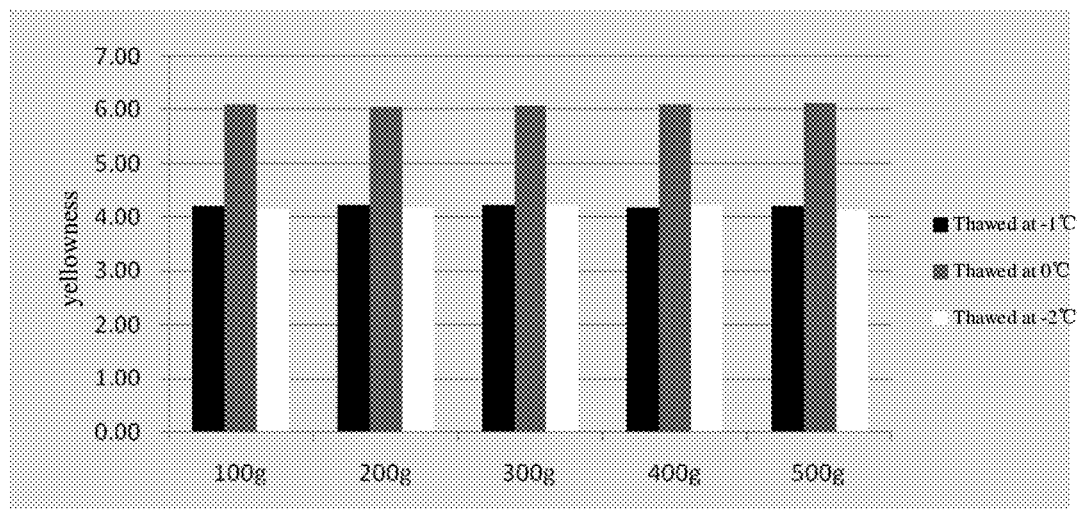
Figure 21:
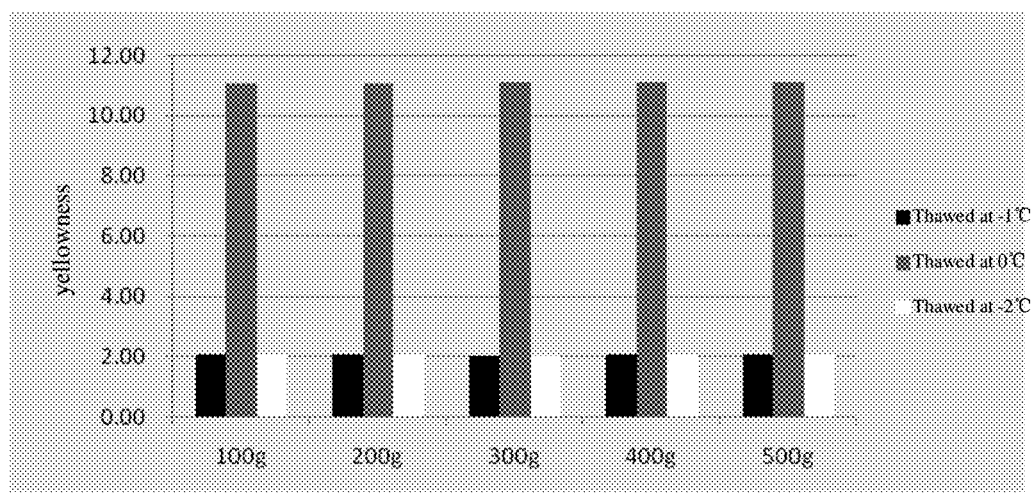

2. Experiment results. FIG. 21 (a) is a diagram drawn according to each group of mean values in Table 53, FIG. 21(b) is a diagram drawn according to each group of mean values in Table 54, FIG. 21(c) is a diagram drawn according to each group of mean values in Table 55 and FIG. 21(d) is a diagram drawn according to each group of mean values in Table 56. It can be seen from FIG. 21(a), FIG. 21(b), FIG. 21(c) and FIG. 21(d) that, after thawing, the yellowness varies with the kind of the food, the weight of the food, and the temperature at thawing endpoint. The yellowness is significantly increased when the temperature of the food after thawing is above 0° C., indicating that parts of the food has been discolored and has been cooked, relative to that when the temperature of the food after thawing is above −1° C.

In embodiment 15, aerobic plate counts of food thawed at −1° C. are analyzed.

1. Pork tenderloin, fish, chicken, and beef are selected as the food respectively, and 100 g (gram), 200 g, 300 g, 400 g, and 500 g are selected as weights of each kind of the food.

(1) Experiments on pork tenderloin of 100 g, 200 g, 300 g, 400 g, and 500 g respectively. Firstly, pork tenderloin of 100 g, 200 g, 300 g, 400 g, and 500 g are put in the microwave oven to thaw respectively. The temperatures of the food in the microwave oven are maintained at different thawing endpoints (i.e. thawed at temperatures of −1° C., 0° C., and −2° C.). And then, aerobic plate counts of pork tenderloin of 100 g, 200 g, 300 g, 400 g and 500 g respectively thawed at different thawing endpoints (i.e. thawed at temperatures of −1° C., 0° C., and −2° C.) are measured by a diluted cultivation counting method respectively. Experimental data of 5 parallel experiments are selected from a plurality of experiments by the inventors and shown in Table 57 below.

TABLE 57 pork tenderloin

| | | parallel 1 | parallel 2 | parallel 3 | parallel 4 | parallel 5 | Mean value |
|---|---|---|---|---|---|---|---|
| 100 g | Thawed at −1° C. | 5.64E+04 | 5.80E+04 | 5.62E+04 | 5.78E+04 | 5.73E+04 | 5.71E+04 |
| | Thawed at 0° C. | 2.68E+05 | 2.64E+05 | 2.63E+05 | 2.55E+05 | 2.51E+05 | 2.60E+05 |
| | Thawed at −2° C. | 5.61E+04 | 5.66E+04 | 5.66E+04 | 5.66E+04 | 5.74E+04 | 5.67E+04 |
| 200 g | Thawed at −1° C. | 5.74E+04 | 5.77E+04 | 5.61E+04 | 5.78E+04 | 5.65E+04 | 5.71E+04 |
| | Thawed at 0° C. | 2.54E+05 | 2.70E+05 | 2.57E+05 | 2.63E+05 | 2.69E+05 | 2.62E+05 |
| | Thawed at −2° C. | 5.70E+04 | 5.61E+04 | 5.70E+04 | 5.77E+04 | 5.74E+04 | 5.70E+04 |
| 300 g | Thawed at −1° C. | 5.78E+04 | 5.80E+04 | 5.76E+04 | 5.78E+04 | 5.75E+04 | 5.77E+04 |
| | Thawed at 0° C. | 2.52E+05 | 2.67E+05 | 2.61E+05 | 2.64E+05 | 2.53E+05 | 2.59E+05 |
| | Thawed at −2° C. | 5.78E+04 | 5.77E+04 | 5.77E+04 | 5.77E+04 | 5.73E+04 | 5.76E+04 |
| 400 g | Thawed at −1° C. | 5.73E+04 | 5.76E+04 | 5.75E+04 | 5.65E+04 | 5.77E+04 | 5.73E+04 |
| | Thawed at 0° C. | 2.69E+05 | 2.68E+05 | 2.65E+05 | 2.59E+05 | 2.56E+05 | 2.63E+05 |
| | Thawed at −2° C. | 5.72E+04 | 5.62E+04 | 5.71E+04 | 5.69E+04 | 5.79E+04 | 5.71E+04 |
| 500 g | Thawed at −1° C. | 5.61E+04 | 5.74E+04 | 5.79E+04 | 5.70E+04 | 5.66E+04 | 5.70E+04 |
| | Thawed at 0° C. | 2.65E+05 | 2.51E+05 | 2.70E+05 | 2.64E+05 | 2.56E+05 | 2.61E+05 |
| | Thawed at −2° C. | 5.76E+04 | 5.66E+04 | 5.63E+04 | 5.69E+04 | 5.79E+04 | 5.71E+04 |

(2) Experiments on fish of 100 g, 200 g, 300 g, 400 g, and 500 g respectively, of which a process and a method are same as that of pork tenderloin of 100 g, 200 g, 300 g, 400 g, and 500 g, and can refer to descriptions of the above process and method corresponding to pork tenderloin of 100 g, 200 g, 300 g, 400 g, and 500 g, which is not described in detail herein. Experimental data of 5 parallel experiments are selected from a plurality of experiments by the inventors and shown in Table 58 below.

TABLE 58 fish

| | | parallel 1 | parallel 2 | parallel 3 | parallel 4 | parallel 5 | Mean value |
|---|---|---|---|---|---|---|---|
| 100 g | Thawed at −1° C. | 6.11E+04 | 6.08E+04 | 6.01E+04 | 6.03E+04 | 6.02E+04 | 6.05E+04 |
| | Thawed at 0° C. | 1.77E+05 | 1.75E+05 | 1.78E+05 | 1.76E+05 | 1.77E+05 | 1.77E+05 |
| | Thawed at −2° C. | 6.04E+04 | 6.02E+04 | 6.06E+04 | 6.14E+04 | 6.03E+04 | 6.06E+04 |
| 200 g | Thawed at −1° C. | 6.11E+04 | 6.12E+04 | 6.16E+04 | 6.16E+04 | 6.13E+04 | 6.14E+04 |
| | Thawed at 0° C. | 1.75E+05 | 1.80E+05 | 1.79E+05 | 1.74E+05 | 1.64E+05 | 1.74E+05 |
| | Thawed at −2° C. | 6.05E+04 | 6.03E+04 | 6.11E+04 | 6.15E+04 | 6.02E+04 | 6.07E+04 |
| 300 g | Thawed at −1° C. | 6.08E+04 | 6.03E+04 | 6.07E+04 | 6.02E+04 | 6.02E+04 | 6.05E+04 |
| | Thawed at 0° C. | 1.65E+05 | 1.62E+05 | 1.67E+05 | 1.73E+05 | 1.74E+05 | 1.68E+05 |
| | Thawed at −2° C. | 6.13E+04 | 6.02E+04 | 6.15E+04 | 6.20E+04 | 6.02E+04 | 6.10E+04 |
| 400 g | Thawed at −1° C. | 6.19E+04 | 6.10E+04 | 6.07E+04 | 6.01E+04 | 6.04E+04 | 6.08E+04 |
| | Thawed at 0° C. | 1.77E+05 | 1.77E+05 | 1.64E+05 | 1.71E+05 | 1.73E+05 | 1.72E+05 |
| | Thawed at −2° C. | 6.02E+04 | 6.19E+04 | 6.06E+04 | 6.01E+04 | 6.05E+04 | 6.07E+04 |
| 500 g | Thawed at −1° C. | 6.02E+04 | 6.12E+04 | 6.18E+04 | 6.06E+04 | 6.13E+04 | 6.10E+04 |
| | Thawed at 0° C. | 1.65E+05 | 1.63E+05 | 1.79E+05 | 1.74E+05 | 1.75E+05 | 1.71E+05 |
| | Thawed at −2° C. | 6.12E+04 | 6.16E+04 | 6.04E+04 | 6.09E+04 | 6.11E+04 | 6.11E+04 |

(3) Experiments on chicken of 100 g, 200 g, 300 g, 400 g, and 500 g respectively, of which a process and a method are same as that of pork tenderloin of 100 g, 200 g, 300 g, 400 g, and 500 g, and can refer to descriptions of the above process and method corresponding to pork tenderloin of 100 g, 200 g, 300 g, 400 g, and 500 g, which is not described in detail herein. Experimental data of 5 parallel experiments are selected from a plurality of experiments by the inventors and shown in Table 59 below.

TABLE 59 chicken

| | | parallel 1 | parallel 2 | parallel 3 | parallel 4 | parallel 5 | Mean value |
|---|---|---|---|---|---|---|---|
| 100 g | Thawed at −1° C. | 7.20E+04 | 7.17E+04 | 7.18E+04 | 7.03E+04 | 7.10E+04 | 7.13E+04 |
| | Thawed at 0° C. | 3.09E+05 | 3.17E+05 | 3.15E+05 | 3.08E+05 | 3.07E+05 | 3.11E+05 |
| | Thawed at −2° C. | 7.14E+04 | 7.12E+04 | 7.18E+04 | 7.07E+04 | 7.13E+04 | 7.13E+04 |
| 200 g | Thawed at −1° C. | 7.03E+04 | 7.14E+04 | 7.01E+04 | 7.16E+04 | 7.18E+04 | 7.11E+04 |
| | Thawed at 0° C. | 3.06E+05 | 3.02E+05 | 3.03E+05 | 3.14E+05 | 3.11E+05 | 3.07E+05 |
| | Thawed at −2° C. | 7.19E+04 | 7.11E+04 | 7.09E+04 | 7.05E+04 | 7.18E+04 | 7.12E+04 |
| 300 g | Thawed at −1° C. | 7.13E+04 | 7.04E+04 | 7.08E+04 | 7.05E+04 | 7.08E+04 | 7.08E+04 |
| | Thawed at 0° C. | 3.06E+05 | 3.13E+05 | 3.07E+05 | 3.09E+05 | 3.05E+05 | 3.08E+05 |
| | Thawed at −2° C. | 7.01E+04 | 7.17E+04 | 7.15E+04 | 7.06E+04 | 7.05E+04 | 7.09E+04 |

TABLE 59-continued

| | | parallel 1 | parallel 2 | parallel 3 | parallel 4 | parallel 5 | Mean value |
|---|---|---|---|---|---|---|---|
| | | | | chicken | | | |
| 400 g | Thawed at −1° C. | 7.13E+04 | 7.02E+04 | 7.10E+04 | 7.01E+04 | 7.16E+04 | 7.08E+04 |
| | Thawed at 0° C. | 3.08E+05 | 3.01E+05 | 3.08E+05 | 3.14E+05 | 3.20E+05 | 3.10E+05 |
| | Thawed at −2° C. | 7.19E+04 | 7.07E+04 | 7.11E+04 | 7.18E+04 | 7.00E+04 | 7.11E+04 |
| 500 g | Thawed at −1° C. | 7.19E+04 | 7.18E+04 | 7.17E+04 | 7.14E+04 | 7.17E+04 | 7.17E+04 |
| | Thawed at 0° C. | 3.16E+05 | 3.17E+05 | 3.18E+05 | 3.11E+05 | 3.02E+05 | 3.13E+05 |
| | Thawed at −2° C. | 7.15E+04 | 7.12E+04 | 7.15E+04 | 7.13E+04 | 7.06E+04 | 7.12E+04 |

(4) Experiments on beef of 100 g, 200 g, 300 g, 400 g, and 500 g respectively, of which a process and a method are same as that of pork tenderloin of 100 g, 200 g, 300 g, 400 g, and 500 g, and can refer to descriptions of the above process and method corresponding to pork tenderloin of 100 g, 200 g, 300 g, 400 g, and 500 g, which is not described in detail herein. Experimental data of 5 parallel experiments are selected from a plurality of experiments by the inventors and shown in Table 60 below.

TABLE 60

| | | parallel 1 | parallel 2 | parallel 3 | parallel 4 | parallel 5 | Mean value |
|---|---|---|---|---|---|---|---|
| | | | | beef | | | |
| 100 g | Thawed at −1° C. | 4.04E+04 | 4.13E+04 | 4.09E+04 | 4.13E+04 | 4.02E+04 | 4.08E+04 |
| | Thawed at 0° C. | 1.15E+05 | 1.18E+05 | 1.15E+05 | 1.13E+05 | 1.02E+05 | 1.13E+05 |
| | Thawed at −2° C. | 4.10E+04 | 4.00E+04 | 4.05E+04 | 4.02E+04 | 4.07E+04 | 4.05E+04 |
| 200 g | Thawed at −1° C. | 4.18E+04 | 4.09E+04 | 4.11E+04 | 4.06E+04 | 4.03E+04 | 4.09E+04 |
| | Thawed at 0° C. | 1.15E+05 | 1.04E+05 | 1.03E+05 | 1.13E+05 | 1.02E+05 | 1.08E+05 |
| | Thawed at −2° C. | 4.14E+04 | 4.08E+04 | 4.17E+04 | 4.10E+04 | 4.15E+04 | 4.13E+04 |
| 300 g | Thawed at −1° C. | 4.20E+04 | 4.04E+04 | 4.15E+04 | 4.01E+04 | 4.08E+04 | 4.10E+04 |
| | Thawed at 0° C. | 1.07E+05 | 1.03E+05 | 1.13E+05 | 1.09E+05 | 1.14E+05 | 1.09E+05 |
| | Thawed at −2° C. | 4.16E+04 | 4.10E+04 | 4.12E+04 | 4.19E+04 | 4.18E+04 | 4.15E+04 |
| 400 g | Thawed at −1° C. | 4.10E+04 | 4.13E+04 | 4.00E+04 | 4.17E+04 | 4.17E+04 | 4.12E+04 |
| | Thawed at 0° C. | 1.10E+05 | 1.16E+05 | 1.19E+05 | 1.18E+05 | 1.15E+05 | 1.16E+05 |
| | Thawed at −2° C. | 4.09E+04 | 4.13E+04 | 4.11E+04 | 4.05E+04 | 4.01E+04 | 4.08E+04 |
| 500 g | Thawed at −1° C. | 4.06E+04 | 4.17E+04 | 4.03E+04 | 4.19E+04 | 4.07E+04 | 4.10E+04 |
| | Thawed at 0° C. | 1.07E+05 | 1.01E+05 | 1.17E+05 | 1.17E+05 | 1.09E+05 | 1.10E+05 |
| | Thawed at −2° C. | 4.16E+04 | 4.14E+04 | 4.14E+04 | 4.16E+04 | 4.14E+04 | 4.15E+04 |

Figure 22:
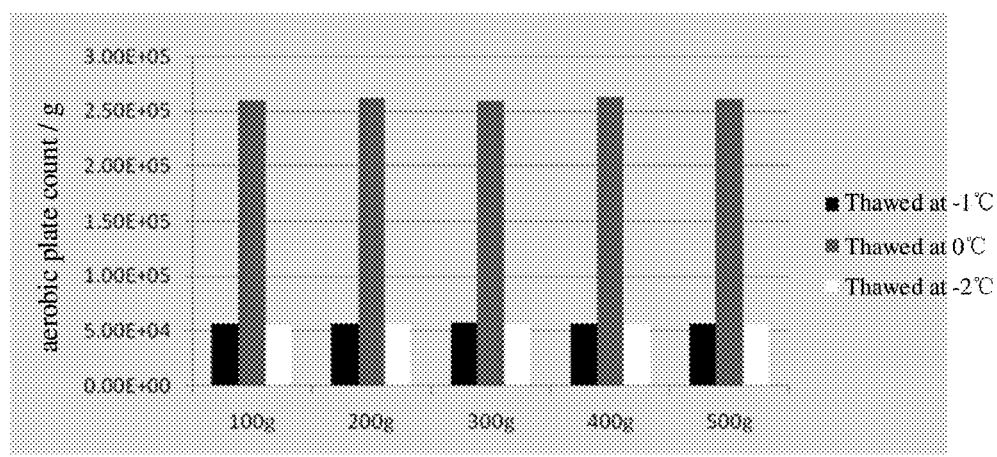
FIG. 22 (a) is a schematic diagram of aerobic plate counts of pork tenderloin with different weights thawed at different temperatures at thawing endpoint according to an embodiment of the present disclosure.
Figure 22:
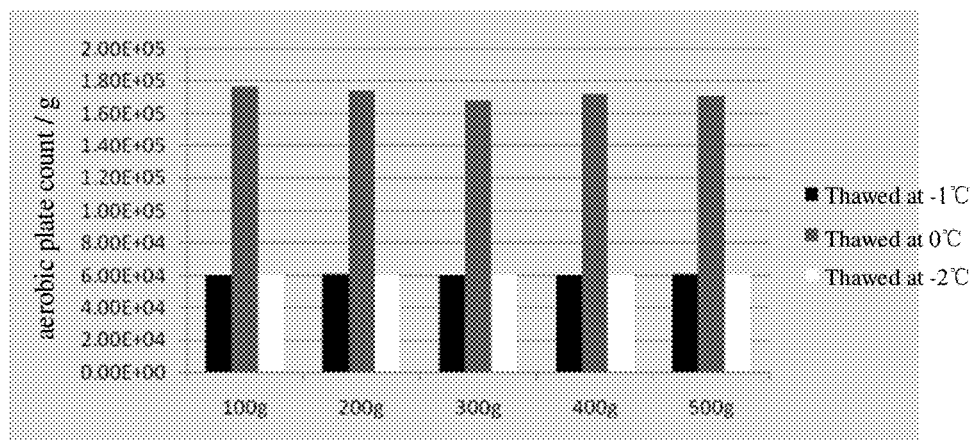
Figure 22:
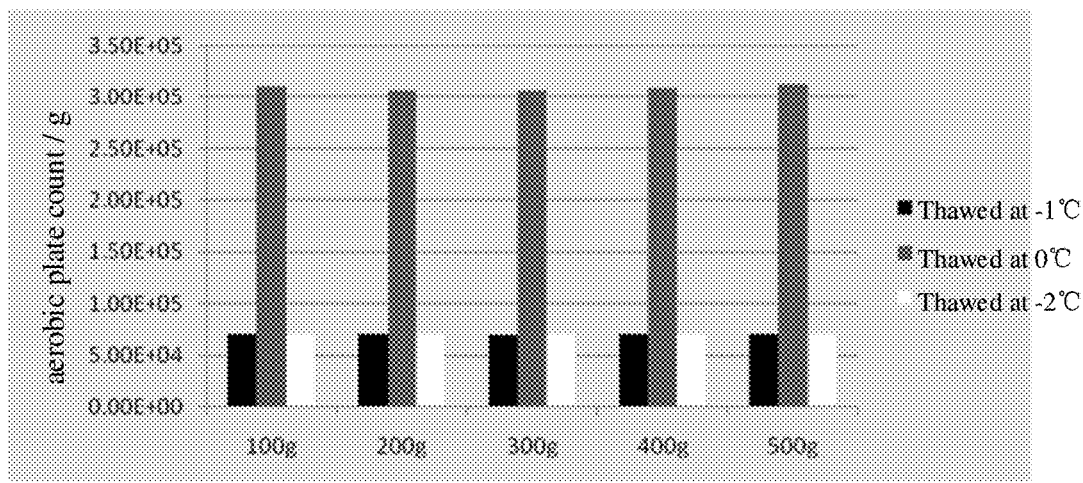
Figure 22:
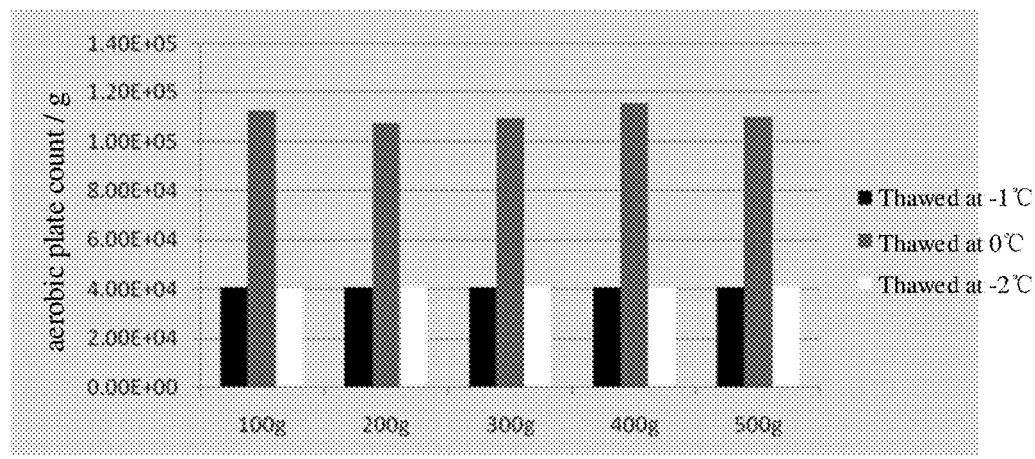

2. Experiment results: FIG. 22(*a*) shows a diagram drawn on the basic of each group of mean values in Table 57, FIG. 22(*b*) shows a diagram drawn on the basic of each group of mean values in Table 58, FIG. 22(*c*) shows a diagram drawn on the basic of each group of mean values in Table 59 and FIG. 22(*d*) shows a diagram drawn on the basic of each group of mean values in Table 60. It can be seen from FIG. 22(*a*), FIG. 22(*b*), FIG. 22(*c*) and FIG. 22(*d*) that the aerobic plate count after thawing varies with the temperature at thawing endpoint, the weight of the food and the kind of food. Further, the aerobic plate count of the food when the temperature after thawing is about −1° C. is significantly smaller than that when the temperature after thawing is above 0° C. It is because that the microbial propagation is slower when the temperature after thawing is lower. As a result, the thawed food (or the food after thawing) is healthier.

In conclusion, through lots of experiments and theoretical analysis, the inventors innovatively find that, by controlling the temperature of the food at about −1° C., the thawed food is more nutritious, healthier and easier to cut, and the temperature difference of the food is lower, and there is no cooked discoloration phenomenon. Therefore it is better to determine the optimal temperature at thawing endpoint as 1° C.

With the thawing control method for a microwave oven in embodiments of the present disclosure, the thawing instruction can be received first, then the thawing can be started, the temperature of the food in the microwave oven can be detected and the thawing condition can be controlled so that the temperature of the food in the microwave oven is maintained at −1° C. It is discovered innovatively that −1° C. can be the optimal temperature at thawing endpoint through a large number of experiments and theoretical, which has at least following advantages: (1) the thawed food is more nutritious; (2) the thawed food is healthier; (3) the thawed food has the lower temperature difference, and there is no cooked discoloration phenomenon; (4) the thawed food has the moderate shear force and is easier to cut and operate.

Corresponding to the thawing control method for a microwave oven in the above embodiments, another embodiment of the present disclosure also provides a thawing control device for a microwave oven. Since the thawing control device for a microwave oven in the embodiment of the present disclosure corresponds to the thawing control method for a microwave oven in the above embodiments of the present disclosure, implementations suitable for the thawing control method for a microwave oven are also applicable to the thawing control device for a microwave oven in the present embodiment, which will not be described in detail in the present embodiment.

Figure 23:
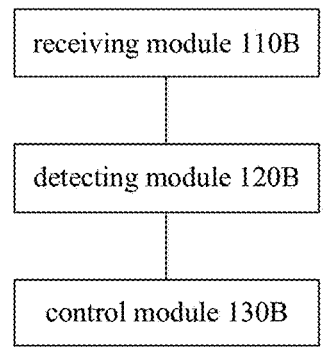
FIG. 23 is a block diagram of a thawing control device for a microwave oven according to an embodiment of the present disclosure.

FIG. 23 is a schematic diagram illustrating a thawing control device for a microwave oven according to an embodiment of the present disclosure. As shown in FIG. 23, the thawing control device for a microwave oven may include a receiving module 110B, a detecting module 120B, and a control module 130B.

In detail, the receiving module 110B can be configured to receive a thawing instruction. The detecting module 120B can be configured to start a thawing and to detect a temperature of food in the microwave oven. The control module 130B can be configured to control a thawing condition so that the temperature of the food in the microwave oven is maintained at −1° C. According to an embodiment of the present disclosure, the food may be meat or fish. In addition, controlling the thawing condition may specifically include controlling one or more of a period of thawing, heating power for thawing, a heating direction for thawing and the like.

With the thawing control device for a microwave oven in embodiments of the present disclosure, the detecting module may start the thawing and detect the temperature of the food in the microwave oven after the receiving module receives the thawing instruction, and the control module may control the thawing condition so that the temperature of the food in the microwave oven is maintained at −1° C. It is discovered innovatively that −1° C. can be the optimal temperature at thawing endpoint through a large number of experiments and theoretical analysis, which has at least following advantages: (1) the thawed food is more nutritious; (2) the thawed food is healthier; (3) the thawed food has the lower temperature difference, and there is no cooked discoloration phenomenon; (4) the thawed food has the moderate shear force and is easier to cut and operate.

Embodiments of the present disclosure also provide a microwave oven in order to achieve the above embodiments. The microwave oven includes the thawing control device in embodiments shown in FIG. 23.

With the microwave oven in embodiments of the present disclosure, the detecting module of the thawing control device may start the thawing and detect the temperature of the food in the microwave oven after the receiving module of the thawing control device receives the thawing instruction, and the control module of the thawing control may control the thawing condition so that the temperature of the food in the microwave oven is maintained at −1° C. It is discovered innovatively that −1° C. can be the optimal temperature at thawing endpoint through a large number of experiments and theoretical analysis, which has at least following advantages: (1) the thawed food is more nutritious; (2) the thawed food is healthier; (3) the thawed food has the lower temperature difference, and there is no cooked discoloration phenomenon; (4) the thawed food has the moderate shear force and is easier to cut and operate.

Alternatively, the thawing condition may also be controlled so that the temperature of the food in the microwave oven is maintained at −1° C. after thawing, at which moment the food may also be referred to as the thawed food of −1° C. In particular, an embodiment of the present disclosure also provides another thawing control method for a microwave oven.

Figure 24:
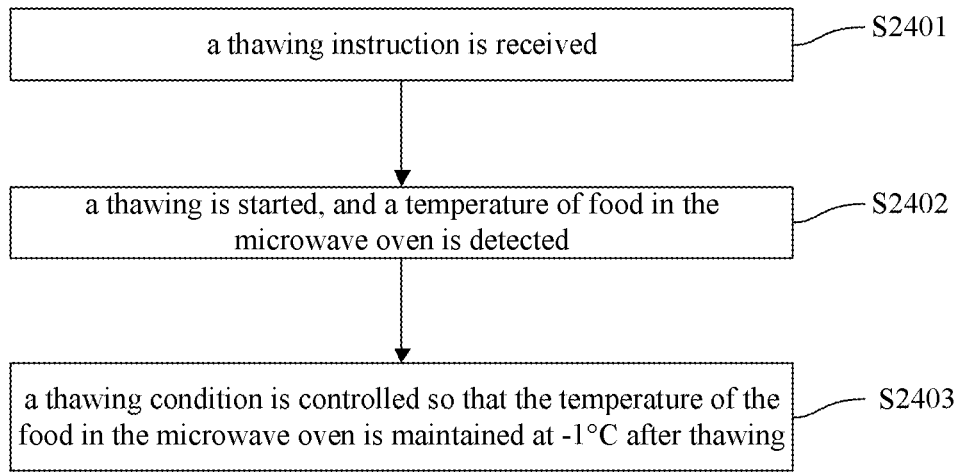
FIG. 24 is a flow chart of a thawing control method for a microwave oven according to another embodiment of the present disclosure.

FIG. 24 is a flow chart showing a thawing control method for a microwave oven according to another embodiment of the present disclosure. As shown in FIG. 24, the thawing control method for a microwave oven may include followings.

S2401, a thawing instruction is received.

S2402, a thawing is started, and a temperature of food in the microwave oven is detected.

According to an embodiment of the present disclosure, the food may be meat or fish.

S2403, a thawing condition is controlled so that the temperature of the food in the microwave oven is maintained at −1° C. after thawing.

According to an embodiment of the present disclosure, controlling the thawing condition may specifically include controlling one or more of a period of thawing, heating power for thawing, a heating direction for thawing and the like.

It should be noted that the thawing control method for a microwave oven provided in the present embodiment makes the food to the thawed food of −1° C., which has advantages that can be described in detail with reference to the above-described embodiments 9 to 15, and not discussed here.

With the thawing control method for a microwave oven in embodiments of the present disclosure, the thawing instruction can be received first, then the thawing can be started, the temperature of the food in the microwave oven can be detected and the thawing condition can be controlled so that the temperature of the food in the microwave oven is maintained at −1° C. after thawing. It is discovered innovatively that −1° C. can be the optimal temperature at thawing endpoint through a large number of experiments and theoretical analysis, which has at least following advantages: (1) the thawed food is more nutritious; (2) the thawed food is healthier; (3) the thawed food has the lower temperature difference, and there is no cooked discoloration phenomenon; (4) the thawed food has the moderate shear force and is easier to cut and operate.

Corresponding to the thawing control method for a microwave oven in the above embodiments, another embodiment of the present disclosure also provides a thawing control device for a microwave oven. Since the thawing control device for a microwave oven in the embodiment of the present disclosure corresponds to the thawing control method for a microwave oven in the above embodiments of the present disclosure, implementations suitable for the thawing control method for a microwave oven are also applicable to the thawing control device for a microwave oven in the present embodiment, which will not be described in detail in the present embodiment.

Figure 25:
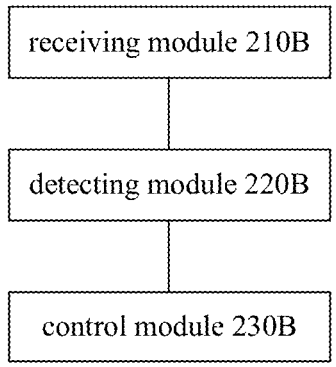
FIG. 25 is a block diagram of a thawing control device for a microwave oven according to another embodiment of the present disclosure.

FIG. 25 is a schematic diagram illustrating a thawing control device for a microwave oven according to another embodiment of the present disclosure. As shown in FIG. 25, the thawing control device for a microwave oven may include a receiving module 210B, a detecting module 220B, and a control module 230B.

In detail, the receiving module 210B is configured to receive a thawing instruction. The detecting module 220B is configured to start a thawing and to detect a temperature of food in the microwave oven. According to an embodiment of the present disclosure, the food may be meat or fish. The control module 230B is configured to control a thawing condition so that the temperature of the food in the microwave oven is maintained at −1° C. after thawing. According to an embodiment of the present disclosure, controlling the thawing condition may specifically include controlling one or more of a period of thawing, heating power for thawing, a heating direction for thawing and the like.

With the thawing control device for a microwave oven in embodiments of the present disclosure, the detecting module may start the thawing and detect the temperature of the food in the microwave oven after the receiving module receives the thawing instruction, and the control module may control the thawing condition so that the temperature of the food in the microwave oven is maintained at −1° C. after thawing. It is discovered innovatively that −1° C. can be the optimal temperature at thawing endpoint through a large number of experiments and theoretical analysis, which has at least following advantages: (1) the thawed food is more nutritious; (2) the thawed food is healthier; (3) the thawed food has the lower temperature difference, and there is no cooked discoloration phenomenon; (4) the thawed food has the moderate shear force and is easier to cut and operate.

Embodiments of the present disclosure also provide another microwave oven in order to achieve the above embodiments. The microwave oven includes the thawing control device in embodiments shown in FIG. 25.

With the microwave oven in embodiments of the present disclosure, the detecting module of the thawing control device may start the thawing and detect the temperature of the food in the microwave oven after the receiving module of the thawing control device receives the thawing instruction, and the control module of the thawing control may control the thawing condition so that the temperature of the food in the microwave oven is maintained at −1° C. after thawing. It is discovered innovatively that −1° C. can be the optimal temperature at thawing endpoint through a large number of experiments and theoretical analysis, which has at least following advantages: (1) the thawed food is more nutritious; (2) the thawed food is healthier; (3) the thawed food has the lower temperature difference, and there is no cooked discoloration phenomenon; (4) the thawed food has the moderate shear force and is easier to cut and operate.

Alternatively, embodiments of the present disclosure may also provide another thawing control method for a microwave oven. With the method, a temperature of food in the microwave oven is lower than −1° C. during a thawing and the temperature of the food is maintained at about −1° C. after the thawing.

It should be noted that the thawing control method for a microwave oven provided in the present embodiment makes the food to the thawed food of −1° C., which has advantages that can be described in detail with reference to the above-described embodiments 9 to embodiment 15, and not discussed here.

With the thawing control method for a microwave oven in embodiments of the present disclosure, the temperature of the food in the microwave oven is below −1° C. during thawing and the temperature of the food in the microwave oven is maintained at −1° C. after thawing. It is discovered innovatively that −1° C. can be the optimal temperature at thawing endpoint through a large number of experiments and theoretical analysis, which has at least following advantages: (1) the thawed food is more nutritious; (2) the thawed food is healthier; (3) the thawed food has the lower temperature difference, and there is no cooked discoloration phenomenon; (4) the thawed food has the moderate shear force and is easier to cut and operate.

Embodiments of the present disclosure also provide another thawing control device for a microwave oven in order to achieve the above embodiments. With the device, temperature of food in the microwave oven is lower than −1° C. during a thawing and the temperature of the food is maintained at about −1° C. after the thawing.

With the thawing control device for a microwave oven in embodiments of the present disclosure, the temperature of the food in the microwave oven is below −1° C. during thawing and the temperature of the food in the microwave oven is maintained at −1° C. after thawing. It is discovered innovatively that −1° C. can be the optimal temperature at thawing endpoint through a large number of experiments and theoretical analysis, which has at least following advantages: (1) the thawed food is more nutritious; (2) the thawed food is healthier; (3) the thawed food has the lower temperature difference, and there is no cooked discoloration phenomenon; (4) the thawed food has the moderate shear force and is easier to cut and operate.

Embodiments of the present disclosure also provide a microwave oven in order to achieve the above embodiments. The microwave oven includes the thawing control device in the above embodiments.

With the microwave oven in embodiments of the present disclosure, the temperature of the food in the microwave oven is below −1° C. during thawing and the temperature of the food in the microwave oven is maintained at −1° C. after thawing. It is discovered innovatively that −1° C. can be the optimal temperature at thawing endpoint through a large number of experiments and theoretical analysis, which has at least following advantages: (1) the thawed food is more nutritious; (2) the thawed food is healthier; (3) the thawed food has the lower temperature difference, and there is no cooked discoloration phenomenon; (4) the thawed food has the moderate shear force and is easier to cut and operate.

Embodiments of the present disclosure also provide a thawing control method for a microwave oven.

The thawing control method for a microwave oven 100A according to an embodiment of the present disclosure will be described with reference to FIGS. 26 to 34. The microwave oven 100A has a key 22 for thawing and a microwave generator. When the key 22 for thawing is pressed, the food 200 such as meat (including pork, chicken, fish, etc.) placed in the microwave oven 100A is thawed. Here, it should be noted that the structure and working principle of the microwave generator (including a microwave source 31, a microwave source feeding device 32, a waveguide 33, a heating antenna 34 or a stirring blade 35, etc.) are well known to those skilled in the art, which is no longer elaborated here.

Figure 26:
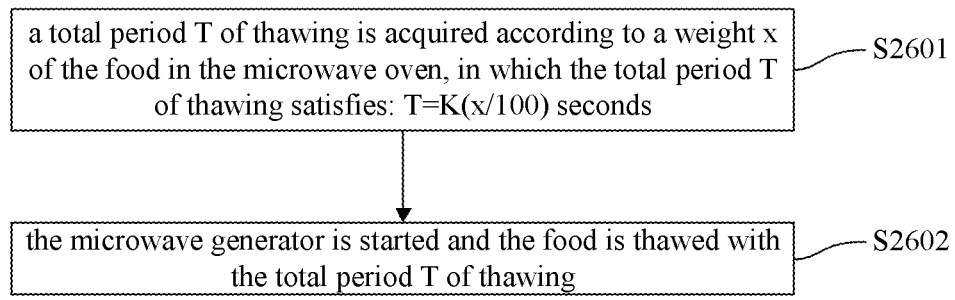
FIG. 26 is a flow chart of a thawing control method for a microwave oven according to an embodiment of the present disclosure.

As shown in FIG. 26, the thawing control method for the microwave oven 100A according to a first aspect of embodiments of the present disclosure includes followings.

S2601, a total period T of thawing is acquired according to a weight x of the food 200 in the microwave oven 100A. The total period T of thawing satisfies: $T=K(x/100)$ seconds, in which 20 seconds/g≤K≤120 seconds/g.

S2602, the microwave generator is started and the food 200 is thawed with the total period T of thawing.

The weight x of the food 200 is in grams. The specific value of K can be specifically selected depending on the kind of the food 200, and the present disclosure is not particularly limited thereto.

The relationship between the total period T of thawing and the weight x of the food 200 is obtained by the inventors through a large number of thawing tests with different foods such as meat and different weights.

In this way, since the total period T of thawing (which is required for thawing the meat) can be acquired based on the weight of the meat, it is only necessary to put the meat into the microwave oven 100A when the microwave oven 100A is used to thaw the food 200, and the meat can be thawed in the total period T of thawing. Therefore the operation is convenient. The phenomenon of the nutrient loss and part cooked during thawing in the conventional microwave oven 100A is solved by accurately acquiring the total period T of thawing based on the different weights of the food such as meat.

Alternatively, after the total period T of thawing, the temperature of the food is −3° C. to 0° C. That is, after the thawing process is finished, the temperature of the food such as meat is between −3° C. and 0° C., preferably −1° C. Therefore, −1° C. is used as the temperature at thawing endpoint, which has at least following advantages: (1) the thawed food is more nutritious; (2) the thawed food is healthier; (3) the thawed food has the lower temperature difference, and there is no cooked discoloration phenomenon; (4) the thawed food has the moderate shear force and is easier to cut and operate.

With the thawing control method for the microwave oven 100A according to an embodiment of the present disclosure, by acquiring the total period T of thawing which is required for thawing the food 200 according to the weight x of the food 200, the thawing effect is good.

Further, step S2602 includes thawing the food 200 with a plurality of firepower levels successively in a plurality of successive periods of time. That is, the total period T of thawing can be divided into a plurality of successive periods of time, and the plurality of periods of time is successive in chronological order. During each period of time, the corresponding firepower level is used to thaw the food 200. The sum of the plurality of successive periods of time is the total period T of thawing, in other words, each period of the time is less than the total period T of thawing. The sizes of the plurality of periods of time may be the same or different; similarly, the sizes of the plurality of firepower levels may be the same or different.

According to an embodiment of the present disclosure, for example, the total period T of thawing is divided into four periods of time. Corresponding to the different period of time, the different firepower level is used for thawing the food 200 such as meat. It is to be understood that the specific value of the maximum firepower may be adaptively changed depending on the kind of the food 200 and the like, and the present disclosure is not particularly limited thereto.

Figure 27:
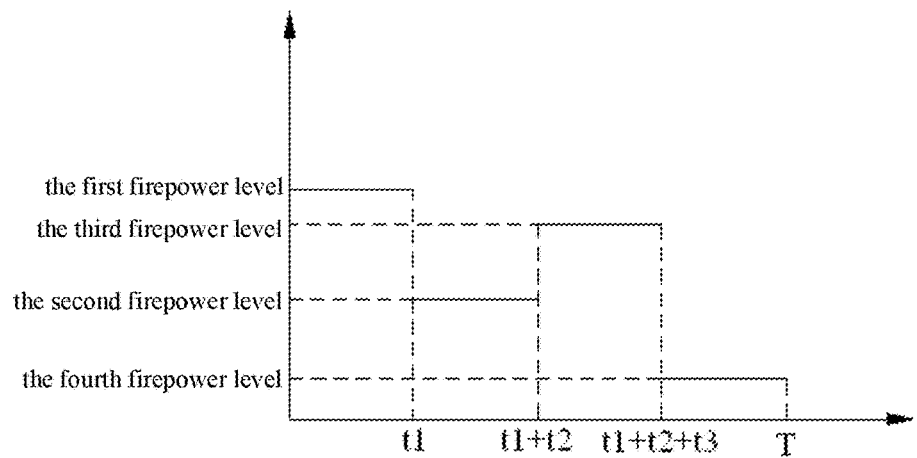
FIG. 27 is a schematic diagram of thawing food to be thawed with a plurality of firepower levels successively in a total period T of thawing according to an embodiment of the present disclosure.

Specifically, as shown in FIG. 27, step S2602 specifically includes:

S26021, the food is thawed with a first firepower level in a first period t1 of time, in which the first firepower level is 30% to 60% of the maximum firepower.

S26022, the food is thawed with a second firepower level in a second period t2 of time, in which the second firepower level is 20%~40% of the maximum firepower S26023, the food is thawed with a third firepower level in a third period t3 of time, in which the third firepower level is 30%~60% of the maximum firepower.

S26024, the food is thawed with a fourth firepower level in a fourth period t4 of time, in which the fourth firepower level is 0%~30% of the maximum firepower.

The maximum firepower is 100%.

That is, the total period T of thawing is divided into the successive first period t1 of time, second period t2 of time, third period t3 of time and fourth period t4 of time. During each period of time, the first firepower level, the second firepower level, the third firepower level and the fourth firepower level are respectively used to thaw the food 200 such as meat.

Alternatively, the first period t1 of time, second period t2 of time, third period t3 of time and fourth period t4 of time satisfy following conditions respectively:

$t1=K(n+1+a)/4$, $t2=K(n-1-a)/4$, $t3=K(n+1-a)/4$, and $t4=K(n-1+a)/4$, where $n=x/100$ g, and $a=[1+(-1)^n]/2$.

Thus, by dividing the total period T of thawing into four periods of time, and by thawing the food 200 during each period of time with the corresponding firepower level, the thawing is well-distributed, the nutrient is not lost, and the thawing speed is fast.

Certainly, the present disclosure is not limited thereto. The total period T of thawing can also be divided into the successive two, three, five, six or more periods of time, and the corresponding firepower level is used for each period of time to thaw in order to achieve the better thawing effect.

According to an alternative embodiment of the present disclosure, between step S26022 and step S26023, the thawing control method further includes followings.

S260221A, the thawing is suspended after the second period t2 of time, and it is prompted to turn over the food, and it begins to detect whether the food is turned over.

S260222A, if it is detected that the food is turned over, the thawing is controlled to proceed to step S26023.

In other words, when the thawing proceeds after the second period t2 of time and before the third period t3 of time, the thawing is suspended. At this moment, the microwave generator is stopped and the food in the microwave oven 100A is not thawed and the microwave oven 100A prompts the user to turn over the food in the microwave oven 100A. After the user turns over the food 200 in the microwave oven 100A, the microwave generator is restarted to continue to thaw the food in the microwave oven 100A.

A detection device disposed in the microwave oven 100A detects whether the food is turned over after the microwave oven 100A prompts the user to turn over the food in the microwave oven 100A. For example, when the microwave generator emits microwaves upward, the detection device can detect the temperature of the lower surface of the food. Before turning, the temperature of the lower surface of the food should be higher than the temperature of the upper surface of the food, and after turning, the upper and lower surfaces of the food are interchanged, and then the temperature (which is detected by the detection device) of the lower surface (i.e., the upper surface before turning) of the food is lower than the temperature of the upper surface (i.e., the lower surface before turning) of the food. Therefore, it can be determined that the food has been turned over. Alternatively, the detection device is a temperature sensor.

According to another alternative embodiment of the present disclosure, between step S26022 and step S26023, the thawing control method further includes followings.

S260221B, the thawing is suspended after the second period t2 of time, and it is prompted to turn over the food, and it begins to detect whether the microwave generator is restarted.

S260222B, if it is detected that the microwave generator is restarted, the thawing is controlled to proceed to step S26023.

In other words, when the thawing proceeds after the second period t2 of time and before the third period t3 of time, the thawing is suspended. At this moment, the microwave generator is stopped and the food in the microwave oven 100A is not thawed. The microwave oven 100A prompts the user to turn over the food in the microwave oven 100A. After the user turns over the food 200 in the microwave oven 100A, the microwave generator is restarted to continue to thaw the food in the microwave oven 100A.

After the microwave oven 100A prompts the user to turn over the food in the microwave oven 100A, the user can press the key 22 for thawing or a key for starting on the microwave oven 100A to control the microwave generator to restart, thereby continuing to thaw the food in the microwave oven 100A.

According to an alternative embodiment of the present disclosure, the weight x of the food 200 can be judged according to a triggering state of the key 22 for thawing. For example, one key 22 for thawing is disposed on the microwave over 100A, and the one key 22 for thawing is configured to successively increase a weight displayed on the microwave oven 100A by 50 g~100 g when the one key 22 for thawing is pressed once. That is, the user can estimate the weight x of the food 200 first himself, and then press the key 22 for thawing multiple times according to the estimated value. The weight displayed on the microwave oven 100A is increased every time when the key 22 for thawing is pressed until the estimated value is reached. It is to be understood that the specific value of the weight displayed on the microwave oven 100A when the key 22 for thawing is pressed once can be specifically designed according to actual requirements, and the present disclosure is not particularly limited thereto.

Figure 28:
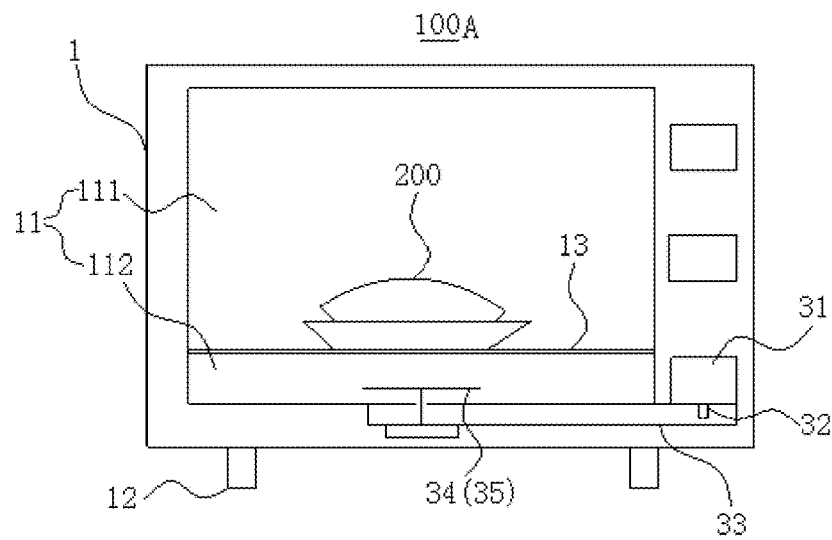
FIG. 28 is a block diagram of a microwave oven according to an embodiment of the present disclosure.
Figure 29A:
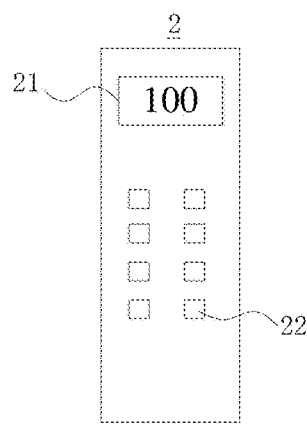
FIG. 29a is a schematic diagram of a control panel of the microwave oven in FIG. 28 after a key for thawing is pressed once.
Figure 29B:
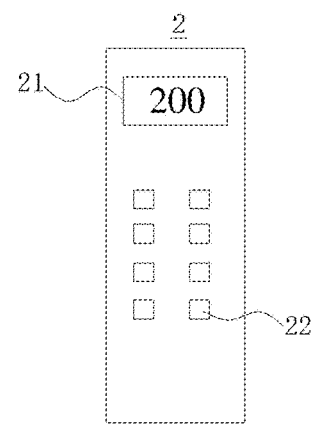
FIG. 29b is a schematic diagram of a control panel of the microwave oven in FIG. 28 after a key for thawing is pressed twice.
Figure 29C:
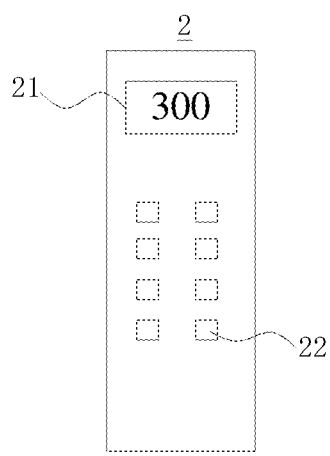
FIG. 29c is a schematic diagram of a control panel of the microwave oven in FIG. 28 after a key for thawing is pressed three times.
Figure 29D:
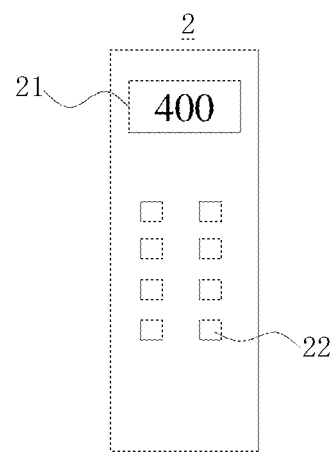
FIG. 29d is a schematic diagram of a control panel of the microwave oven in FIG. 28 after a key for thawing is pressed four times.
Figure 29E:
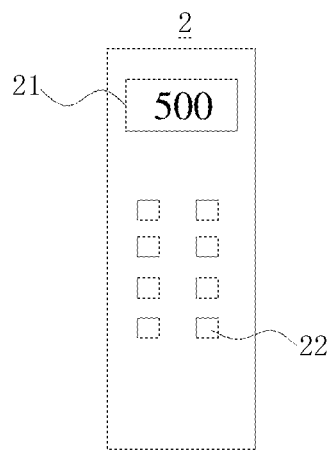
FIG. 29e is a schematic diagram of a control panel of the microwave oven in FIG. 28 after a key for thawing is pressed five times.

Referring to FIG. 28 and in combination with FIGS. 29a-29e, a control panel 2 of the microwave oven 100A has a display screen 21. The key 22 for thawing is provided below the display screen 21, and there is one key 22 for thawing. When the key 22 for thawing is pressed every time, the weight displayed on the microwave oven 100A is increased by 100 grams. For example, when the user estimates that the weight x of the food 200 such as meat is equal to 500 g, i.e. x=500 g, the key 22 for thawing can be pressed five times, in which the weight displayed on the microwave oven 100A is increased by 100 g when the key 22 for thawing is pressed once.

Figure 30:
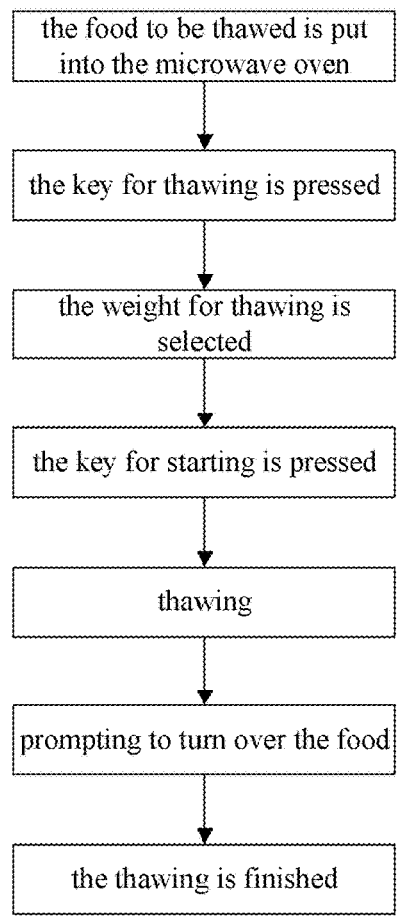
FIG. 30 is a flow chart of thawing operation of the microwave oven in FIG. 28.

The operation for thawing the food 200 such as meat is shown in FIG. 30. The weight x of the food 200 such as meat is estimated, and then the food 200 such as meat is put into the microwave oven 100A. Then the key 22 for thawing is pressed one or more times based on the estimated weight x so as to select a suitable weight for thawing. The microwave oven 100A can acquire the total period T of thawing according to the above-described weight for thawing, and then the key for starting on the microwave oven 100A is pressed to start the thawing, at which moment the microwave generator is activated so that the food 200 such as meat is thawed. After the second period t2 of time and before the third period t3 of time, the microwave oven 100A pauses and prompts to turn the food over. The user turns the food over and then the microwave oven 100A is restarted to thaw until the thawing ends.

Certainly, the key 22 for thawing can include a plurality of keys 22 for thawing corresponding to a plurality of weight grams respectively (not shown in Figs.). At this time, the control panel 2 of the microwave oven 100A is provided with the plurality of keys 22 for thawing, and the weights corresponding respectively to the plurality of keys 22 for thawing are different. When the food 200 such as meat is required to be thawed, the weight of the meat is estimated first, and then the key 22 for thawing that is closest to the estimated value of the weight of the meat is found from the plurality of keys 22 for thawing, and then the selected key 22 for thawing is pressed.

According to another alternative embodiment of the present disclosure, the weight x of the food 200 is judged by a weight sensor 4 disposed in the microwave oven 100A. For example, in an embodiment of FIG. 31, the weight sensor 4 is provided on the oven feet 12 at bottom of the microwave oven 100A. When the microwave oven 100A is empty, the weight sensor 4 detects the weight of the microwave oven 100A without the food 200. When the food 200 is placed in the microwave oven 100A, the weight sensor 4 detects the weight of the microwave oven 100A with the food 200. The weight of the food 200 is obtained to be the difference between the two detected weights. It will be appreciated that the number of the weight sensors 4 may be tailored according to actual requirements to accurately obtain the weight of the food 200 such as meat.

Figure 32:
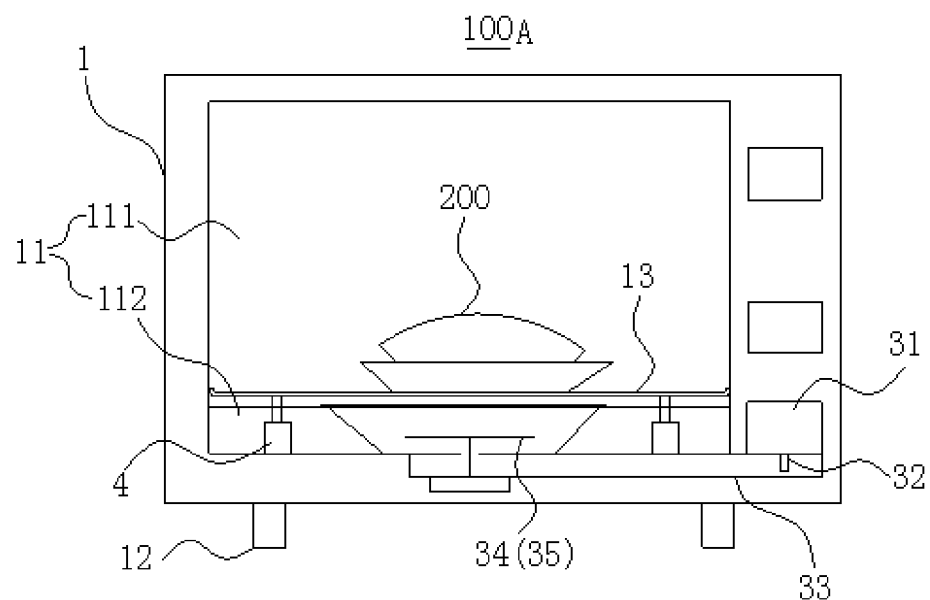
FIG. 32 is a block diagram of a microwave oven according to yet another embodiment of the present disclosure.

For example, in an embodiment of FIG. 32, the microwave oven 100A has an oven chamber 11. The oven chamber 11 is divided into a cooking chamber 111 and a heating chamber 112 located below the cooking chamber 111 by a clapboard 13. The food 200 is adapted to be placed in the cooking chamber 111. The weight sensor 4 is provided at bottom of the clapboard 13. At this time, the weight sensor 4 can directly detect the weight of the food 200 on the clapboard 13.

Figure 33:
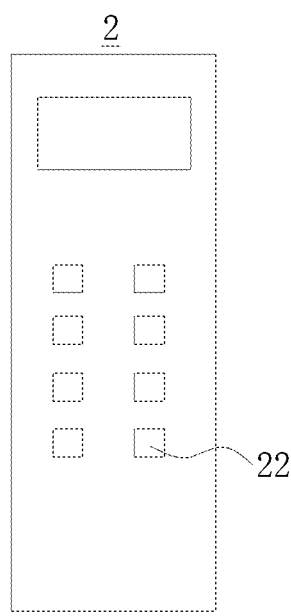
FIG. 33 is a schematic diagram of a control panel of the microwave oven in FIG. 31 or FIG. 32.
Figure 34:
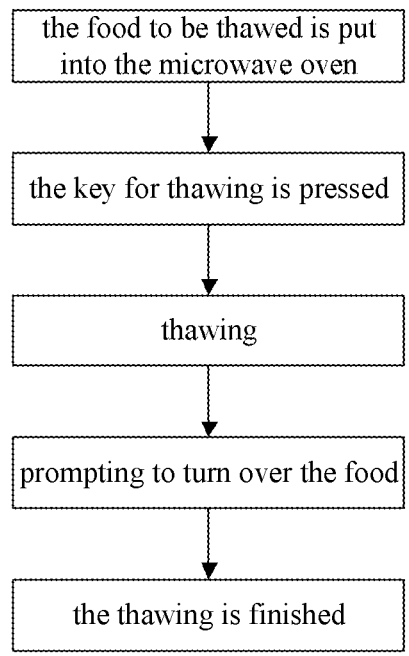
FIG. 34 is a flow chart of thawing operation of the microwave oven in FIG. 31 or FIG. 32.

The operation for thawing the food 200 such as meat is shown in FIG. 33 and FIG. 34. The food 200 such as meat is put into the microwave oven 100A first. The weight of the food 200 such as meat is detected automatically by the weight sensor 4 in the microwave oven 100A. The microwave oven 100A can acquire the total period T of thawing according to the detected weight. Then the key 22 for thawing is pressed and then the key for starting is pressed, and then the thawing is started. At this moment, the microwave generator is activated so that the food 200 such as meat is thawed. After the second period t2 of time and before the third period t3 of time, the microwave oven 100A pauses and prompts to turn the food over. The user turns the food over and then the microwave oven 100A is restarted to thaw until the thawing ends.

Certainly, the weight sensor 4 may also be provided both at bottom of the oven feet 12 and at bottom of the clapboard 13, to further accurately obtain the weight of the food 200 such as meat. Thus, by providing the weight sensor 4 in the microwave oven 100A, the microwave oven 100A has automatic detection, thereby making the microwave oven 100A more intelligent.

Figure 31:
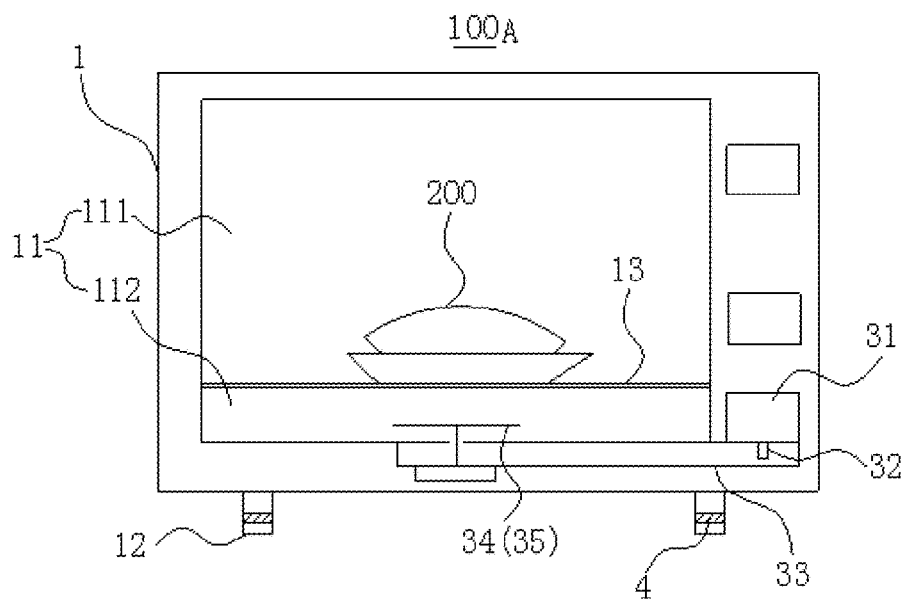
FIG. 31 is a block diagram of a microwave oven according to another embodiment of the present disclosure.

As shown in FIGS. 28, 31 and 32, the microwave oven 100A according to a second aspect of embodiments of the present disclosure includes an oven body 1, a control panel 2, and a microwave generator. The microwave oven 100A uses the thawing control method for the microwave oven 100A according to the first aspect of embodiments of the present disclosure to thaw the food 200.

In detail, the oven body 1 defines an oven chamber 11 suitable for placing the food 200 such as meat. The control panel 2 is disposed on the oven body 1, for example on the front surface of the oven body 1. The control panel 2 has a key 22 for thawing and a key for starting. The microwave generator is disposed in the oven body 1, and configured to emit microwaves to the oven chamber 11 to thaw the food 200 such as meat.

With the microwave oven 100A in embodiments of the present disclosure, by using the thawing control method for the microwave oven 100A according to the first aspect of embodiments of the present disclosure, the thawed food such as meat has no nutrition loss.

As shown in FIG. 31, the oven body 1 is provided with the weight sensor 4 adapted to detect the weight of the food. The oven feet 12 are provided at bottom of the oven body 1. The weight sensor 4 is provided on the oven feet 12. When the microwave oven 100A is empty, the weight sensor 4 detects the weight of the microwave oven 100A without the food 200. When the food 200 is placed in the microwave oven 100A, the weight sensor 4 detects the weight of the microwave oven 100A with the food 200. The weight of the food 200 is obtained to be the difference between the two detected weights.

Or as shown in FIG. 32, the oven body 1 is provided with the weight sensor 4 adapted to detect the weight of the food.

The oven chamber 11 is divided into a cooking chamber 111 and a heating chamber 112 located below the cooking chamber 111 by a clapboard 13. The weight sensor 4 is provided at bottom of the clapboard 13. At this time, the weight sensor 4 can directly detect the weight of the food 200 on the clapboard 13. Thus, by providing the weight sensor 4 in the microwave oven 100A, the microwave oven 100A has automatic detection, thereby making the microwave oven 100A more intelligent.

The operation for thawing the food 200 such as meat is shown in FIG. 34. The food 200 such as meat is put into the microwave oven 100A first. The weight of the food 200 such as meat is detected automatically by the weight sensor 4 in the microwave oven 100A. The microwave oven 100A can acquire the total period T of thawing according to the detected weight. Then the key 22 for thawing is pressed and then the key for starting is pressed, and then the thawing is started. At this moment, the microwave generator is activated so that the food 200 such as meat is thawed. After the second period t2 of time and before the third period t3 of time, the microwave oven 100A pauses and prompts to turn the food over. The user turns the food over and then the microwave oven 100A is restarted to thaw until the thawing ends.

Certainly, the weight x of the food 200 is judged according to a triggering state of the key 22 for thawing. For example, one key 22 for thawing is disposed on the microwave over 100A, and the one key 22 for thawing is configured to successively increase a weight displayed on the microwave oven 100A by 50 g~100 g when the one key 22 for thawing is pressed once. That is, the user can estimate the weight x of the food 200 first himself, and then press the key 22 for thawing multiple times according to the estimated value of the weight x. The weight displayed on the microwave oven 100A is increased every time when the key 22 for thawing is pressed until the estimated value is reached. It is to be understood that the specific value of the weight displayed on the microwave oven 100A when the key 22 for thawing is pressed once can be specifically designed according to actual requirements, and the present disclosure is not particularly limited thereto.

Referring to FIG. 28 and in combination with FIGS. 29a-29e, a control panel 2 of the microwave oven 100A has a display screen 21. The key 22 for thawing is provided below the display screen 21, and there is one key 22 for thawing. When the key 22 for thawing is pressed every time, the weight displayed on the microwave oven 100A is increased by 100 grams. For example, when the user estimates that the weight x of the food 200 such as meat is equal to 500 g, i.e. x=500 g, the key 22 for thawing can be pressed five times, in which the weight displayed on the microwave oven 100A is increased by 100 g when the key 22 for thawing is pressed once.

The operation for thawing the food 200 such as meat is shown in FIG. 30. The weight x of the food 200 such as meat is estimated, and then the food 200 such as meat is put into the microwave oven 100A. Then the key 22 for thawing is pressed one or more times based on the estimated weight x so as to select a suitable weight for thawing. The microwave oven 100A can acquire the total period T of thawing according to the above-described weight for thawing, and then the key for starting on the microwave oven 100A is pressed to start the thawing, at which moment the microwave generator is activated so that the food 200 such as meat is thawed. After the second period t2 of time and before the third period t3 of time, the microwave oven 100A pauses and prompts to turn the food over. The user turns the food over and then the microwave oven 100A is restarted to thaw until the thawing ends.

Certainly, the key 22 for thawing can include a plurality of keys 22 for thawing corresponding to a plurality of weight grams respectively (not shown in Figs.). At this time, the control panel 2 of the microwave oven 100A is provided with the plurality of keys 22 for thawing, and the weights corresponding respectively to the plurality of keys 22 for thawing are different. When the food 200 such as meat is required to be thawed, the weight of the meat is estimated first, and then the key 22 for thawing that is closest to the estimated value of the weight of the meat is found from the plurality of keys 22 for thawing, and then the selected key 22 for thawing is pressed.

Other configurations and operations of the microwave oven 100A according to the embodiments of the present disclosure are known to those skilled in the art and will not be described in detail herein.

Embodiments of the present disclosure also provide another thawing control method for a microwave oven.

The thawing control method for a microwave oven 100B according to an embodiment of the present disclosure will be described with reference to FIGS. 35 to 40. The microwave oven 100B has a key 22 for thawing and a microwave generator. When the key 22 for thawing is pressed, the food 200 such as meat (including pork, chicken, fish, etc.) placed in the microwave oven 100B is thawed. Here, it should be noted that the structure and working principle of the microwave generator (including a microwave source 31, a microwave source feeding device 32, a waveguide 33, a heating antenna 34 or a stirring blade 35, etc.) are well known to those skilled in the art, which is no longer elaborated here.

Figure 35:
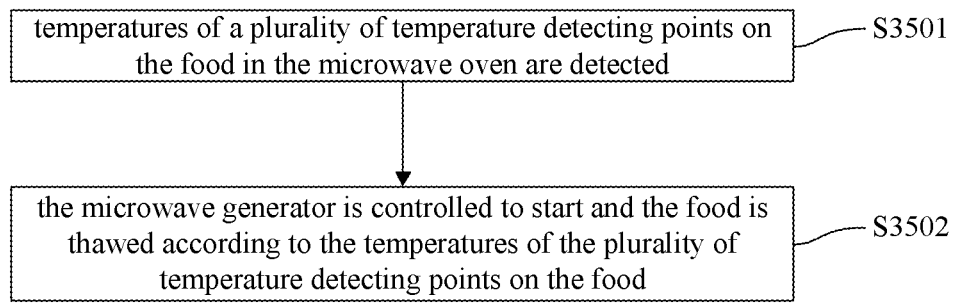
FIG. 35 is a flow chart of a thawing control method for a microwave oven according to an embodiment of the present disclosure.

As shown in FIG. 35, the thawing control method for the microwave oven 100B according to a first aspect of embodiments of the present disclosure includes followings.

S3501, temperatures of a plurality of temperature detecting points 131 on the food 200 in the microwave oven 100B are detected.

S3502, the microwave generator is controlled to start and the food 200 is thawed according to the temperatures of the plurality of temperature detecting points 131 on the food 200 such as meat.

Figure 39:
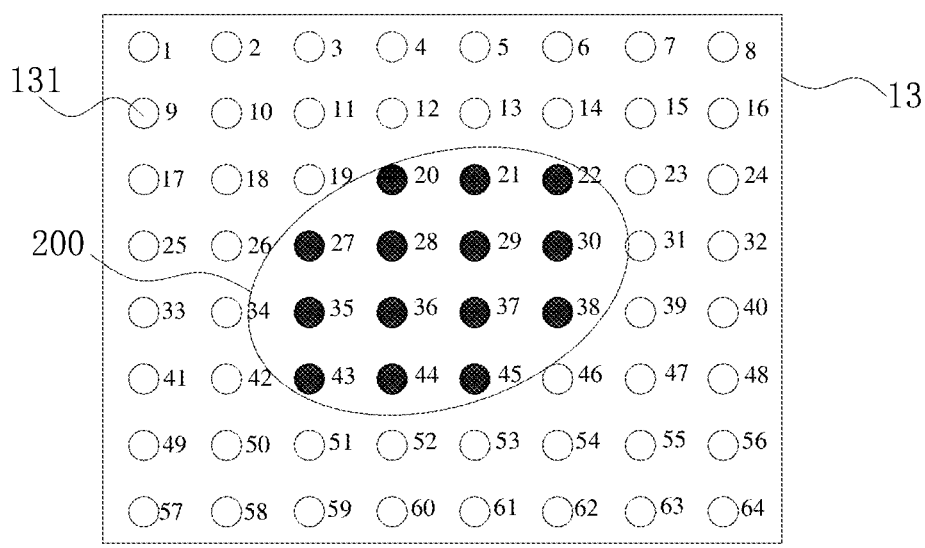
FIG. 39 is a schematic diagram of a microwave oven using an infrared temperature sensor to detect temperatures of a plurality of temperature detecting points on food to be thawed according to an embodiment of the present disclosure.
Figure 40:
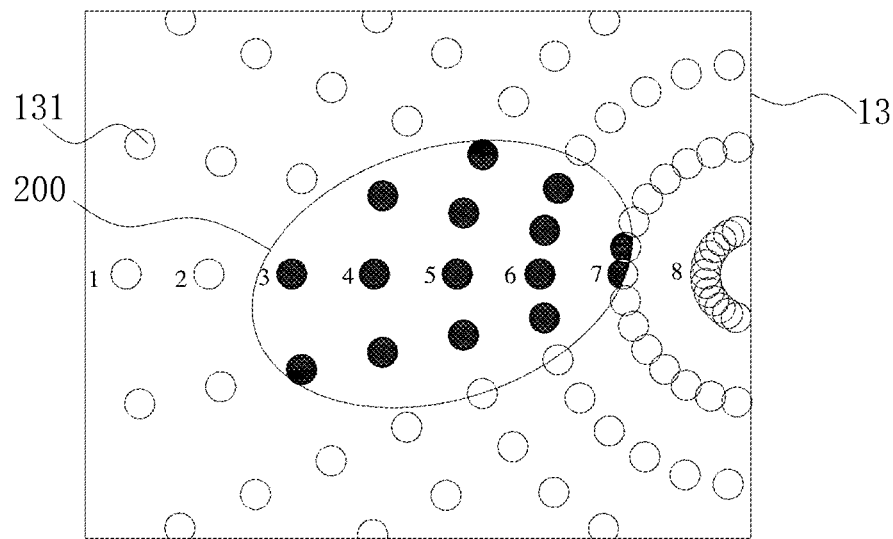
FIG. 40 is another schematic diagram of a microwave oven using an infrared temperature sensor to detect temperatures of a plurality of temperature detecting points on food to be thawed according to an embodiment of the present disclosure.

In step S3501, the number of the temperature detecting points 131 and the distribution of the temperature detecting points 131 on the food 200 can be specifically designed according to actual requirements. For example, as shown in FIG. 39, when the food 200 is placed on the clapboard 13 in the microwave oven 100B, the plurality of temperature detecting points 131 may be arranged in a matrix on the clapboard 13. At this time, the temperature detecting points 131 on the food 200 also may be distributed in a plurality of rows or columns. Alternatively, as shown in FIG. 40, the plurality of temperature detecting points 131 may be distributed in a plurality of circles commonly having a center at a point on the clapboard 13, and each circle includes a plurality of temperature detecting points 131 distributed in the circumferential direction, at which time at least part of the temperature detecting points 131 on the clapboard 13 falls on the food 200 to achieve better detection results.

In step S3502, during the process of thawing the food 200 such as meat in the microwave oven 100B, the thawing firepower and/or the period of thawing can be controlled in accordance with the temperatures of the plurality of temperature detecting points 131 on the food 200, so that a good thawing effect is reached, to solve the phenomenon of the nutrient loss and part cooked during thawing in the conventional microwave oven 100B.

Alternatively, after the thawing process is finished, the temperature of the food such as meat is between −3° C. and 0° C., preferably −1° C. Therefore, the rapid thawing is achieved, the thawing is normally, and the nutrient is not lost. In addition, −1° C. is used as the temperature at thawing endpoint, which has at least following advantages: (1) the thawed food is more nutritious; (2) the thawed food is healthier; (3) the thawed food has the lower temperature difference, and there is no cooked discoloration phenomenon; (4) the thawed food has the moderate shear force and is easier to cut and operate.

With the thawing control method for the microwave oven 100B in the embodiments of the present disclosure, by thawing the food 200 according to the temperatures of the plurality of temperature detecting points 131 on the food 200 such as meat, the thawing effect is good.

In step S3501, the temperatures of the plurality of temperature detecting points 131 on the food 200 can be detected based on an infrared temperature sensor 5 provided in the microwave oven 100B. The infrared temperature sensor 5 may scan the initial temperature of the food 200 such as meat and count the number of the temperature detecting points 131 on the food 200 such as meat. For example, in an embodiment of FIG. 39, the number of the temperature detecting points 131 on the food 200 such as meat is 14, and in an embodiment of FIG. 40, the number of the temperature detecting points 131 on the food 200 such as meat is 15.

Figure 36:
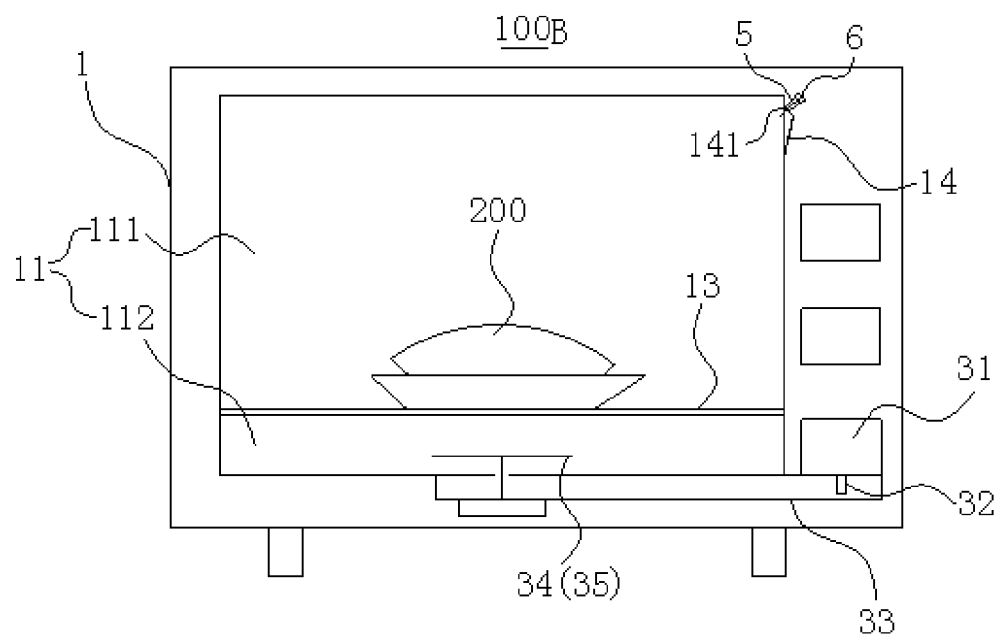
FIG. 36 is a block diagram of a microwave oven according to an embodiment of the present disclosure.

As shown in FIG. 36, the infrared temperature sensor 5 is provided in the microwave oven 100B. Specifically, the oven chamber 11 is defined in the microwave oven 100B. The oven chamber 11 is divided into a cooking chamber 111 and a heating chamber 112 located below the cooking chamber 111 by a clapboard 13. The infrared temperature sensor 5 is provided outside the oven chamber 11 and is located in an upper portion of the cooking chamber 111. The cooking chamber 111 is formed with a through-hole 141. The infrared temperature sensor 5 has an infrared temperature sensing probe. The infrared temperature sensing probe corresponds to the through-hole 141.

Alternatively, the infrared temperature sensor 5 is slantwise provided on the side wall outside the oven chamber 11 and is provided near the top wall of the oven chamber 11. The microwave oven 100B is provided with a mounting portion 14 adapted to mount the infrared temperature sensor 5. A portion of the side wall of the oven chamber 11 protrudes outward to form the mounting portion 14, and the through-hole 141 is formed in the mounting portion 14. Certainly, the infrared temperature sensor 5 may be provided on the top wall outside the oven chamber 11 (not shown in Figs.). It is to be understood that the specific installation position of the infrared temperature sensor 5, and the shape and molding method of the mounting portion 14 can be specifically designed according to actual requirements. The present disclosure is not particularly limited thereto.

Specifically, the infrared temperature sensor 5 has M infrared temperature sensing probes. For example, in an embodiment shown in FIG. 39, the infrared temperature sensor 5 has 64 infrared temperature sensing probes. In an embodiment shown in FIG. 40, the infrared temperature sensor 5 has 8 infrared temperature sensing probes. When the infrared temperature sensor 5 rotates, the full-surface scanning of the clapboard 13 can be realized. The infrared temperature sensor 5 may be driven to rotate by a motor 6, such as a stepping motor.

The temperatures of the plurality of temperature detecting points 131 on the food 200 such as meat are detected by the N infrared temperature sensing probes. As shown in FIG. 39, 14 temperature detecting points 131 are distributed on the surface of the food 200 such as meat, numbered as: 20, 21, 22, 27, 28, 29, 30, 35, 36, 37, 38, 43, 44, 45. As shown in FIG. 40, 15 temperature detecting points 131 distributed on the surface of the food 200 such as meat are acquired by scanning.

N and M are both positive integers and N is less than or equal to M. When the food 200 such as meat, covers the upper surface of the whole clapboard 13, N is equal to M.

According to a particular embodiment of the present disclosure, step S3502 includes successively adopting a plurality of firepower levels according to temperature detection values of the N infrared temperature sensing probes to thaw the food 200. In other words, the food 200 such as meat is thawed using different or partially identical firepower levels, depending on the temperature values of the plurality of temperature detecting points 131 on the food 200 such as meat.

Specifically, the step S3502 specifically includes:

S35021, the food is thawed with a first firepower level after the microwave generator is started, in which the first firepower level is 30%~60% of a maximum firepower.

S35022, when 30% of the temperature detection values of the N infrared temperature sensing probes are larger than −4° C., the food is thawed with a second firepower level, in which the second firepower level is 20%~40% of the maximum firepower.

S35023, when 60% of the temperature detection values of the N infrared temperature sensing probes are larger than −4° C., the food is thawed with a third firepower level, in which the third firepower level is 30%~60% of the maximum firepower.

S314, when 30% of the temperature detection values of the N infrared temperature sensing probes are in −3° C.~0° C., the food is thawed with a fourth firepower level, in which the fourth firepower level is 0%~30% of the maximum firepower.

S315, when 80% of the temperature detection values of the N infrared temperature sensing probes are in −3° C.~0° C., thawing the food is stopped.

The maximum firepower is 100%. It will be understood that the specific value of the maximum firepower may be adaptively changed depending on the kind of the food 200 and the like, and the present disclosure is not particularly limited thereto.

In other words, after the microwave generator is started, the first firepower level is used to thaw the food 200 such as meat first, in which the first firepower level is 30% to 60% of the maximum firepower. The temperature of the food 200 such as meat is detected continually and when the temperature values of 30% of the plurality of temperature detecting points 131 on the food 200 such as meat are larger than −4° C., the food such as meat is thawed with the second firepower level, in which the second firepower level is 20%~40% of the maximum firepower. The temperature of the food 200 such as meat is detected continually, and when the temperature values of 60% of the plurality of temperature detecting points 131 on the food 200 such as meat are larger than −4° C., the food such as meat is thawed with the third firepower level, in which the third firepower level is 30%~60% of the maximum firepower. The temperature of the food 200 such as meat is detected continually, and when the temperature values of 30% of the plurality of temperature detecting points 131 on the food 200 such as meat are in −3° C.~0° C., the food such as meat is thawed with the fourth firepower level, in which the fourth firepower level is 0%~30% of the maximum firepower. The temperature of the food 200 such as meat is detected continually, and when the temperature values of 80% of the plurality of temperature detecting points 131 on the food 200 such as meat are in −3° C.~0° C., thawing the food is stopped and the thawing process is finished.

As shown in FIG. 36, the infrared temperature sensor 5 is fixed. The infrared temperature sensor 5 has 64 infrared temperature sensing probes. The clapboard 13 is correspondingly provided with 64 temperature detecting points 131.

Figure 37:
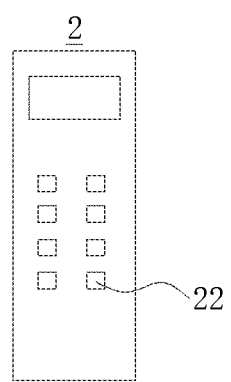
FIG. 37 is a schematic diagram of a control panel of the microwave oven in FIG. 36.
Figure 38:
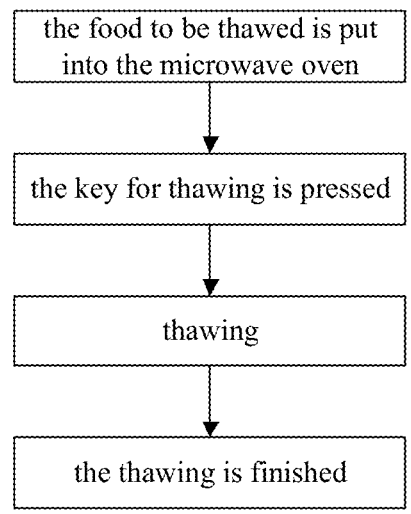
FIG. 38 is a flow chart of thawing operation of the microwave oven in FIG. 36.

When thawing, referring to FIGS. 37 and 38 and in combination with FIG. 39, the food 200 such as meat is placed in the microwave oven 100B first. The infrared temperature sensor 5 scans to acquire the initial temperature of the meat and counts the number (14) of the temperature detecting points 131 on the meat. Then the key 22 for thawing on the control panel 2 of the microwave oven 100B is pressed to activate the microwave generator to thaw the meat.

In detail, the first firepower level is used to thaw the food 200 such as meat first, in which the first firepower level is 30% to 60% of the maximum firepower. The temperature of the food 200 such as meat is detected continually and when the temperature values of 30% of the plurality of temperature detecting points 131 on the food 200 such as meat are larger than −4° C., the food such as meat is thawed with the second firepower level, in which the second firepower level is 20%~40% of the maximum firepower. The temperature of the food 200 such as meat is detected continually, and when the temperature values of 60% of the plurality of temperature detecting points 131 on the food 200 such as meat are larger than −4° C., the food such as meat is thawed with the third firepower level, in which the third firepower level is 30%~60% of the maximum firepower. The temperature of the food 200 such as meat is detected continually, and when the temperature values of 30% of the plurality of temperature detecting points 131 on the food 200 such as meat are in −3° C.~0° C., the food such as meat is thawed with the fourth firepower level, in which the fourth firepower level is 0%~30% of the maximum firepower. The temperature of the food 200 such as meat is detected continually, and when the temperature values of 80% of the plurality of temperature detecting points 131 on the food 200 such as meat are in −3° C.~0° C., thawing the food is stopped and the thawing process is finished.

As shown in FIG. 36, the infrared temperature sensor 5 can be driven to rotate by the motor 6 connected thereto. The infrared temperature sensor 5 has 8 infrared temperature sensing probes. Correspondingly, 8 temperature detecting points 131 are arranged in the clapboard 13. The 8 temperature detecting points 131 are arranged in a straight line on the clapboard 13.

When thawing, referring to FIGS. 37 and 38 and in combination with FIG. 40, the food 200 (i.e. the food to be thawed) such as meat is placed in the microwave oven 100B first. The infrared temperature sensor 5 is driven by the stepping motor to rotate, thereby realizing the full-surface scanning. The initial temperature of the meat is detected, and the number (15) of the temperature detecting points 131 distributed on the surface of the meat is acquired by the scanning. Then the key 22 for thawing on the control panel 2 of the microwave oven 100B is pressed to start the microwave generator to thaw the meat.

In detail, the first firepower level is used to thaw the food 200 such as meat first, in which the first firepower level is 30% to 60% of the maximum firepower. The temperature of the food 200 such as meat is detected continually and when the temperature values of 30% of the plurality of temperature detecting points 131 on the food 200 such as meat are larger than −4° C., the food such as meat is thawed with the second firepower level, in which the second firepower level is 20%~40% of the maximum firepower. The temperature of the food 200 such as meat is detected continually, and when the temperature values of 60% of the plurality of temperature detecting points 131 on the food 200 such as meat are larger than −4° C., the food such as meat is thawed with the third firepower level, in which the third firepower level is 30%~60% of the maximum firepower. The temperature of the food 200 such as meat is detected continually, and when the temperature values of 30% of the plurality of temperature detecting points 131 on the food 200 such as meat are in −3° C.~0° C., the food such as meat is thawed with the fourth firepower level, in which the fourth firepower level is 0%~30% of the maximum firepower. The temperature of the food 200 such as meat is detected continually, and when the temperature values of 80% of the plurality of temperature detecting points 131 on the food 200 such as meat are in −3° C.~0° C., thawing the food is stopped and the thawing process is finished.

As shown in FIG. 36, the microwave oven 100B according to a second aspect of embodiments of the present disclosure includes an oven body 1, a temperature detecting device and a microwave generator. The microwave oven 100B uses the thawing control method for the microwave oven 100B according to the first aspect of embodiments of the present disclosure to thaw the food 200.

In detail, the oven body 1 defines an oven chamber 11 suitable for placing the food 200 such as meat. The control panel 2 is disposed on the oven body 1, for example on the front surface of the oven body 1. The control panel 2 has a key 22 for thawing. The microwave generator is disposed in the oven body 1, and configured to emit microwaves to the oven chamber 11 to thaw the food 200 such as meat.

The temperature detecting device is provided in the oven body 1 to detect temperatures of a plurality of temperature detecting points 131 on the food 200. Alternatively, the temperature detecting device is an infrared temperature sensor 5, and the infrared temperature sensor 5 is provided in the upper portion of the oven body 1.

The infrared temperature sensor 5 is provided in the oven chamber 11. Specifically, referring to FIG. 36, the oven chamber 11 is divided into a cooking chamber 111 and a heating chamber 112 located below the cooking chamber 111 by a clapboard 13. The infrared temperature sensor 5 is provided outside the oven chamber 11 and is located in an upper portion of the cooking chamber 111. The cooking chamber 111 is formed with a through-hole 141. The infrared temperature sensor 5 has an infrared temperature sensing probe. The infrared temperature sensing probe corresponds to the through-hole 141.

For example, the infrared temperature sensor 5 is slantwise provided on the side wall outside the oven chamber 11 and is provided near the top wall of the oven chamber 11. The microwave oven 100B is provided with a mounting portion 14 adapted to mount the infrared temperature sensor 5. A portion of the side wall of the oven chamber 11 protrudes outward to form the mounting portion 14, and the through-hole 141 is formed in the mounting portion 14. Certainly, the infrared temperature sensor 5 may be provided on the top wall outside the oven chamber 11 (not shown in Figs.). It is to be understood that the specific installation position of the infrared temperature sensor 5, and the shape and molding method of the mounting portion 14 can be specifically designed according to the actual requirements. The present disclosure is not particularly limited thereto.

As shown in FIG. 36, the infrared temperature sensor 5 is fixed. The infrared temperature sensor 5 has 64 infrared temperature sensing probes. The clapboard 13 is correspondingly provided with 64 temperature detecting points 131.

When thawing, referring to FIGS. 37 and 38 and in combination with FIG. 39, the food 200 such as meat is placed in the microwave oven 100B first. The infrared temperature sensor 5 scans to acquire the initial temperature of the meat and counts the number (14) of the temperature detecting points 131 on the meat. Then the key 22 for thawing on the control panel 2 of the microwave oven 100B is pressed to activate the microwave generator to thaw the meat.

In detail, the first firepower level is used to thaw the food 200 such as meat first, in which the first firepower level is 30% to 60% of the maximum firepower. The temperature of the food 200 such as meat is detected continually and when the temperature values of 30% of the plurality of temperature detecting points 131 on the food 200 such as meat are larger than −4° C., the food such as meat is thawed with the second firepower level, in which the second firepower level is 20%~40% of the maximum firepower. The temperature of the food 200 such as meat is detected continually, and when the temperature values of 60% of the plurality of temperature detecting points 131 on the food 200 such as meat are larger than −4° C., the food such as meat is thawed with the third firepower level, in which the third firepower level is 30%~60% of the maximum firepower. The temperature of the food 200 such as meat is detected continually, and when the temperature values of 30% of the plurality of temperature detecting points 131 on the food 200 such as meat are in −3° C.~0° C., the food such as meat is thawed with the fourth firepower level, in which the fourth firepower level is 0%~30% of the maximum firepower. The temperature of the food 200 such as meat is detected continually, and when the temperature values of 80% of the plurality of temperature detecting points 131 on the food 200 such as meat are in −3° C.~0° C., thawing the food is stopped and the thawing process is finished.

As shown in FIG. 36, the infrared temperature sensor 5 can be driven to rotate by the motor 6 connected thereto. The infrared temperature sensor 5 has 8 infrared temperature sensing probes. Correspondingly, 8 temperature detecting points 131 are arranged in the clapboard 13. The 8 temperature detecting points 131 are arranged in a straight line on the clapboard 13.

When thawing, referring to FIGS. 37 and 38 and in combination with FIG. 40, the food 200 (i.e. the food to be thawed) such as meat is placed in the microwave oven 100B first. The infrared temperature sensor 5 is driven by the stepping motor to rotate, thereby realizing the full-surface scanning. The initial temperature of the meat is detected, and the number (15) of the temperature detecting points 131 distributed on the surface of the meat is acquired by the scanning. Then the key 22 for thawing on the control panel 2 of the microwave oven 100B is pressed to start the microwave generator to thaw the meat.

In detail, the first firepower level is used to thaw the food 200 such as meat first, in which the first firepower level is 30% to 60% of the maximum firepower. The temperature of the food 200 such as meat is detected continually and when the temperature values of 30% of the plurality of temperature detecting points 131 on the food 200 such as meat are larger than −4° C., the food such as meat is thawed with the second firepower level, in which the second firepower level is 20%~40% of the maximum firepower. The temperature of the food 200 such as meat is detected continually, and when the temperature values of 60% of the plurality of temperature detecting points 131 on the food 200 such as meat are larger than −4° C., the food such as meat is thawed with the third firepower level, in which the third firepower level is 30%~60% of the maximum firepower. The temperature of the food 200 such as meat is detected continually, and when the temperature values of 30% of the plurality of temperature detecting points 131 on the food 200 such as meat are in −3° C.~0° C., the food such as meat is thawed with the fourth firepower level, in which the fourth firepower level is 0%~30% of the maximum firepower. The temperature of the food 200 such as meat is detected continually, and when the temperature values of 80% of the plurality of temperature detecting points 131 on the food 200 such as meat are in −3° C.~0° C., thawing the food is stopped and the thawing process is finished.

With the microwave oven 100B in embodiments of the present disclosure, by using the thawing control method for the microwave oven 100B according to the first aspect of embodiments of the present disclosure, the thawed food such as meat has no loss of nutrition.

Other configurations and operations of the microwave oven 100B according to the embodiments of the present disclosure are known to those skilled in the art and will not be described in detail herein.

Embodiments of the present disclosure also provide another thawing control method for a microwave oven. It is to be understood that the structure of the microwave oven according to the embodiment of the present disclosure can be the same as that of the microwave oven 100B in the above embodiment. In order to save space, the structure of the microwave oven according to the embodiment of the present disclosure can be described with reference to the structure of the microwave oven 100B in the above embodiment.

The thawing control method for a microwave oven 100B according to an embodiment of the present disclosure will be described with reference to FIGS. 36 to 41. The microwave oven 100B has a key 22 for thawing and a microwave generator. When the key 22 for thawing is pressed, the food 200 such as meat (including pork, chicken, fish, etc.) placed in the microwave oven 100B is thawed. Here, it should be noted that the structure and working principle of the microwave generator (including a microwave source 31, a microwave source feeding device 32, a waveguide 33, a heating antenna 34 or a stirring blade 35, etc.) are well known to those skilled in the art, which is no longer elaborated here.

Figure 41:
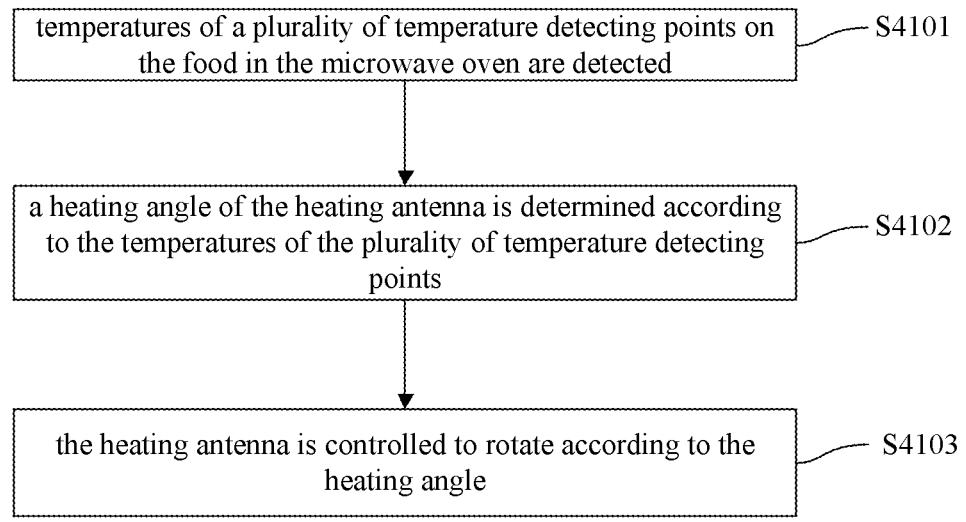
FIG. 41 is a flow chart of a thawing control method for a microwave oven according to an embodiment of the present disclosure.

As shown in FIG. 41, the thawing control method for the microwave oven 100B according to a first aspect of embodiments of the present disclosure includes followings. The microwave oven 100B includes a rotatable heating antenna 34.

S4101, temperatures of a plurality of temperature detecting points 131 on the food 200 in the microwave oven 100B are detected.

S4102, a heating angle of the heating antenna 34 is determined according to the temperatures of the plurality of temperature detecting points 131.

S4103, the heating antenna is controlled to rotate according to the heating angle.

In step S4101, the number of the temperature detecting points 131 and the distribution of the temperature detecting points 131 on the food 200 can be specifically designed according to actual requirements. For example, as shown in FIG. 39, when the food 200 is placed on the clapboard 13 in the microwave oven 100B, the plurality of temperature detecting points 131 may be arranged in a matrix on the clapboard 13. At this time, the temperature detecting points 131 on the food 200 also may be distributed in a plurality of rows or columns. Alternatively, as shown in FIG. 40, the plurality of temperature detecting points 131 may be distributed in a plurality of circles commonly having a center at a point on the clapboard 13, and each circle includes a plurality of temperature detecting points 131 distributed in the circumferential direction, at which time at least part of the temperature detecting points 131 on the clapboard 13 falls on the food 200 to achieve better detection results.

In steps S4102 and S4103, during the process of thawing the food 200 such as meat by the microwave oven 100B, the temperatures of the plurality of temperature detecting points 131 on the food 200 such as meat are detected continually, so as to determine the heating angle of the heating antenna 34. After the heating angle is determined, the heating antenna 34 is rotated to the heating angle to thaw the food 200 such as meat.

For example, in step S4102, a position of a point with a lowest temperature in the plurality of temperature detecting points 131 is judged. In step S4103, the heating antenna 34 is controlled to rotate to the position of the point with the lowest temperature, so that the point with the lowest temperature on the thawed food has stronger microwave heating. Thus, the heating position of the heating antenna 34 can be controlled in accordance with the temperatures of the plurality of temperature detecting points 131 on the food 200, and a good thawing effect can be achieved, and the nutrient loss and partial cooked when thawing in the conventional microwave oven 100B can be solved.

With the thawing control method for the microwave oven 100B according to an embodiment of the present disclosure, by thawing the food 200 according to the temperatures of the plurality of temperature detecting points 131 on the food 200 such as meat, the thawing effect is good.

Between step S4101 and step S4102, the thawing control method further includes followings.

S41011, the heating antenna 34 is controlled to rotate at a constant speed.

S41012, when 30% of the temperatures of the plurality of temperature detecting points are larger than −4° C., it is controlled to execute step S4102.

That is, after the microwave generator in the microwave oven 100B is controlled to start, the heating antenna 34 can be controlled to rotate at the constant speed, thereby uniformly thawing the food 200 such as meat. During thawing, when the temperature values of 30% of the plurality of temperature detecting points 131 on the food 200 such as meat are larger than −4° C., the directional heating mode is started. That is, the point with the lowest temperature in the plurality of temperature detecting points 131 on the food 200 such as meat is judged, and then the heating antenna 34 is rotated to a certain position to give stronger microwave heating to the point with the lowest temperature on the food such as meat.

After S4103, the thawing control method for the microwave oven 100B further includes followings.

S4104, when 80% of the temperatures of the plurality of temperature detecting points are in −3° C.~0° C., the thawing is stopped.

In other words, during thawing, the temperatures of the plurality of temperature detecting points 131 on the food such as meat are continually detected. When the temperatures of 80% of the plurality of temperature detecting points 131 on the food 200 such as meat are in −3° C.~0° C., the food 200 such as meat is stopped to thaw. At this moment the thawing process ends.

In step S4101, the temperatures of the plurality of temperature detecting points 131 on the food 200 can be detected based on an infrared temperature sensor 5 provided in the microwave oven 100B. The infrared temperature sensor 5 may scan the initial temperature of the food 200 such as meat and count the number of the temperature detecting points 131 on the food 200 such as meat. For example, in an embodiment of FIG. 39, the number of the temperature detecting points 131 on the food 200 such as meat is 14, and in an embodiment of FIG. 40, the number of the temperature detecting points 131 on the food 200 such as meat is 15.

As shown in FIG. 36, the infrared temperature sensor 5 is provided in the microwave oven 100B. Specifically, the oven chamber 11 is defined in the microwave oven 100B. The oven chamber 11 is divided into a cooking chamber 111 and a heating chamber 112 located below the cooking chamber 111 by the clapboard 13. The infrared temperature sensor 5 is provided outside the oven chamber 11 and is located in an upper portion of the cooking chamber 111. The cooking chamber 111 is formed with a through-hole 141. The infrared temperature sensor 5 has an infrared temperature sensing probe. The infrared temperature sensing probe corresponds to the through-hole 141.

Alternatively, the infrared temperature sensor 5 is slantwise provided on the side wall outside the oven chamber 11 and is provided near the top wall of the oven chamber 11. The microwave oven 100B is provided with a mounting portion 14 adapted to mount the infrared temperature sensor 5. A portion of the side wall of the oven chamber 11 protrudes outward to form the mounting portion 14, and the through-hole 141 is formed in the mounting portion 14. Certainly, the infrared temperature sensor 5 may be provided on the top wall outside the oven chamber 11 (not shown in Figs.). It is to be understood that the specific installation position of the infrared temperature sensor 5, and the shape and molding method of the mounting portion 14 can be specifically designed according to actual requirements. The present disclosure is not particularly limited thereto.

Specifically, the infrared temperature sensor 5 has M infrared temperature sensing probes. For example, in an embodiment shown in FIG. 39, the infrared temperature sensor 5 has 64 infrared temperature sensing probes. In an embodiment shown in FIG. 40, the infrared temperature sensor 5 has 8 infrared temperature sensing probes. When the infrared temperature sensor 5 rotates, the full-surface scanning of the clapboard 13 can be realized. The infrared temperature sensor 5 may be driven to rotate by a motor 6, such as a stepping motor.

The temperatures of the plurality of temperature detecting points 131 on the food 200 such as meat are detected by the N infrared temperature sensing probes. As shown in FIG. 39, 14 temperature detecting points 131 are distributed on the surface of the food 200 such as meat, numbered as: 20, 21, 22, 27, 28, 29, 30, 35, 36, 37, 38, 43, 44, 45. As shown in FIG. 40, 15 temperature detecting points 131 distributed on the surface of the food 200 such as meat are acquired by scanning.

N and M are both positive integers and N is less than or equal to M. When the food 200 such as meat, covers the upper surface of the whole clapboard 13, N is equal to M.

As shown in FIG. 36, the infrared temperature sensor 5 is fixed. The infrared temperature sensor 5 has 64 infrared temperature sensing probes. The clapboard 13 is correspondingly provided with 64 temperature detecting points 131.

When thawing, referring to FIGS. 37 and 38 and in combination with FIG. 39, the food 200 such as meat is placed in the microwave oven 100B first. The infrared temperature sensor 5 scans to acquire the initial temperature of the meat and counts the number (14) of the temperature detecting points 131 on the meat. Then the key 22 for thawing on the control panel 2 of the microwave oven 100B is pressed to activate the microwave generator to thaw the meat.

In detail, the heating antenna 34 can be controlled to rotate at the constant speed first. The temperature of meat is detected continually. When the temperature values of 30% of the plurality of temperature detecting points 131 on the meat are larger than −4° C., the directional heating mode is started. That is, the point with the lowest temperature in the plurality of temperature detecting points 131 on the meat is judged, and the heating antenna 34 is rotated to a certain position to give stronger microwave heating to the point with the lowest temperature on the meat. The temperatures of the plurality of temperature detecting points 131 on the meat is detected continually, and when the temperature values of 80% of the plurality of temperature detecting points 131 on the meat are in −3° C.~0° C., the thawing is stopped, and the thawing process is finished.

As shown in FIG. 36, the infrared temperature sensor 5 is driven to rotate by the motor 6 connected thereto. The infrared temperature sensor 5 has 8 infrared temperature sensing probes. Correspondingly, 8 temperature detecting points 131 are arranged in the clapboard 13. The 8 temperature detecting points 131 are arranged in a straight line on the clapboard 13.

When thawing, referring to FIGS. 37 and 38 and in combination with FIG. 40, the food 200 such as meat is placed in the microwave oven 100B first. The infrared temperature sensor 5 is driven by the stepping motor to rotate, thereby realizing the full-surface scanning. The initial temperature of the meat is detected, and the number (15) of the temperature detecting points 131 distributed on the surface of the meat is acquired by the scanning. Then the key 22 for thawing on the control panel 2 of the microwave oven 100B is pressed to start the microwave generator to thaw the meat.

In detail, the heating antenna 34 can be controlled to rotate at the constant speed first. The temperature of meat is detected continually. When the temperature values of 30% of the plurality of temperature detecting points 131 on the meat are larger than −4° C., the directional heating mode is started. That is, the point with the lowest temperature in the plurality of temperature measurement points 131 on the meat is judged, and the heating antenna 34 is rotated to a certain position to give stronger microwave heating to the point with the lowest temperature on the meat. The temperatures of the plurality of temperature detecting points 131 on the meat is detected continually, and when the temperature values of 80% of the plurality of temperature detecting points 131 on the meat are in −3° C.~0° C., the thawing is stopped, and the thawing process is finished.

After the hawing process is finished, the temperature of the food such as meat is between −3° C. and 0° C., preferably −1° C. Therefore, the rapid thawing is achieved, the thawing is normally, and the nutrient is not lost. In addition, −1° C. is used as the temperature at thawing endpoint, which has at least following advantages: (1) the thawed food is more nutritious; (2) the thawed food is healthier; (3) the thawed food has the lower temperature difference, and there is no cooked discoloration phenomenon; (4) the thawed food has the moderate shear force and is easier to cut and operate.

As shown in FIG. 36, the microwave oven 100B according to a second aspect of embodiments of the present disclosure includes an oven body 1, a temperature detecting device and a microwave generator. The microwave oven 100B uses the thawing control method for the microwave oven 100B according to the first aspect of embodiments of the present disclosure to thaw the food 200.

In detail, the oven body 1 defines an oven chamber 11 suitable for placing the food 200 such as meat. The control panel 2 is disposed on the oven body 1, for example on the front surface of the oven body 1. The control panel 2 has a key 22 for thawing. The microwave generator is disposed in the oven body 1, and configured to emit microwaves to the oven chamber 11 to thaw the food 200 such as meat.

The temperature detecting device is provided in the oven body 1 to detect temperature of a plurality of temperature detecting points 131 on the food 200. Alternatively, the temperature detecting device is an infrared temperature sensor 5, and the infrared temperature sensor 5 is provided in the upper portion of the oven body 1.

The infrared temperature sensor 5 is provided in the oven chamber 11. Specifically, referring to FIG. 36, the oven chamber 11 is divided into a cooking chamber 111 and a heating chamber 112 located below the cooking chamber 111 by a clapboard 13. The infrared temperature sensor 5 is provided outside the oven chamber 11 and is located in an upper portion of the cooking chamber 111. The cooking chamber 111 is formed with a through-hole 141. The infrared temperature sensor 5 has an infrared temperature sensing probe. The infrared temperature sensing probe corresponds to the through-hole 141.

For example, the infrared temperature sensor 5 is slantwise provided on the side wall outside the oven chamber 11 and is provided near the top wall of the oven chamber 11. The microwave oven 100B is provided with a mounting portion 14 adapted to mount the infrared temperature sensor 5. A portion of the side wall of the oven chamber 11 protrudes outward to form the mounting portion 14, and the through-hole 141 is formed in the mounting portion 14. Certainly, the infrared temperature sensor 5 may be provided on the top wall outside the oven chamber 11 (not shown in Figs.). It is to be understood that the specific installation position of the infrared temperature sensor 5, and the shape and molding method of the mounting portion 14 can be specifically designed according to actual requirements. The present disclosure is not particularly limited thereto.

As shown in FIG. 36, the infrared temperature sensor 5 is fixed. The infrared temperature sensor 5 has 64 infrared temperature sensing probes. The clapboard 13 is correspondingly provided with 64 temperature detecting points 131.

When thawing, referring to FIGS. 37 and 38 and in combination with FIG. 39, the food 200 such as meat is placed in the microwave oven 100B first. The infrared temperature sensor 5 scans to acquire the initial temperature of the meat and counts the number (14) of the temperature detecting points 131 on the meat. Then the key 22 for thawing on the control panel 2 of the microwave oven 100B is pressed to activate the microwave generator to thaw the meat.

In detail, the heating antenna 34 can be controlled to rotate at the constant speed first. The temperature of meat is detected continually. When the temperature values of 30% of the plurality of temperature detecting points 131 on the meat are larger than −4° C., the directional heating mode is started. That is, the point with the lowest temperature in the plurality of temperature measurement points 131 on the meat is judged, and the heating antenna 34 is rotated to a certain position to give stronger microwave heating to the point with the lowest temperature on the meat. The temperatures of the plurality of temperature detecting points 131 on the meat is detected continually, and when the temperature values of 80% of the plurality of temperature detecting points 131 on the meat are in −3° C.~0° C., the thawing is stopped, and the thawing process is finished.

As shown in FIG. 36, the infrared temperature sensor 5 is driven to rotate by the motor 6 connected thereto. The infrared temperature sensor 5 has 8 infrared temperature sensing probes. Correspondingly, 8 temperature detecting points 131 are arranged in the clapboard 13. The 8 temperature detecting points 131 are arranged in a straight line on the clapboard 13.

When thawing, referring to FIGS. 37 and 38 and in combination with FIG. 40, the food 200 such as meat is placed in the microwave oven 100B first. The infrared temperature sensor 5 is driven by the stepping motor to rotate, thereby realizing the full-surface scanning. The initial temperature of the meat is detected, and the number (15) of the temperature detecting points 131 distributed on the surface of the meat is acquired by the scanning. Then the key 22 for thawing on the control panel 2 of the microwave oven 100B is pressed to start the microwave generator to thaw the meat.

In detail, the heating antenna 34 can be controlled to rotate at the constant speed first. The temperature of meat is detected continually. When the temperature values of 30% of the temperature detecting points 131 in the plurality of temperature detecting points 131 on the meat are larger than −4° C., the directional heating mode is started. That is, the point with the lowest temperature in the plurality of temperature detecting points 131 on the meat is judged, and the heating antenna 34 is rotated to a certain position to give stronger microwave heating to the point with the lowest temperature on the meat. The temperatures of the plurality of temperature detecting points 131 on the meat is detected continually, and when the temperature values of 80% of the plurality of temperature detecting points 131 on the meat are in −3° C.~0° C., the thawing is stopped, and the thawing process is finished.

With the microwave oven 100B in embodiments of the present disclosure, by using the thawing control method for the microwave oven 100B according to the first aspect of embodiments of the present disclosure, the thawed food such as meat has no loss of nutrition.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc. Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A thawing control method for a microwave oven, wherein the microwave oven comprises a microwave generator, the method comprises:
   detecting temperatures of a plurality of temperature detecting points on food in the microwave oven;
   controlling the microwave generator to start, and thawing the food according to the temperatures of the plurality of temperature detecting points on the food;
   wherein thawing the food according to the temperatures of the plurality of temperature detecting points on the food comprises:
   thawing the food according to the temperatures of the plurality of temperature detecting points on the food, to maintain the temperature of the food between −3° C.-0° C.;
   wherein the temperatures of the plurality of temperature detecting points on the food are detected by an infrared temperature sensor disposed in the microwave oven, the infrared temperature sensor comprises M infrared temperature sensing probes, and the temperatures of the plurality of temperature detecting points on the food are detected by N infrared temperature sensing probes, where N and M are positive integers, and N is less than or equal to M;
   wherein thawing the food according to the temperatures of the plurality of temperature detecting points on the food, to maintain the temperature of the food between −3° C.-0° C. comprises:
   thawing the food with a first firepower level, wherein the first firepower level is 30%-60% of a maximum firepower;
   when 30% of the temperature detection values of the N infrared temperature sensing probes are larger than −4° C., thawing the food with a second firepower level, wherein the second firepower level is 20%-40% of the maximum firepower;
   when 60% of the temperature detection values of the N infrared temperature sensing probes are larger than −4° C., thawing the food with a third firepower level, wherein the third firepower level is 30%-60% of the maximum firepower;
   when 30% of the temperature detection values of the N infrared temperature sensing probes are between −3° C.-0° C., thawing the food with a fourth firepower level, wherein the fourth firepower level is 0%-30% of the maximum firepower; and
   when 80% of the temperature detection values of the N infrared temperature sensing probes are between −3° C.-0° C., stopping thawing the food.

2. The thawing control method according to claim 1, wherein thawing the food according to the temperatures of the plurality of temperature detecting points on the food comprises:
   successively adopting a plurality of firepower levels according to temperature detection values of the N infrared temperature sensing probes to thaw the food.

3. The thawing control method according to claim 1, wherein the microwave oven comprises a rotatable heating antenna, and thawing the food according to the temperatures of the plurality of temperature detecting points on the food comprises:
   S1, determining a heating angle of the heating antenna according to the temperatures of the plurality of temperature detecting points; and
   S2, controlling the heating antenna to rotate according to the heating angle to maintain the temperature of the food.

4. The thawing control method according to claim 3, further comprising:
   in step S1, judging a position of a point with a minimum temperature in the plurality of temperature detecting points; and
   in step S2, controlling the heating antenna to rotate to the position of the point with the minimum temperature, and
   wherein before S1, the method further comprises:
   controlling the heating antenna to rotate at a constant speed; and
   when 30% of the temperatures of the plurality of temperature detecting points are larger than −4° C., controlling to execute S1,
   wherein S2 comprises:
   when 80% of the temperatures of the plurality of temperature detecting points are between −3° C.-0° C., stopping the thawing.

5. The thawing control method according to claim 1, wherein thawing the food according to the temperatures of the plurality of temperature detecting points on the food comprises:
   thawing the food according to the temperatures of the plurality of temperature detecting points on the food, to maintain the temperature of the food at −1° C.

6. The thawing control method according to claim 1, wherein thawing the food according to the temperatures of the plurality of temperature detecting points on the food comprises:
   thawing the food according to the temperatures of the plurality of temperature detecting points on the food, to make the temperature of the food lower than −3° C.-0° C. in thawing and to maintain the temperature of the food between −3° C.-0° C. after thawing.

7. The thawing control method according to claim 6, wherein thawing the food according to the temperatures of the plurality of temperature detecting points on the food comprises:
   thawing the food according to the temperatures of the plurality of temperature detecting points on the food, to make the temperature of the food lower than −1° C. in thawing and to maintain the temperature of the food at −1° C. after thawing.

8. A thawing control device for a microwave oven, comprising:
   a processor; and
   a memory for storing instructions executable by the processor, wherein the processor is configured to:
detect temperatures of a plurality of temperature detecting points on food in the microwave oven;
control the microwave generator to start, and thaw the food according to the temperatures of the plurality of temperature detecting points on the food;
wherein the processor is configured to:
thaw the food according to the temperatures of the plurality of temperature detecting points on the food, to maintain the temperature of the food at −3° C.-0° C.;
where the device further comprises:
an infrared temperature sensor configured to detect the temperatures of the plurality of temperature detecting points on the food, wherein the infrared temperature sensor comprises M infrared temperature sensing probes, and the temperatures of the plurality of temperature detecting points on the food are detected by N infrared temperature sensing probes, where N and M are positive integers, and N is less than or equal to M;
wherein the processor is configured to:
successively adopt a plurality of firepower levels according to temperature detection values of the N infrared temperature sensing probes to thaw the food;
wherein the processor is configured to successively adopt a plurality of firepower levels according to temperature detection values of the N infrared temperature sensing probes to thaw the food by acts of:
thawing the food with a first firepower level, wherein the first firepower level is 30%-60% of a maximum firepower;
when 30% of the temperature detection values of the N infrared temperature sensing probes are larger than −4° C., thawing the food with a second firepower level, wherein the second firepower level is 20%-40% of the maximum firepower;
when 60% of the temperature detection values of the N infrared temperature sensing probes are larger than −4° C., thawing the food with a third firepower level, wherein the third firepower level is 30%-60% of the maximum firepower;
when 30% of the temperature detection values of the N infrared temperature sensing probes are between −3° C.-0° C., thawing the food with a fourth firepower level, wherein the fourth firepower level is 0%-30% of the maximum firepower; and
when 80% of the temperature detection values of the N infrared temperature sensing probes are between −3° C.-0° C., stopping thawing the food.

9. The thawing control device according to claim 8, further comprising:
a rotatable heating antenna,
wherein the processor is further configured to perform acts of:
S1, determining a heating angle of the heating antenna according to the temperatures of the plurality of temperature detecting points; and
S2, controlling the heating antenna to rotate according to the heating angle to maintain the temperature of the food.

10. The thawing control device according to claim 9, wherein the processor is further configured to perform acts of:
in step S1, judging a position of a point with a minimum temperature in the plurality of temperature detecting points;
in step S2, controlling the heating antenna to rotate to the position of the point with the minimum temperature;
before S1, controlling the heating antenna to rotate at a constant speed; and
when 30% of the temperatures of the plurality of temperature detecting points are larger than −4° C., controlling to execute S1;
when 80% of the temperatures of the plurality of temperature detecting points are between −3° C.-0° C., stopping the thawing.

11. The thawing control device according to claim 8, wherein the processor is configured to:
thaw the food according to the temperatures of the plurality of temperature detecting points on the food, to make the temperature of the food lower than −3° C.-0° C. in thawing and to maintain the temperature of the food at −3° C.-0° C. after thawing.

12. The thawing control device according to claim 11, wherein the processor is configured to:
thaw the food according to the temperatures of the plurality of temperature detecting points on the food, to make the temperature of the food lower than −1° C. in thawing and to maintain the temperature of the food at −1° C. after thawing.

13. A microwave oven, comprising:
an oven body, wherein an oven chamber is limited inside the oven body, and food is adaptive to be placed in the oven chamber;
a temperature detecting device, provided in the oven body to detect temperatures of a plurality of temperature detecting points on the food;
a microwave generator, disposed in the oven body, and configured to emit microwaves to the oven chamber to thaw the food;
a controller, configured to execute acts of:
detecting temperatures of a plurality of temperature detecting points on food in the microwave oven; and
controlling the microwave generator to start, and thawing the food according to the temperatures of the plurality of temperature detecting points on the food;
wherein thawing the food according to the temperatures of the plurality of temperature detecting points on the food comprises:
thawing the food according to the temperatures of the plurality of temperature detecting points on the food, to maintain the temperature of the food at −3° C.-0° C.;
wherein the temperatures of the plurality of temperature detecting points on the food are detected by an infrared temperature sensor disposed in the microwave oven, the infrared temperature sensor comprises M infrared temperature sensing probes, and the temperatures of the plurality of temperature detecting points on the food are detected by N infrared temperature sensing probes, where N and M are positive integers, and N is less than or equal to M;
wherein thawing the food according to the temperatures of the plurality of temperature detecting points on the food, to maintain the temperature of the food at −3° C.-0° C. comprises:
thawing the food with a first firepower level, wherein the first firepower level is 30%-60% of a maximum firepower;
when 30% of the temperature detection values of the N infrared temperature sensing probes are larger than −4° C., thawing the food with a second firepower level, wherein the second firepower level is 20%-40% of the maximum firepower;
when 60% of the temperature detection values of the N infrared temperature sensing probes are larger than −4°

C., thawing the food with a third firepower level, wherein the third firepower level is 30%-60% of the maximum firepower;

when 30% of the temperature detection values of the N infrared temperature sensing probes are between −3° C.-0° C., thawing the food with a fourth firepower level, wherein the fourth firepower level is 0%-30% of the maximum firepower; and when 80% of the temperature detection values of the N infrared temperature sensing probes are between −3° C.-0° C., stopping thawing the food.

\* \* \* \* \*